US012066785B2

(12) United States Patent
Sugimoto et al.

(10) Patent No.: US 12,066,785 B2
(45) Date of Patent: Aug. 20, 2024

(54) CARTRIDGE AND IMAGE FORMING APPARATUS

(71) Applicant: CANON KABUSHIKI KAISHA, Tokyo (JP)

(72) Inventors: Sohta Sugimoto, Kanagawa (JP); Shunsuke Hijikata, Kanagawa (JP); Naoki Hayashi, Kanagawa (JP); Yu Fukasawa, Tokyo (JP); Seiya Ishikawa, Tokyo (JP); Shinichi Nishida, Kanagawa (JP); Shinjiro Toba, Kanagawa (JP); Takeo Kawanami, Kanagawa (JP); Yuichi Fukui, Kanagawa (JP); Yasuyuki Egami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/117,557

(22) Filed: Mar. 6, 2023

(65) Prior Publication Data

US 2023/0205128 A1 Jun. 29, 2023

Related U.S. Application Data

(63) Continuation of application No. PCT/JP2021/035216, filed on Sep. 16, 2021.

(30) Foreign Application Priority Data

Sep. 17, 2020 (JP) ................................ 2020-156776

(51) Int. Cl.
*G03G 21/16* (2006.01)
*G03G 21/18* (2006.01)

(52) U.S. Cl.
CPC ..... *G03G 21/1647* (2013.01); *G03G 21/1652* (2013.01); *G03G 21/1676* (2013.01);
(Continued)

(58) Field of Classification Search
CPC .......... G03G 21/1647; G03G 21/1652; G03G 21/1676; G03G 21/186; G03G 21/1864; G03G 2221/1654; G03G 2221/1657
See application file for complete search history.

(56) References Cited

U.S. PATENT DOCUMENTS 7,761,024 B2 7/2010 Imaizumi et al.
9,952,554 B2 4/2018 Itabashi et al.
(Continued)

FOREIGN PATENT DOCUMENTS

JP 2001-337511 A 12/2001
JP 2007286196 A 11/2007
(Continued)

OTHER PUBLICATIONS

International Search Report and Written Opinion for International Patent Application No. PCT/JP2021/035216.
(Continued)

*Primary Examiner* — Sophia S Chen
(74) *Attorney, Agent, or Firm* — Venable LLP

(57) ABSTRACT

A cartridge includes a photosensitive member, a developing member for depositing toner onto the photosensitive member, and a coupling member capable of receiving a driving force for rotating the developing member. The cartridge also includes a movable portion movable between a driving force transmitting position for permitting transmission of the driving force from the coupling member to the developing member and a driving force interrupting position for interrupting the transmission of the driving force from the coupling member to the developing member. A holding portion is provided for holding the movable portion in the driving force interrupting position when the movable portion is in the driving force interrupting position. The movable portion is capable of taking the driving force transmitting position and the driving force interrupting position in a state
(Continued)

where the developing member is in a position where the toner is capable of being deposited on the photosensitive member.

41 Claims, 72 Drawing Sheets

(52) U.S. Cl.
CPC ....... *G03G 21/186* (2013.01); *G03G 21/1864* (2013.01); *G03G 2221/1654* (2013.01); *G03G 2221/1657* (2013.01)

(56) References Cited

U.S. PATENT DOCUMENTS

| | | | |
|---|---|---|---|
| 10,139,777 | B2 | 11/2018 | Sato et al. |
| 10,254,712 | B2 | 4/2019 | Uneme et al. |
| 10,534,313 | B2 | 1/2020 | Sugimoto et al. |
| 10,678,185 | B2 | 6/2020 | Uneme et al. |
| 10,705,480 | B2 | 7/2020 | Sato et al. |
| 10,705,481 | B2 | 7/2020 | Sugimoto et al. |
| 10,824,110 | B2 | 11/2020 | Sugimoto et al. |
| 10,901,365 | B2 | 1/2021 | Sato et al. |
| 11,036,181 | B2 | 6/2021 | Uneme et al. |
| 11,099,521 | B2 | 8/2021 | Uneme et al. |
| 11,112,751 | B2 | 9/2021 | Sato et al. |
| 11,173,524 | B2 | 11/2021 | Nabavi et al. |
| 11,307,531 | B2 | 4/2022 | Uneme et al. |
| 11,385,593 | B2 | 7/2022 | Sato et al. |
| 11,531,301 | B2 | 12/2022 | Kubo et al. |
| 11,614,710 | B2 | 3/2023 | Sato et al. |
| 2004/0126136 | A1 | 7/2004 | Toba et al. |
| 2005/0220480 | A1 | 10/2005 | Miyabe et al. |
| 2005/0220486 | A1 | 10/2005 | Miyabe et al. |
| 2005/0254862 | A1 | 11/2005 | Toba et al. |
| 2006/0051135 | A1 | 3/2006 | Sato et al. |
| 2006/0067725 | A1 | 3/2006 | Miyabe et al. |
| 2006/0072936 | A1 | 4/2006 | Numagami et al. |
| 2006/0072938 | A1 | 4/2006 | Sato et al. |
| 2007/0053722 | A1 | 3/2007 | Sato et al. |
| 2007/0248382 | A1 | 10/2007 | Oguma et al. |
| 2008/0025757 | A1 | 1/2008 | Sato et al. |
| 2008/0159774 | A1 | 7/2008 | Tanabe et al. |
| 2008/0159781 | A1 | 7/2008 | Noguchi et al. |
| 2008/0292355 | A1 | 11/2008 | Sakurai et al. |
| 2009/0003875 | A1 | 1/2009 | Toba et al. |
| 2010/0046980 | A1 | 2/2010 | Imaizumi et al. |
| 2010/0142996 | A1 | 6/2010 | Tanabe et al. |
| 2010/0158563 | A1 | 6/2010 | Tanabe et al. |
| 2010/0266310 | A1 | 10/2010 | Saiki et al. |
| 2010/0322666 | A1 | 12/2010 | Inomata et al. |
| 2011/0064459 | A1 | 3/2011 | Toba et al. |
| 2011/0064477 | A1 | 3/2011 | Takiguchi et al. |
| 2011/0103832 | A1 | 5/2011 | Hayashi et al. |
| 2011/0103839 | A1 | 5/2011 | Toba et al. |
| 2011/0116825 | A1 | 5/2011 | Imaizumi et al. |
| 2011/0142491 | A1 | 6/2011 | Numata et al. |
| 2011/0206412 | A1 | 8/2011 | Tanabe et al. |
| 2012/0141165 | A1 | 6/2012 | Sakurai et al. |
| 2012/0195632 | A1 | 8/2012 | Imaizumi et al. |
| 2013/0022368 | A1 | 1/2013 | Takarada et al. |
| 2013/0114972 | A1 | 5/2013 | Takarada et al. |
| 2013/0164029 | A1 | 6/2013 | Fukui et al. |
| 2013/0177334 | A1 | 7/2013 | Nonaka et al. |
| 2013/0209137 | A1 | 8/2013 | Hayashi et al. |
| 2013/0223876 | A1 | 8/2013 | Sakurai et al. |
| 2013/0243479 | A1 | 9/2013 | Maizumi et al. |
| 2013/0243481 | A1 | 9/2013 | Toba et al. |
| 2013/0251402 | A1 | 9/2013 | Yamashita et al. |
| 2013/0308971 | A1 | 11/2013 | Kashiide et al. |
| 2014/0064776 | A1 | 3/2014 | Yamasaki et al. |
| 2014/0064777 | A1 | 3/2014 | Toba et al. |
| 2014/0064784 | A1 | 3/2014 | Hayashi et al. |
| 2014/0072327 | A1 | 3/2014 | Hayashi et al. |
| 2014/0086620 | A1 | 3/2014 | Takeuchi et al. |
| 2014/0099140 | A1 | 4/2014 | Maizumi et al. |
| 2014/0212166 | A1 | 7/2014 | Takeuchi et al. |
| 2014/0233987 | A1 | 8/2014 | Suzuki et al. |
| 2014/0334844 | A1 | 11/2014 | Fukui et al. |
| 2014/0361030 | A1 | 12/2014 | Toba et al. |
| 2015/0037065 | A1 | 2/2015 | Takarada et al. |
| 2015/0055963 | A1 | 2/2015 | Kanno et al. |
| 2015/0220020 | A1 | 8/2015 | Hayashi et al. |
| 2015/0227085 | A1 | 8/2015 | Kashiide et al. |
| 2015/0355576 | A1 | 12/2015 | Yamasaki et al. |
| 2016/0062270 | A1 | 3/2016 | Fukasawa et al. |
| 2016/0170336 | A1 | 6/2016 | Oba et al. |
| 2016/0170369 | A1 | 6/2016 | Toba et al. |
| 2016/0238967 | A1 | 8/2016 | Fukui et al. |
| 2016/0238993 | A1 | 8/2016 | Kanno et al. |
| 2016/0257041 | A1 | 9/2016 | Takarada et al. |
| 2016/0327887 | A1 | 11/2016 | Takeuchi et al. |
| 2016/0307075 | A1 | 12/2016 | Sato et al. |
| 2016/0370757 | A1 | 12/2016 | Sato et al. |
| 2017/0060033 | A1 | 3/2017 | Takeuchi et al. |
| 2017/0168422 | A1 | 6/2017 | Takeuchi et al. |
| 2017/0269542 | A1 | 9/2017 | Itabashi et al. |
| 2017/0293255 | A1 | 10/2017 | Uratani et al. |
| 2017/0363989 | A1 | 12/2017 | Fukasawa et al. |
| 2018/0074454 | A1 | 3/2018 | Uneme et al. |
| 2018/0150024 | A1 | 5/2018 | Takahashi et al. |
| 2018/0224794 | A1 | 8/2018 | Kamoshida et al. |
| 2018/0253057 | A1 | 9/2018 | Koishi et al. |
| 2018/0329363 | A1 | 11/2018 | Hijikata et al. |
| 2018/0373199 | A1 | 12/2018 | Sugimoto et al. |
| 2019/0064732 | A1 | 2/2019 | Sato et al. |
| 2019/0219966 | A1 | 7/2019 | Uneme et al. |
| 2019/0227484 | A1 | 7/2019 | Takahashi et al. |
| 2019/0286051 | A1 | 9/2019 | Sugimoto et al. |
| 2019/0302687 | A1 | 10/2019 | Miyoshi et al. |
| 2019/0354061 | A1 | 11/2019 | Uratani et al. |
| 2020/0004192 | A1 | 1/2020 | Kamoshida et al. |
| 2020/0117136 | A1 | 4/2020 | Nishida et al. |
| 2020/0125028 | A1 | 4/2020 | Sugimoto et al. |
| 2020/0241467 | A1 | 7/2020 | Uneme et al. |
| 2020/0249622 | A1 | 8/2020 | Uratani et al. |
| 2020/0301355 | A1 | 9/2020 | Sato et al. |
| 2021/0003961 | A1 | 1/2021 | Uneme et al. |
| 2021/0003965 | A1 | 1/2021 | Sugimoto et al. |
| 2021/0088958 | A1 | 3/2021 | Kamoshida et al. |
| 2021/0109479 | A1 | 4/2021 | Kubo et al. |
| 2021/0191312 | A1 | 6/2021 | Sato et al. |
| 2021/0200145 | A9 | 7/2021 | Uneme et al. |
| 2021/0325821 | A1* | 10/2021 | Ikegami ............. G03G 21/1647 |
| 2021/0325824 | A1 | 10/2021 | Uneme et al. |
| 2021/0382434 | A1 | 12/2021 | Morioka et al. |
| 2021/0397122 | A1 | 12/2021 | Fukui et al. |
| 2022/0035309 | A1 | 2/2022 | Sugimoto et al. |
| 2022/0050417 | A1 | 2/2022 | Nishida et al. |
| 2022/0206410 | A1 | 6/2022 | Uneme |
| 2022/0236685 | A1 | 7/2022 | Kamoshida et al. |
| 2022/0283538 | A1 | 9/2022 | Sato et al. |
| 2022/0404738 | A1 | 12/2022 | Toba et al. |
| 2023/0074264 | A1 | 3/2023 | Fujino et al. |
| 2023/0075423 | A1 | 3/2023 | Fujino et al. |
| 2023/0082891 | A1 | 3/2023 | Koishi et al. |
| 2023/0096202 | A1 | 3/2023 | Sato et al. |
| 2023/0176496 | A1 | 6/2023 | Fujino et al. |
| 2023/0176503 | A1 | 6/2023 | Fukui et al. |
| 2023/0176519 | A1 | 6/2023 | Fujino et al. |

FOREIGN PATENT DOCUMENTS

| | | | |
|---|---|---|---|
| JP | 2012-177840 | A | 9/2012 |
| JP | 2014-215593 | A | 11/2014 |
| JP | 2015-111221 | A | 6/2015 |
| JP | 2017-003974 | A | 1/2017 |
| JP | 2017-161904 | A | 9/2017 |
| JP | 2017-167350 | A | 9/2017 |
| JP | 2019-159083 | A | 9/2019 |
| JP | 2020-003791 | A | 1/2020 |
| JP | 2020-140096 | A | 9/2020 |
| TW | 201039077 | A | 11/2010 |

(56) References Cited

FOREIGN PATENT DOCUMENTS

| | | | |
|---|---|---|---|
| TW | 201100982 | A | 1/2011 |
| TW | 201111923 | A | 4/2011 |
| TW | 201807516 | A | 3/2018 |
| TW | 201807520 | A | 3/2018 |
| TW | 201827956 | A | 8/2018 |
| TW | 201835695 | A | 10/2018 |
| TW | 202022509 | A | 6/2020 |
| TW | 202022511 | A | 6/2020 |

OTHER PUBLICATIONS

Co-pending U.S. Appl. No. 18/112,610, filed Feb. 22, 2023.
Co-pending U.S. Appl. No. 18/208,405, filed Jun. 12, 2023.
Co-pending U.S. Appl. No. 18/210,147, filed Jun. 15, 2023.
Jan. 4, 2024 Examination Report in Australian Patent Application No. 2021343023.
Oct. 20, 2023 Office Action in Taiwanese Patent Application No. 110134547.
Nov. 20, 2023 Office Action in Indian Patent Application No. 202347016503.

* cited by examiner (a)

(b)

(a)

(b)

(a)

(b)

(a)

(b)

(a)

(b)

(c)

(a)

(b)

(a)

(b)

(a)

(b)

(a)

(b)

(a)

(b)

(a)

(b)

(c)

(a)

(b)

CARTRIDGE AND IMAGE FORMING APPARATUS

TECHNICAL FIELD

The present invention relates to an electrophotographic image forming apparatus such as a copying machine or a printer which employs an electrophotographic method, and a cartridge which can be mounted to or dismounted from the electrophotographic image forming apparatus. Here, an electrophotographic image forming apparatus (hereinafter also referred to as an "image forming apparatus") forms an image on a sheet-like recording material such as paper using an electrophotographic image forming process. Examples of image forming apparatuses include copying machines, facsimile machines, printers (laser beam printers, LED printers, and so on), and multifunction machines (multi-function printers). A cartridge is a unit which can be mounted to and dismounted from the image forming apparatus described above, and is a unit which includes a photosensitive member and/or process means (a charging member, a developing member, a cleaning member, and so on, for example) actable on the photosensitive member.

BACKGROUND ART

Conventionally, an image forming apparatus employs a process cartridge system in which a drum and process means actable on the drum are integrated into a cartridge, and the cartridge is mountable to and dismountable from a main assembly of the image forming apparatus. Using this process cartridge system, maintenance operation of the image forming apparatus can be performed by the user himself/herself without relying on a serviceman, so that the operability can be improved remarkably. Therefore, this process cartridge system is widely usable with the image forming apparatuses.

Here, Japanese Laid-open Patent Application No. 2001-337511, for example, proposes a process cartridge provided with a clutch for performing drive switching such that the developing roller is driven during image formation and the developing roller is isolated from the drive during non-image formation. In addition, JP 2015-111221 discloses a structure for switching between transmission and interruption of drive to the developing roller while the surface of the photosensitive drum and the developing roller are kept in contact with each other.

SUMMARY OF THE INVENTION

Problem to be Solved

In JP 2001-337511, a clutch for switching drive is provided at the end of the developing roller, and the use is made with a rotating shaft and a crank mechanism including an arm connecting the shaft which is out of alignment with the rotating axis in order to switch the drive in interrelation with the contact/separation operation between the photosensitive drum and the developing roller. However, the conventional techniques described in JP 2001-337511 and JP 2015-111221 still have room for further improvement. Therefore, an object of the present disclosure is to further develop the conventional technology.

Means for Solving the Problem

In order to solve the above-described problems, a cartridge comprises:

a photosensitive member;

a developing member for depositing toner onto the photosensitive member;

a coupling member capable of receiving a driving force for rotating the developing member;

a movable portion movable between a driving force transmitting position for permitting transmission of the driving force from the coupling member to the developing member and a driving force interrupting position for interrupting the transmission of the driving force from the coupling member to the developing member;

a holding portion for holding the movable portion in the driving force interrupting position when the movable portion is in the driving force interrupting position, wherein the movable portion is capable of taking the driving force transmitting position and the driving force interrupting position in a state that the developing member is in a position where the toner is capable of being deposited on the photosensitive member.

Effect of the Invention

According to the present disclosure, the prior art can be further developed.

DESCRIPTION OF EMBODIMENTS

Embodiment implementing the present invention will be exemplarily described in detail in the following with reference to the drawings. However, the dimensions, materials, shapes and relative arrangement of the components described in this embodiment should be appropriately changed in accordance with the structure of the device to which the invention is applied and various conditions. That is, it is not intended to limit the scope of the present invention to the embodiments which will be described in the following.

Embodiment 1

Referring to FIGS. 1 to 16, an Embodiment 1 of the present disclosure will be described. In the following embodiments, an image forming apparatus in which four cartridges (hereinafter referred to as process cartridges) can be dismountably mounted is exemplified as an image forming apparatus. The number of process cartridges to be mounted on the image forming apparatus is not limited to that in the embodiments. It is appropriately selected depending on the situation. Also, in the embodiments described below, a laser beam printer is exemplified as one aspect of the image forming apparatus.

[Schematic Structure of Image Forming Apparatus]

Figure 2:
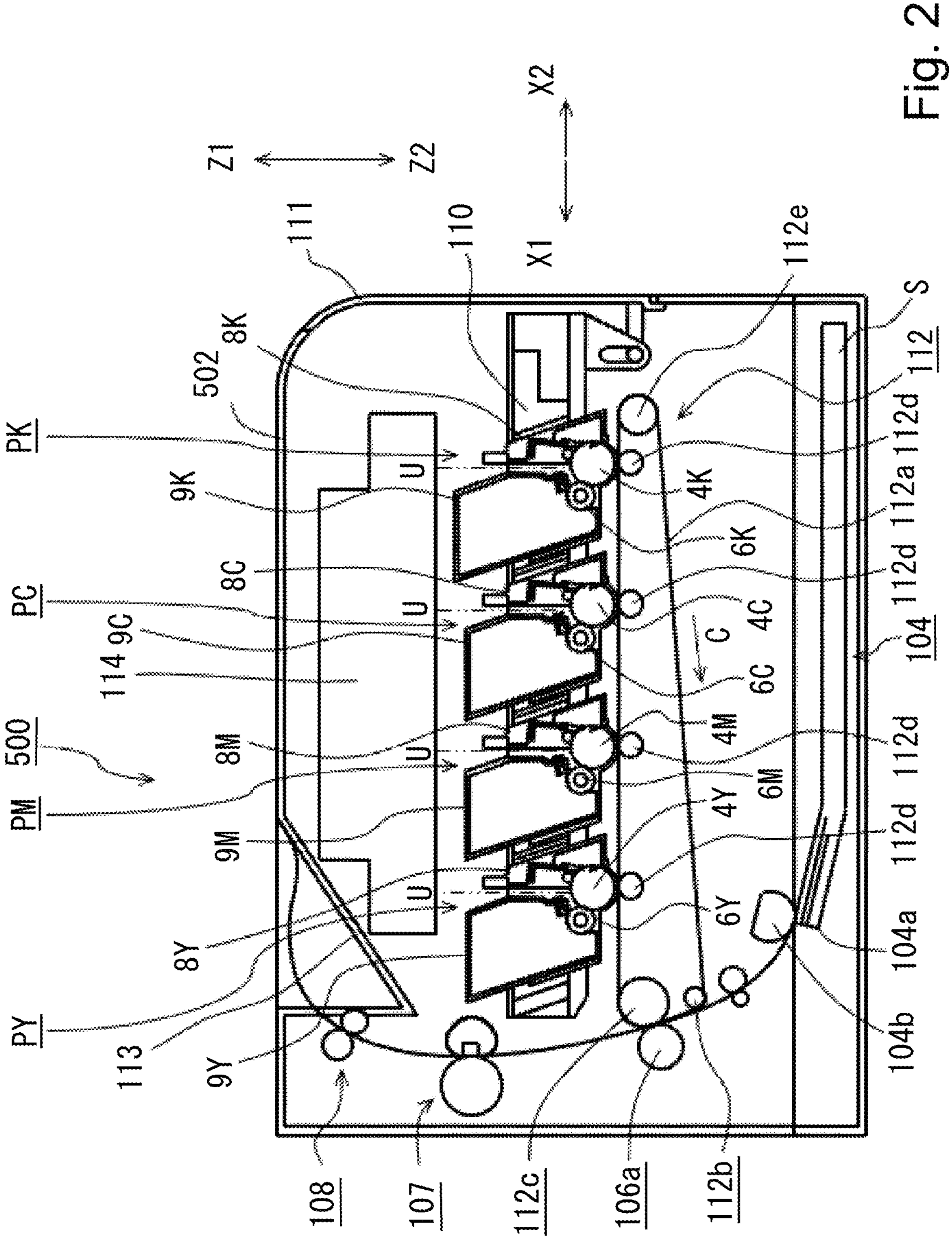
FIG. 2 is a cross-sectional view of the image forming apparatus according to the Embodiment 1.
Figure 3:
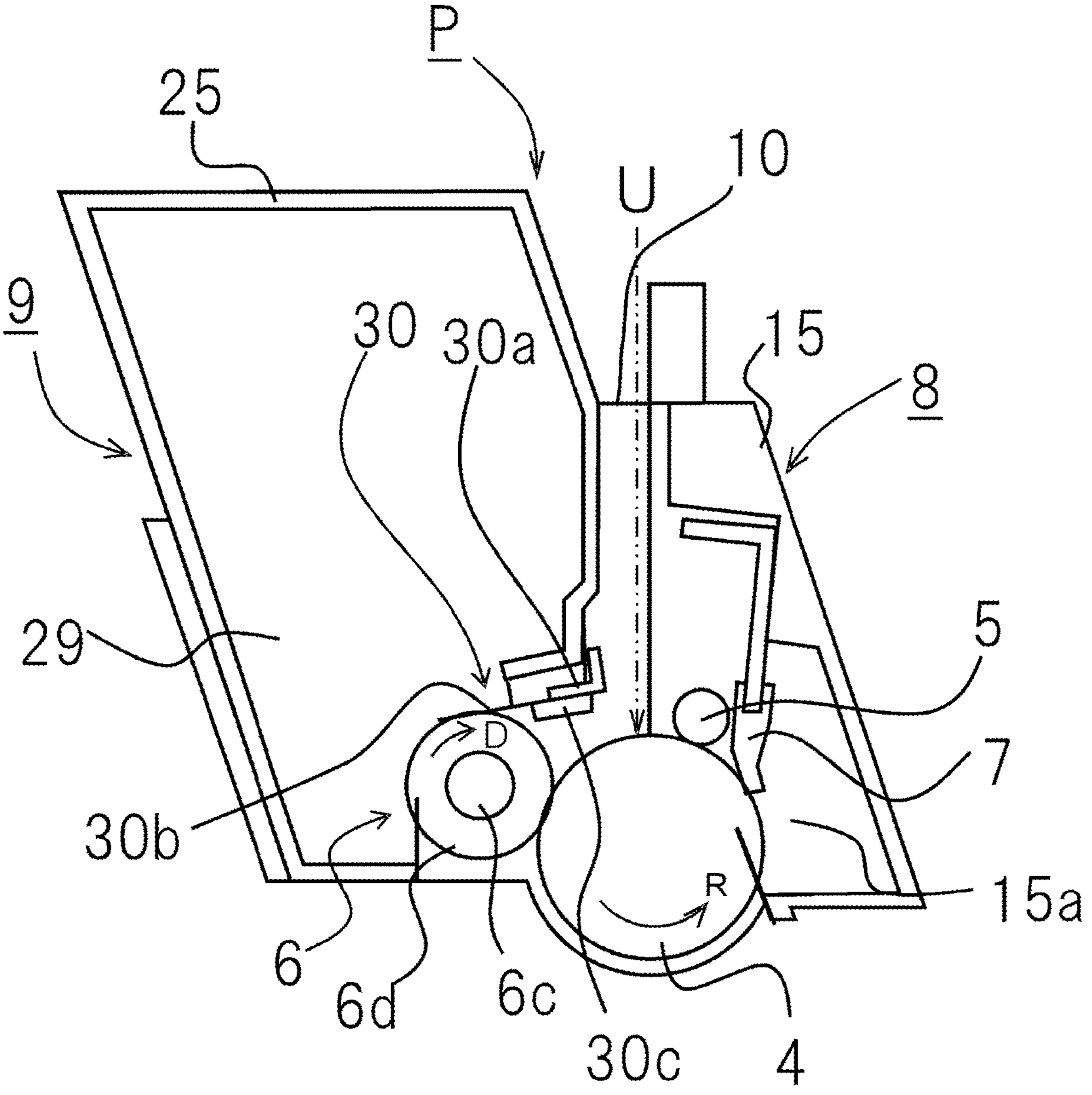
FIG. 3 is a cross-sectional view of the process cartridge according to Embodiment 1.
Figure 4:
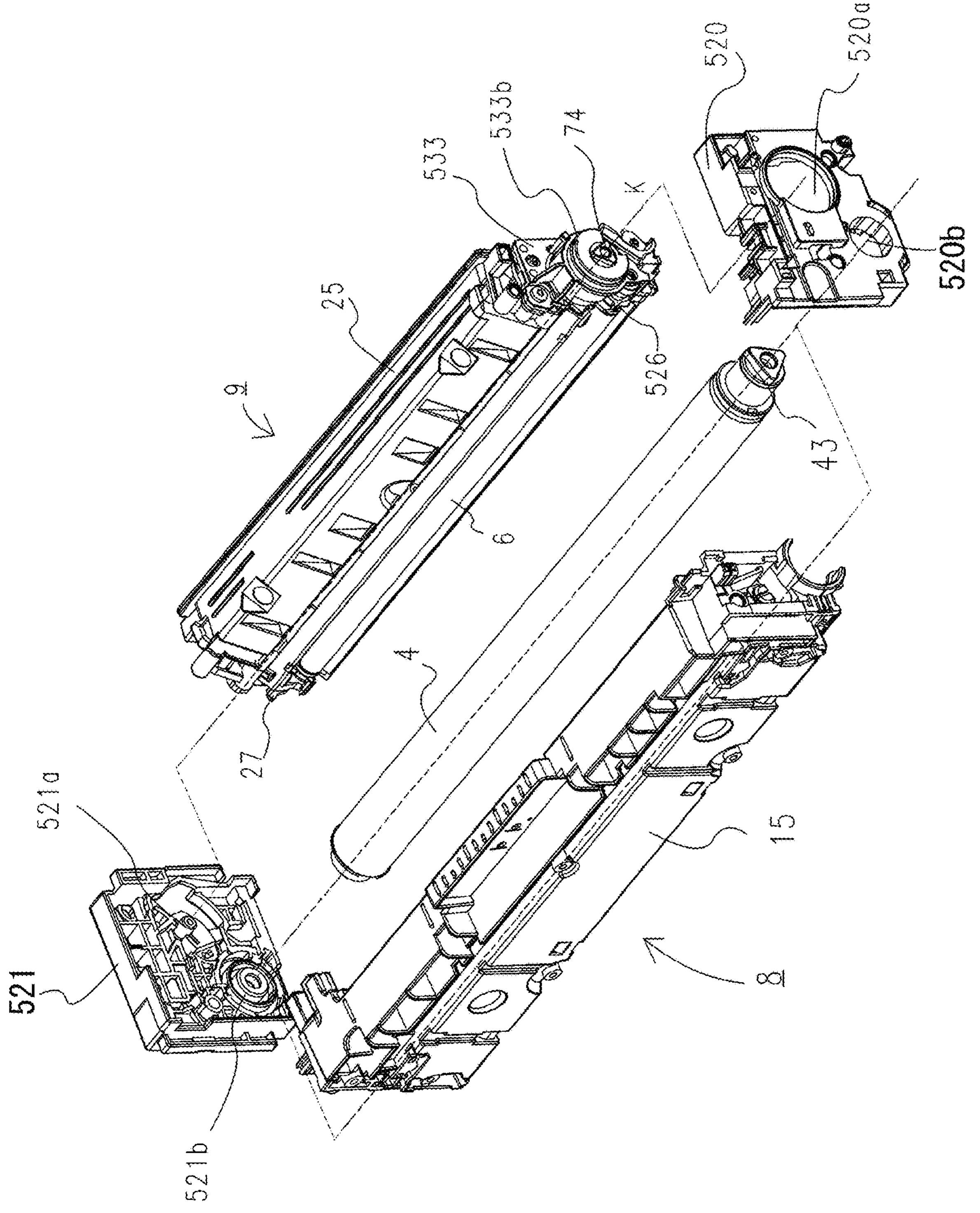
FIG. 4 is an assembly perspective view of the process cartridge according to the Embodiment 1.

FIG. 2 is a schematic cross-sectional view of an image forming apparatus 500 according to the Embodiment 1 of the present disclosure. FIG. 3 is a cross-sectional view of a process cartridge P according to the Embodiment 1 of the present disclosure. FIG. 4 is an exploded perspective view of the process cartridge P according to the Embodiment 1 of the present disclosure, as viewed from a drive side, which is one end side in an axial direction (hereinafter referred to as the longitudinal direction) of a photosensitive member (hereinafter referred to as photosensitive drum 4).

This image forming apparatus 500 is a four-color full-color laser printer using an electrophotographic process, and forms a color image on a recording material S. The image forming apparatus 500 is of a process cartridge type, and forms a color image on a recording material S, wherein the process cartridge P is dismountably mounted to an image forming apparatus main assembly 502. Here, regarding the image forming apparatus 500, a side on which a front door 111 is provided is a front side, and a side opposite to the front side is a back side (rear side). In addition, a right side of the image forming apparatus 500 is called a drive side, and a left side is called a non-drive side. Also, when the image forming apparatus 500 is viewed from the front side, an upper side is called an upper side, and a lower side is called a lower side. FIG. 2 is a sectional view of the image forming apparatus 500 as viewed from the non-drive side, wherein the front side of the sheet of the drawing is the non-drive side of the image forming apparatus 500, the right side of the sheet of the drawing is the front side of the image forming apparatus 500, the back side of the sheet of the drawing is the drive side of the image forming apparatus 500.

In the image forming apparatus main assembly 502, there are arranged four process cartridges P (PY, PM, PC, PK), namely a first process cartridge PY, a second process cartridge PM, a third process cartridge PC, and a fourth process cartridge PK, in a substantially horizontal direction. Each of the first to fourth process cartridges P (PY, PM, PC, PK) has a similar electrophotographic process mechanism, and uses different color of developer (hereinafter referred to as toner). Rotational drive forces are transmitted from a drive output portion (not shown) of the image forming apparatus main assembly 502 to the first to fourth process cartridges P (PY, PM, PC, PK). A bias voltage (charging bias, developing bias, and so on) (not shown) is supplied from the image forming apparatus main assembly 502 to each of the first to fourth process cartridges P (PY, PM, PC, PK).

As shown in FIG. 3, each of the first to fourth process cartridges P (PY, PM, PC, PK) of this embodiment includes drum unit 8 rotatably supporting the photosensitive drum 4 and including charging means and cleaning means as process means actable on the photosensitive drum 4. Each of the first to fourth process cartridges P (PY, PM, PC, PK) shown in FIG. 2 includes a developing unit 9 including developing means for developing an electrostatic latent image on the photosensitive drum 4. The drum unit 8 and developer unit 9 are coupled with each other. A more specific structures of the process cartridge P will be described hereinafter.

The first process cartridge PY contains yellow (Y) toner in the developer container 25 and forms a yellow toner image on the surface of the photosensitive drum 4. The second process cartridge PM contains magenta (M) toner in the developer container 25 and forms a magenta toner image on the surface of the photosensitive drum 4. The third process cartridge PC contains cyan (C) toner in the developer container 25 and forms a cyan toner image on the surface of the photosensitive drum 4. The fourth process cartridge PK contains black (K) toner in the developer container 25 and forms a black toner image on the surface of the photosensitive drum 4.

A laser scanner unit 114 as exposure means is provided above the first to fourth process cartridges P (PY, PM, PC, PK). This laser scanner unit 114 outputs a laser beam U in accordance with image information. The laser beam U travels through the exposure window 10 of the process cartridge P to scan and expose the surface of the photosensitive drum 4.

An intermediary transfer belt unit 112 as a transfer member is extended below the first to fourth process cartridges P (PY, PM, PC, PK). The intermediary transfer belt unit 112 includes a driving roller 112*e*, a turn roller 112*c*, and a tension roller 112*b*, and a flexible transfer belt 112*a* is stretched therearound. The lower surfaces of the photosensitive drums 4 (4Y, 4M, 4C, 4K) of the first to fourth process cartridges P (PY, PM, PC, PK) are in contact with an upper surface of the transfer belt 112*a*. The contact portion therebetween is a primary transfer portion. A primary transfer roller 112*d* is provided inside the transfer belt 112*a*, opposing the photosensitive drum 4. A secondary transfer roller 106*a* is in contact with the turn roller 112*c* with the transfer belt 112*a* therebetween. A contact portion between the transfer belt 112*a* and the secondary transfer roller 106*a* is a secondary transfer portion.

A feeding unit 104 is provided below the intermediary transfer belt unit 112. The feeding unit 104 includes a sheet feeding tray 104*a* in which the recording material S is accommodated in stack, and includes a sheet feeding roller 104*b*. A fixing device 107 and a paper discharge device 108 are provided in the upper left (FIG. 2) portion of the image forming apparatus main assembly 502. The upper surface of the image forming apparatus main assembly 502 functions as a discharge tray 113. A toner image is fixed on the recording material S by fixing means provided in the fixing device 107, and then the recording material S is discharged to the paper discharge tray 113.

[Image Forming Operation]

The operation for forming a full-color image is as follows. The photosensitive drums 4 of the first to fourth process cartridges P (PY, PM, PC, PK) are rotationally driven at a predetermined speed (in the direction of arrow R in FIG. 3). The transfer belt 112*a* is also rotationally driven at a speed corresponding to the speed of the photosensitive drum 4 in the forward direction (direction of arrow C in FIG. 2) with the rotation of the photosensitive drum. The laser scanner unit 114 is also driven. In synchronism with the driving of the laser scanner unit 114, the charging roller 5 uniformly charges the surface of the photosensitive drum 4 to a potential of a predetermined polarity, in each process cartridge. The laser scanner unit 114 scans and exposes the surface of each photosensitive drum 4 with a laser beam U in accordance with the image signal of each color. By this, an electrostatic latent image corresponding to the image signal of the corresponding color is formed on the surface of the photosensitive drum 4. The formed electrostatic latent image is developed by the developing roller 6 (6Y, 6M, 6C, 6K) which is rotationally driven (in the direction of arrow D in FIG. 3) at a predetermined speed.

A yellow toner image corresponding to the yellow component of the full-color image is formed on the photosensitive drum 4 (4Y) of the first process cartridge PY by the electrophotographic image forming process operation as described above. Then, the toner image is primarily transferred onto the transfer belt 112*a*. Similarly, the magenta toner image corresponding to the magenta component of the full-color image is formed on the photosensitive drum 4 (4M) of the second process cartridge PM. Then, the toner image is superimposed on the yellow toner image which has already been transferred onto the transfer belt 112*a*, by primary transfer. Similarly, a cyan toner image corresponding to the cyan component of the full-color image is formed on the photosensitive drum 4 (4C) of the third process cartridge PC. Then, the toner image is superimposed on the yellow and magenta toner images which have already been transferred onto the transfer belt 112*a*, by primary transfer. Similarly, a black toner image corresponding to the black component of the full-color image is formed on the photosensitive drum 4 (4K) of the fourth process cartridge PK. Then, the toner image is superimposed on the yellow, magenta, and cyan toner images which have already been transferred onto the transfer belt 112*a*, by primary transfer. In this manner, an unfixed full-color toner image of four colors of yellow, magenta, cyan, and black is formed on the transfer belt 112*a*.

On the other hand, the recording material S is separated and fed one by one at a predetermined controlled timing. The recording material S is introduced to the secondary transfer portion, which is the contact portion between the secondary transfer roller 106*a* and the transfer belt 112*a*, at predetermined controlled timing. By this, the four-color superimposed toner image on the transfer belt 112*a* is collectively transferred onto the surface of the recording material S while the recording material S is being fed to the secondary transfer portion.

[Overall Structure of Process Cartridge]

In this embodiment, the first to fourth process cartridges P (PY, PM, PC, PK) have the same electrophotographic process mechanisms, and contain the toners different in colors and amount. The process cartridge P shown in FIG. 3 includes a photosensitive drum 4 and process means actable on the photosensitive drum 4. Here, the process means includes the charging roller 5 as a charging means for charging the photosensitive drum 4, the developing roller 6 as a developing member for developing a latent image formed by depositing the toner to the photosensitive drum 4, and a cleaning blade 7 as the cleaning means for removing residual toner from the surface of the photosensitive drum 4, and the like. The process cartridge P is divided into the drum unit 8 and the developing unit 9. The form of the cartridge which can be used with the main assembly of the image forming apparatus is not limited to the form shown here. For example, the drum unit 8 and the developing unit 9 may be independently mountable to and dismountable from the image forming apparatus main assembly, or the drum unit 8 is fixed to the image forming apparatus main assembly and only the developing unit 9 is mountable to and dismountable from the image forming apparatus main assembly.

[Structure of Drum Unit]

As shown in FIGS. 3 and 4, the drum unit 8 includes a photosensitive drum 4, a charging roller 5, a cleaning blade 7, a drum frame 15, a waste toner storing portion 15*a*, a drive side cartridge cover member 520, a non-drive side cartridge cover member 521. The photosensitive drum 4 is rotatably supported by a drive side cartridge cover member 520 and a non-drive side cartridge cover member 521 provided at both ends of the process cartridge Pin the longitudinal direction. In addition, as shown in FIG. 4, a photosensitive member coupling member 43 to which driving force for rotating the photosensitive drum 4 is inputted is provided on one end side of the photosensitive drum 4 in the longitudinal direction. The photosensitive member coupling member 43 is engaged with a coupling (not shown) as a drum drive output portion of the image forming apparatus main assembly 502, so that the driving force of the drive motor (not shown) of the image forming apparatus main assembly 502 is transmitted to the photosensitive drum 4. The charging roller 5 is supported by the drum frame 15 so as to be in contact with the photosensitive drum 4 so as to be driven for rotation by the photosensitive drum 4. In addition, the cleaning blade 7 is supported by the drum frame 15 so as to contact the peripheral surface of the photosensitive drum 4 with a predetermined pressure. The untransferred residual toner removed from the peripheral surface of the photosensitive drum 4 by the cleaning blade 7 is stored in the waste toner storing portion 15*a* within the drum frame 15.

[Structure of Developing Unit]

As shown in FIG. 3, the developing unit 9 includes the developing roller 6, a development blade 30, the developer container 25, and so on. The developer container 25 includes a toner storing portion 29 which stores toner to be supplied to the developing roller 6 and a development blade 30 which regulates the thickness of the toner layer on the peripheral surface of the developing roller 6. The development blade 30 is formed by mounting an elastic member 30*b* made of sheet metal having a thickness of about 0.1 mm to a supporting member 30*a* made of a metal material having an L-shaped cross-section by welding or the like. The development blade 30 is mounted to the developer container 25 with fixing screws 30*c* at two positions, namely one longitudinal end and the other longitudinal end. The developing roller 6 includes a metal core 6*c* and a rubber portion 6*d*. The developing roller 6 is rotatably supported by a drive side bearing 526 and a non-drive side bearing 27 mounted to opposite longitudinal ends of the developer container 25, respectively.

As shown in FIGS. 3 and 4, the drum unit 8 includes a photosensitive drum 4, a charging roller 5, a cleaning blade 7, a drum frame 15, a waste toner storing portion 15*a*, a drive side cartridge cover member 520, a non-drive side cartridge cover member 521. The photosensitive drum 4 is rotatably supported by a drive side cartridge cover member 520 and a non-drive side cartridge cover member 521 provided at both ends of the process cartridge P in the longitudinal direction. In addition, as shown in FIG. 4, a photosensitive member coupling member 43 to which driving force for rotating the photosensitive drum 4 is inputted is provided on one end side of the photosensitive drum 4 in the longitudinal direction. The photosensitive member coupling member 43 is engaged with a coupling 61Y, 61M, 61C, and 61K (see FIG. 7(*b*)) as a drum drive output portion of the image forming apparatus main assembly 502, so that the driving force of the drive motor (not shown) of the image forming apparatus main assembly 502 is transmitted to the photosensitive drum 4. The charging roller 5 is supported by the drum frame 15 so as to be in contact with the photosensitive drum 4 so as to be driven for rotation by the photosensitive drum 4. In addition, the cleaning blade 7 is supported by the drum frame 15 so as to contact the peripheral surface of the photosensitive drum 4 with a predetermined pressure. The untransferred residual toner removed from the peripheral surface of the photosensitive drum 4 by the cleaning blade 7 is stored in the waste toner storing portion 15*a* within the drum frame 15.

[Assembling Drum Unit and Developing Unit]

Referring to FIG. 4, assembly of the drum unit 8 and the developing unit 9 will be described. The drum unit 8 and the developing unit 9 are connected by a drive side cartridge cover member 520 and a non-drive side cartridge cover member 521 provided at opposite ends of the process cartridge P in the longitudinal direction. A drive side cartridge cover member 520 provided at one end in the longitudinal direction of the process cartridge P is provided with a support hole 520*a* for supporting the developing unit 9 in a swingable (movable) manner. A non-drive side cartridge cover member 521 provided at the other end in the longitudinal direction of the process cartridge P is provided with a cylindrical support portion 521*a* for supporting the developing unit 9 in a swingable manner. In addition, the drive side cartridge cover member 520 and the non-drive side cartridge cover member 521 are provided with support holes 520*b* and 521*b* for rotatably supporting the photosensitive drum 4. Here, on the one end side, the outer diameter portion of the cylindrical portion 533*b* of the developing device cover member 533 is fitted into the support hole 520*a* of the drive side cartridge cover member 520. On the other end side, the support portion 521*a* of the non-drive side cartridge cover member 521 is fitted into the hole of the non-drive side bearing 27. Further, opposite end portions of the photosensitive drum 4 in the longitudinal direction are fitted into the supporting holes 520*b* of the drive side cartridge cover member 520 and the supporting holes 521*b* of the non-drive side cartridge cover member 521, respectively. The drive side cartridge cover member 520 and the non-drive side cartridge cover member 521 are fixed to the drum frame 15 by screws (not shown), adhesive, or the like. That is, the drive side cartridge cover member 520 and the non-drive side cartridge cover member 521 are integrated with the drum frame 15 to provide the drum unit 8. By this, the developing unit 9 is supported by the drive side cartridge cover member 520 and the non-drive side cartridge cover member 521 so as to be swingable (movable) relative to the drum unit 8 (photosensitive drum 4). Here, an axis connecting the support hole 520*a* of the drive side cartridge cover member 520 and the support portion 521*a* of the non-drive side cartridge cover member 521 at the center of rotation of the developing unit 9 is referred to as a swing axis K. The cylindrical portion 533*b* of the developing device cover member 533 is coaxial with the development coupling member 74, and the development unit 9 receives driving force from the image forming apparatus main assembly 502 by way of the development coupling member 74 at the swing axis K. When the driving force is interrupted by a structure which will be described hereinafter, the repulsive force between the photosensitive drum 4 and the developing roller 6 causes the developing unit 9 to rotate about the swing axis K away from the drum unit 8 slightly. By this, the contact pressure between the photosensitive drum 4 and the developing roller 6 can be lowered.

[Process Cartridge Mounting/Dismounting Structure]

Figure 5:
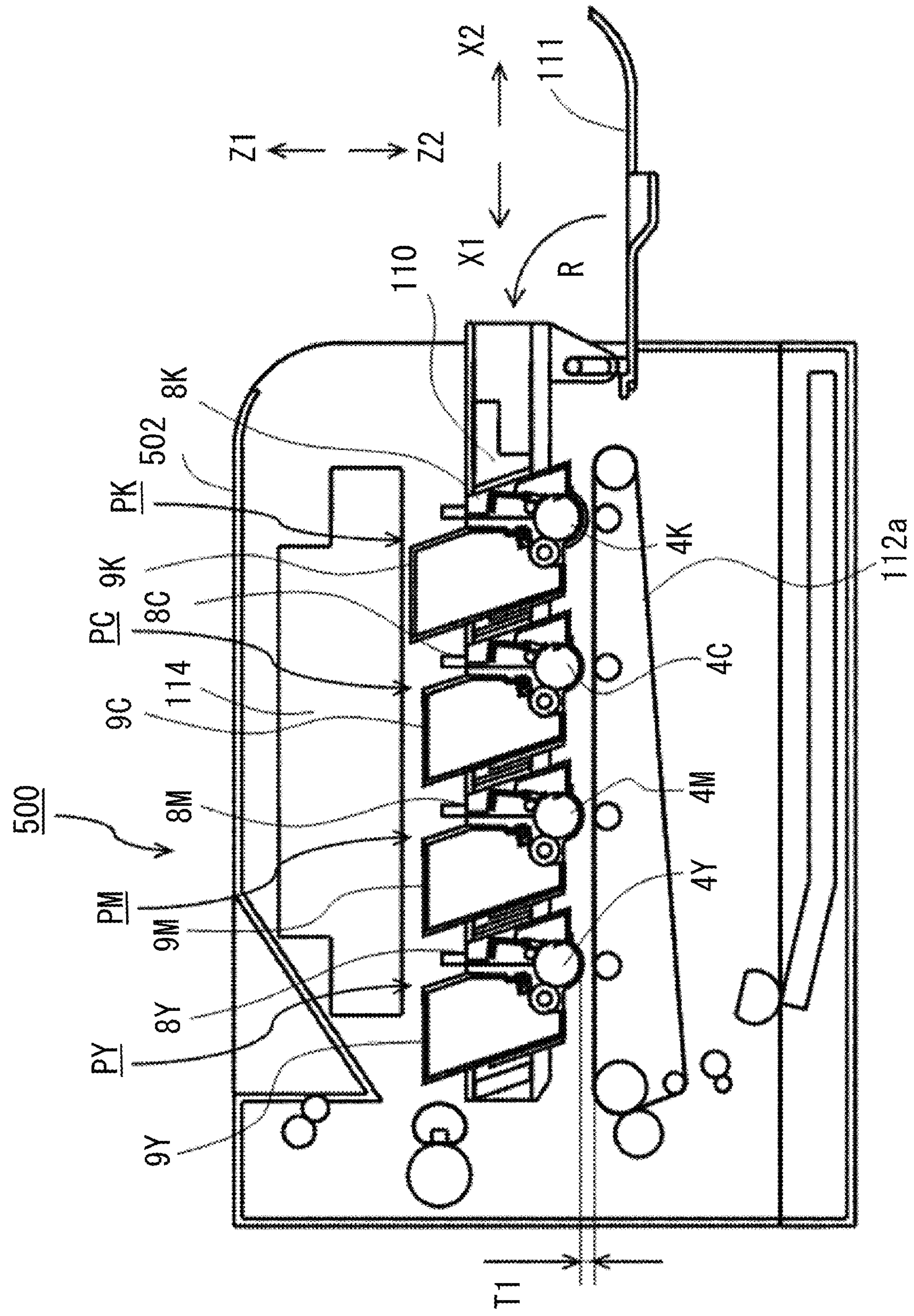
FIG. 5 is a sectional view of the image forming apparatus according to the Embodiment 1.
Figure 6:
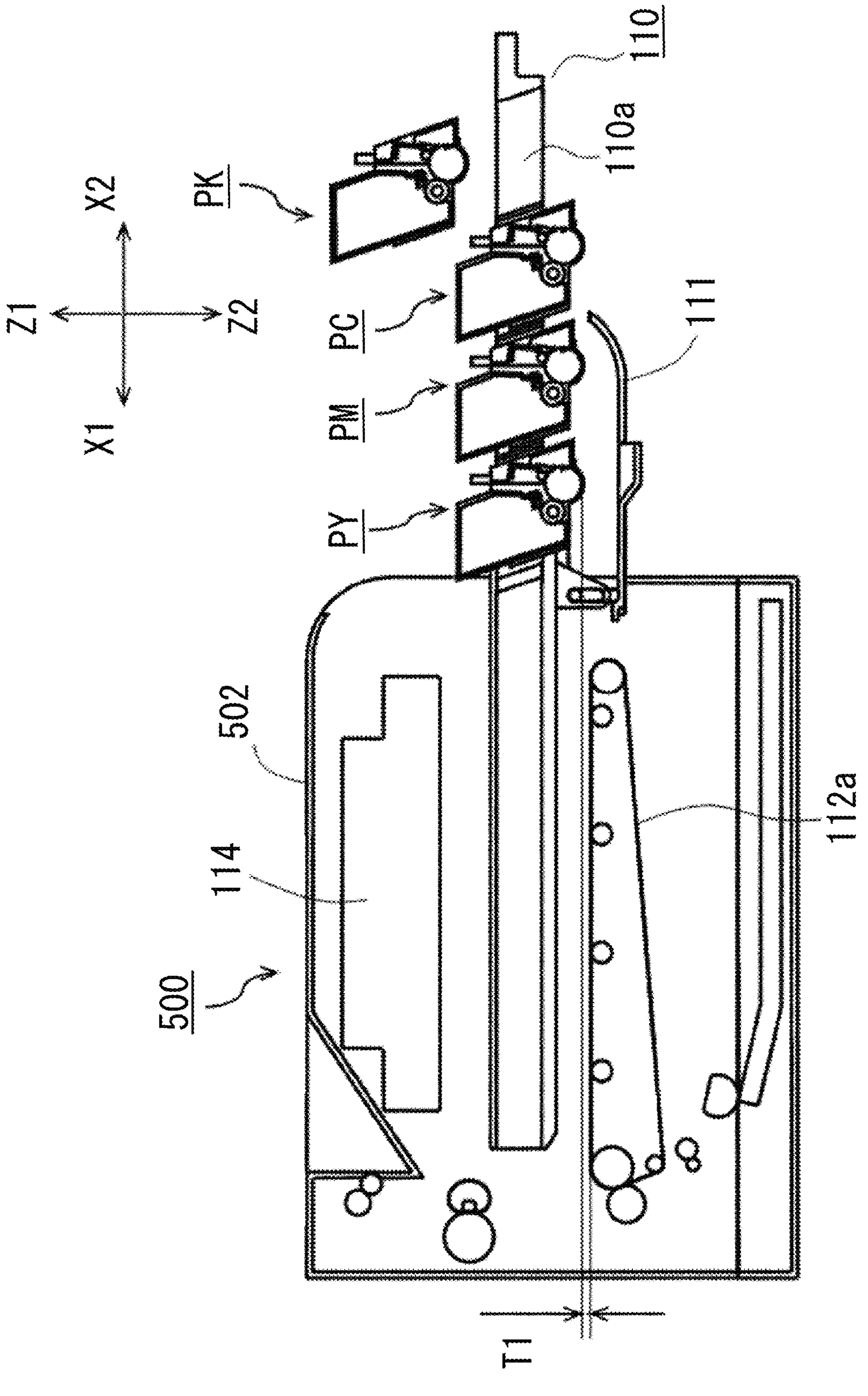
FIG. 6 is a sectional view of the image forming apparatus according to the Embodiment 1.

Referring to FIGS. 2, 5, and 6, The description will be made as to a cartridge tray (hereinafter referred to as tray) 110 which supports the process cartridges in more detail. FIG. 5 is a sectional view of the image forming apparatus 500 in which the tray 110 is positioned inside the image forming apparatus main assembly 502 with the front door 111 open. FIG. 6 is a sectional view of the image forming apparatus 500 in which the tray 110 is positioned outside the image forming apparatus main assembly 502 with the front door 111 open.

As shown in FIGS. 5 and 6, the tray 110 is movable with respect to the image forming apparatus main assembly 502 in the arrow X1 direction (pushing direction) and the arrow X2 direction (pulling out direction). That is, the tray 110 is provided so as to be able to be pulled out and pushed into the image forming apparatus main assembly 502, and in a state in which the image forming apparatus main assembly 502 is placed on a horizontal plane, the tray 110 is structured to be movable in a substantially horizontal direction. Here, in the state in which the tray 110 is positioned outside the image forming apparatus main assembly 502 (the state in FIG. 6), the position of the tray 110 is referred to as the outer position. In addition, in the tray 110 is positioned inside the image forming apparatus main assembly 502 with the front door open and the photosensitive drums 4 (4Y, 4M, 4C, and 4K) are spaced from the transfer belt 112*a* by the gap T1 (see FIG. 5), the position of the tray 110 is referred to as first inner position.

The tray 110 has a mounting portion 110*a* to which the process cartridges P (PY, PM, PC, PK) can be dismountably mounted at the outer position shown in FIG. 6. Each of the process cartridges P (PY, PM, PC, PK) mounted in the mounting portion 110*a* of the tray 110 in the outside position is supported on the tray 110 by a drive side cartridge cover member 520 and a non-drive side cartridge cover member 521 shown in FIG. 4 contacting the mounting portion 110*a*. Each process cartridge P moves inside the image forming apparatus main assembly 502 as the tray 110 moves from the outer position to the first inner position while being carried on the mounting portion 110*a*. At this time, each process cartridge P moves while maintaining a gap T1 between the transfer belt 112*a* and the photosensitive drum 4, as shown in FIG. 5. Therefore, the tray 110 can move the process cartridge P inside the image forming apparatus main assembly 502 without the photosensitive drum 4 contacting the transfer belt 112*a*. When the tray 110 is positioned in the first inner position, the gap T1 is maintained between the photosensitive drum 4 and the transfer belt 112*a*.

Here, the direction perpendicular to the arrow X direction (X1, X2) in FIG. 5 and perpendicular to the axis of the photosensitive drum 4 is referred to as Z direction (arrows Z1, Z2 in FIG. 5). The tray 110 can be moved from the first inner position in the direction of arrow Z2 in FIG. 5 to the second inner position (state shown in FIG. 2) where the photosensitive drum 4 and the transfer belt 112*a* are in contact with each other and image formation is possible. In this embodiment, the structure is such that the tray 110 positioned at the first inner position moves in the direction of arrow Z2 in FIG. 5 in the direction of arrow R in FIG. 5 to a second inner position, in interrelation with the operation of closing the front door 111.

As described above, the tray 110 can collectively place the plurality of process cartridges P at a position where image forming operation is possible inside the image forming apparatus main assembly 502.

[Structure of Drive Connection Part]

Figure 7:
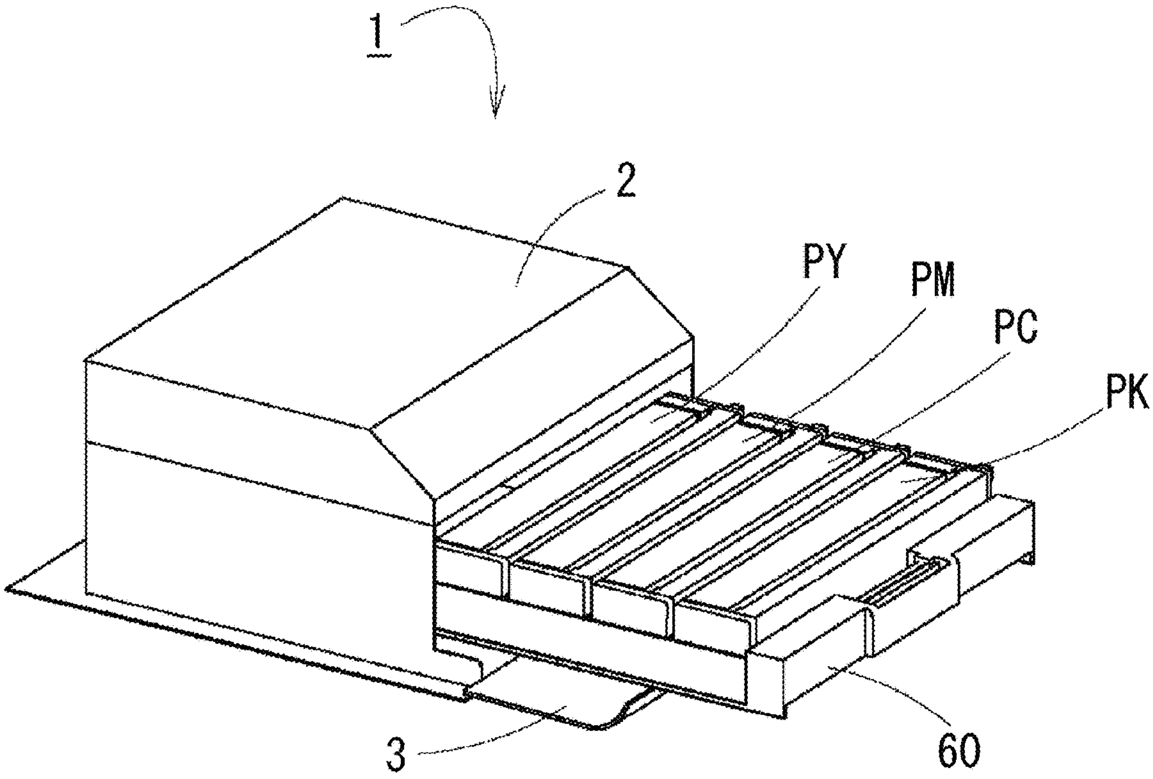
FIG. 7 is a perspective view of the image forming apparatus according to the Embodiment 1.
Figure 7:
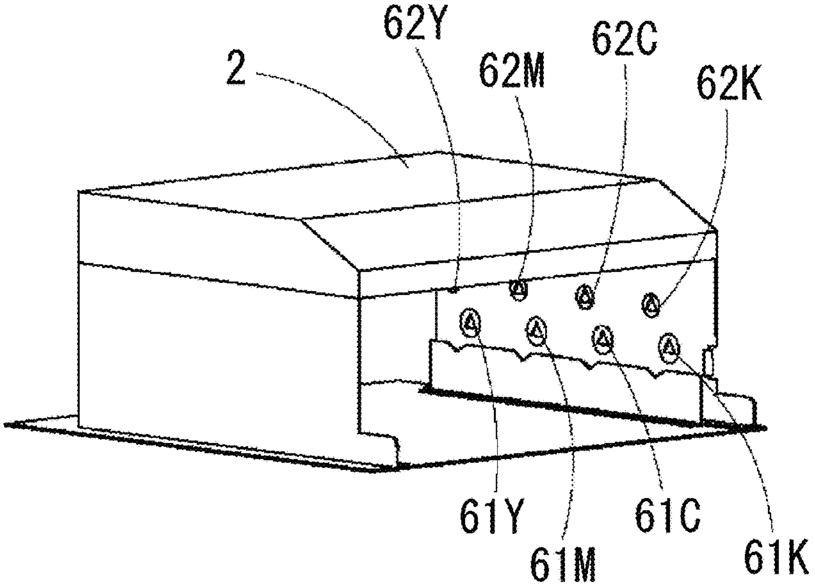
Figure 8:
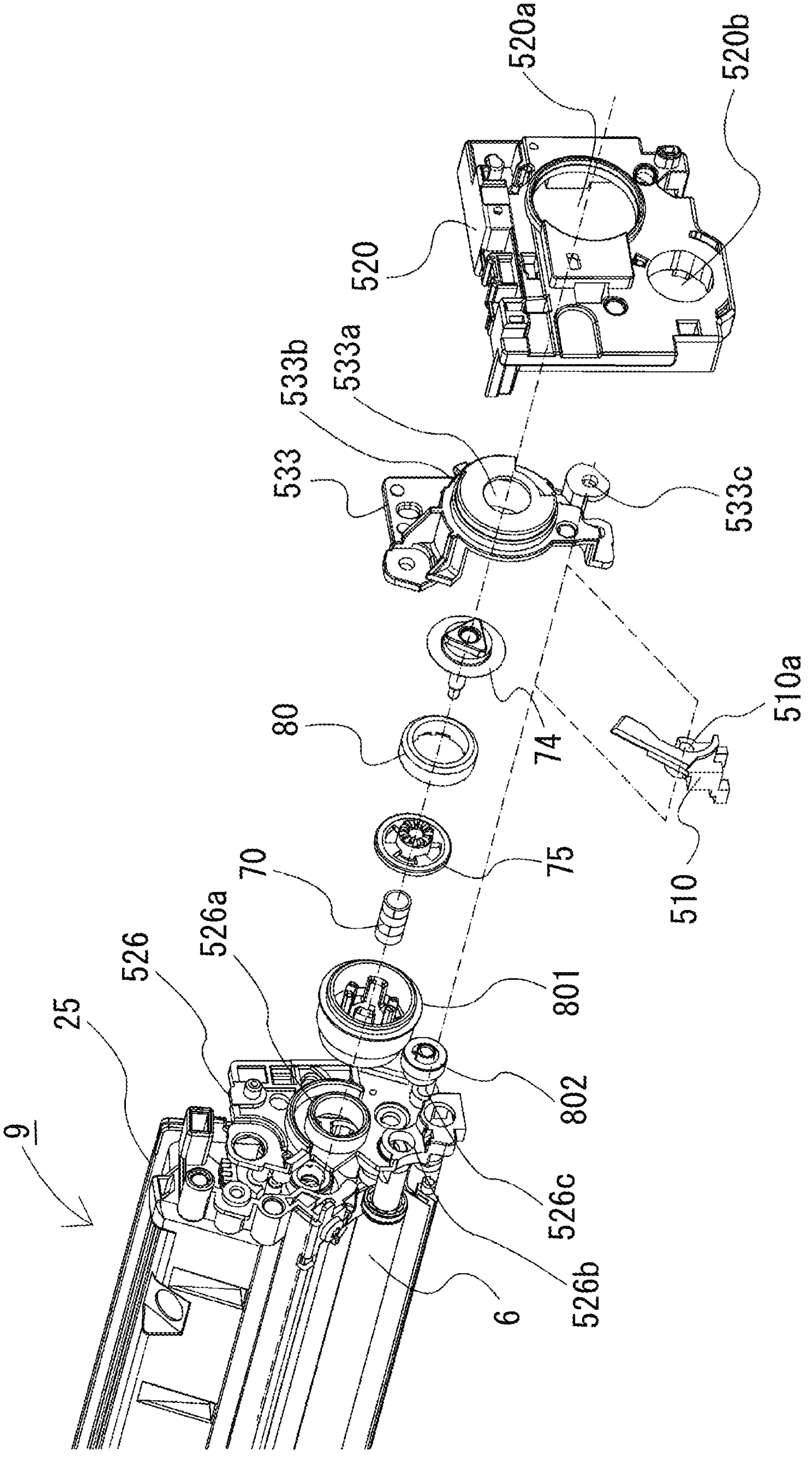
FIG. 8 is a perspective view of a drive connecting portion in the Embodiment 1.

Referring to FIGS. 7 and 8, the structure of the drive connecting portion will be described. Here, the drive connecting portion is a mechanism which receives drive from the development drive output member 62 of the image forming apparatus main assembly 502 shown in FIG. 7 and transmits the drive to the developing roller 6 and stops the drive transmission. FIG. 8 is a perspective view of the process cartridge P as viewed from the drive side, showing a state in which the drive side cartridge cover member 520 and the developing device cover member 533 are removed. As described above, the drive side cartridge cover member 520 is provided with openings 520*a* and 520*b*. The development coupling member 74 is exposed from the opening 520*a*. The development coupling member 74 engages with the development drive output member 62 (62Y, 62M, 62C, 62K) of the image forming apparatus main assembly 502 shown in part (b) of FIG. 7 to transmit the driving force from the motor (not shown).

At the end of the developing unit 9 shown in FIG. 8, the development coupling member 74 and a rotatable member 75 capable of transmitting driving force by way of the development coupling member 74 are rotatably provided. As the details will be described hereinafter, the development coupling member 74 and the rotatable member 75 are coaxial and engageable with each other in the longitudinal direction, and when they are engaged, the drive can be transmitted to the rotatable member 75 from the development coupling member 74. The rotatable member 75 is engaged with gear 801, which in turn is engaged with a developing roller gear 802. Gear teeth are formed on the gear 801 and the developing roller gear 802, and the gear teeth mesh with each other. By this, the drive transmitted to the rotatable member 75 is transmitted to the developing roller 6 by way of the developing roller gear 802.

Between the drive side bearing 526 and the drive side cartridge cover member 520, the gear 801, a spring 70, the rotatable member 75, a sliding member 80, the development coupling member 74, and the developing device cover member 533 are provided in order from the drive side bearing 526. The sliding member 80 is a part of the drive switching mechanism and is a coupling disengagement member. These members are provided coaxially with the development coupling member 74. Here, the drive side bearing 526 includes a cylindrical support portion 526*c* which projects in the longitudinal direction parallel to the swing axis K, and the developing device cover member 533 is provided with a fitting hole 533*c* which is fitted around the support portion 526*c*. The regulating member 510, which is a part of the drive switching mechanism and is a movable member capable of moving between a first position and a second position which will be described hereinafter, is mounted on the support portion 526*c* so as to be swingable thereabout. Details will be described hereinafter. Although the regulating member 510 is mounted to the support portion 526*c* of the drive side bearing 526 in this embodiment, it may be mounted to other members such as the developing device cover member 533 or the drive side cartridge cover member 520. In this embodiment, the driving connecting portion comprises the gear 801, the developing roller gear 802, the spring 70, the rotatable member 75, the sliding member 80, the development coupling member 74 and the developing device cover member 533.

Figure 9:
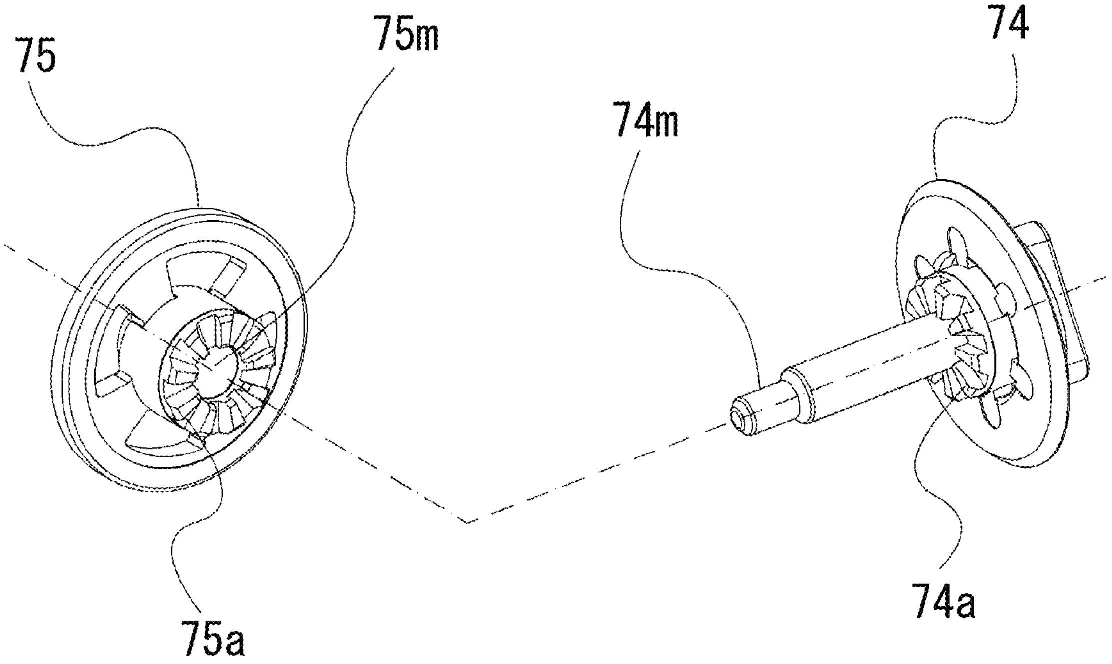
FIG. 9 is a perspective view illustrating an engaging portion of a coupling in Embodiment 1.

Referring to FIG. 9, the structures of the development coupling member 74 and the rotatable member 75 will be described. FIG. 9 is an exploded perspective view illustrating an engaging portion between the development coupling member 74 and the rotatable member 75. The development coupling member 74 includes a claw portion 74*a* as an engaging portion (coupling portion), and the rotatable member 75 includes a claw portion 75*a* as an engaging portion (coupling portion). The development coupling member 74 has a surface 74*b* which contacts a sliding member 80, which will be described hereinafter, and the rotatable member 75 has a surface 75*d* which contacts the sliding member 80, which will also be described hereinafter. Here, the claw portions 74*a* and 75*a* are a plurality of claws extending radially and arranged at equal intervals circumferentially about the rotation centers thereof, respectively. The claw portion 74*a* and the claw portion 75*a* are structured to be engageable with each other. That is, the development coupling member 74 is structured to be connectable with the rotatable member 75. By this, the development coupling member 74 which is engaged with the development drive output member 62 of the image forming apparatus main assembly 502 and receives the driving force rotates and thereby rotates the engaged rotatable member 75. In this embodiment, each of the claw portion 74*a* and the claw portion 75*a* has nine claws, but the number is not limited such an example.

In addition, as shown in FIG. 9, a hole 75*m* is provided at the center of the rotatable member 75. The hole 75*m* is fitted with a small-diameter cylindrical portion 74*m* of the development coupling member 74 and penetrates it. By this, the development coupling member 74 is supported so as to be rotatable with respect to the rotatable member 75 about the axis thereof and slidable with respect to the rotatable member 75.

Figure 10:
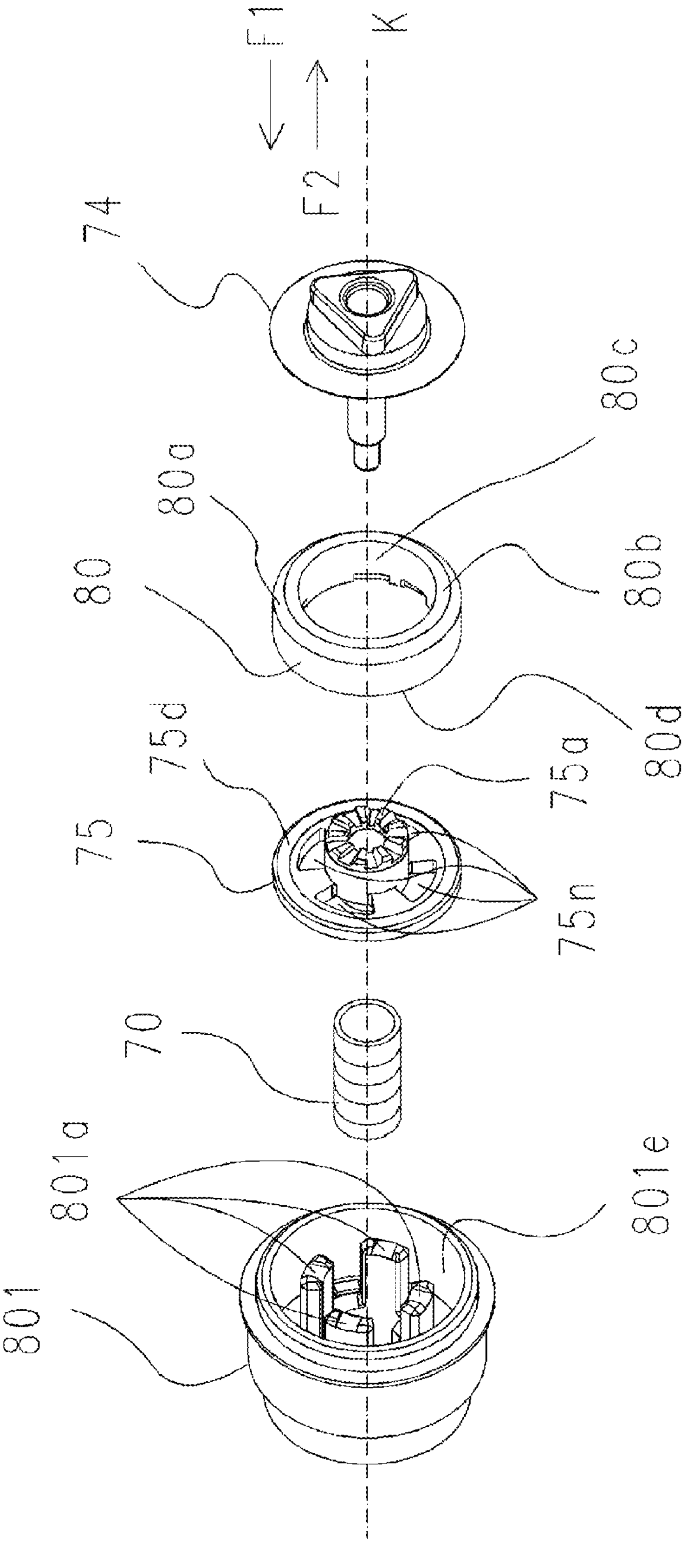
FIG. 10 is an exploded view of the drive connecting portion in the Embodiment 1.
Figure 11:
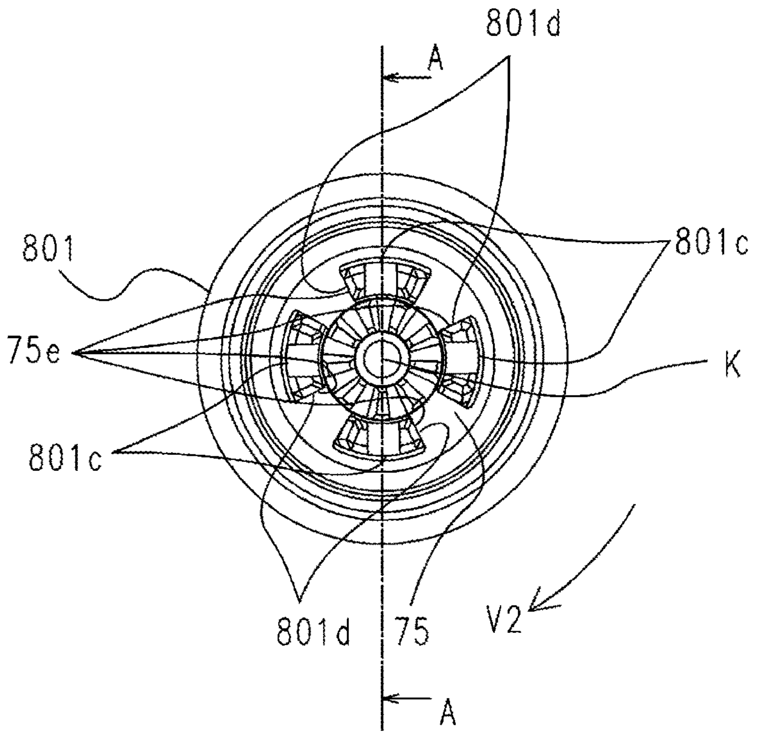
FIG. 11 is an illustration showing the structure of each part of a drive connecting portion during drive transmission in the Embodiment 1.
Figure 11:
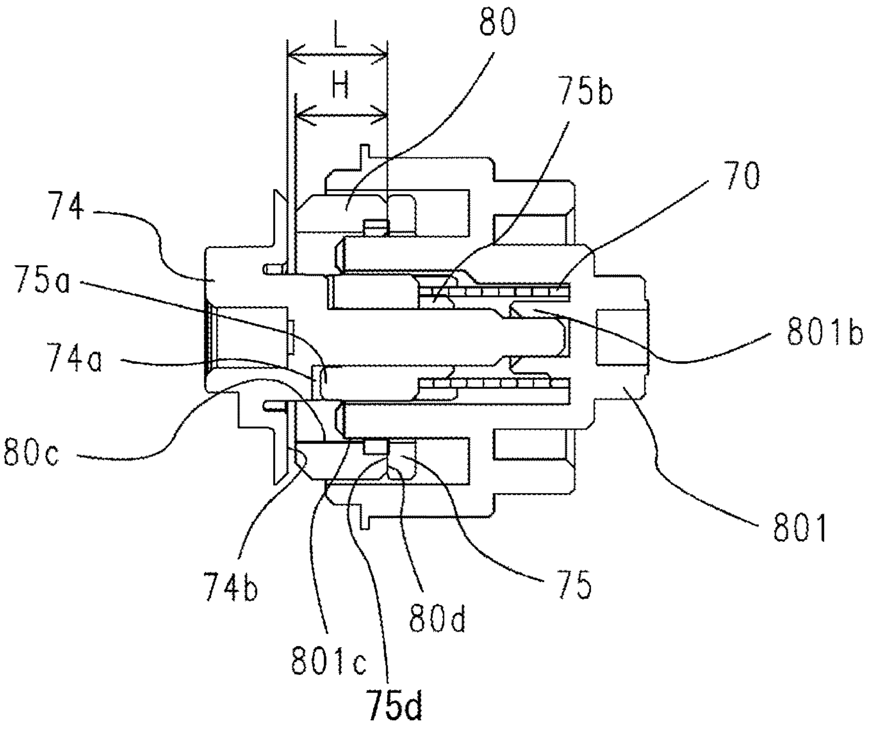

Referring to FIGS. 10 and 11, structures of the development coupling member 74, the rotatable member 75, the spring 70, the gear 801, and the sliding member 80 will be described. FIG. 10 is an exploded perspective view of the drive connecting portion. Part (a) of FIG. 11 is a view of the gear 801 and the rotatable member 75 at the time of drive transmission as viewed from the drive side, and part (b) of FIG. 11 is a cross-sectional view taken along the line A-A shown in part (a) of FIG. 11 be. For the sake of better illustration, the development coupling member 74 and the sliding member 80 are not shown in part (a) of FIG. 11.

The gear 801 includes a column portion 801*a* which fits with the rotatable member 75 and the sliding member 80, and a support portion 801*b* which supports the spring 70. The column portion 801*a* is radially extended from the rotation center of the gear 801 and extends in the F2 direction. Here, in this embodiment, four pillars 801*a* are provided as an example, but the number is not limited to that if such an example. The column portion 801*a* passes through the fitting hole 75*n*, which is the drive transmission portion of the rotatable member 75, and the surface 801*c* of the column portion 801*a* and the cylindrical inner surface 80*c* of the sliding member 80 are fitted to each other outside the fitting hole 75 in the longitudinal direction. One end of the spring 70 is mounted to the support portion 801*b* of the gear 801, and the other end is mounted to the support portion 75*b* of the rotatable member 75, so that the rotatable member 75 is urged longitudinally outward along the swing axis K direction in the F1 direction. Here, the support portion 801*b* is provided coaxially with the rotation center of the gear 801, extends in the F2 direction, and is fitted to one end of the spring 70, thereby supporting the spring 70 so that it does not fall off. The outer peripheral surface 75*c* of the rotatable member 75 is positioned inside the inner peripheral surface 801*e* of the gear 801, and the rotatable member 75 is slidable inside the gear 801 in the swing axis K direction. The cylindrical inner surface 80c of the sliding member 80 is supported by the surface 801c of the column portion 801a so as to be rotatable about the swing axis K and slidable in the direction of the swing axis K, and an end surface 80d thereof is in contact with the surface 75d of the rotatable member 75. By this, the sliding member 80 receives the urging force from the spring 70 and is constantly urged in the F1 direction. The sliding member 80 has a cam surface 80a and a surface 80b facing the surface 74b of the development coupling member 74, and in the drive transmission state shown in part (b) of FIG. 11, the relation of a distance from the end surface 80d to the opposing surface 80b and a distance L from the surface 74b to the surface 75d is H<L. Therefore, the claw portions 75a and 74a can be engaged with each other, by the rotatable member 75 being urged by the spring 70 and moves in the F1 direction.

Referring to part (a) of FIG. 11, the description will be made as to the drive transmission state when the claw portion 74a and the claw portion 75a are engaged with each other and the development coupling member rotates with the drive inputted from the development drive output member 62 of the image forming apparatus main assembly 502. When the rotatable member 75 rotates in the direction V2, the drive transmission surface 75e at the upstream end of the fitting hole 75n in the rotational direction is brought into contact with the drive transmission surface 801d of the column portion 801a of the gear 801. The gear 801 receiving a rotational force in the V2 direction on the drive transmission surface 801d, rotates in the V2 direction, and transmits the rotation to the engaged developing roller gear 802, thereby driving the developing roller 6.

[Drive Connection Breaking Structure]

Figure 12:
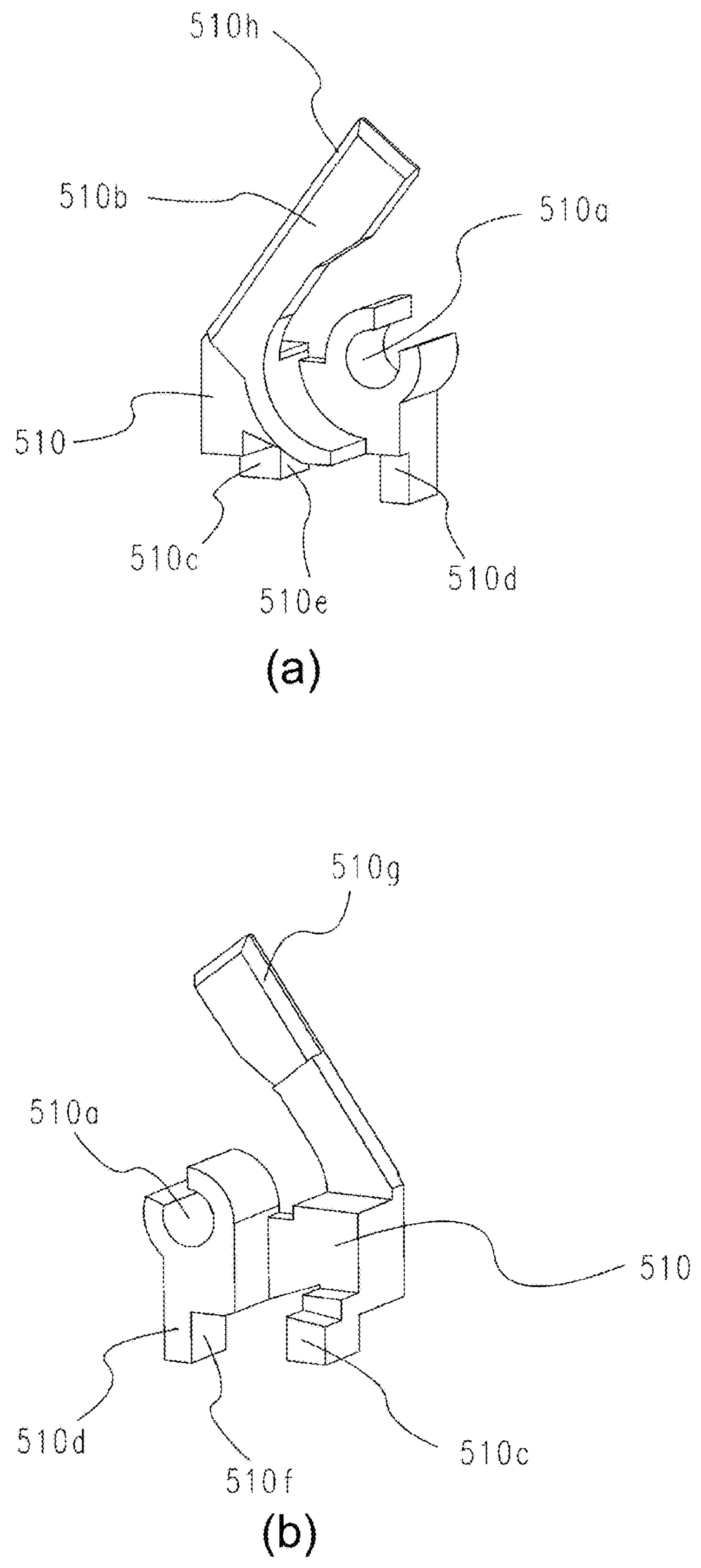
FIG. 12 is a perspective view of a regulating member 510 per se in the Embodiment 1.
Figure 13:
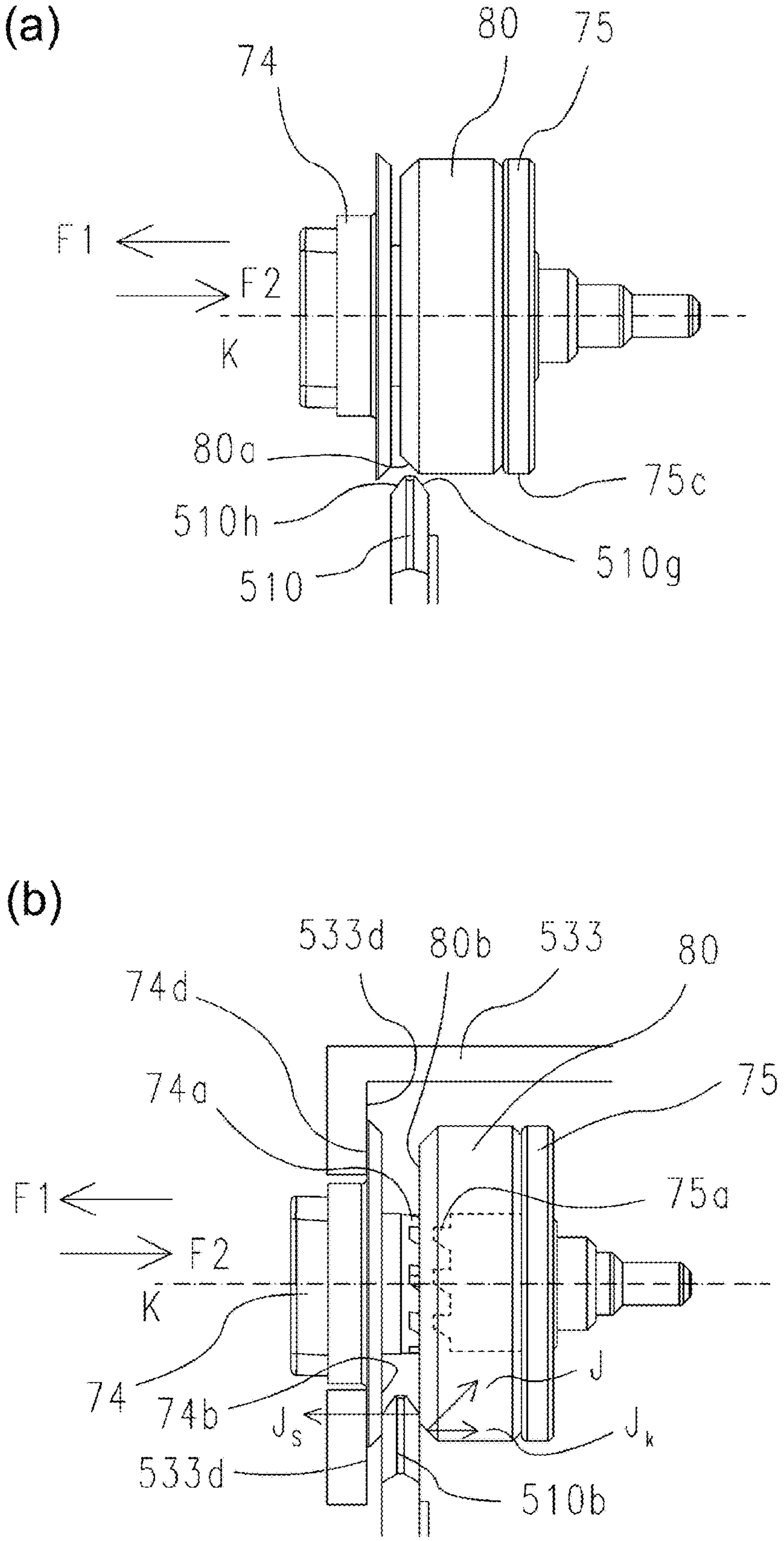
FIG. 13 is an illustration showing a positional relationship of the regulating member 510 at the time of drive connection and interruption, in the Embodiment 1.

Referring to FIGS. 12 and 13, the structure for breaking the driving connection will be described. FIG. 12 shows a regulating member 510 which regulates the longitudinal position of the sliding member 80 to break the driving connection, and part (a) of FIG. 12 and part (b) of FIG. 12 are perspective views as viewed from the opposite side, for better illustration. Part (a) of FIG. 13 and part (b) of FIG. 13 show the positional relationship between the regulating member 510 and the aforementioned drive connecting portion, in the drive connection state and the drive connection broken state, respectively.

The regulating member 510 has a supported hole 510a, a regulating lever portion 510b, a foot portion 510c, and a foot portion 510d. The regulating lever portion 510b has a cam surface 510g and an inclined surface 510h, and the foot portions 510c and 510d have respective surfaces 510e and 510f which receive forces from a drive control member 540, which will be described hereinafter. The supported hole 510a of the regulating member 510 is fitted with the support portion 526c of the drive side bearing 526 described above, so that it is swingable about an axis of the support portion 526c.

Part (a) of FIG. 13 shows the positional relationship between the regulating lever portion 510b and the drive connecting portion in the drive transmission state. This position of the regulating member 510 is referred to as a first position of the regulating member 510. This position is a driving force transmission position for allowing transmission of the driving force from the development coupling member 74 to the developing roller 6.

In a state of interrupted drive transmission shown in part (b) of FIG. 13, the regulating member 510 swings about the support portion 526c (FIG. 8) of the drive side bearing 526, and the regulating lever portion 510b of the regulating member 510 is interposed between the incline surface 74c of the development coupling member 74 and the cam surface 80a of the sliding member 80. This position of the regulating member 510 is referred to as second position of the regulating member 510. This position is a driving force interrupting position for interrupting transmission of the driving force from the development coupling member 74 to the developing roller 6. At this time, the cam surface 510g of the regulating lever portion 510b contacts the cam surface 80a of the sliding member 80, and the force component $J_k$ in the direction of the swing axis K of the force J applied from the regulating lever portion 510b to the sliding member 80 causes the sliding member 80 is moved in the direction of F2. By the movement of the sliding member 80 in the F2 direction, the rotatable member 75 also moves in the F2 direction, so that the claw portions 75a and 74a of the rotatable member 75 and the development coupling member 74 are disengaged from each other, thereby breaking the driving connection. At this time, the regulating lever portion 510b receives the reaction force $J_s$ of the spring 70 as the urging means from the surface 80b of the sliding member 80 in the F1 direction. The regulating lever portion 510b abuts against the surface 74b of the development coupling member 74 and tends to move in the F1 direction, but the surface 74d of the development coupling member 74 abuts against the surface 533d of the developing device cover member 533 and stops thereby. By this, the regulating lever portion 510b is sandwiched between the sliding member 80 and the development coupling member 74, receives the reaction force of the spring 70 at the engagement portion and is sandwiched to receive resistance, and therefore, the position thereof is restricted in the state of not being subjected to an external force. That is, the regulating lever portion 510b as a moving portion is sandwiched between the sliding member 80 and the development coupling member 74 and is held at the driving force interrupted position.

[Mounting to Main Assembly]

Figure 14:
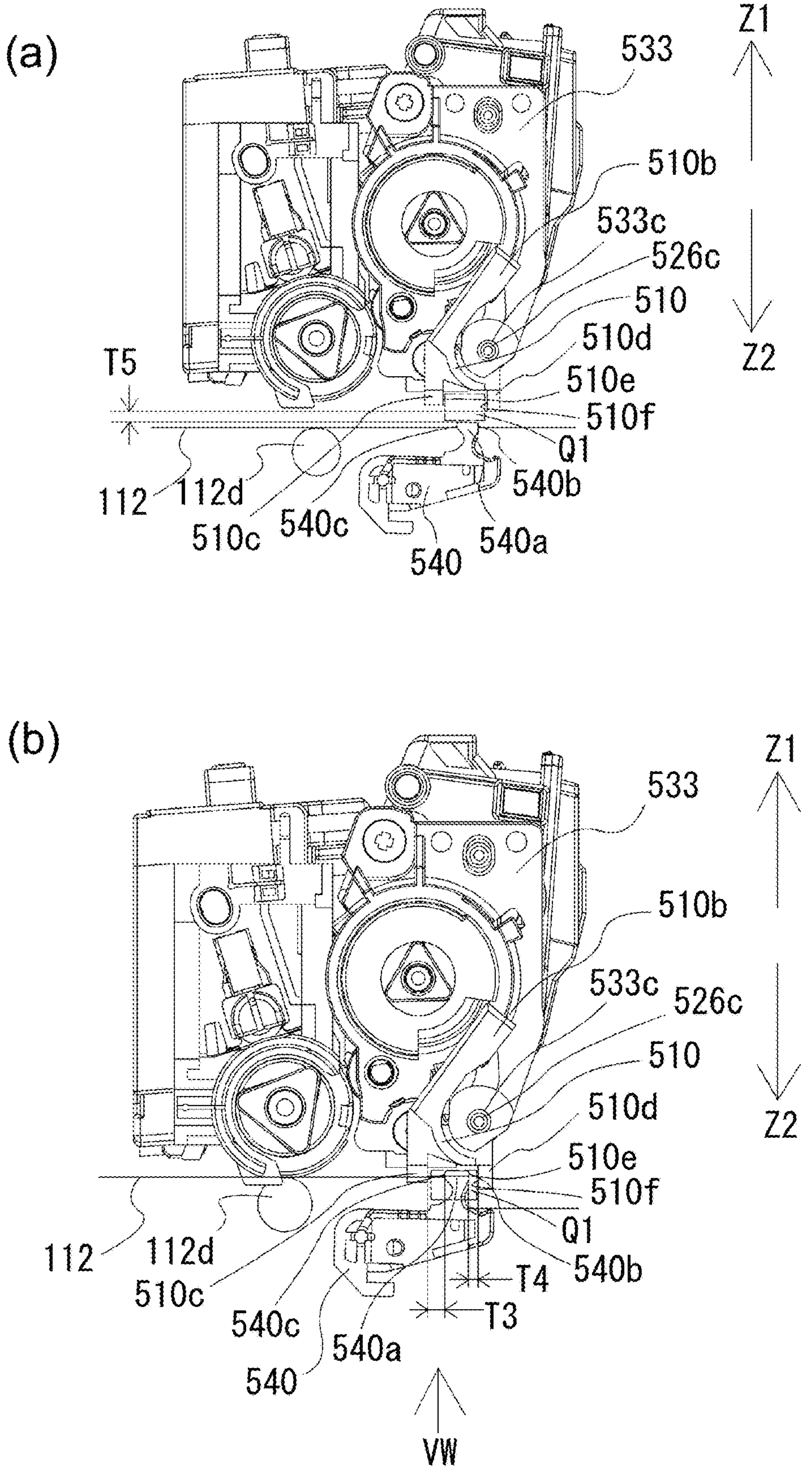
FIG. 14 is an illustration showing a mounting operation of the process cartridge to the main assembly of the apparatus, in the Embodiment 1.

Referring to Figure, the operation when the process cartridge P is mounted to the image forming apparatus main assembly 502 will be described. Part (a) of FIG. 14 is an illustration showing a state in which the process cartridge P is positioned at the first inner position and the photosensitive drum 4 and the transfer belt 112a are separated from each other, as viewed from the drive side. Part (b) of FIG. 14 is a view of the state where the process cartridge P is positioned at the second inner position and the photosensitive drum 4 and the transfer belt 112a are in contact with each other, as viewed from the drive side. In part (a) of FIG. 14 and part (b) of FIG. 14 the drive side cartridge cover member 520 are omitted for the sake of better illustration.

The image forming apparatus main assembly 502 includes the drive control members 540 corresponding to respective process cartridges P (PY, PM, PC, PK). The drive control member 540 is arranged below the regulating member 510 (Z2 direction in FIG. 14) of the process cartridge P positioned at the first inner position and the second inner position. The drive control member 540 includes a control portion 540a projecting toward the process cartridge P as a main assembly force applying portion, and the control portion 540a includes a first force applying surface 540b as a first main assembly force applying portion and a second force applying surface 540c as a second main assembly force applying portion. The control portion 540a of the drive control member 540 is placed below the lower surface of the space Q1 sandwiched between the surfaces 510e and 510f described with FIG. 12. In addition, the drive control member 540 is arranged so that a gap T5 is provided between itself and the regulating member 510 when the process cartridge P is positioned at the first inner position (part (a) of FIG. 14). That is, as described above, the regulating member 510 of the process cartridge P inserted into the image forming apparatus main assembly 502 by the tray 110 moving from the outer position to the first inner position is inserted into the apparatus main assembly 502 without contacting the drive control member 540. When the process cartridge P moves from the first inner position to the second inner position by closing the front door 111 as described above, the control portion 540*a* enters the space Q1 as shown in part (b) of FIG. 14.

Figure 15:
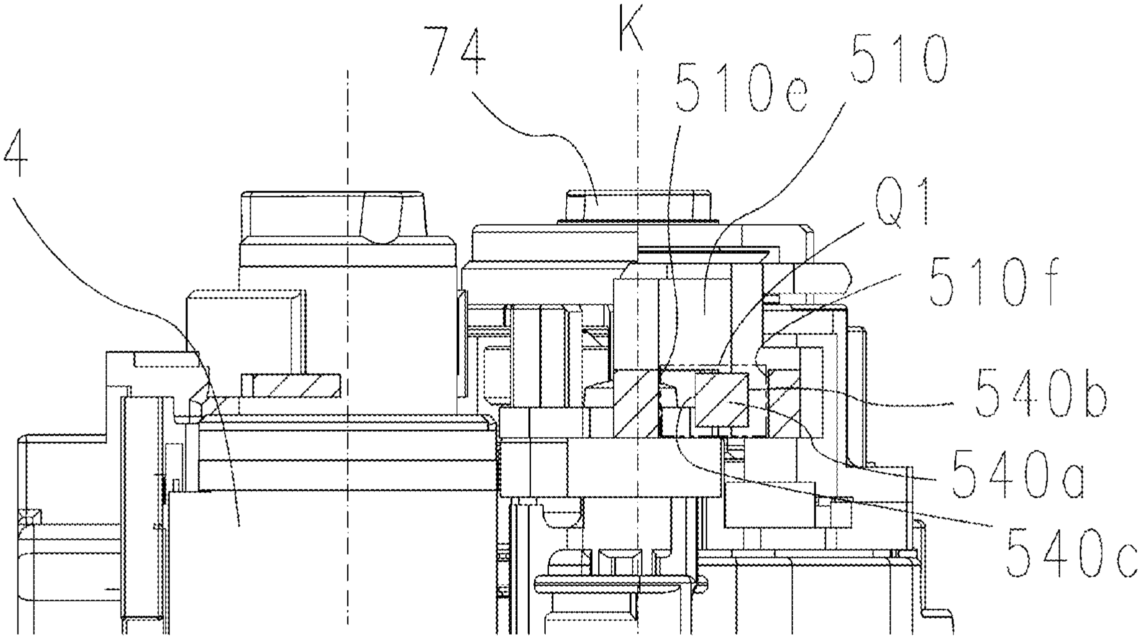
FIG. 15 is an illustration showing an arrangement of the regulating member 510 in the Embodiment 1.

FIG. 15 shows a view of the process cartridge P installed in the image forming apparatus main assembly 502 as viewed in the direction of the arrow VW in part (b) of FIG. 14. For the sake of better illustration, FIG. 15 omits the drive control member 540 except for the control portion 540*a*. Also, some of the portions of the process cartridge P are omitted. As shown in FIG. 15, the foot portion 510*c* as the retracting force receiving portion of the regulating member 510 and the foot portion 510*d* as the insertion force receiving portion partially overlap in the direction along the swing axis K of the developing unit 9, so as to form a space Q1. Further, when the process cartridge P is placed in the second inner position (image forming position) and the control portion 540*a* enters the space Q1, the control portion 540*a* is disposed so as to overlap foot portion 510*c* and the foot portion 510*d* in the direction along the swing axis K. Here, as shown in part (b) of FIG. 14, when the process cartridge P is placed in the second inner position of the image forming apparatus main assembly 502 and the regulating member 510 is in the first position, there is a gap T3 between the surface 510*e* of the foot portion 510*c* and the second force applying surface 540*c*, and there is a gap T4 between the surface 510*f* of the foot portion 510*d* and the first force applying surface 540*b*, wherein this position is referred to as a home position of the drive control member 540.

[Drive Connection Breaking Operation]

Figure 1:
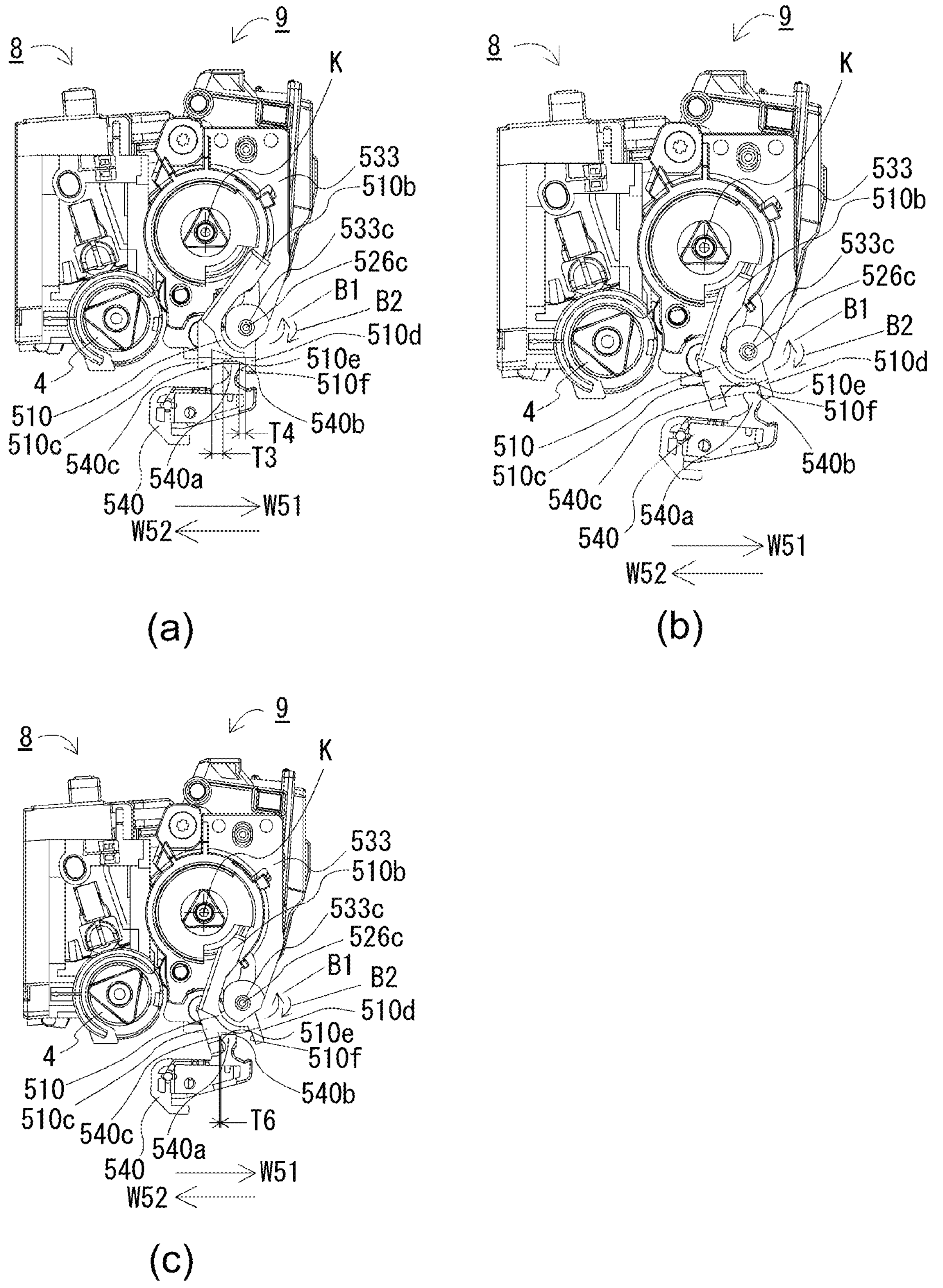
FIG. 1 is an illustration of a drive interruption operation according to the Embodiment 1.

Referring to FIG. 1, an operation of moving the regulating member 510 from the first position to the second position inside the image forming apparatus main assembly 502, that is, an operation of breaking the driving connection described above will be described. FIG. 1 is a view of the process cartridge P placed at the second inner position inside the image forming apparatus main assembly 502 as viewed from the drive side. For the sake of better illustration, the drive side cartridge cover member 520 is omitted therein.

Part (a) of FIG. 1 shows a state in which the regulating member 510 is at the first position and the drive control member 540 is at the home position (first main assembly position). Here, as described above, at the home position of the drive control member 540 in FIG. 1, the gap T4 exists between the first force applying surface and the foot 510*d* which is the retraction force receiving portion for the process cartridge P situated in the second inner position. Moreover, the gap T3 exists between the second force applying surface 540*c* and the foot portion 510*c*, which is the insertion force receiving portion. The drive control member 540 of this embodiment is structured to be movable from the home position in the direction of arrow W51 in part (a) of FIG. 1 toward the second main assembly position. When the drive control member 540 moves in the W51 direction from the state of part (b) of FIG. 1 in the direction of the arrow B1, the first force applying surface 540*b* and the surface 510*f* of the foot portion 510*d* abuts to each other, the regulating member 510 swings in arrow B1 direction in part (b) of FIG. 1 about the support portion 526*c* of the drive side bearing 526. The support portion 526*c* of the drive side bearing 526 is coaxially fitted into the fitting hole 533*c* of the developing device cover member 533, and the axis thereof is parallel to the swing axis K. When the regulating member 510 rotates in the direction of the arrow B1 in part (b) of FIG. 1, the regulating member 510 moves from the first position toward the second position. At this time, the regulating lever portion 510*b* of the regulating member 510 is inserted between the development coupling member 74 and the sliding member 80 as shown in FIG. 13, by which the sliding member 80 is moved in the F2 direction to bring the claw portion 75*a* and the claw portion 74*a* out of engagement with each other, thereby breaking the driving connection. Furthermore, as shown in part (c) of FIG. 1, even if the drive control member 540 moves in the W52 direction and returns to the home position, the control portion 540*a* keeps the gap T6 between the surface 510*e* of the foot portion 510*c* of the regulating member 510 and the gap T6 and does not bring them into abutment to each other. That is, the regulating member 510 receives no external force from the drive control member 540. Further, since the regulating lever portion 510*b* is sandwiched between the sliding member 80 and the development coupling member 74 as described above, the regulating member 510 is maintained at the second position. By this, the sliding member 80 cannot slide in the F1 direction, so that the drive disconnection state is maintained.

[Drive Connection Operation]

Figure 16:
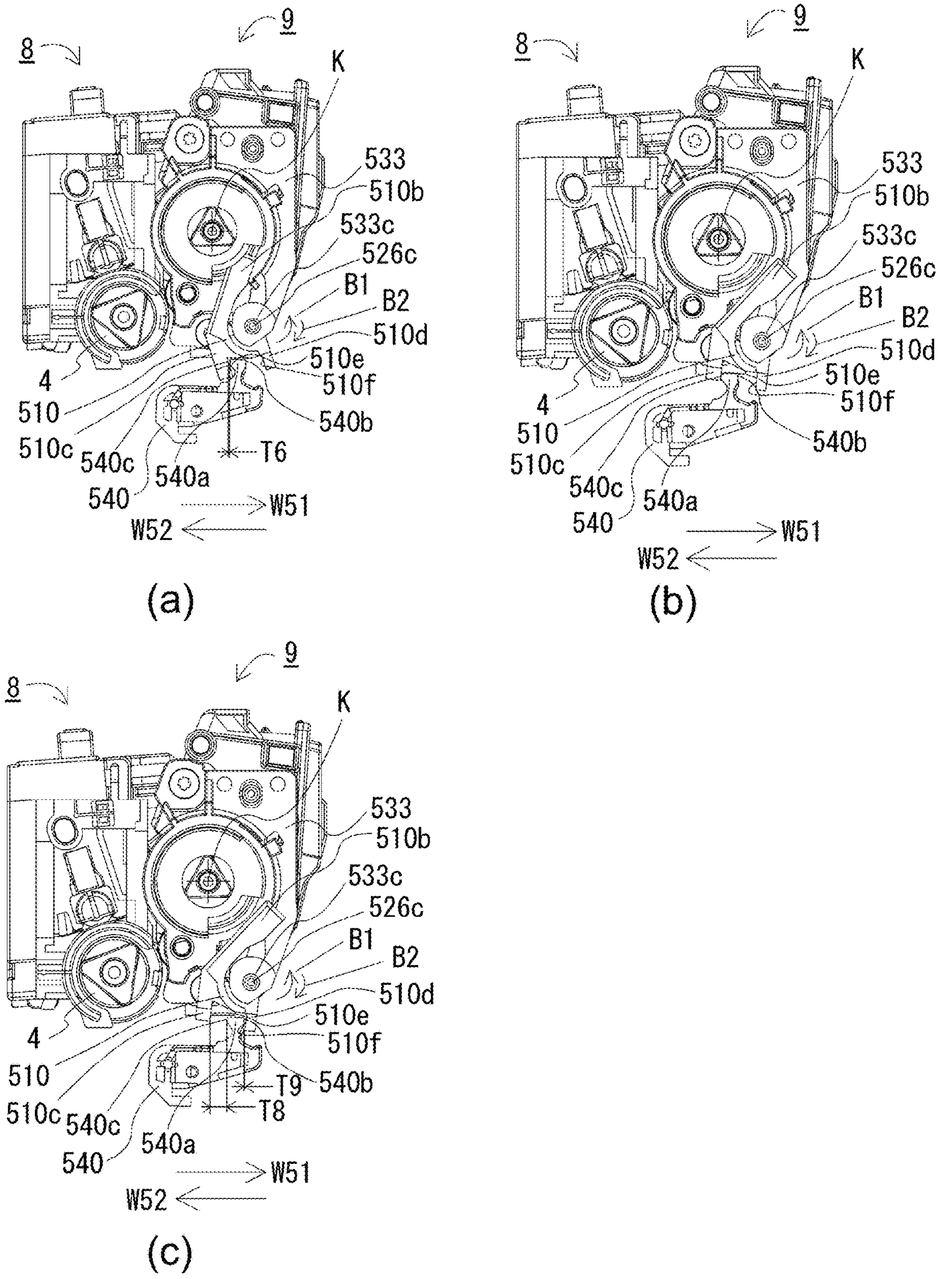
FIG. 16 is an illustration showing a drive connection operation in the Embodiment 1.

Referring to FIG. 16, the operation of moving the regulating member 510 from the second position to the first position inside the image forming apparatus main assembly 502, that is, the operation of connecting the drive will be described. FIG. 16 is a view of the process cartridge P located at the second inner position inside the image forming apparatus main assembly 502 as viewed from the drive side. For the sake of better illustration, the drive side cartridge cover member 520 is omitted therein.

Part (a) of FIG. 16 shows a state in which the regulating member 510 is at the second position and the drive control member 540 is at the home position. The drive control member 540 is structured to be movable from the home position in the arrow W52 direction in part (a) of FIG. 16 toward the third main assembly position. When the drive control member 540 of this embodiment moves from the state shown in part (a) of FIG. 16 until the second force applying surface 540*c* and the surface 510*e* of the foot portion 510*c* are brought into abutment with each other, the regulating member 510 rotates in the arrow B2 direction (FIG. 16) home position in the direction of arrow W52 in part (a) of FIG. 16 toward the third main assembly position. As described above, the support portion 526*c* is fitted in the fitting hole 533*c* of the developing device cover member 533, and the rotation axis of the regulating member 510 is parallel to the swing axis K. By swinging of the regulating member 510 in the arrow B2 direction, the regulating member 510 moves from the second position toward the first position. At this time, the regulating lever portion 510*b* of the regulating member 510 explained referring to FIG. 13 moves away from between the development coupling member 74 and the sliding member 80, by which the rotatable member 75 receiving the urging force described with FIG. 11 is moved in the arrow F1 direction, whereby the drive connection is broken. Furthermore, as shown in part (c) of FIG. 16, even if the drive control member 540 moves in the W51 direction and returns to the home position, the control portion 540*a* is kept spaced from the surface 510*f* of the foot 510*d* of the regulating member 510 by the gap T9, and therefore, they do not abut to each other. Furthermore, at this time, the control portion 540*a* is spaced, by a gap T8, from the surface 510*e* of the foot portion 510*c* of the regulating member 510, and therefore, the control portion 540*a* and the regulating member 510 are kept out of contact state. For this reason, the driving connection state is maintained while the regulating member 510 is maintained at the first position.

As described above, by using the structure of this embodiment, it is possible to switch between the second position and the first position of the regulating member 510 by moving the drive control member 540 from the home position, thereby switching the drive connection state. By this, it is possible to switch the drive regardless of the contact/separation operation between the photosensitive drum 4 and the developing roller 6.

In this embodiment The development coupling member 74 and the sliding member 80 are illustrated as an example of the coaxial first and second rotatable members which are engageable with each other for carrying out transmission and non-transmission of the drive, in the transmission path of the driving force from the development coupling member 74 to the developing roller 6. The first rotatable member and the second rotatable member may be two members which are placed in other points in the transmission path and which can take an engagement position where they can engage with each other about the rotation axis to transmit the driving force, and a non-engagement position where they are separated from each other in the rotation axis direction and the driving force is not transmitted. That is, the present invention is not limited to the structure of this embodiment.

Embodiment 2

Referring to FIGS. 17 to 25, a process cartridge and an image forming apparatus according to Embodiment 2 of the present disclosure will be described. The process cartridge of this embodiment is the same as that of the Embodiment 1, except for the structure of the regulating member and the periphery thereof. Accordingly, members including the same functions and structures are assigned by the same reference numerals, and detailed description thereof is omitted.

[Structure of Drive Connecting Portion]

Figure 17:
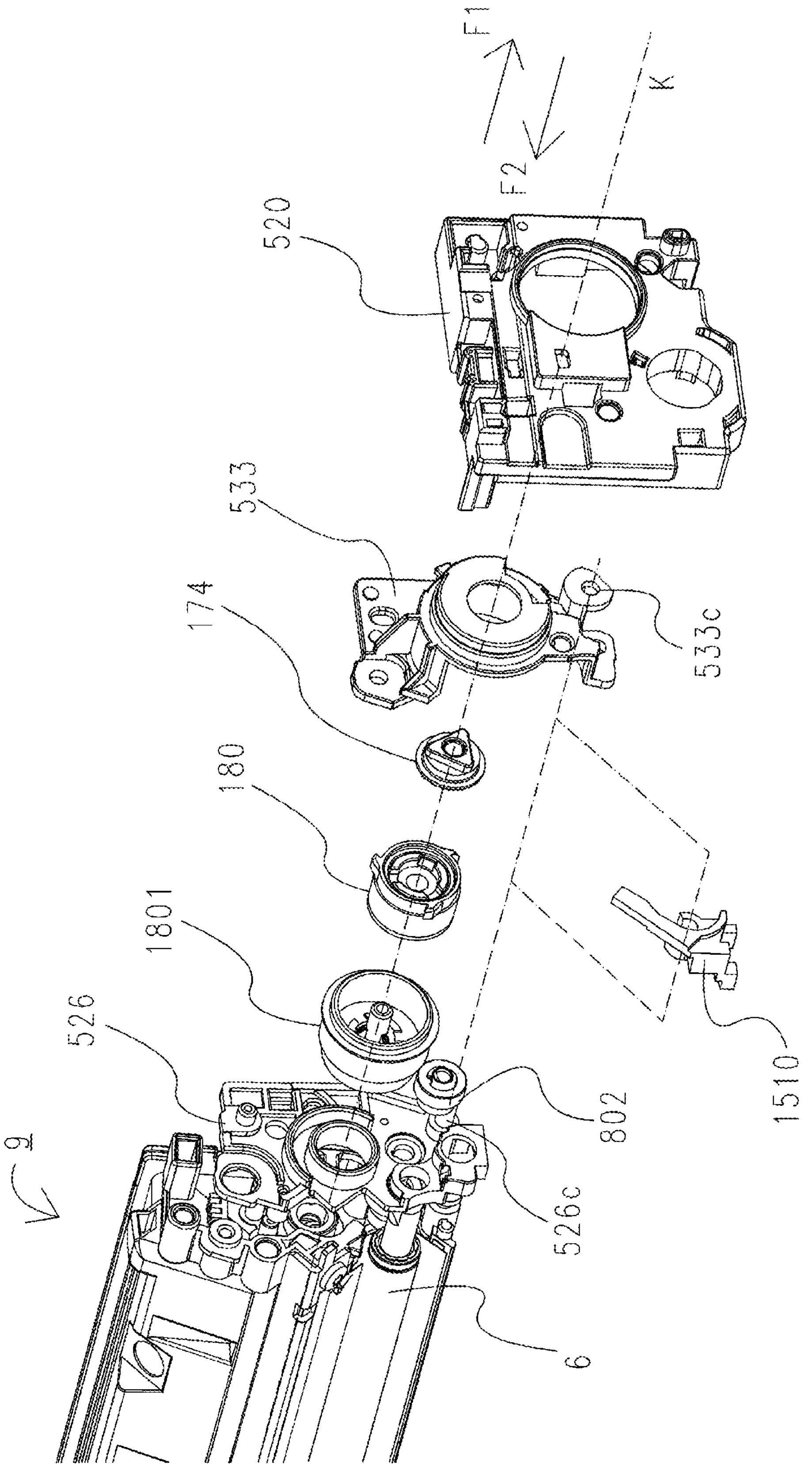
FIG. 17 is a perspective view of the drive connecting portion in Embodiment 2.

FIG. 17 is a perspective view of the process cartridge P as viewed from the drive side, showing a state in which the drive side cartridge cover member 520 and the developing device cover member 533 are removed. Between the drive side bearing 526 and the drive side cartridge cover member 520, there are provided a gear 1801, a clutch 180 that is a drive transmission switching device including a transmission breaking mechanism, a development coupling member 174, and a developing device cover member 533. In addition, similarly to the Embodiment 1, the regulating member 1510 is slidably mounted to the support portion 526*c* of the drive side bearing 526. In this embodiment, the drive connecting portion comprises the gear 1801, the clutch 180, the development coupling member 174, and the developing device cover member 533. In this embodiment, the drive transmission switching device 180 will be described as a spring clutch as an example, and will be referred to as a spring clutch 180.

Figure 18:
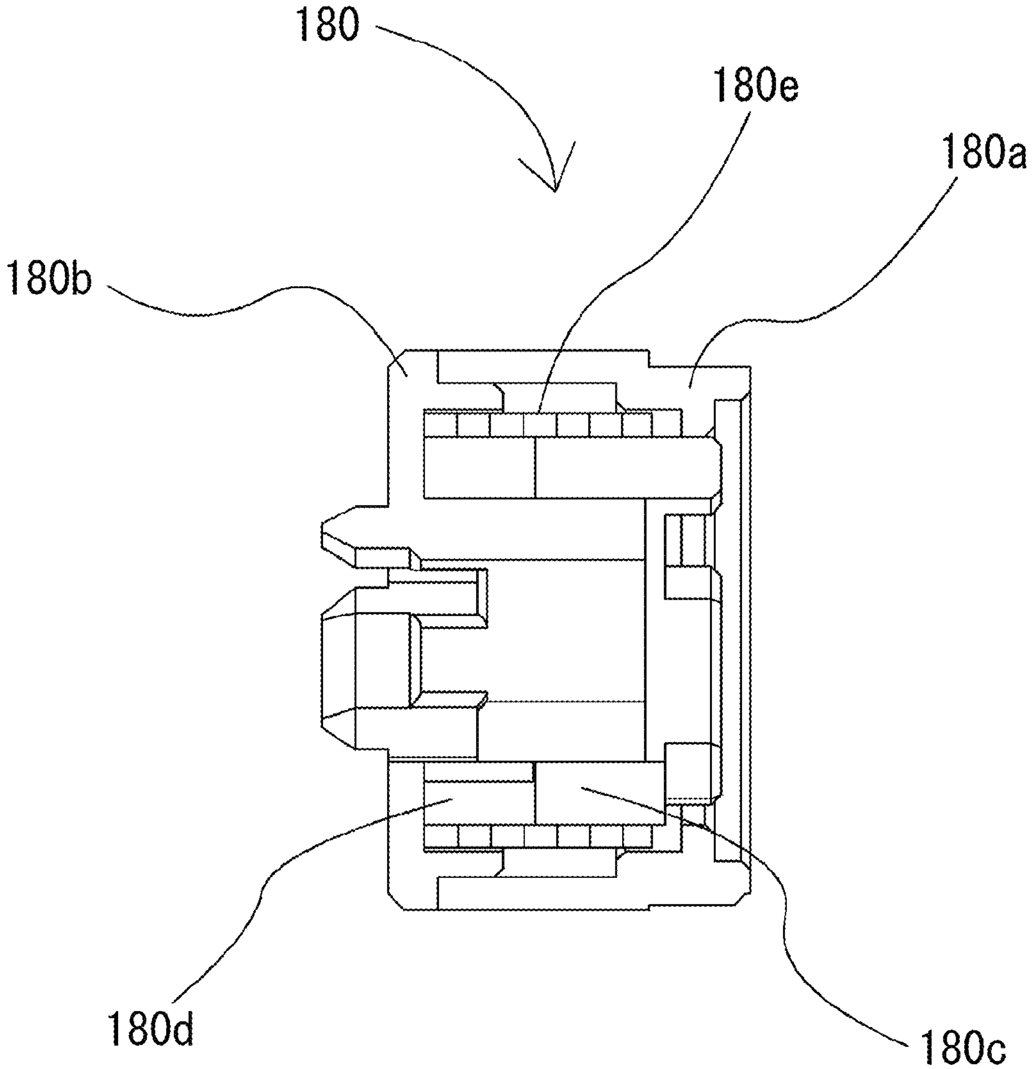
FIG. 18 is a sectional view of a clutch component in Embodiment 2.

Referring to FIG. 18, an overview of the spring clutch 180 will be described. The spring clutch 180 in this embodiment comprises a control ring 180*a*, an output member 180*b*, an input inner ring 180*c*, a transmission inner ring 180*d* and a transmission spring 180*e*. An input inner ring 180*c* as an input member engages with the development coupling member 174 and rotates by receiving a driving force from the upstream side of the transmission path. The input inner ring 180*c* and the transmission spring 180*e* wound around its outer periphery are in a state in which relative rotation is restricted by the tightening force (friction) of the transmission spring 180*e* as a transmission member, and the driving force is transmitted to the transmission spring 180*e*. Relative rotation between the input inner ring 180*c* and the transmission spring 180*e* is also restricted by tightening force (friction) of the transmission spring 180*e*. Therefore, the rotation transmitted to the transmission spring 180*e* is transmitted to the transmission inner ring 180*d* by the tightening force of the transmission spring 180*e*. The transmission inner ring 180*d* is engaged with the output member 180*b*, and the output member 180*b* transmits the driving force at the engaging portion with the gear 1801, which will be described hereinafter, in the same manner as in the Embodiment 1. The control ring 180*a* as the control member is engaged with one end of a transmission spring 180*e*, and by rotating the control ring 180*a* in a direction opposite to the spring tightening direction, the tightening of the spring (the degree of contact with each inner ring) can be loosened. As described above, all the portions constituting the spring clutch 180 rotate together during drive transmission. To interrupt the drive transmission, the transmission spring 180*e* is loosened from the input inner ring 180*c* (reducing the frictional force between the transmission spring 180*e* and each inner ring) by stopping the rotation of the control ring 180*a*, and the drive from the input inner ring 180*c* to the transmission inner ring 180*d* by the transmission spring 180*e* is not transmitted to transmission inner ring 180*d*, thereby interrupting the transmission.

In addition, the structure of the spring clutch 180 is not limited to this example, and the number of inner rings may be one. In that case, the opposite end of the transmission spring 180*e* to the one end that engages with the control ring 180*a* may be directly engaged with the output member 180*b* to transmit the rotation. In addition, the drive transmission switching device may be in a form other than a spring clutch, and may be a device structured such that by partially stopping the rotation, the rotation transmission portion expands in the radial direction or moves in the circumferential direction to disconnect the drive. That is, conventionally known various structures may be employed, if, it is possible to form a transmission state in which the driving force is transmitted by restricting the relative rotation between the members which transmit the driving force, and to form a non-transmission state in which the driving force is not transmitted by allowing the relative rotation.

Figure 19:
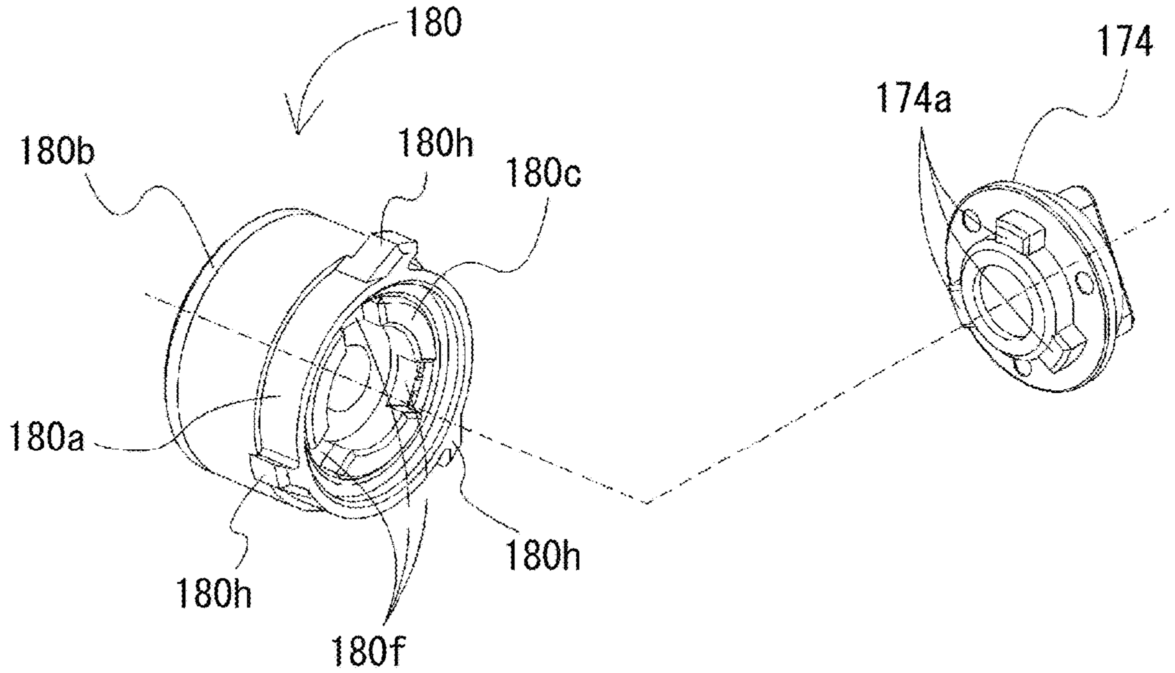
FIG. 19 is an illustration showing an engagement portion between a clutch component and the coupling in the Embodiment 2.
Figure 19:
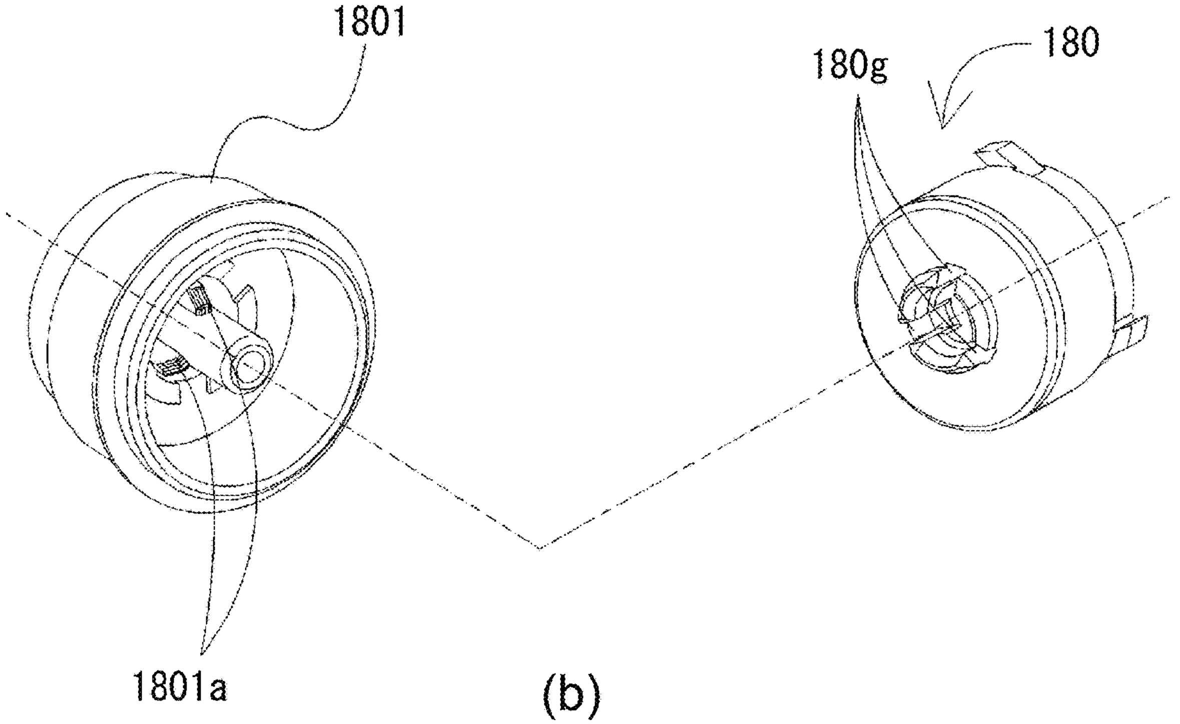

Referring to Figure, assembly of the gear 1801, the spring clutch 180, and the development coupling member 174 will be described. Part (a) of FIG. 19 shows the assembly of the spring clutch 180 and the development coupling member 174, and part (b) of FIG. 19 shows the assembly of the spring clutch 180 and the gear 1801. The input inner ring 180*c* of the spring clutch 180 is provided with an input groove 180*f*, and the development coupling member 174 is provided with a claw portion 174*a*. By engaging the claw portion 174*a* with the input groove 180*f*, when the development coupling member 174 rotates, the input inner ring 180*c* rotates and the drive can be transmitted. The output member 180*b* of the spring clutch 180 is provided with an output claw 180*g*, and the gear 1801 is provided with a transmission groove 1801*a*. By engaging the output claw 180*g* with the transmission groove 1801*a*, when the output member 180*b* rotates, the gear 1801 rotates and the drive can be transmitted. By this, the driving force input to the development coupling member 174 is transmitted to the gear 1801 to rotate the developing roller gear 802, thus driving the developing roller 6. In this embodiment, three claw portions 174*a*, three input grooves 180*f*, three output claws 180*g*, and three transmission grooves 1801*a* are provided, but the number is not limited such examples.

[Drive Disconnection Structure]

Figure 20:
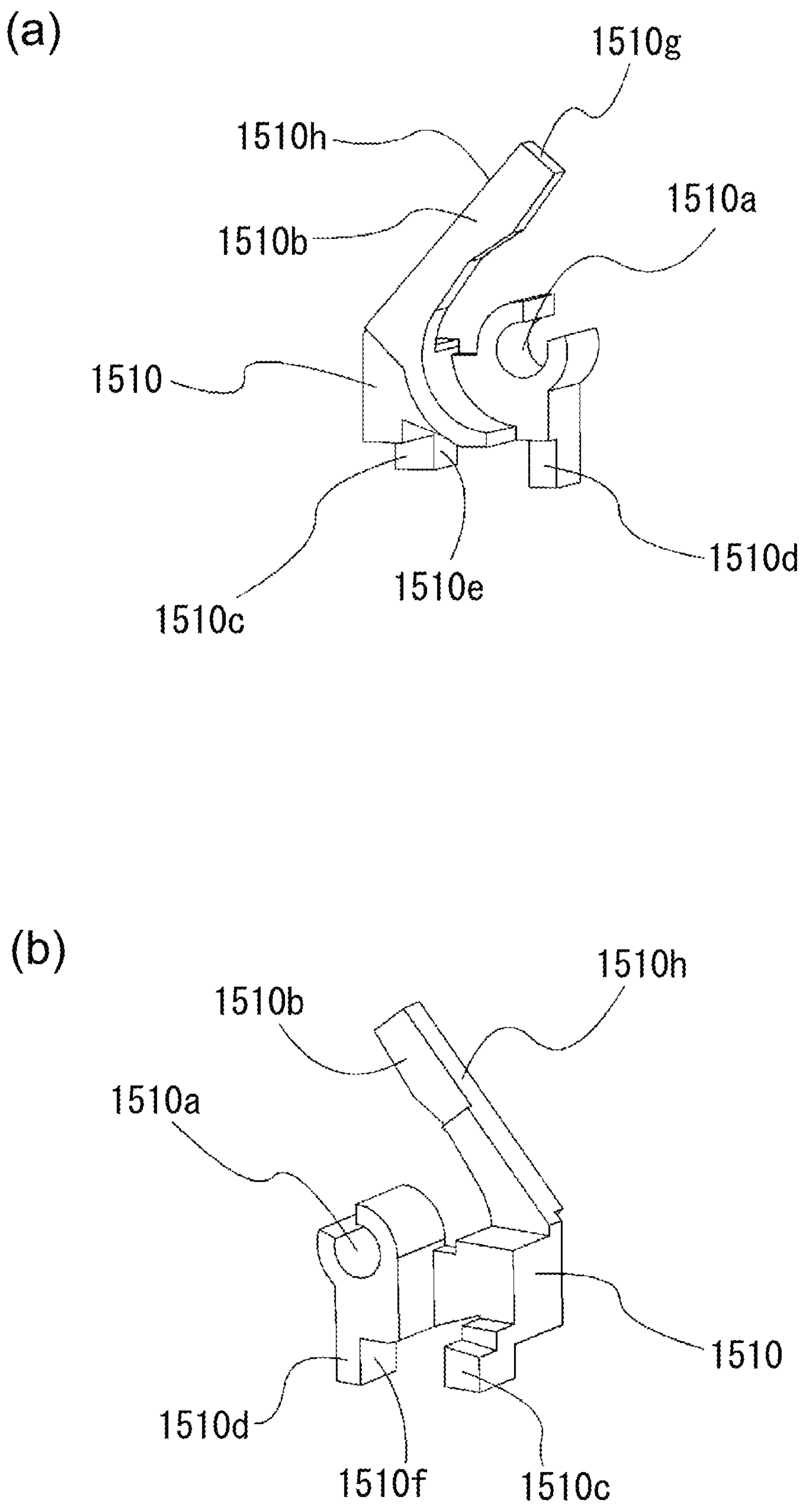
FIG. 20 is a perspective view of a regulating member 1510 in the Embodiment 2.
Figure 21:
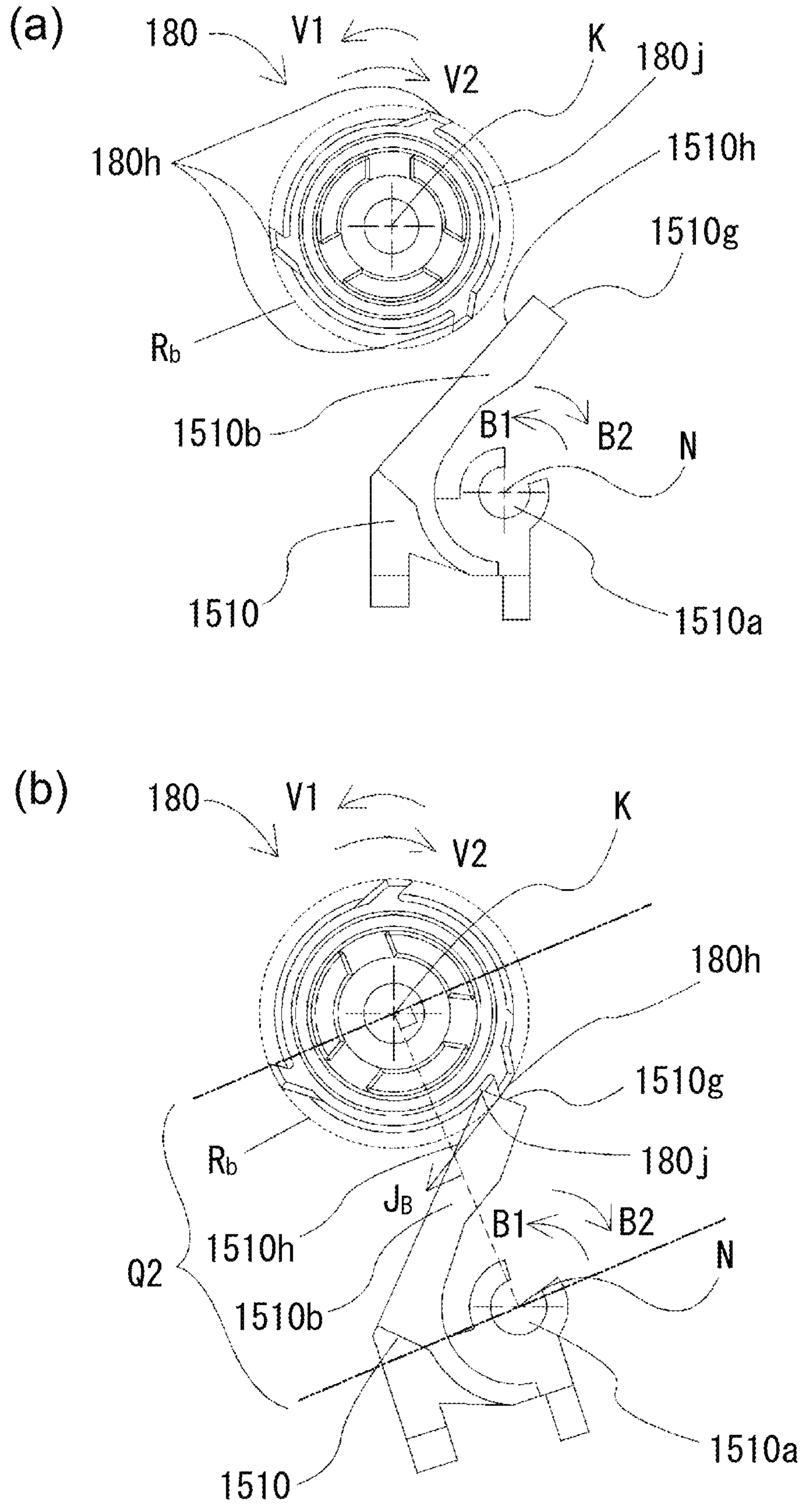
FIG. 21 is an illustration showing the positional relationship of the regulating member 1510 at the time of drive connection and interruption, in the Embodiment 2.

Referring to FIGS. 20 and 21, the structure of drive disconnection will be described. FIG. 20 shows a regulating member 1510 for stopping the rotation of the control ring 180*a* of the spring clutch 180 in order to disconnect the drive, and FIG. 21 is a view as seen from the drive side and shows a positional relationship between the regulating member 1510 and the spring clutch 180 in the drive transmission state and drive interruption state.

Referring to FIG. 20, the structure of the regulating member 1510 will be described. The regulating member 1510 has a supported hole 1510*a*, a regulating lever portion 1510*b*, a foot portion 1510*c*, and a foot portion 1510*d*. The regulating lever portion 1510*b* has a regulating surface 1510*g* for stopping the control ring 180*a* of the spring clutch 180 and a contact surface 1510*h* which contacts the outer peripheral surface 180*j* of the spring clutch 180. In addition, similarly to the Embodiment 1, the foot portion 1510*c* and the foot portion 1510*d* have surfaces 1510*e* and 1510*f*, which are surfaces for receiving force from the drive control member 540, respectively. Further, as in the Embodiment 1, the supported hole 1510*a* is fitted with the support portion 526*c* of the drive side bearing 526 so that it can swing about the axis of the support portion 526*c*.

Referring to part (a) of FIG. 21, the positional relationship between the regulating member 1510 and the spring clutch 180 in the drive transmission state will be described. A control ring 180*a* of the spring clutch 180 is provided with a control portion 180 has an engaged portion which engages with the regulating member 1510. The control portion 180*h* is a claw-shaped portion projecting from the outer peripheral surface of the control ring 180*a*. Here, reference sign rb indicates a locus of movement of the radial free end portion of the control portion 180*h* at the time when the spring clutch 180 receives the driving force and rotates in the V2 direction. When the regulating member 1510 is positioned outside the locus rb as viewed from the center of the spring clutch 180 (oscillation axis K), the control ring 180*a* can rotate in the V2 direction, so that the drive is transmitted. The position of this regulating member 1510 is referred to as the first position of the regulating member 1510 as a non-engagement position.

Referring to part (b) of FIG. 21, the positional relationship between the regulating member 1510 and the spring clutch 180 in the drive disconnected state will be described. The regulating member 1510 swings about the support portion 526*c* (FIG. 17) of the drive side bearing 526 in the B1 direction as a movement about the rotational axis parallel to the rotational axis of the control ring 180*a*, and when the regulating surface 1510*g* enters the locus rb, the controlling portion 180*h*, which is rotating in the direction V2 by receiving the driving force hits the regulating surface 1510*g*. Here, the force which the control surface 1510*g* receives from the control portion 180*h* at the contact surface between the control portion 180*h* and the control surface 1510*g* is a rotational force JB. It is desired that a length of the regulating lever portion 1510*b* and the length of the control portion 180*h* are adjusted so that the rotation force JB in the V2 rotational direction is produced in an area Q2 which is perpendicular to an imaginary line connecting the shaft center N of the supported hole 1510*a* and the swing axis K which is also the rotation center of the spring clutch 180. With such adjustment, the control portion 180*h* which hits the regulating surface 1510*g* pulls the restricting lever portion 1510*b* in the V2 rotational direction, and rotates the regulating member 1510 in the B1 direction. By this, the contact surface 1510*h* provided on the regulating lever portion 1510*b* of the regulating member 1510 having rotated in the B1 direction can hit the outer peripheral surface 180*j* of the spring clutch 180, thereby regulating the position in the B1 direction. At this time, the regulating member 1510 hits the outer peripheral surface 180*j* of the spring clutch 180 functioning as the second engaged portion, at the contact surface 1510*h* and hits the control portion 180*h* functioning as the first engaged portion, at the regulating surface 1510*g*. In the area Q2, which is a region sandwiched between a first imaginary line passing through the swing axis K of the spring clutch 180 and a second imaginary line passing through the axial center N of the regulating member 1510, the movement locus of the controlling portion 180*h* and the movement locus of the regulating member 1510 as the movement portion intersect each other. By this, the position of the regulating member 1510 is fixed while receiving the rotational force JB unless it receives an external force from another. By stopping the control portion 180*h* of the spring clutch 180 by the regulating member 1510, that is, by stopping the rotation of the control ring 180*a*, the driving force inputted from the image forming apparatus main assembly 502 can be disconnected. This position of the regulating member 1510 is referred to as a second position of the regulating member 1510 as the engaging position.

[Drive Connection Breaking Operation]

Figure 22:
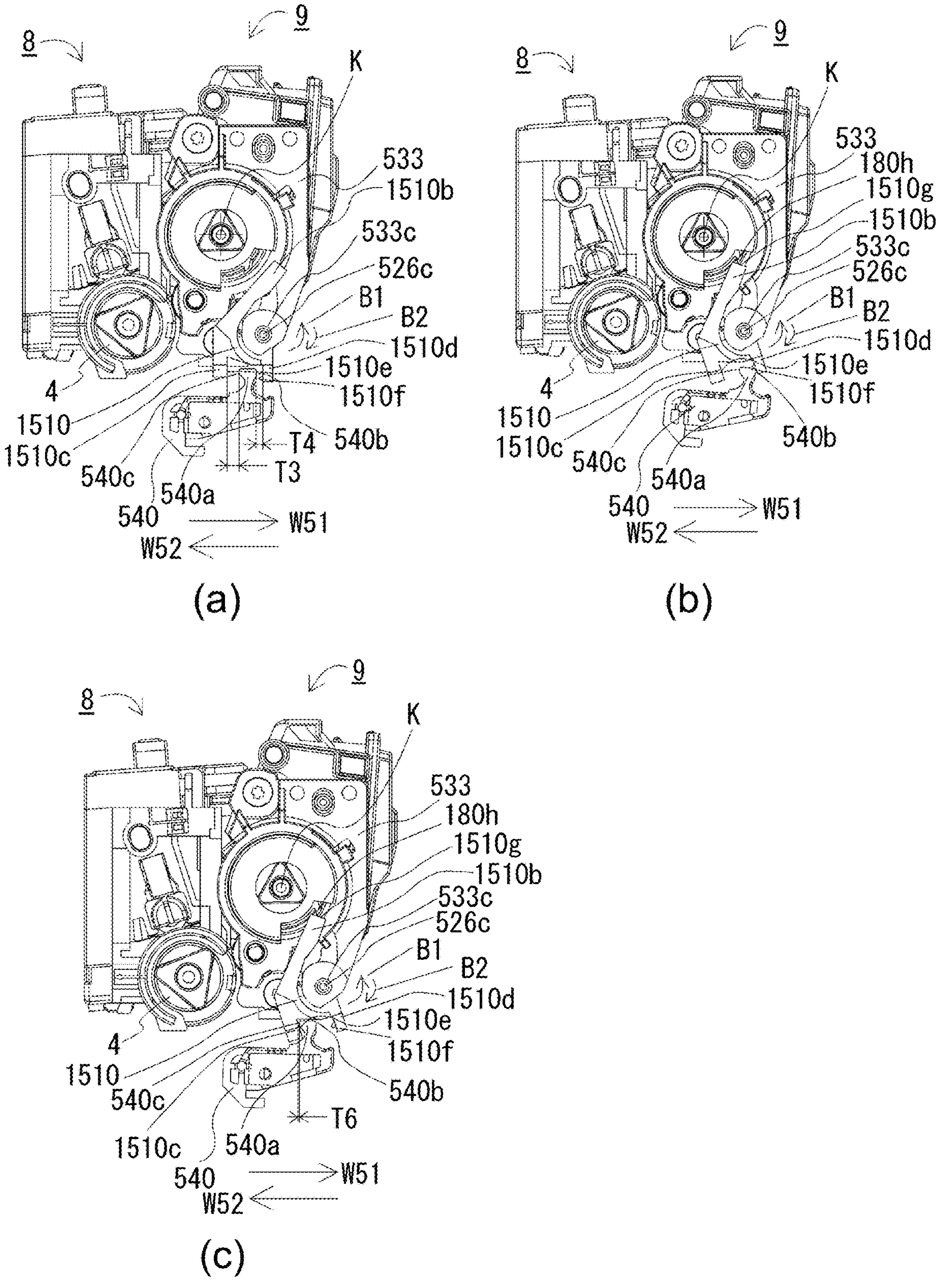
FIG. 22 is an illustration showing a drive interruption operation in the Embodiment 2.

Referring to FIG. 22, the operation of moving the regulating member 1510 from the first position to the second position inside the image forming apparatus main assembly 502, that is, the operation of disconnection of the drive described above will be explained. FIG. 22 is a view of the process cartridge P placed at the second inner position inside the image forming apparatus main assembly 502, as viewed from the drive side. For the sake of better illustration, the drive side cartridge cover member 520 is omitted.

As shown in part (a) of FIG. 22, when the regulating member 1510 is in the first position and the drive control member 540 is at the home position, the control ring 180*a* can rotate in the V2 direction and drive is transmitted. When the drive control member 540 moves in the W51 direction from the state of Figure (a) and the first force applying surface 540*b* and a surface 1510*f* of the foot portion 1510*d* of the regulating member 1510 are brought into contact with each other, the regulating member 1510 swings in the direction of the arrow B1 in part (b) of FIG. 22. That is, the regulating member 1510 moves from the first position toward the second position. In the second position, as shown in part (b) of FIG. 21, by inserting the regulating lever portion 1510*b* of the regulating member 1510 into the locus rb of the free end of the control portion 180*h* of the spring clutch 180, the regulating surface 1510*g* stops the rotation of the control portion 180*h*. By this, the rotation of the control ring 180*a* is stopped, and the spring 180*e* of the spring clutch 180 is loosened, thereby disconnecting the drive. Furthermore, as shown in part (c) of FIG. 22, even if the drive control member 540 moves in the W52 direction and returns to the home position, the control portion 540*a* keeps the gap T6 from the surface 1510*e* on the foot portion 1510*c* of the regulating member 1510, and they do not contact with each other. Therefore, as shown in FIG. 21, the restricting lever portion 1510*b* is pulled in the V2 direction by the control portion 180*h*, so that the regulating member 1510 is maintained at the second position and the drive disconnection state is maintained.

[Drive Connecting Operation]

Figure 23:
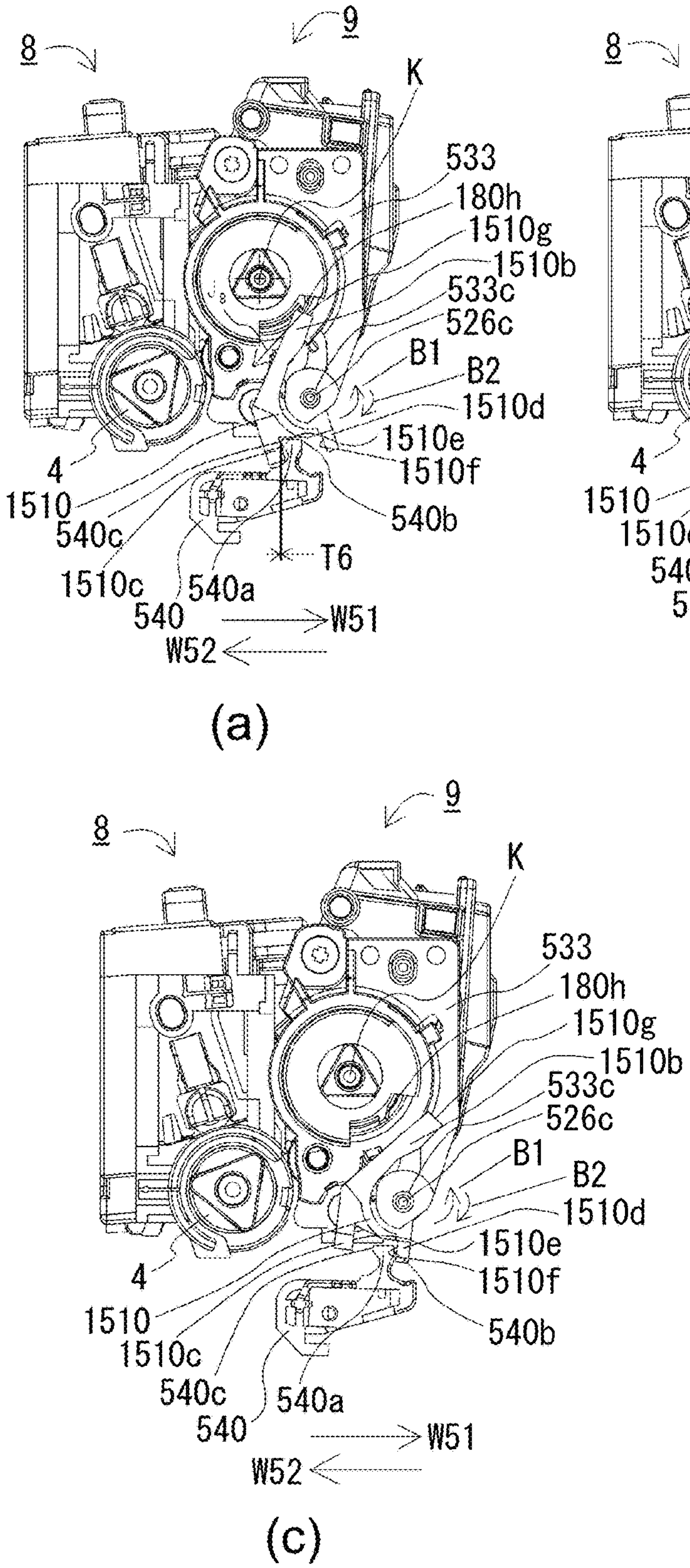
FIG. 23 is an illustration showing a drive connection operation in the Embodiment 2.

Referring to FIG. 23, the operation of moving the regulating member 1510 from the second position to the first position inside the image forming apparatus main assembly 502, that is, the operation of connecting the drive will be described. FIG. 23 is a view of the process cartridge P placed at the second inner position inside the image forming apparatus main assembly 502 as viewed from the drive side. For the sake of better illustration, the drive side cartridge cover member 520 is omitted.

Part (a) of FIG. 23 shows a state in which the regulating member 1510 is in the second position and the drive control member 540 is in the home position. When the drive control member 540 moves in the W52 direction from the state of Figure (b) Rotate in the direction of the arrow B2 and the second force applying member 540*c* and the surface 1510*e* of the foot portion 1510*c* of the regulating member are brought into contact with each other, the regulating portion 1510 rotates in the arrow B2 direction in part (b) of FIG. 23. That is, the regulating member 1510 moves from the second position toward the first position. At this time, as shown in FIG. 21, the regulation lever portion 1510*b* rotates in the B2 direction from the state in which it is pulled in the V2 direction by the control portion 180*h*, and therefore, the rotational force JB is imparted to the drive control member as a load. Here, the rotational force JB acting as a load is a force which stops (tends to push back) the control ring 180*a* of the spring clutch 180, and therefore, it is a force in the same direction as the elastic force of the spring 180*e* tending to return the control ring 180*a* to the original position thereof. Therefore, when it is desired to reduce the rotational force JB, it is preferable to change the spring constant, but it is desirable to determine so as to balance with the necessary transmission performance of the clutch itself. In the state of part (b) of FIG. 23, the regulating lever portion 1510*b* is removed from the locus rb, and the drive is transmitted. Furthermore, as shown in part (c) of FIG. 23, even if the drive control member 540 moves in the W51 direction and returns to the home position, the control portion 540*a* keeps the gap T9 from the surface 1510*f* on the foot portion 1510*d* of the regulating member 1510, and they do not contact each other. Therefore, the drive transmission state is maintained while the regulating member 1510 is maintained at the first position.

[Other Structures]

Figure 24:
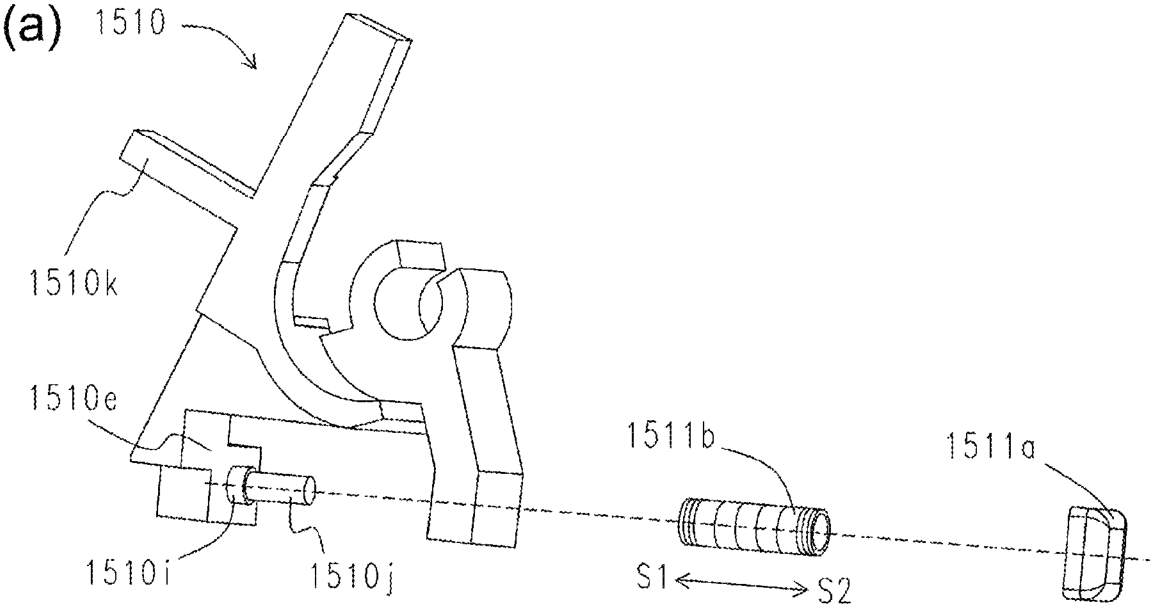
FIG. 24 is an exploded view of an urging member 1511 the Embodiment 2.
Figure 24:
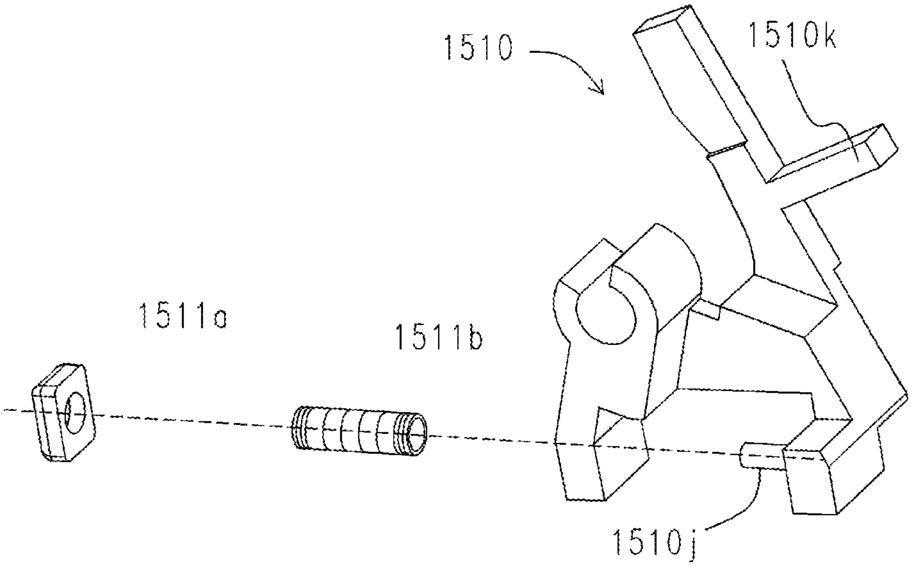
Figure 25:
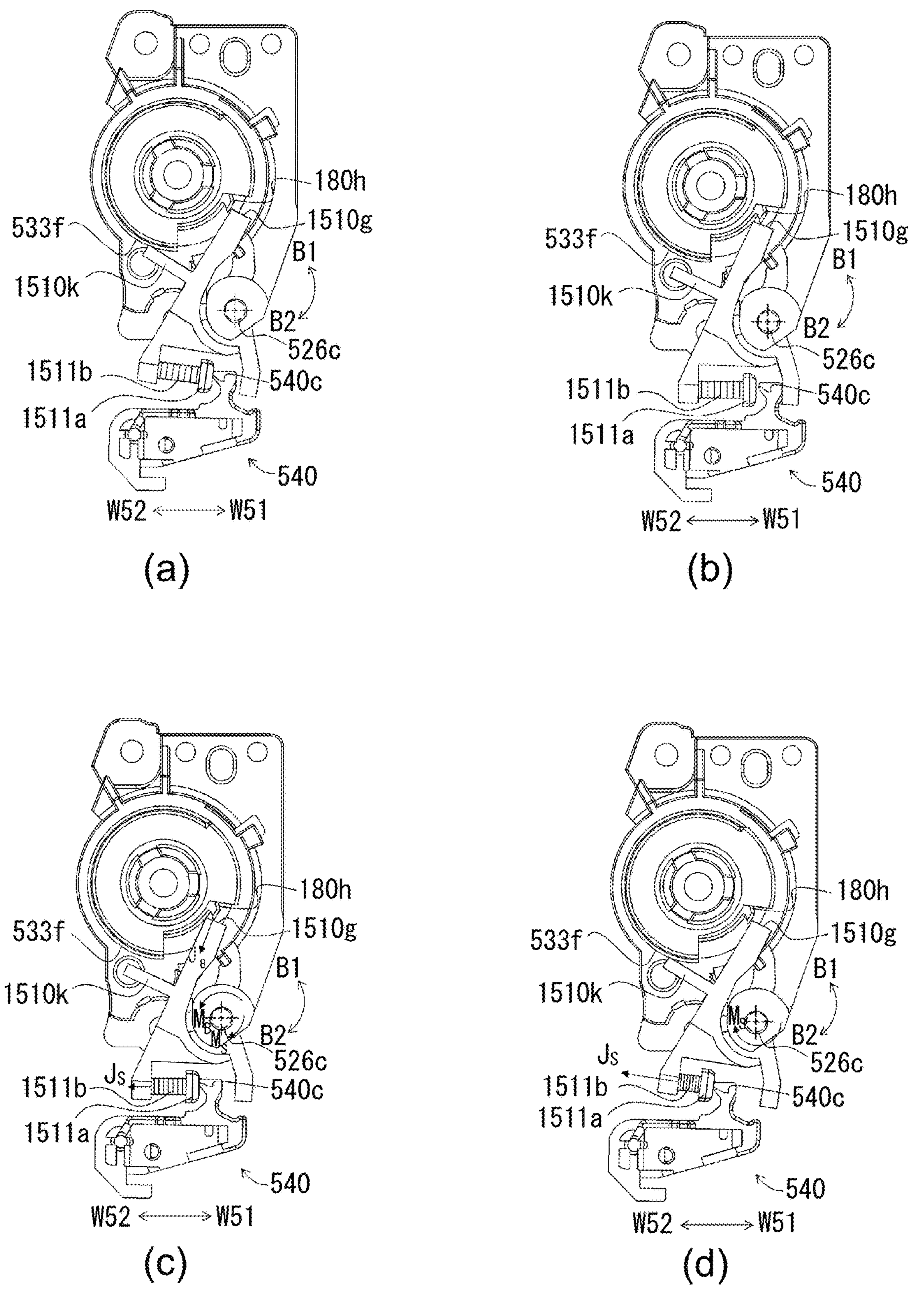
FIG. 25 is an illustration showing drive connection and drive interruption operations when the urging member, in the Embodiment 2 is used.

Referring to FIGS. 24 and 25, other structures of this embodiment will be described. In this embodiment, the position of the drive control member 540 at the time when a gap exists between it and the regulating member 1510 is referred to as the home position, but the structure is not necessarily limited to the structure including the gap. As an example of a structure in which the regulating member 1510 and the drive control member 540 are in contact with each other at the home position, there is a structure in which an urging member 1511 is mounted to the regulating member 1510. Referring to FIGS. 24 and 25, a structure in which an urging member 1511 is mounted to the regulating member 1510 will be described.

Referring to part (a) of FIG. 24 and part (b) of FIG. 24, the outline of the urging member 1511 will be described. The urging member 1511 comprises a free end portion 1511*a* and a spring 1511*b* which is a compression coil spring. FIG. 24 shows a state in which the spring 1511*b* of the urging member 1511 is removed from the free end portion 1511*a* and the support portion 1510*i* provided on the surface 1510*e* of the regulating member 1510. The spring 1511*b* of the urging member 1511 is provided with an end turn portion at each of the opposite end portions, and is fixed by press-fitting the support portion 1510*i* of the regulating member 1510 to the inner diameter of the end turn portion at one end. The end turn portion at the other end is fixed to the free end portion 1511*a* of the urging member 1511. In addition, a projecting portion 1510*j* having a diameter smaller than that of the support portion 1510*i* of the regulating member 1510 passes through the inner portion of the elastic portion of the spring 1511*b* of the urging member 1511 to restrict the contracting direction of the spring 1511*b* to an arrow S1 direction or an arrow S2 direction.

Referring to FIG. 25, the switching operation of the drive transmission state inside the image forming apparatus main assembly 502 will be described. In this structure, the second force applying surface 540*c* of the drive control member 540 and the free end portion 1511*a* of the urging member 1511 are in contact with each other at the home position. Part (a) of FIG. 25 shows a state in which the regulating member 1510 is at the first position and the drive control member 540 is at the home position. In the state of part (a) of FIG. 25, the spring 1511*b* of the urging member 1511 is slightly compressed, and the regulating lever portion 1510*k* of the regulating member 1510 is in contact with the outer peripheral surface 533*f* of the developing device cover member 533. Therefore, the regulating member 1510 is fixed at a position where the regulating lever portion 1510*k* contacts the outer peripheral surface 533*f* of the developing device cover member 533, thereby reliably maintaining the drive transmission state.

Here, when the drive control member 540 moves in the W51 direction, the regulating member 1510 moves from the first position toward the second position as shown in part (b) of FIG. 25, and the regulating surface 1510*g* of the regulating member 1510 and the control portion 180*h* of the spring clutch 180 abut to each other. By this, the rotation of the control portion 180*h* of the spring clutch 180 is stopped, and the drive is disconnected. In the state shown in part (b) of FIG. 25, the second force applying surface 540*c* of the drive control member 540 and the free end portion 1511*a* of the urging member 1511 are spaced from each other. The free end portion 1511*a* of the urging member 1511 may be in light contact with the second force applying surface 540*c* of the drive control member 540, as long as it does not affect the control of the regulating member 1510 by the drive control member 540. That is, the structure may be such that the contact between the urging member 1511 and the drive control member 540 is maintained even in the second position.

Subsequently, as shown in part (c) of FIG. 25, when the drive control member 540 moves in the W52 direction and returns to the home position, the second force applying surface 540*c* of the drive control member 540 and the free end portion 1511*a* of the urging member 1511 abut to each other, and the spring 1511*b* is compressed. Therefore, the regulating member 1510 receives a moment MB in the B1 direction about the support portion 526*c* of the drive side bearing 526 produced by the force JB applied from the control portion 180*h* of the spring clutch 180, and a moment MS in the B2 direction about the support portion 526*c* produced by a force JB applied from the spring 1511*b* of the urging member 1511. In the state of part (c) of FIG. 25, MB>MS, and therefore, the regulating member 1510 does not move from the second position. That is, the drive disconnection state is maintained.

Furthermore, when the drive control member 540 moves in the W52 direction, the moment relationship changes to MB<MS, and as shown in part (d) of FIG. 25, the regulating member 1510 moves from the second position to the first position, so that the drive is transmitted.

As described above, by using the structure of this embodiment, it is possible to switch the drive transmission state between the first position and the second position of the restriction member 1510 by moving the drive control member 540 from the home position. By this, it is possible to switch the drive regardless of the contact/separation operation for between the photosensitive drum 4 and the developing roller 6.

Embodiment 3

Referring to FIGS. 26 to 30, a process cartridge and an image forming apparatus according to Embodiment 3 of the present disclosure will be described. The process cartridge of this embodiment is the same as that of the Embodiment 2, and differs only in the structure of a locking member 550 and the peripheral structures thereof, which will be described hereinafter. Accordingly, members having the same functions and structures are assigned by the same reference numerals, and detailed description thereof is omitted.

[Structure of Drive Connecting Portion]

Figure 26:
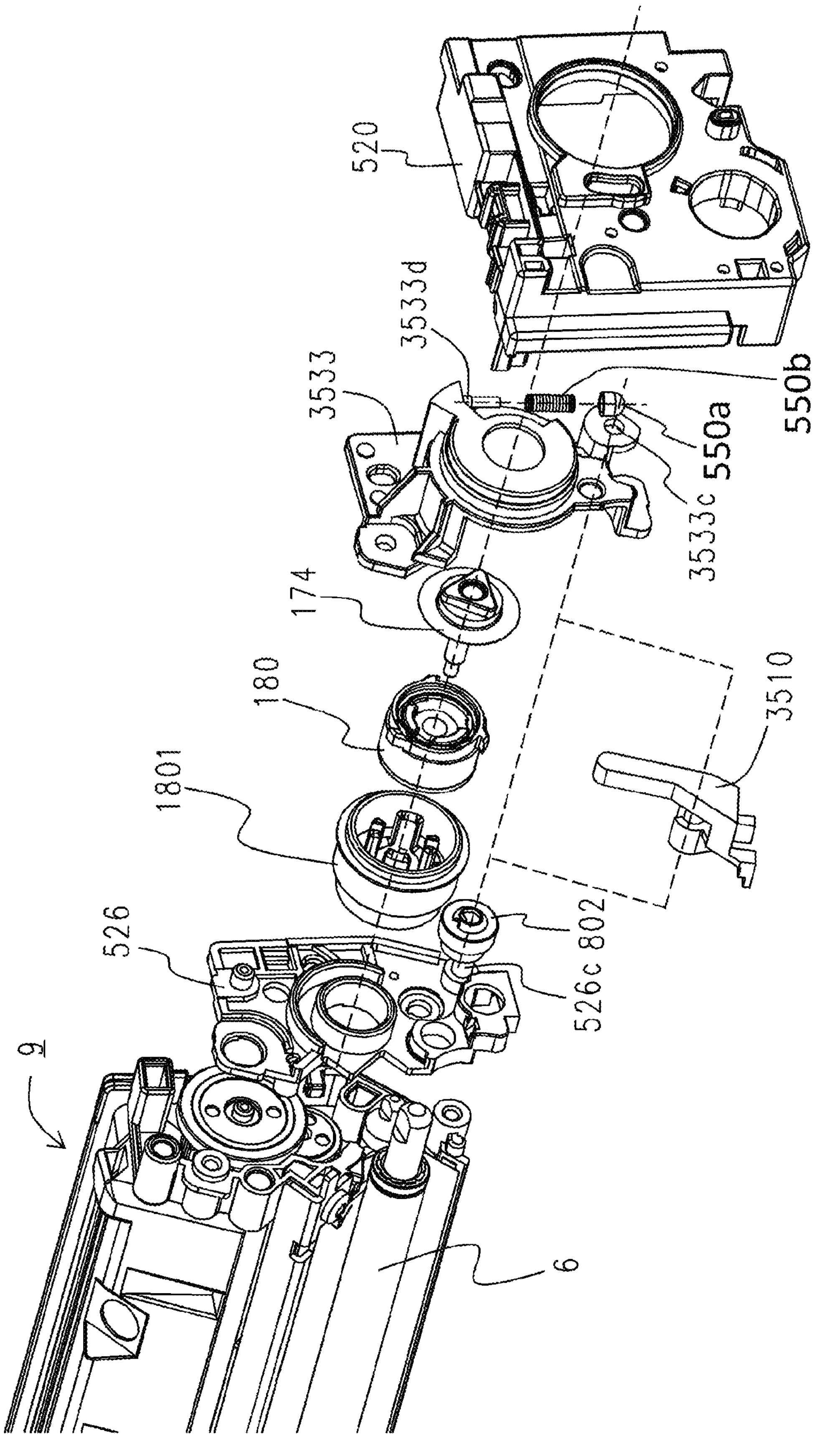
FIG. 26 is a perspective view of the drive connecting portion in Embodiment 3.

FIG. 26 is a perspective view of the process cartridge P as viewed from the drive side, showing a state in which the drive side cartridge cover member 520, the developing device cover member 3533, and the locking member 550 are removed. Between the drive side bearing 526 and the drive side cartridge cover member 520, there are provided a gear 1801, a spring clutch 180 which is a drive transmission switching device including a transmission interrupting mechanism, a development coupling member 174, and a developing device cover member 533. In addition, a regulating member 3510 (an example of a movable member) is swingably mounted to the support portion 526*c* of the drive side bearing 526. In this embodiment, the drive connecting portion comprises the gear 1801, the spring clutch 180, the development coupling member 174, the developing device cover member 3533, the regulating member 3510 and the locking member 550.

Figure 27:
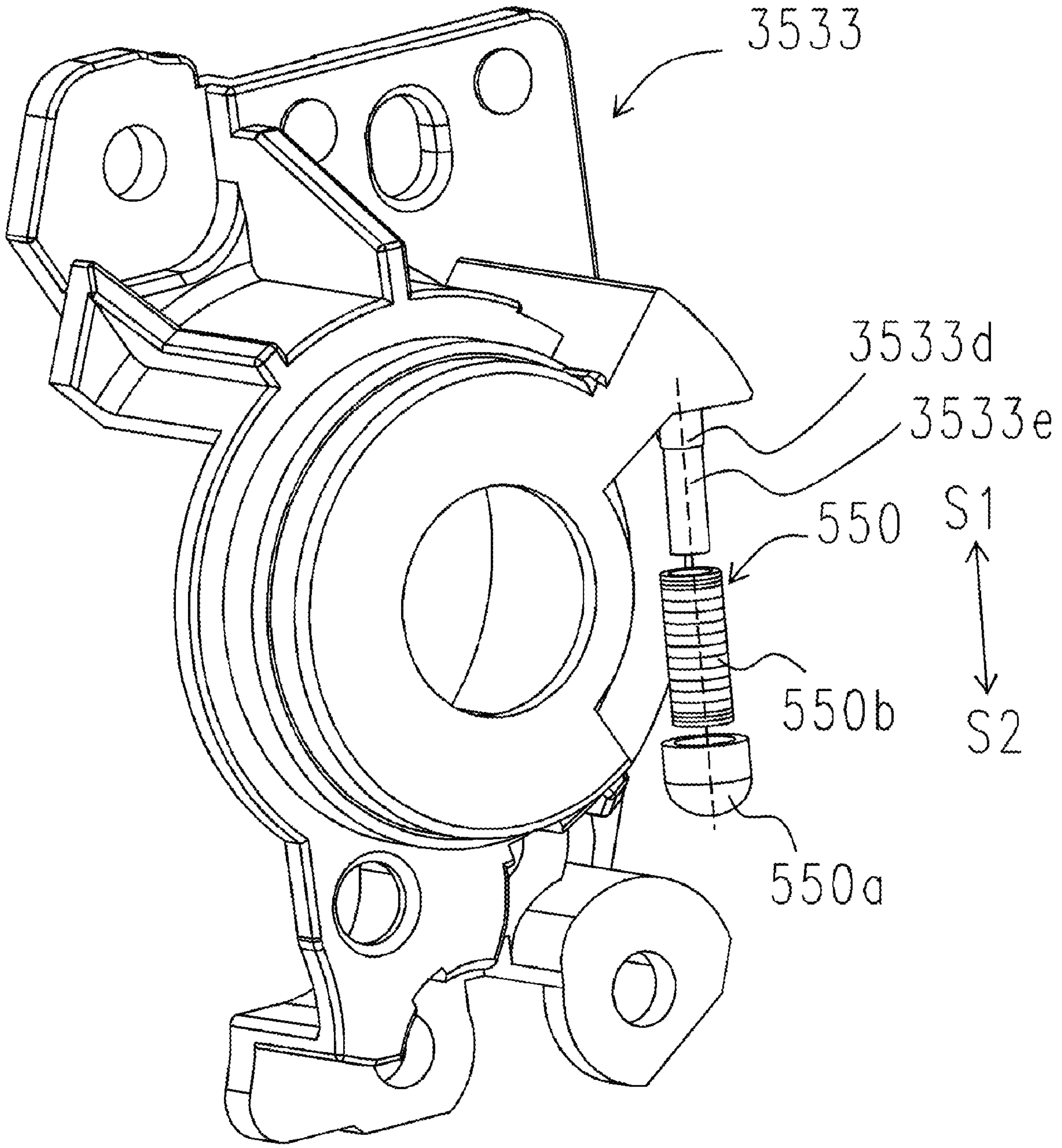
FIG. 27 is an exploded view of a locking member 550 in the Embodiment 3.

Referring to Figure, the outline of the locking member 550 as the second biasing means will be described. The locking member 550 comprises a free end portion 550*a* and a spring 550*b*, which is a compression coil spring. FIG. 27 shows a state where the spring 550*b* of the locking member 550 is removed from the free end portion 550*a* and the support portion 3533*d* of the developing device cover member 3533. The spring 550*b* of the locking member 550 is provided with end turn portions at the opposite ends, and is fixed by press-fitting the support portion 3533*d* of the developing device cover member 3533 to the inner diameter of the end turn portion at one end. The end turn portion at the other end is fixed to the free end portion 550*a* of the locking member 550. A projecting portion 3533*e* having a smaller diameter than the support portion 3533*d* of the developing device cover member 3533 passes through the inner portion of the elastic portion of the spring 550*b* of the locking member 550, and restricts the contracting direction of the spring 550*b* to the arrow S1 or arrow S2 direction.

[Drive Disconnecting Operation]

Figure 28:
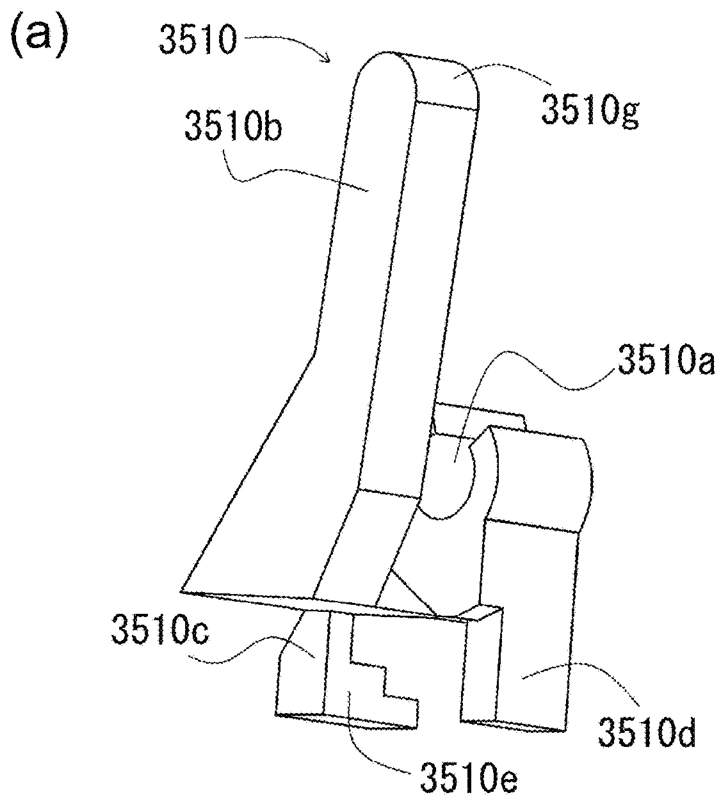
FIG. 28 is a perspective view of a regulating member 3510 per se in the Embodiment 3.
Figure 28:
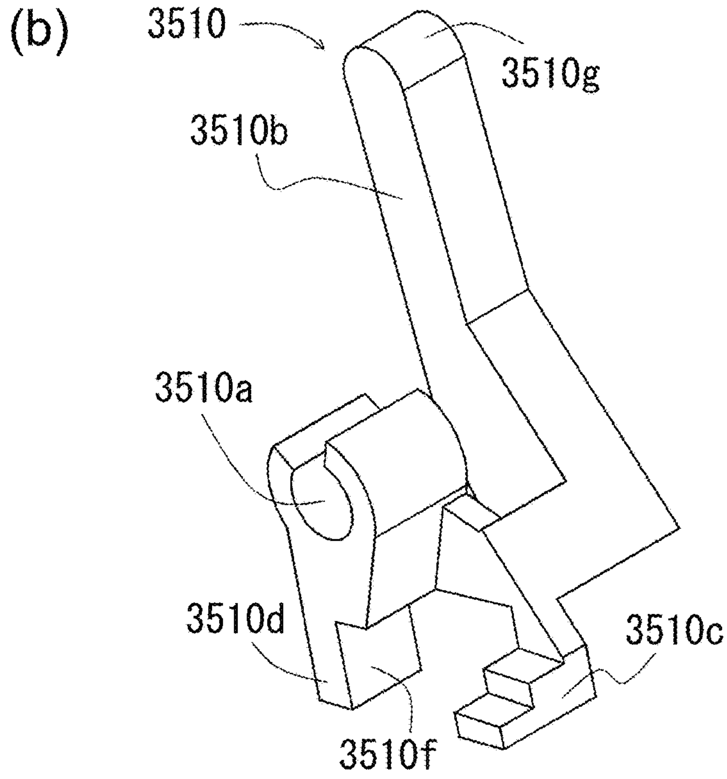

Referring to part (a) of FIGS. 28 and 28(*b*), the structure of the regulating member 3510 for stopping the rotation of the control ring 180*a* of the spring clutch 180 to disconnect the drive will be described. The regulating member 3510 includes a supported hole 3510*a*, a regulating lever portion 3510*b*, a foot portion 3510*c*, and a foot portion 3510*d*. The lever portion 3510*b* includes a surface 3510*g* for stopping the control ring 180*a* of the spring clutch 180. Further, the foot portion 3510*c* and the foot portion 3510*d* have surfaces 3510*e* and 3510*f*, which receive forces from the drive control member 540, respectively. In addition, the supported hole 3510*a* is fitted with the support portion 526*c* of the drive side bearing 526 so that it can swing about the axis of the support portion 526*c* (FIG. 26).

Figure 29:
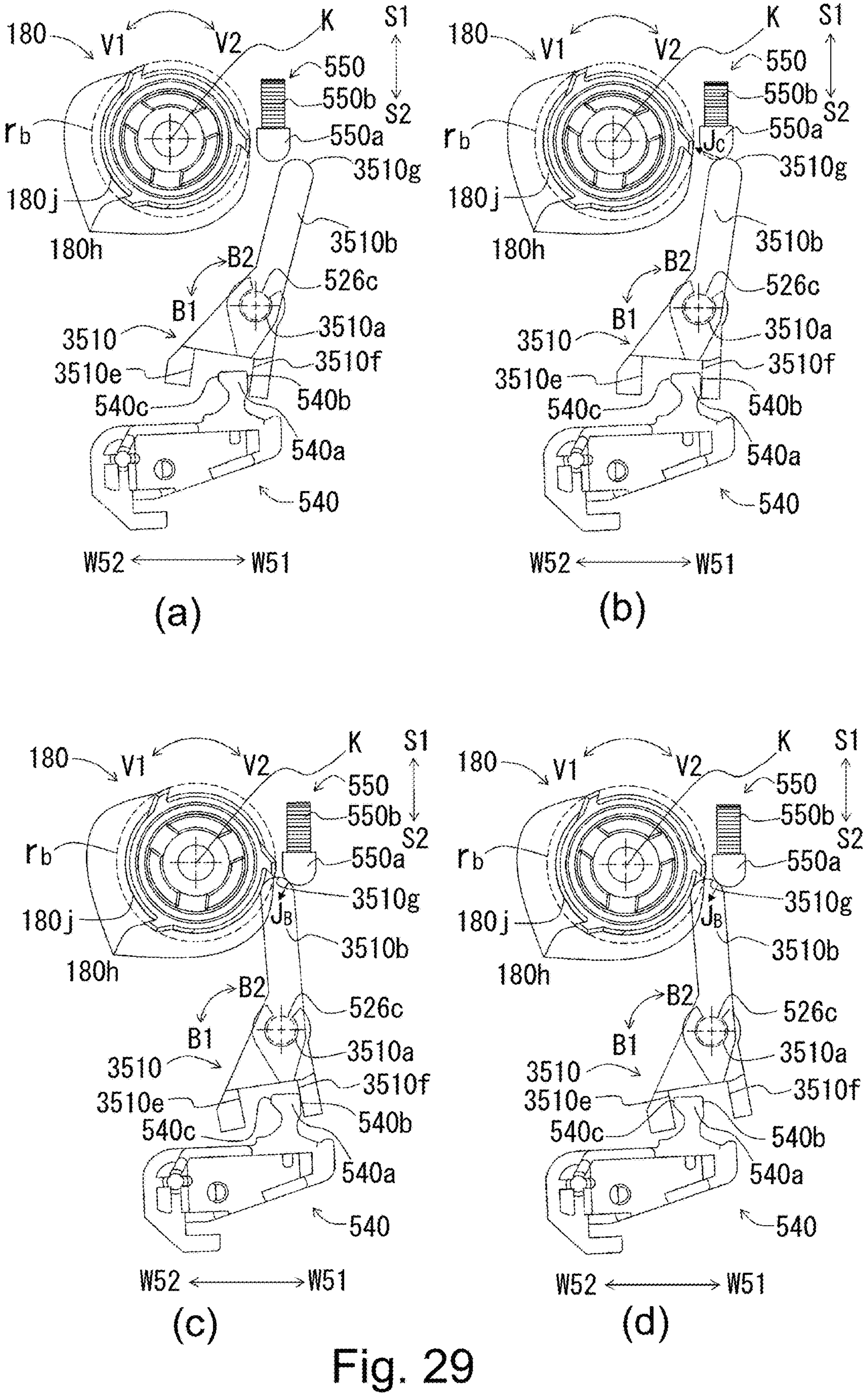
FIG. 29 is an illustration showing a drive interruption operation in the Embodiment 3.

Referring to FIG. 29, a driving connection interrupting operation inside the image forming apparatus main assembly 502 will be described. Here, a locus of movement of the radial free end portion of the control portion 180*h* at the time when the spring clutch 180 receives the driving force and rotates in the V2 direction is referred to as rb. As shown in part (a) of FIG. 29, when the regulating surface 3510*g* of the regulating member 3510 is placed outside the locus rb as viewed from the center (oscillating axis K) of the spring clutch 180, the control ring 180*a* rotates in the V2 direction, and the drive is transmitted. In addition, when the regulating member 3510 swings about the axis of the support portion 526*c* of the drive side bearing 526 in the B1 direction, the regulating member 3510 is placed at a position where the regulating lever portion 3510*b* abuts the free end portion 550*a*. This position of the regulating member 3510 is referred to as a first position of the regulating member 3510.

Part (a) of FIG. 29 shows a state in which the regulating member 3510 is at the first position and the drive control member 540 is at the home position. When the drive control member 540 moves in the W51 direction from the state of part (a) of FIG. 29 so that the first force applying surface 540*b* and the surface 3510*f* of the foot of the regulating member 3510 are brought into abutment to each other, the regulating member 3510 swings in the B1 direction from the first position about the support portion 526*c* of the drive side bearing 526, and the regulating surface 3510*g* abuts to the free end portion 550*a* of the locking member 550. At this time, as shown in part (b) of FIG. 29, the spring 550*b* of the locking member 550 is compressed by the component force, in the S1 direction, of the force Jc acting in the B1 direction from the regulating member 3510, and the free end portion 550*a* moves in the S1 direction. By this, the regulating member 3510 is permitted to further swing in the B1 direction, and as shown in part (c) of FIG. 29, the regulating surface 3510*g* abuts to the outer peripheral surface 180*j* of the spring clutch 180. In addition, the free end portion 550*a* of the locking member 550 is moving in the S2 direction while being in contact with the regulating surface 3510*g* of the regulating member 3510 by the restoring force of the spring 550*b*. At this time, on the contact surface between the free end portion 550*a* of the locking member 550 and the regulating surface 3510*g* of the regulating member 3510, the regulating surface 3510*g* receives a force JB as an urging force from the free end portion 550*a*. Here, the direction of the force JB in which the regulating surface 3510*g* receives from the free end portion 550*a* is the direction in which a moment acts in the B1 direction centered on the support portion 526*c* of the drive side bearing 526. Therefore, the position of the regulating member 3510 is fixed with the regulating surface 3510*g* abutting against the outer peripheral surface 180*j* of the spring clutch 180. In this manner, the regulating member 3510 stops the control portion 180*h*, that is, stops the rotation of the control ring 180*a*, thereby interrupting the driving force inputted from the image forming apparatus main assembly 502 to the development coupling member 174. This position of the regulating member 3510 is referred to as a second position of the regulating member 3510.

Furthermore, as shown in part (d) of FIG. 29, even if the drive control member 540 moves in the W52 direction and returns to the home position, the control portion 540*a* is spaced, by a gap, from the surfaces 3510*e* and 3510*f* of the regulating member 3510, and therefore they do not abut to each other. As in the case shown in part (c) of FIG. 29, the regulating member 3510 receives force JB from the free end portion 550*a* of the locking member 550, and therefore, the regulating surface 3510*g* abuts to the outer peripheral surface 180*j* of the spring clutch 180 and is fixed in position, so that it cannot swing in the B2 direction. In other words, the regulating member 3510 remains at the second position, stops the control ring 180*a*, and maintains the drive disconnection state.

[Drive Connection Operation]

Figure 30:
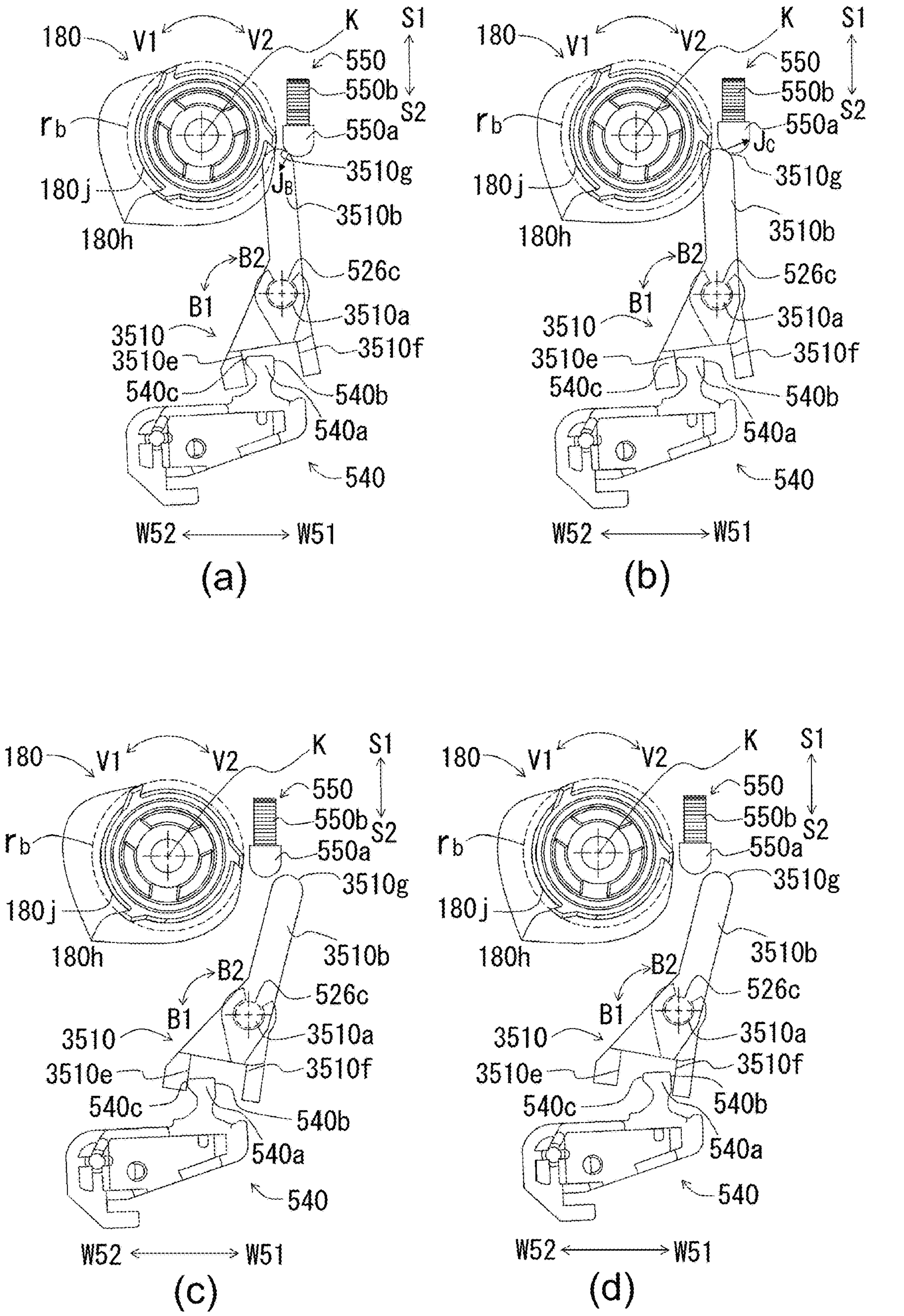
FIG. 30 is an illustration showing a drive connection operation in the Embodiment 3.

Referring to FIG. 30, the operation of moving the regulating member 3510 from the second position to the first position inside the image forming apparatus main assembly 502, that is, the operation of establishing the driving connection will be described. Part (a) of FIG. 30 shows a state where the regulating member 3510 is at the second position and the drive control member 540 is at the home position. When the drive control member 540 moves in the W52 direction from the state of part (a) of FIG. 30, the second force applying surface 540*c* and the surface 3510*e* of the foot portion 3510*c* of the regulating member 3510 come into contact with each other. At this time, as shown in part (b) of FIG. 30, the spring 550*b* of the locking member 550 is compressed by the component force, in the S1 direction, of the force Jc acting in the B2 direction from the regulating member 3510, so that the free end portion 550*a* moves in the S1 direction. By this, as shown in part (c) of FIG. 30, the regulating member 3510 is permitted to swing further in the B2 direction and moves to the first position, the regulating member 3510 exits the locus rb to the outside, and the control portion 180*h* of the spring clutch 180 and the regulating surface 3510*g* of the regulating member 3510 are separated from each other. That is, the control ring 180*a* becomes rotatable and the drive is transmitted. Furthermore, as shown in part (d) of FIG. 30, even if the drive control member 540 moves in the W51 direction and returns to the home position, the control portion 540*a* is spaced, by a gap, from the surfaces 3510*e* and 3510*f* of the regulating member 3510, and therefore, there do not abut to each other. Therefore, the regulating member 3510 which does not produce a rotational force cannot move the free end portion 550*a* which is urged in the S2 direction by the spring of the locking member 550 in the S1 direction, and therefore it cannot swing in the B1 direction. In other words, the regulating member 3510 remains at the first position, and the drive transmission state is maintained.

As described above, by using the structure of this embodiment, it is possible to switch the driving force transmission state by switching, between the first position and the second position, of the regulating member 3510 by moving the drive control member 540 from the home position. By this, it is possible to switch the drive regardless of the contact/separation operation between the photosensitive drum 4 and the developing roller 6.

Embodiment 4

Referring to FIGS. 31 to 35, a process cartridge and an image forming apparatus according to Embodiment 4 of the present disclosure will be described. In this structure, a toggle structure is used to switch transmission and interruption of the drive transmitting portion. The process cartridge of this embodiment is the same as that of the Embodiment 2, except that the structure of the regulating member and its periphery is different. Accordingly, members having the same functions and structures are assigned by the same reference numerals, and detailed description thereof is omitted.

[Structure of Drive Connecting Portion]

Figure 31:
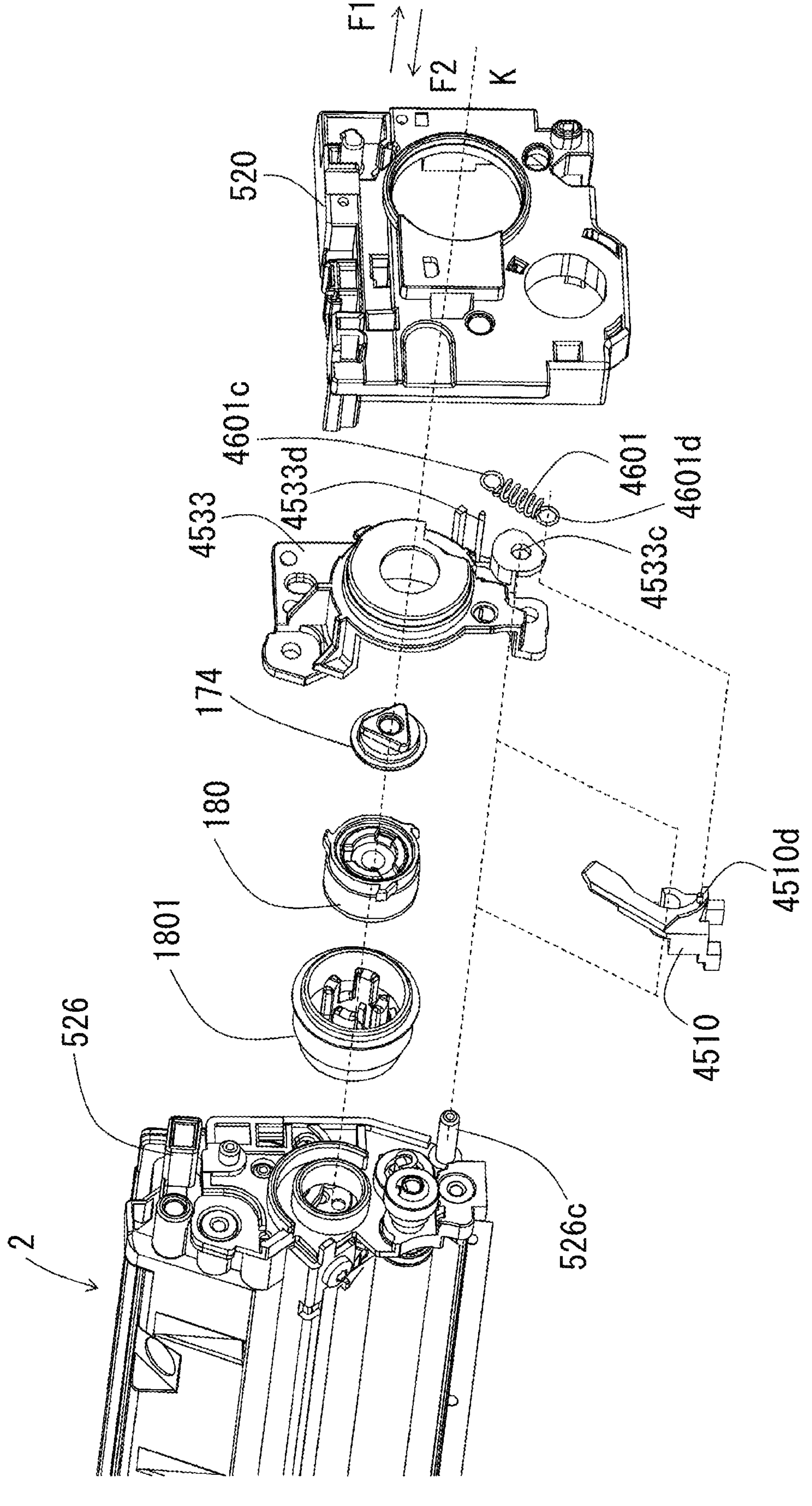
FIG. 31 is a perspective view of a drive connecting portion in Embodiment 4.

FIG. 31 is an exploded perspective view of the process cartridge P as viewed from the drive side. Between the drive side bearing 526 and the drive side cartridge cover member 520, there are provided a gear 1801, a spring clutch 180, a development coupling member 174 and a developing device cover member 4533. Further, similarly to the Embodiment 2, a regulating member 4510 is swingably mounted to the support portion 526*c* of the drive side bearing 526. One end 4601*c* of the toggle spring 4601, which is a tension spring, is engaged with the boss 4533*d* of the developing device cover member 4533, and the other end 4601*d* of the toggle spring 4601 is engaged with the boss 4510*d* of the regulating member 4510. The toggle mechanism of this embodiment will be described hereinafter. Therefore, in this embodiment, the drive connecting portion comprises the gear 1801, the spring clutch 180, the development coupling member 174, the developing device cover member 4533 and the toggle spring 4601. In this embodiment, the structure of the spring clutch 180 is the same as that of the Embodiment 2, and therefore, description thereof will be omitted. Also, the assembly of the gear 1801, the spring clutch 180, and the development coupling member 174 is the same as that of the Embodiment 2, and therefore, description thereof is omitted.

[Toggle Mechanism of this Embodiment]

Figure 32:
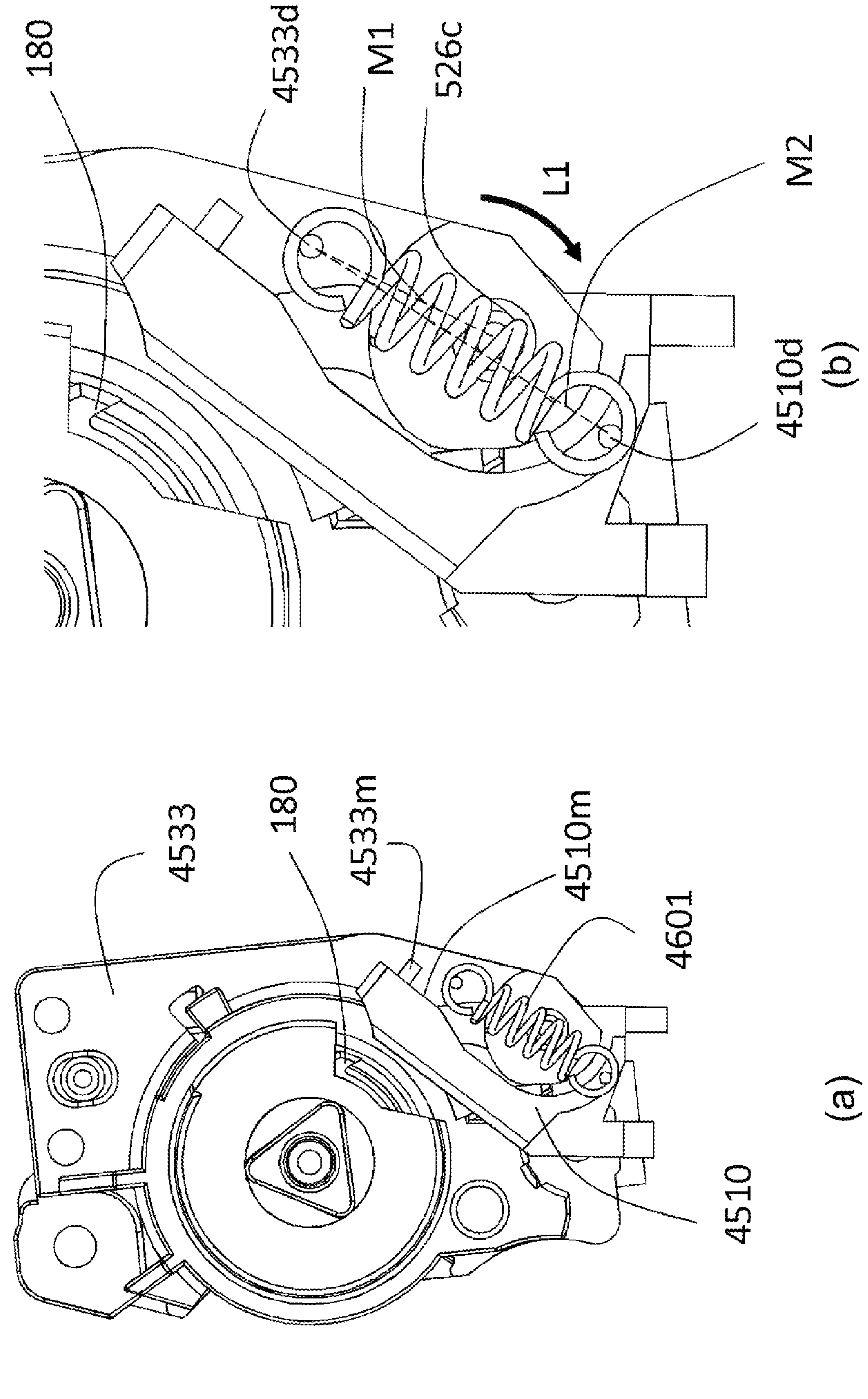
FIG. 32 is an illustration showing the positional relationship of the drive connecting portions during drive transmission in the Embodiment 4.
Figure 33:
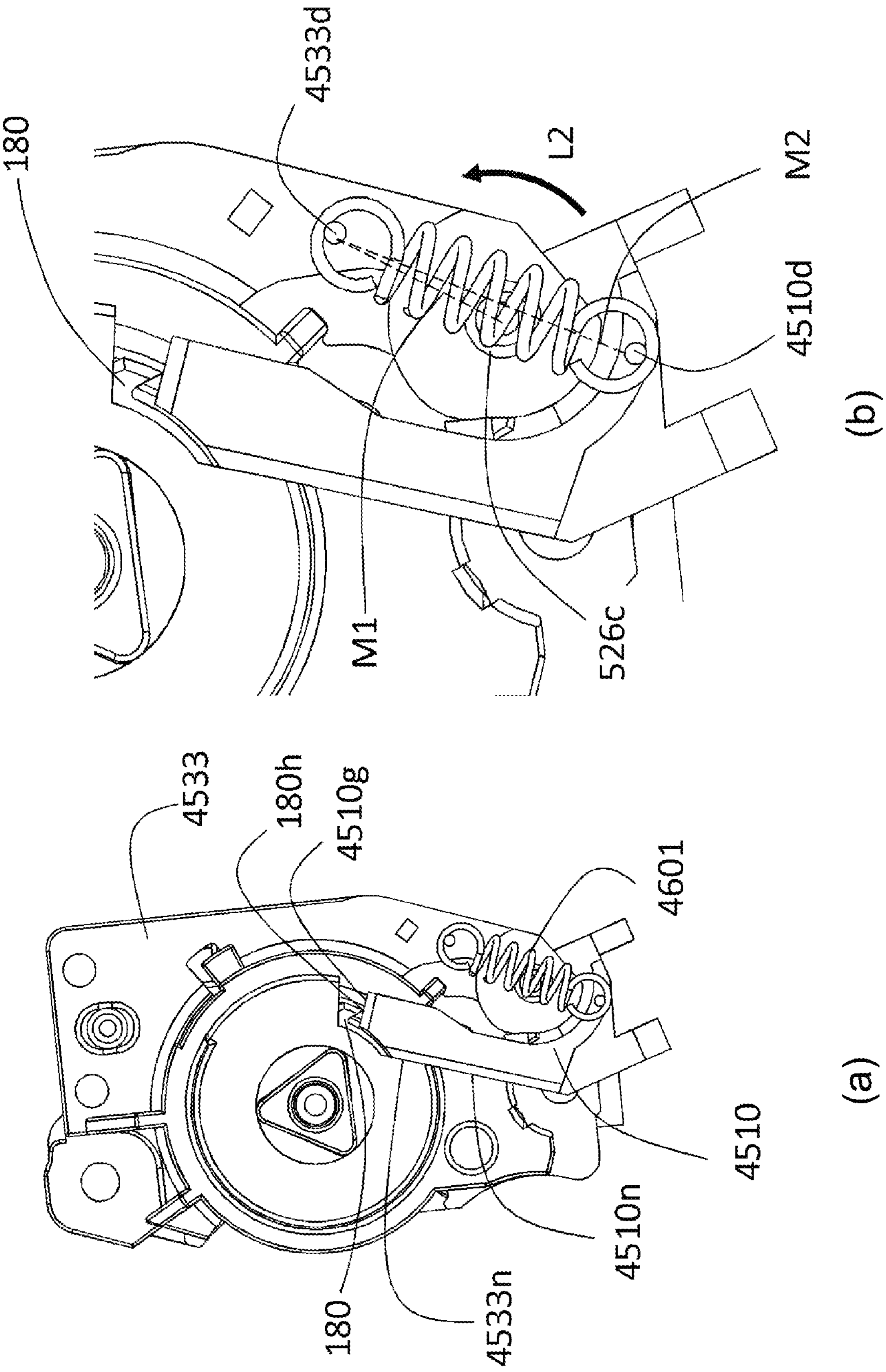
FIG. 33 is an illustration showing a positional relationship of the drive connecting portion when the drive is interrupted, in the Embodiment 4.

Referring to FIGS. 32 and 33, the toggle mechanism of this embodiment will be described. Part (a) of FIG. 32 is an illustration showing a state in which the regulating member 4510 is not in contact with the spring clutch 180, and part (b) of FIG. 32 is a partially enlarged view of part (a) of FIG. 32. At this time, a line M2 connecting the center of the boss 4533*d* of the developing device cover member 4533 and the center of the boss 4510*d* of the regulating member 4510 is disposed on the left side, in the Figure, of the line M1 connecting the center of the developing device cover member boss 4533*d* and the center of the support portion 526*c* of the drive side bearing 526, and therefore, the regulating member 4510 rotates about the support portion 526*c* in the direction L1. By this, the regulating member 4510 moves away from the spring clutch 180, and therefore, the drive transmission is interrupted as described in the Embodiment 2. In addition, the regulating member 4510 is held in its attitude by the surface 4510*m* of the regulating member 4510 abutting against the boss 4533*m* of the developing device cover member 4533.

Referring to FIG. 33, a state in which regulating member 4510 is in contact with spring clutch 180 will be described. At this time, the line M2 connecting the center of the boss 4533*d* of the developing device cover member 4533 and the center of the boss 4510*d* of the regulating member 4510 is on the right side, in the Figure, of the line M1 connecting the center of the developing device cover member boss 4533*d* and the center of the support portion 526*c* of the drive side bearing 526, and therefore, the regulating member 4510 rotates around the support portion 526*c* of the drive side bearing 526 in the L2 direction. This is because the regulating member 4510 moves toward the spring clutch 180, and the surface 4510*n* of the regulating member 4510 abuts against the surface 4533*n* of the developing device cover member 4533, so that the attitude of the regulating member 4510 is maintained. Thereafter, the surface 4510*g* of the regulating member 4510 and the control portion 180*h* of the spring clutch 180 are brought into contact with each other. The operation of the spring clutch 180 at this time is the same as that of the Embodiment 2, and therefore, the description thereof is omitted here. The clutch is connected by this, and the drive can be transmitted from the main assembly side. It should be noted that the operation of disconnecting the driving of the spring clutch 180 is also the same as that of the Embodiment 2, so the description is omitted here.

[Connecting Operation of Drive Connecting Portion]

Figure 34:
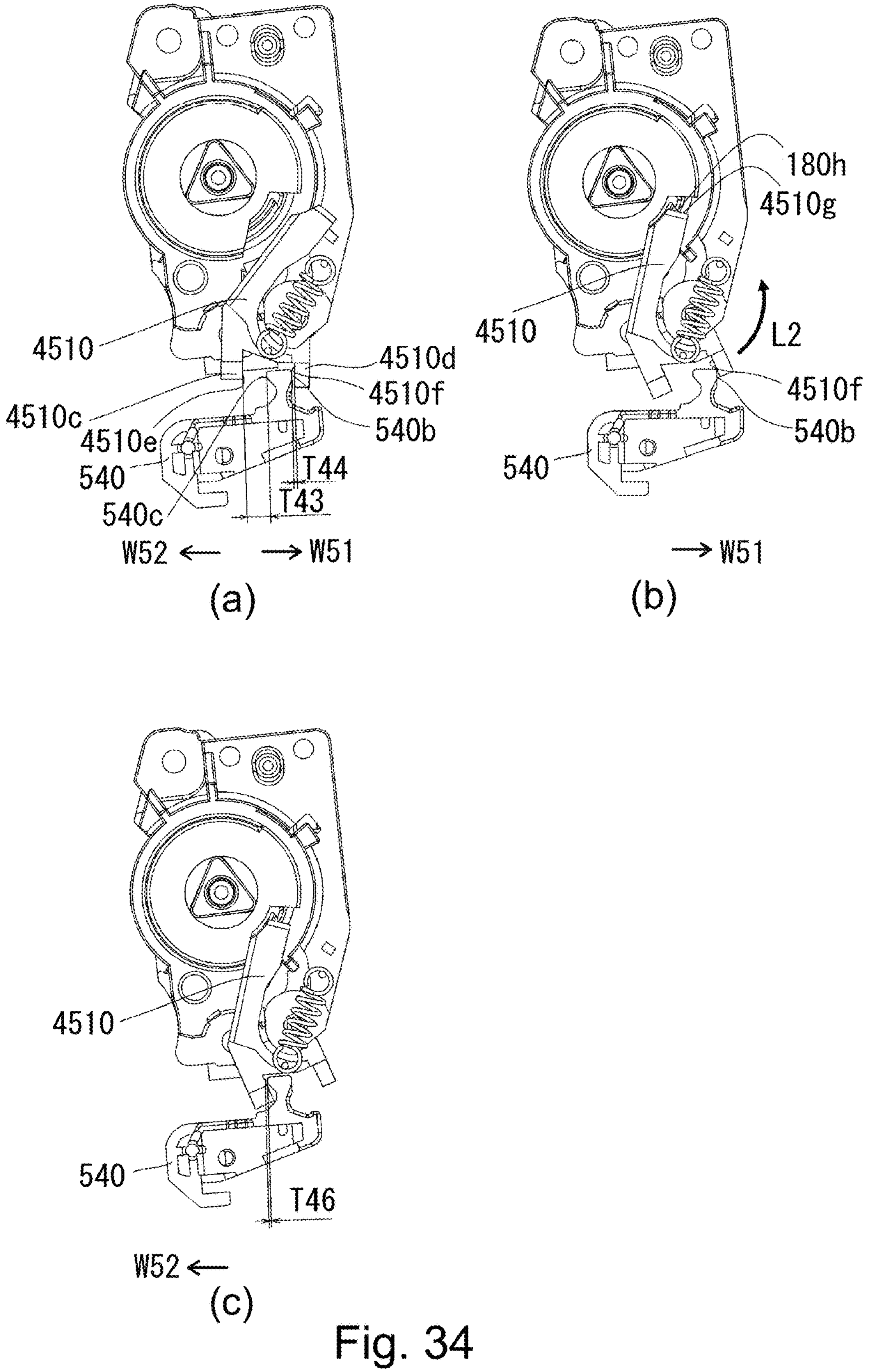
FIG. 34 is an illustration showing a drive interruption operation in the Embodiment 4.

Referring to FIG. 34, the operation of the process cartridge P from the state in which the drive from the main assembly of the image forming apparatus P is disconnected by the operation of the drive control member 540 inside the main assembly 502 of the image forming apparatus to the state of the connection of the drive will be described. Part (a) of FIG. 34 shows a state in which the driving of the drive control member 540 is at the home position, and the drive is disconnected, part (b) of FIG. 34 shows a state in which the drive control member 540 moves in the w51 direction from the state of part (a) of FIG. 34 to the first position, and part (c) of FIG. 34 shows a state in which the drive control member 540 moves in the w52 direction from the state of part (b) of FIG. 34 to the home position, and the drive is connected. Descriptions of details and symbols as long as they are the same as those of the Embodiment 1 are omitted.

As shown in part (a) of FIG. 34, when the driving of the drive control member 540 is disconnected and the drive control member 540 is at the home position, the drive control member 540 is not in contact with the regulating member 4510, but is separated therefrom with gaps T43 and T44 therebetween. When the drive control member 540 moves in the W51 direction from this state, the first force applying surface 540*b* and the surface 4510*f* of the foot portion 4510*d* of the regulating member 4510 are brought into contact with each other, and the regulating member 4510 is rotated in the L2 direction shown in part (b) of FIG. 34. As a result of the rotation, the surface 4510*g* of the regulating member 4510 and the control portion 180*h* of the spring clutch 180 are brought into contact with each other. By this, the connection of the clutch is established, and the drive can be transmitted from the main assembly side. As described above referring to FIG. 33, in this state, the surface 4510*n* of the regulating member 4510 is in contact with the surface 4533*n* of the developing device cover member 4533 by the action of the toggle spring 4601 as the third biasing means, so that the attitude is maintained. Thereafter, as shown in part (c) of FIG. 34, the drive control member 540 moves in the W52 direction, and the drive control member 540 returns to the home position. In this state, the drive control member 540 does not apply force to the regulating member 4510 because there is a gap T46 between itself and the regulating member 4510. For this reason, the regulating member 4510 remains in the attitude shown in FIG. 33, and the drive is stably connected.

[Interrupting Operation of Drive Connection Portion]

Figure 35:
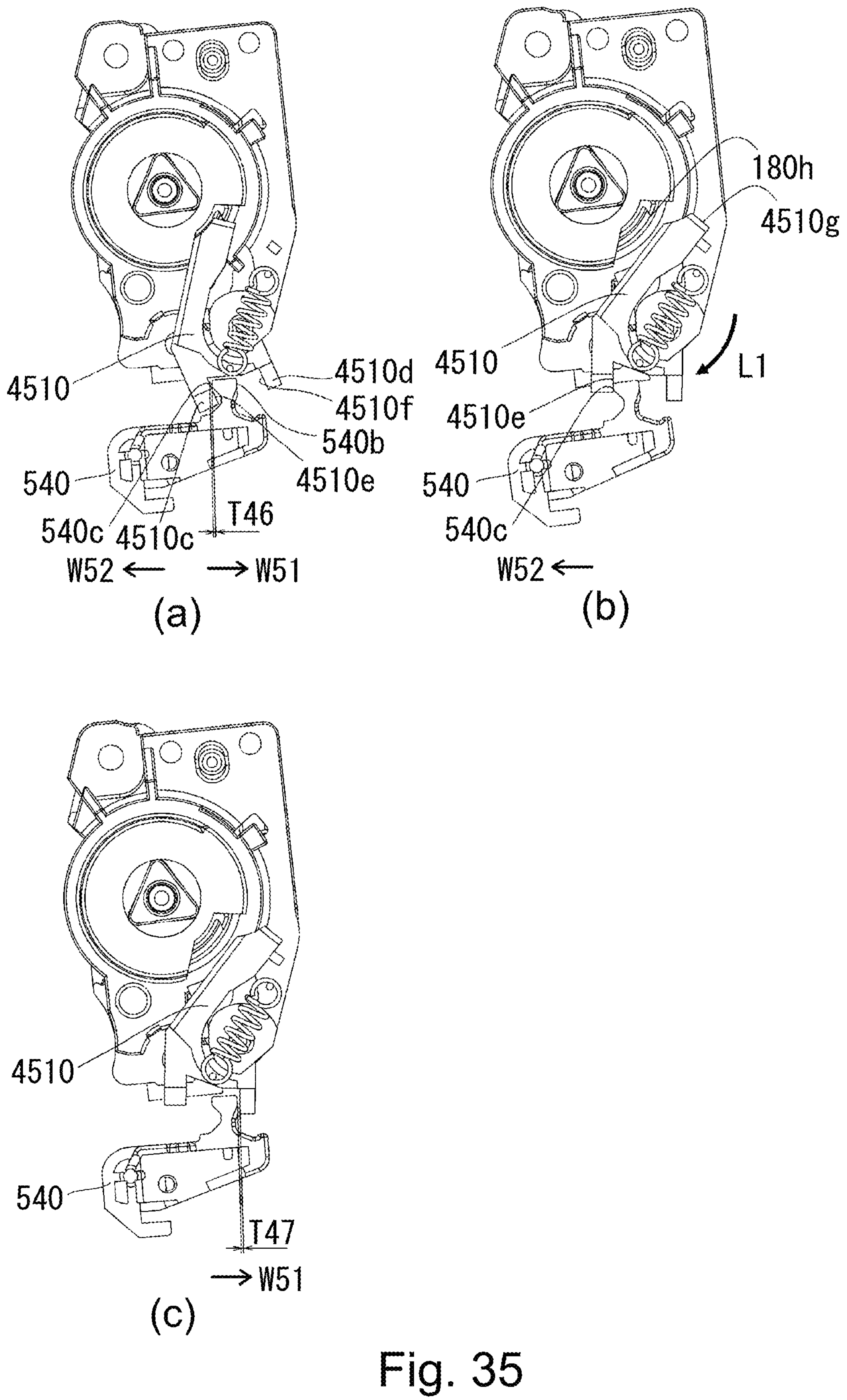
FIG. 35 is an illustration showing a drive connection operation in the Embodiment 4.

Referring to FIG. 35, the operation of the drive control member 540 inside the image forming apparatus main assembly 502 from the connection state to the disconnection state relative to the drive of the main assembly will be described. Part (a) of FIG. 35 shows a state in which the drive control member 540 is at the home position and the drive connection is established, part (b) of FIG. 35 shows the drive control member 540 is moving in the w52 direction from the state shown in part (a) of FIG. 35 to the second position, and part (c) of FIG. 35 shows a state in which the drive control member 540 moves in the w51 direction from part (b) of FIG. 35 to the home position, and the drive is disconnected. The description of the details and symbols which are the same as those of the Embodiment 1 are omitted.

When the drive control member 540 moves in the W52 direction, the second force applying surface 540*c* and the surface 4510*e* of the foot portion 4510*c* of the regulating member 4510 are brought into contact with each other, and the regulating member 4510 rotates in the L1 direction shown in part (b) of FIG. 33. With the rotation, the surface 4510*g* of the regulating member 4510 is separated from the control portion 180*h* of the spring clutch 180. This disengages the clutch to disable the transmission of the drive from the main assembly side. As described above referring to FIG. 32, in this state, the surface 4510*m* of the regulating member 4510 abuts to the boss 4533*m* of the developing device cover member 4533 by the action of the toggle spring 4601, thereby maintaining the attitude thereof. Thereafter, as shown in part (c) of FIG. 35, the drive control member 540 moves in the W51 direction, and the drive control member 540 returns to the home position. In this state, the drive control member 540 does not apply force to regulating member 4510 because a gap T47 is provided between itself and the regulating member 4510. Therefore, the regulating member 4510 remains in the attitude shown in FIG. 32, and the drive is stably disconnected.

As described above, by using this embodiment, the switching between contact and separation of the regulating member 4510 is stably performed by the toggle mechanism in interrelation with the operation of the drive control member 540, so that it is possible to stably switch the drive regardless of the contact/separation operation between the photosensitive drum 4 and the developing roller 6.

Embodiment 5

Referring to FIGS. 36 to 39, a process cartridge and an image forming apparatus according to Embodiment 5 of the present disclosure will be described. This structure is a structure in which the engaging portion uses meshing of gears. The process cartridge of this embodiment is the same as that of the Embodiment 1, except that the structure of the regulating member and its periphery is different. Accordingly, members having the same functions and structures are assigned by the same reference numerals, and the detailed description thereof is omitted.

[Structure of Drive Connecting Portion]

Figure 36:
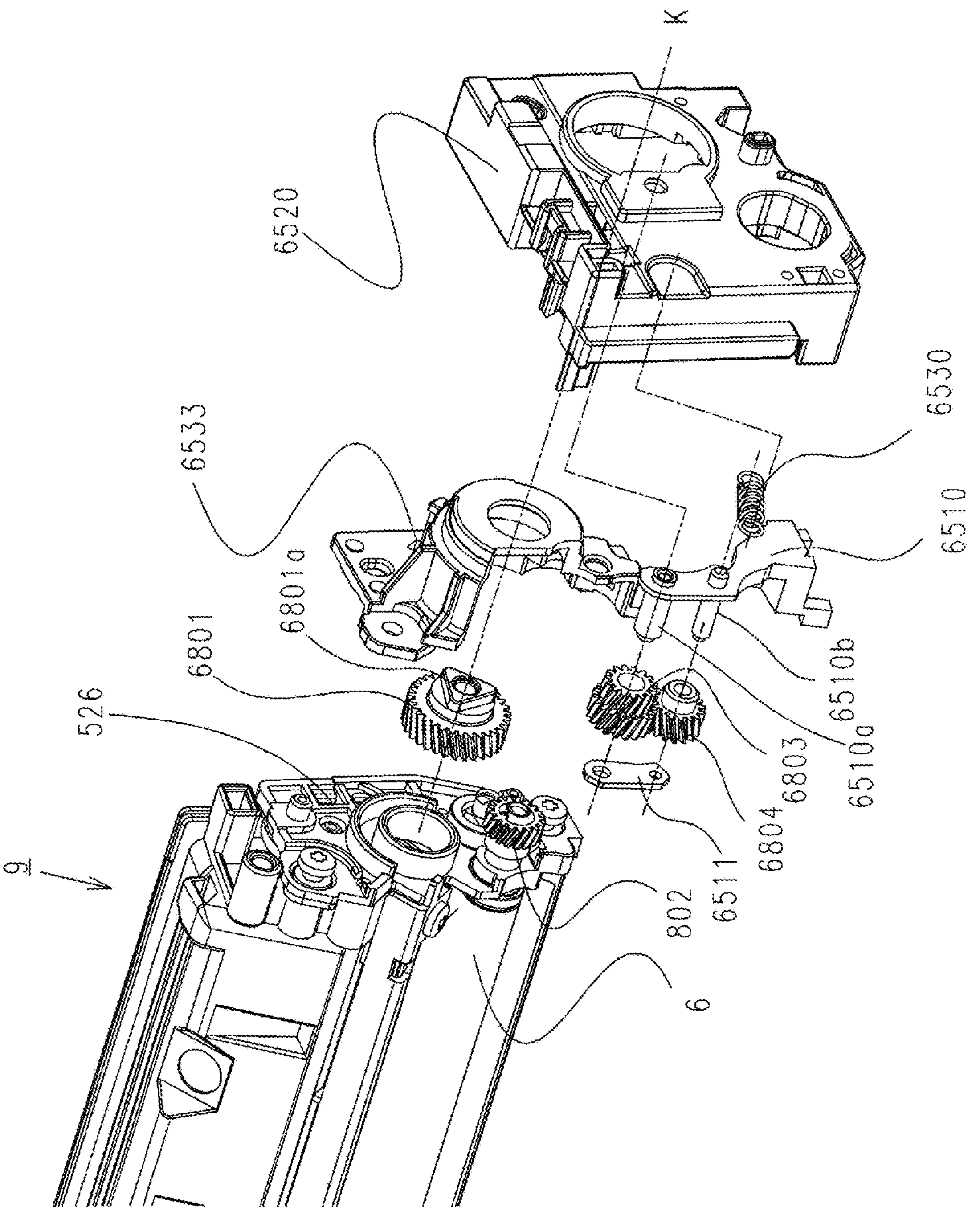
FIG. 36 is a perspective view of a drive connecting portion in Embodiment 5.

FIG. 36 is a perspective view of the process cartridge P as viewed from the drive side, showing a state in which the drive side cartridge cover member 6520 and developing device cover member 6533 are removed. A development coupling gear 6801 and a developing device cover member 6533 are provided between the drive side bearing 526 and the drive side cartridge cover member 6520. A coupling portion 6801*a* is provided at an end portion of the development coupling gear 6801, and is exposed through the drive side cartridge cover member 6520, to receive the driving force from the image forming apparatus main assembly 502. In addition, an idler gear 6803 is provided at a position where it meshes with the development coupling gear 6801 and a distance between the axes is kept constant. The idler gear 6803 is connected to an idler gear 6804 which transmits the drive to the developing roller gear 802, by a regulating member 6510 as a supporting member. The regulating member 6510 is provided with rotation shafts 6510*a* and 6510*b* od the idler gears 6803 and 6804, respectively. That is, the idler gear 6803 is rotatably supported by the rotating shaft 6510*a*, and the idler gear 6504 is rotatably supported by the rotating shaft 6510*b*. It is sandwiched between a plate member 6511 and a regulating member 6510 as a retainer.

In the regulating member 6510, the rotating shaft 6510*a* of the idler gear 6803 is rotatably supported by a holding portion 6520*a* of the drive side cartridge cover member 6520. In other words, the regulating member 6510 is structured to be swingable with respect to the drive side cartridge cover member 6520 with the rotating shaft 6510*a* of the idler gear 6803 as the center of rotation. In other words, the idler gear 6804 is structured to be swingable around the idler gear 6803 with respect to the drive side cartridge cover member 6520. The regulating member 6510 may be supported by another component such as the drum unit 8. In such a case, the idler gear 6804 can swing about the axis of the idler gear 6803 with respect to the drum unit 8.

[Drive Disconnecting Operation]

Figure 37:
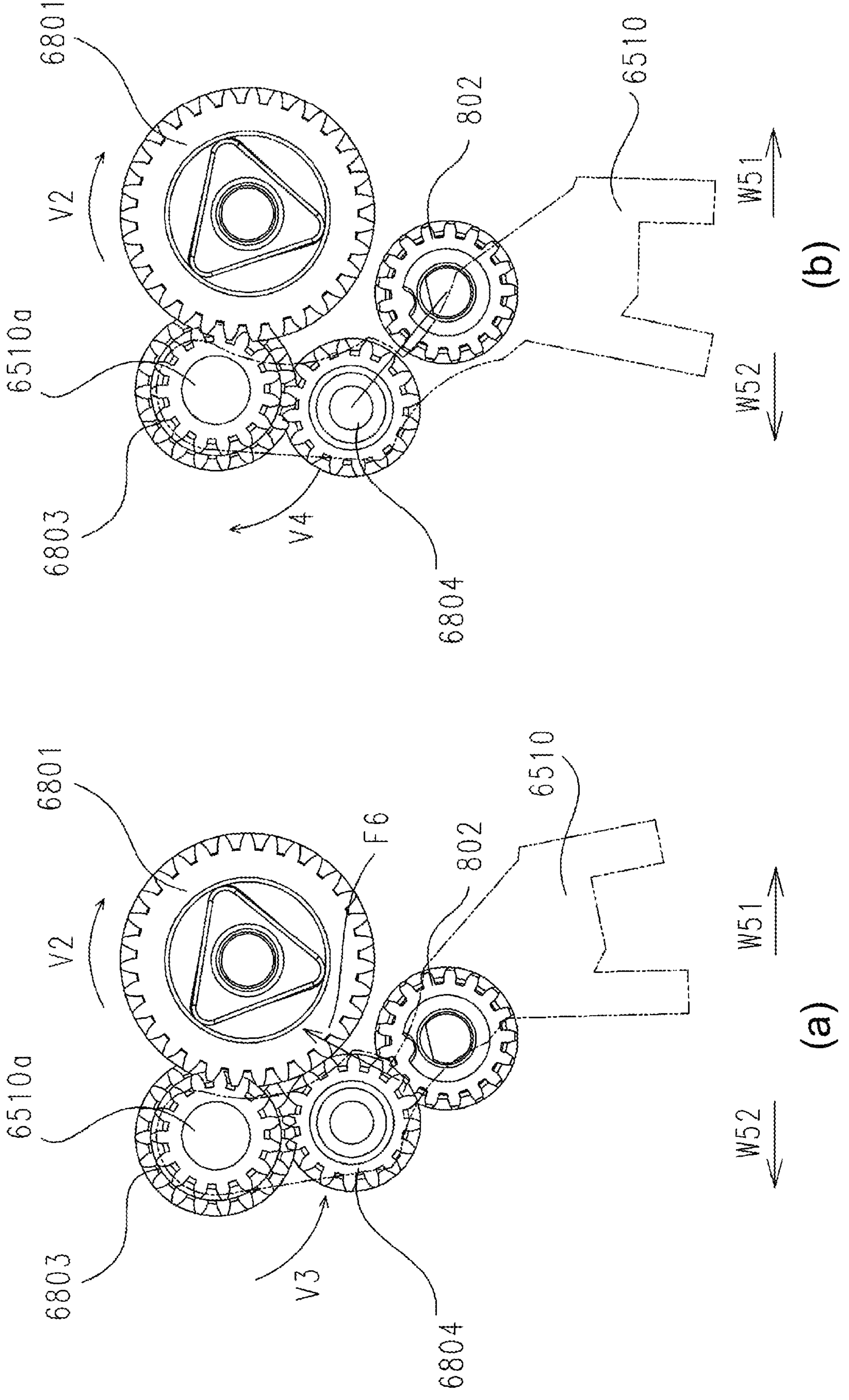
FIG. 37 is an illustration showing the positional relationship at the time of drive connection and drive interruption of the drive connecting portion in the Embodiment 5.

Referring to Figure, the operation of switching from the drive transmission state to the drive interruption state will be described. Part (a) of FIG. 37 shows only the state of the gear and the regulating member when driving is transmitted to the developing roller gear 802 and shows only the states of the gears and the regulating member when the drive is disconnected.

A coupling portion 6801*a* of the development coupling gear 6801 receives a driving force from the image forming apparatus main assembly 502 to rotate in the direction V2. The driving force is transmitted to the developing roller gear 802 by way of the idler gears 6803 and 6804. At this time, the regulating member 6510 produces a moment in the direction of arrow V3 about rotating shaft 6510*a* by the meshing with the idler gear 6803 and idler gear 6804. Further, the idler gear 6804 is pulled in the arrow V3 direction because it receives force in the pressure angle direction F6 by the meshing with the developing roller gear 802. This is because the swinging fulcrum (rotating shaft 6510*a*) of the idler gear 6804 is placed on the W52 side of a line connecting the development coupling gear 6801 and the developing roller gear 802 the, so that the regulating member 6510 receives no force in the escape direction (arrow V4 direction). Therefore, a moment in the direction of arrow V3 always acts on the regulating member 6510, and the drive transmission is maintained in a state that the idler gear 6804 and the developing roller gear 802 continue to mesh with each other (part (a) of FIG. 37). The position of the regulating member 6510 at this time is referred to as a first position (part (b) of FIG. 37).

For the interruption of the drive transmission, the regulating member 6510 is moved in the W52 direction to move the idler gear 6804 in the arrow V4 direction, thereby disconnecting the drive between the idler gear 6804 and the developing roller gear 802. The position of the regulating member 6510 at this time is referred to as a second position.

[Drive Connection and Disconnection Operations]

Figure 38:
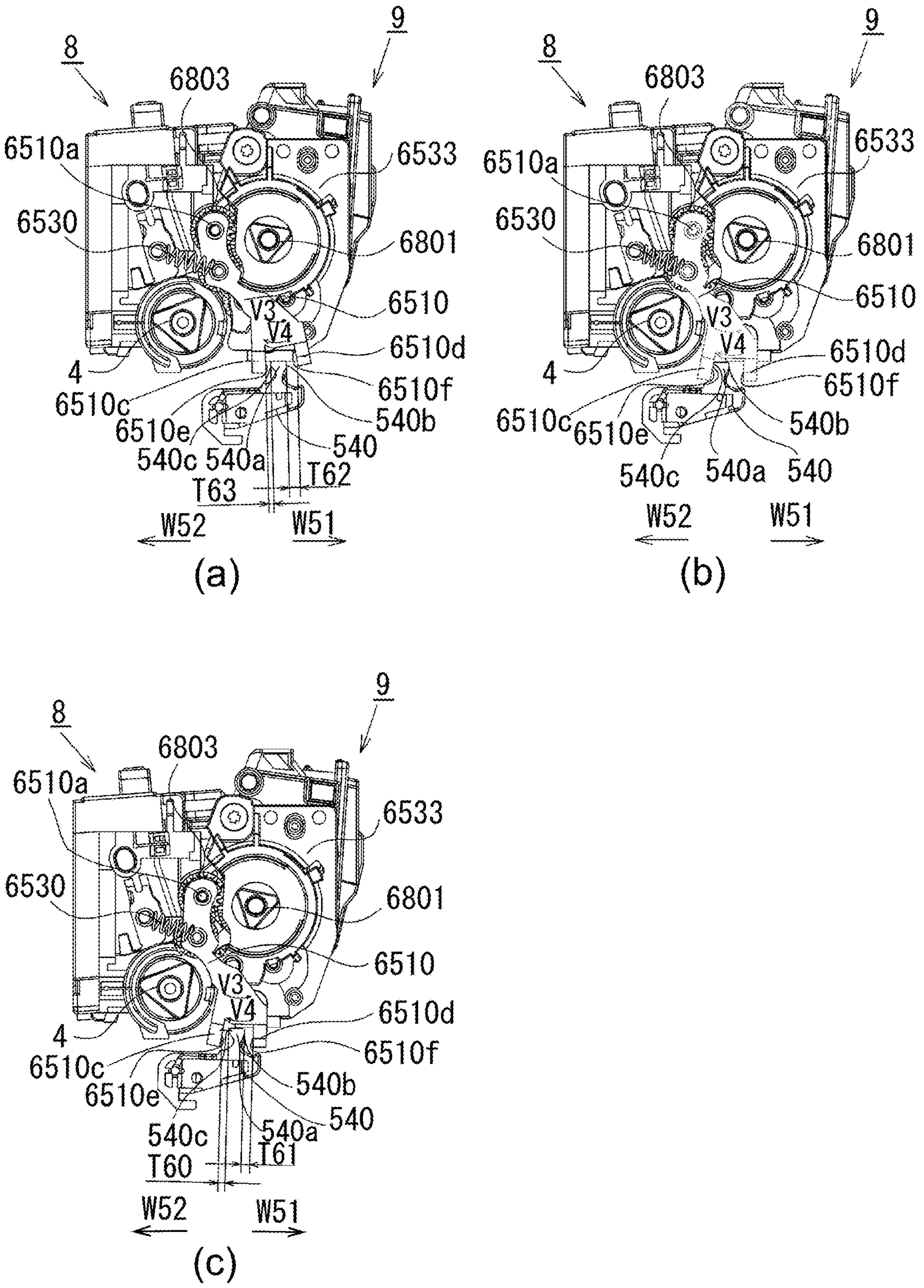
FIG. 38 is an illustration showing a drive interruption operation in the Embodiment 5.

Referring to FIG. 38, the operation of moving the regulating member 6510 from the first position to the second position inside the image forming apparatus main assembly 502, that is, the above-described drive disconnection operation will be described. FIG. 38 is a view of the process cartridge P positioned at the second inner position inside the image forming apparatus main assembly 502 as viewed from the drive side. For the sake of better illustration, the drive side cartridge cover member 6520 is omitted. Part (a) of FIG. 38 shows a state in which the regulating member 6510 is at the first position and the drive control member 540 is at the home position. Part (b) of FIG. 38 shows a state in which the regulating member 6510 has moved from the first position to the second position. Part (c) of FIG. 38 shows a state in which the regulating member 6510 is at the second position and the drive control member 540 is at the home position. The descriptions of details and symbols which are the same as those of the Embodiment 1 are omitted.

When the drive control member 540 moves in the W52 direction, the second force applying surface 540*c* and the surface 6510*e* on the foot portion 6510*c* of the regulating member 6510 are brought into contact with each other, and the regulating member 6510 rotates about the axis of the rotating shaft 6510*a* in part (b) of FIG. 38 in the direction of arrow V4. That is, the regulating member 6510 moves the developing roller gear 802 as the first gear (one gear) and the idler gear 6804 as the second gear (the other gear) from the first position for causing them to engage with each other to the second position for not causing them to engage. In the second position, the idler gear 6804 also rotates in the V4 direction together with the regulating member 6510, and the drive for the developing roller gear 802 is disconnected as described above (part (b) of FIGS. 37 and 63(*b*)).

Further, the drive control member 540 moves in the direction of arrow W51 in part (b) of FIG. 38 to return to the home position. At this time, as described above, the regulating member 6510 receives a moment in the V3 direction from the idler gear 6803 as the third gear and tends to return to the first position, but it is urged in the V4 direction by the tension spring 6530. The spring pressure of the tension spring 6530 as the fourth urging means is selected so as to maintain the regulating member 6510 at the second position and so as to prevent the regulating member 6510 from moving to the second position when it is at the first position.

Here, the moment produced by the meshing force between the idler gears 6803 and 6804 is moment M1, the moment by the meshing force between the idler gear 6804 and the developing roller gear 802 is moment M2, and the moment produced by the tension spring 6530 is moment M3. At the second position, the moments about the rotation axis 6510*a* satisfy M3>M1.

That is, the drive connection state is maintained by "M3<M1+M2". For example, assuming that the moment produced by the force applied from the drive control member 540 is moment M4 (the moment required for switching the regulating member 6510), the drive connection is disestablished by the moments becoming "M3+M4>M1+M2". Therefore, by the disestablishment of the driving connection, the moment M2=0, and "M3+M4>M1". By the drive control member 540 returns to the home position, the moment M4=0 and "M3>M1".

That is, the moment in the V4 direction by the spring pressure of the tension spring 6530 is larger than the moment in the V3 direction by the meshing force of the idler gears 6803 and 6804. Therefore, the regulating member 6510 is urged in the V4 direction and maintained at the second position.

Therefore, the second force applying surface 540*c* of the control portion 540*a* is spaced, by a gap T60, from the surface 6510*e* of the foot portion 6510*c* of the regulating member 6510, and does not contact therewith (part (c) of FIG. 38). In addition, the first force applying surface 540*b* is spaced, by a gap T61, from with the surface 6510*f* of the foot portion 6510*d* of the regulating member 6510. Therefore, the regulating member 6510 is positioned at the second position without contacting the drive control member 540, and the drive disconnection state is maintained (part (b) of FIG. 37).

[Drive Connecting Operation]

Figure 39:
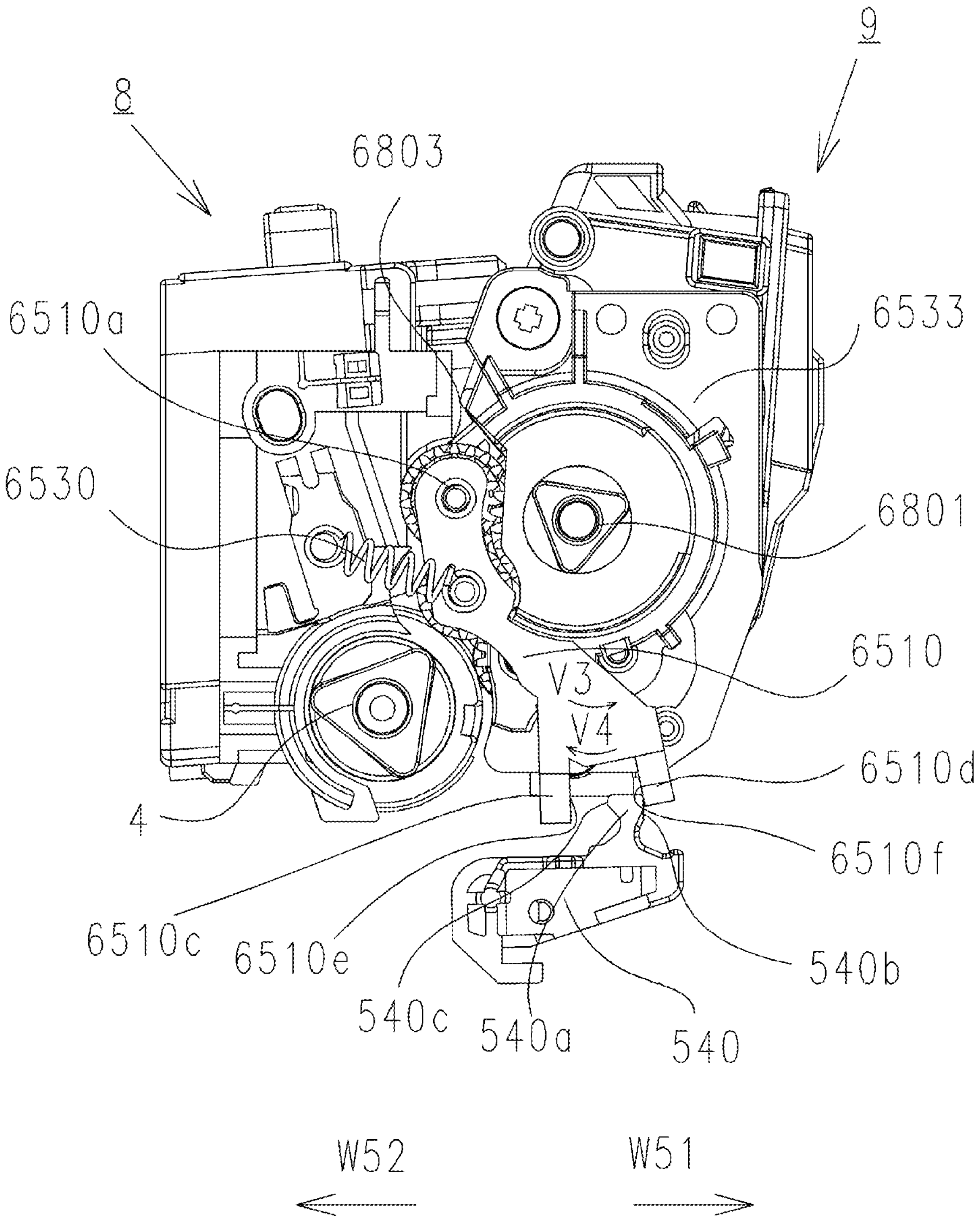
FIG. 39 is an illustration showing the drive connection operation in the Embodiment 5.

Referring to FIGS. 38 and 39, the operation of moving the regulating member 6510 from the second position to the first position inside the image forming apparatus main assembly 502, that is, the operation of connecting the drive will be described. FIG. 39 is a view of the process cartridge P positioned at the second inner position inside the image forming apparatus main assembly 502 as viewed from the drive side. For the sake of better illustration, the drive side cartridge cover member 6520 is omitted. FIG. 39 shows a state in which the regulating member 6510 has moved from the second position to the first position.

When the drive control member 540 moves in the W51 direction, the first force applying surface 540*b* and the surface 6510*f* the foot portion 1510*d* of the regulating member 6510 are brought into contact with each other, and the regulating member 6510 rotates in the arrow V3 direction in FIG. 39. That is, the regulating member 6510 moves from the second position toward the first position. Then, as described above, the idler gear 6804 meshes with the developing roller gear 802 to connect the drive (part (a) of FIG. 37).

Even if drive control member 540 moves in the direction of arrow W52 and returns to the home position (part (a) of FIG. 38), the control portion 540*a* is spaced, by a gap T62, from the surface 6510*f* of foot portion 6510*d* of regulating member 6510, and they are out of contact from each other. In addition, the second force applying surface 540*c* is spaced, by a gap T63, from the surface 6510*e* of the foot portion 6510*c* of the regulating member 6510. Therefore, the regulating member 6510 is placed at the first position without contacting the drive control member 540, and the drive connection state is maintained (part (a) of FIG. 37). At the first position, the moments about the rotation axis 6510*a* satisfy M1+M2>M3. That is, at the first position, the moment in the V3 direction by the meshing force between the idler gears 6803 and 6804 and the meshing force between the idler gear 6804 and the developing roller gear 802 is larger than the moment in the V4 direction by the spring pressure of the tension spring 6530. Therefore, the regulating member 6510 is urged in the V3 direction to maintain the first position.

As described above, by using the structure of this embodiment, the drive control member 540 moves the regulating member 6510 to the first position and the second position, by which the drive transmission states of the idler gear 6804 and the developing roller gear 802 can be switched. By this, it is possible to switch the drive regardless of the contact/separation operation between the photosensitive drum 4 and the developing roller 6.

Embodiment 6

Referring to FIGS. 40 to 45, a process cartridge and an image forming apparatus according to Embodiment 6 of the present disclosure will be described. In the structure of this embodiment, a moving member and an engaging portion are provided in a laser shutter unit (or shutter unit). The process cartridge of this embodiment is the same as that of the Embodiment 1, with the exception that it differs only in the structure of the regulating member as a moving member and the periphery thereof. Accordingly, the members having the same functions and structures are assigned by the same reference numerals, and the detailed description thereof is omitted.

Further, in this embodiment, by providing a laser shutter unit in the process cartridge it is possible to switch between a reachable state (the laser shutter unit does not block the laser beam) and a non-reachable state (the laser shutter unit blocks the laser beam) of a laser beam emitted in accordance with an image signal from the electrophotographic image forming apparatus is applied to the photosensitive drum as the above-described electrophotographic image forming process operation. By this, it is possible to switch between enablement and disablement of the image forming operation regardless of the structure of the contact/separation operation between the photosensitive drum and the developing roller or the interrupting operation of the drive connecting portion or the like, which are described in other embodiments. In another embodiment, if the contact/separation state between the photosensitive drum and the developing roller or the connection state of the drive connecting portion cannot be stably controlled, problems may occur in image forming operation. For example, there is a possibility that image problems such as poor image density attributable to contact pressure and banding attributable to the drive connecting portion may occur. However, in this embodiment, the switching is carried out between reachable state and non-reachable state of the laser beam from the electrophotographic image forming apparatus outside the process cartridge, and therefore, the portions related to the image forming means inside the process cartridge (photosensitive drum, developing roller, gears, and so on) are damaged with less possibility. By this, it is possible to stably switch between enablement and disablement of the image forming operation as an electrophotographic image forming process operation.

[Overall Structure of Process Cartridge Having Laser Shutter Unit]

Figure 40:
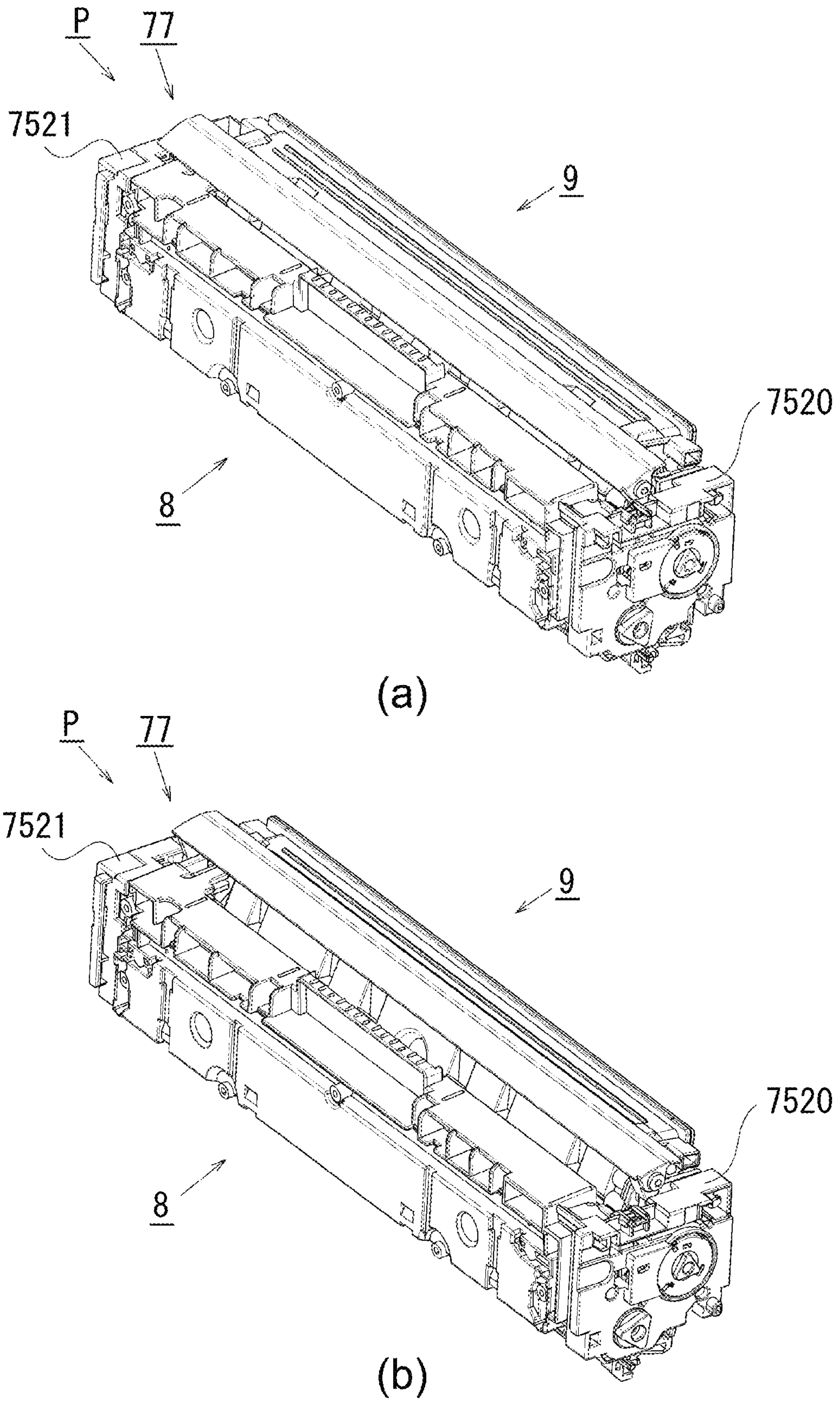
FIG. 40 is a perspective view of a drive connecting portion in Embodiment 6.
Figure 41:
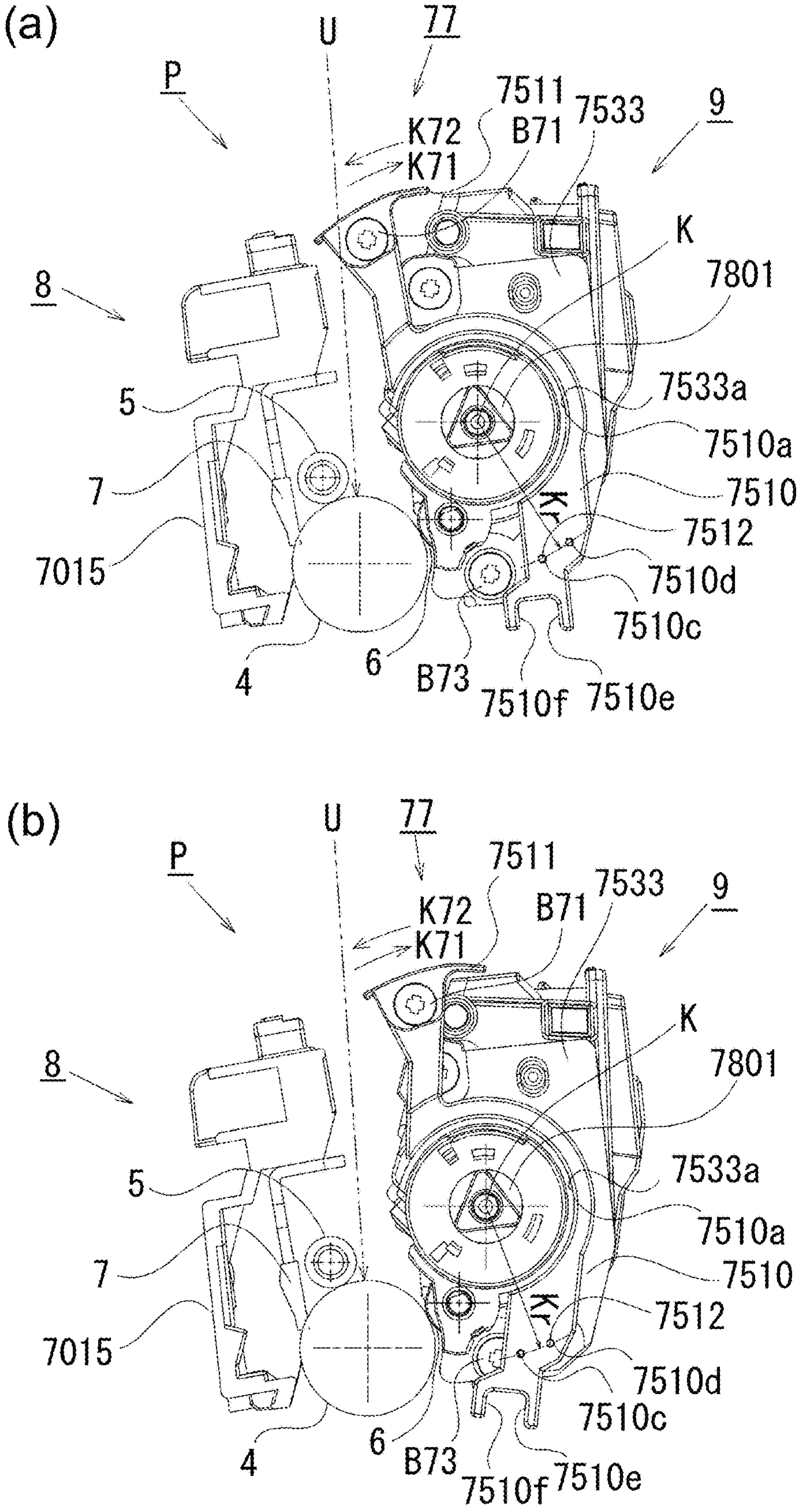
FIG. 41 is an illustration showing the positional relationship of the drive connecting portion when the drive is connected and when the drive is interrupted, in the Embodiment 6.

Referring to FIGS. 40 and 41, The overall structure of the process cartridge P will be described. FIG. 40 is a perspective view of the process cartridge P as viewed from the drive side. As shown in FIG. 40, the process cartridge P has a structure in which the drum unit 8, the developing unit 9, and the laser shutter unit 77 are sandwiched between a drive side cartridge cover member 7520 and a non-drive side cartridge cover member 7521 and fixedly supported thereby. FIG. 41 is a view of the process cartridge P as viewed from the drive side, and does not show the drive side cartridge cover member 7520 shown in FIG. 40 for better illustration of the structure. FIG. 41 shows the photosensitive drum 4, the charging roller 5, the cleaning blade 7, and a drum frame 7015 without showing a part of the drum unit 8. The developing unit 9 is shown with a laser shutter unit 77 as a shielding member mounted thereto. The laser shutter unit 77 comprises a shutter moving member 7510 (or a moving member) and a laser shutter 7511 as a shielding portion. A shutter-side rotation support portion 7510*a* of the shutter moving member 7510 is rotatably supported by a cover-side rotation support portion 7533*a* of a developing device cover member 7533 provided in the developing unit 9. Rotation centers of the shutter-side rotation support portion 7510*a* and the cover-side rotation support portion 7533*a* are the same as the swing axis K which is the rotation center of the developing unit 9 and the development coupling gear 7801. That is, the laser shutter unit 77 is rotatably supported about the swing axis K in the shutter opening direction K71 and the shutter closing direction K72.

Part (a) of FIG. 40 and part (a) of FIG. 41 show a state in which the laser shutter unit 77 is fixed at a position where the laser beam U is blocked. Part (b) of FIG. 40 and part (b) of FIG. 41 show a state in which the laser shutter unit 77 is fixed at a position where the laser beam U is not blocked. A detailed structure for fixing the laser shutter unit 77 at each position will be described hereinafter. The shutter moving member 7510 is provided with two phase fixing holes for fixing the position of the laser shutter unit 77, namely, a closing phase hole 7510*c* and an opening phase hole 7510*d*. The laser shutter unit 77 can be fixed at an arbitrary phase by inserting and removing the free end of the shutter position restricting pin 7512 provided in the developing unit 9 into and out of the two phase fixing holes. Here, the closing phase hole 7510*c* and the opening phase hole 7510*d* are arranged on the same circumference Kr centered on the swing axis K. By this, when the laser shutter unit 77 rotates to an arbitrary phase about the swing axis K, the free end of the shutter position regulating pins 7512 can be inserted into and removed out of the respective holes.

Part (a) of FIG. 41 shows a state in which the laser shutter unit 77 is fixed ata position for blocking the laser beam U, that is, the free end of the shutter position restricting pin 7512 enters the closing phase hole 7510*c*, and the position of the shutter moving member 7510 is in the closing position. The position of the moving member at this time is referred to as the first position.

Part (b) of FIG. 41 shows a state in which the laser shutter unit 77 is fixed at an open position not blocking the laser beam U, that is, the free end of the shutter position restricting pin 7512 enters the opening phase hole 7510*d*, and the position of the member 7510 is fixed. The position of the moving member at this time is referred to as a second position.

The details of the structure and operation of the shutter position restricting pin 7512 will be described hereinafter. In addition, the shutter moving member 7510 has an opening direction pressed surface 7510*f* and a closing direction pressed surface 7510*e* as external force receiving surfaces for rotating about the swing axis K. The laser shutter unit 77 can rotate in the shutter opening direction K71 by receiving a rotational force at the opening direction pressed surface 7510*f*, and can rotate in the shutter closing direction K72 by receiving a rotational force at the closing direction pressed surface 7510*e*. By this, even when the photosensitive drum 4 and the developing roller 6 are always in contact with each other, the laser beam U can be switched between states of reaching and not reaching the photosensitive drum, regardless of the contact/separation operation between the photosensitive drum 4 and the developing roller 6, and by the switching, it is possible to switch between enablement and disablement of the image forming operation as an electrophotographic image forming process operation.

The first position is not limited to such a position that the laser shutter unit 77 covers the photosensitive drum 4 so as to substantially completely block exposure of the photosensitive drum 4 to the outside of the cartridge. For example, it may be positioned so as to partially cover the photosensitive drum 4 from the outside of the cartridge (the exposed portion may remain to some extent) to the extent that the exposure to the laser beam U can be sufficiently blocked. As for the second position, if the laser shutter unit 77 exposes the photosensitive drum 4 more than in the first position so that the photosensitive drum 4 can be exposed to the laser beam U, the degree of exposure can be selected arbitrarily.

[Detailed Structure of Process Cartridge Having Laser Shutter Unit]

Figure 42:
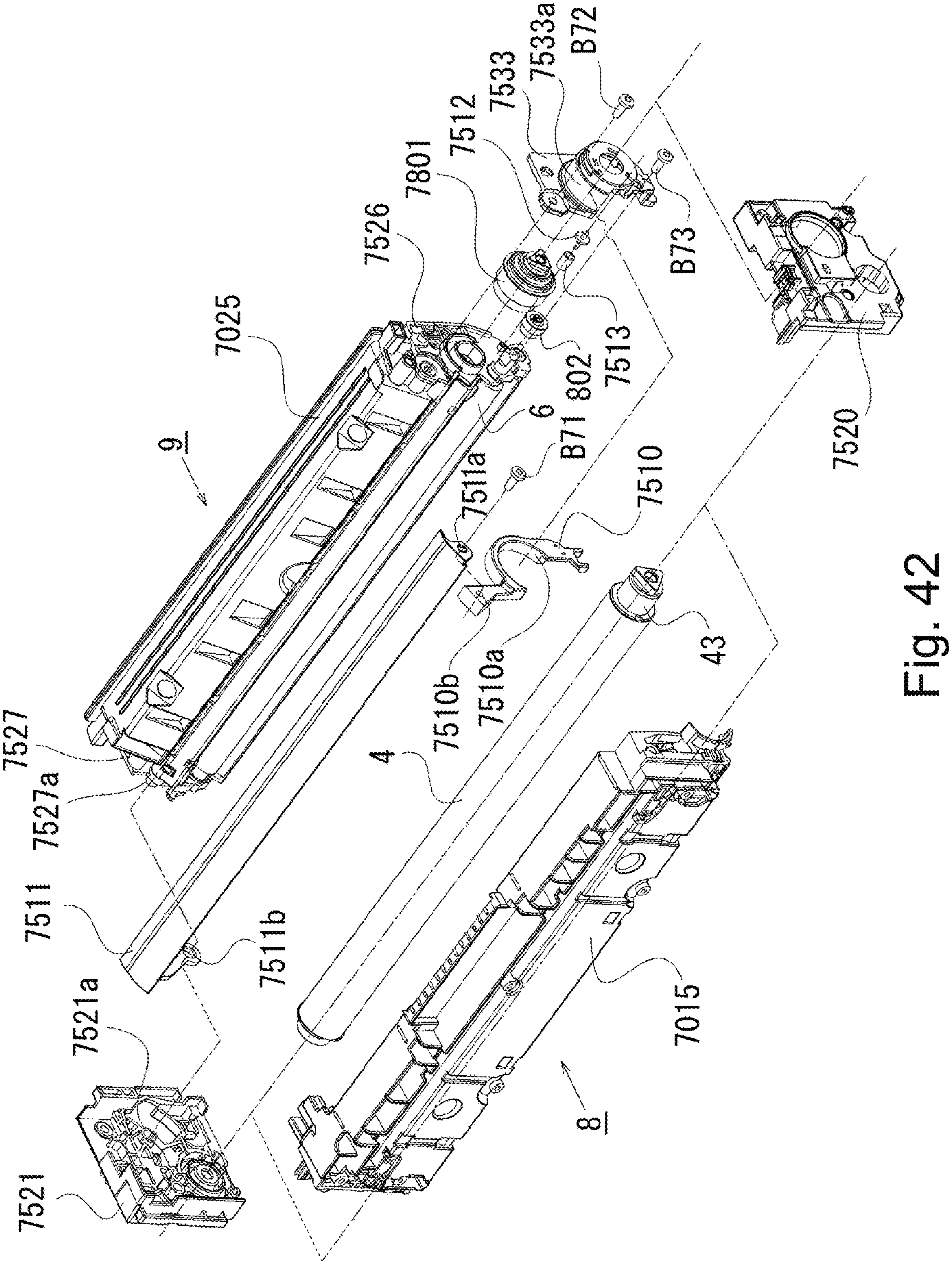
FIG. 42 is an exploded perspective view of a process cartridge according to Embodiment 6.

Referring to FIG. 42, the detailed structure of the process cartridge P will be described. FIG. 42 is an exploded perspective view of the process cartridge P as viewed from the drive side. The drive side cartridge cover member 7520, the non-drive side cartridge cover member 7521, the drum unit 8, the developing unit 9, and the laser shutter unit 77 are removed, in this Figure.

A drum frame 7015 of in the drum unit 8 is structured so as not to hinder the movement of the laser shutter unit 77 and not interfere with the laser shutter 7511, when the laser shutter unit 77 rotates. The shape of the laser shutter 7511 provided in the laser shutter unit 77 and the shape of the drum frame 7015 may be changed in view of the incident angle of the laser beam U and the width of the incident light. The developer container 7025 provided in the developing unit 9 is structured so as not to hinder the movement of the laser shutter unit 77 and not to interfere with the laser shutter 7511, when the laser shutter unit 77 rotates, similarly to the drum frame 7015. The development coupling gear 7801 is rotatably held by the drive side bearing 7526 and the developing device cover member 7533 mounted to the developer container 7025, and the shutter position restricting pin 7512 and the shutter position regulation spring 7513 are also held. The details of holding structures for the shutter position restricting pin 7512 and the shutter position regulation spring 7513 will be described hereinafter. The laser shutter unit 77 comprises the shutter moving member 7510 and the laser shutter 7511. The laser shutter unit 77 is integrated by the shutter moving member screw hole 7510*b* and the laser shutter screw hole 7511*a* and screws B71. As described above, on the drive side of the laser shutter unit 77, the shutter-side rotation support portion 7510*a* is rotatably supported by the cover-side rotation support portion 7533*a* of the developing device cover member 7533 provided in the developing unit 9. On the other hand, on the non-drive side of the laser shutter unit 77, the bearing side rotation support portion 7527*a* of the non-drive side bearing 7527 provided on the non-drive side of the developing unit 9 is fitted into and supported by a non-drive side cartridge cover member rotation support hole 7521*a* of the laser shutter rotation support portion 7511*b* and the non-drive side cartridge cover member 7521. By this, the laser shutter rotation support portion 7511*b* is rotatably supported.

[Switching Operation Between Opening and Blocking Laser Beam]

Figure 43:
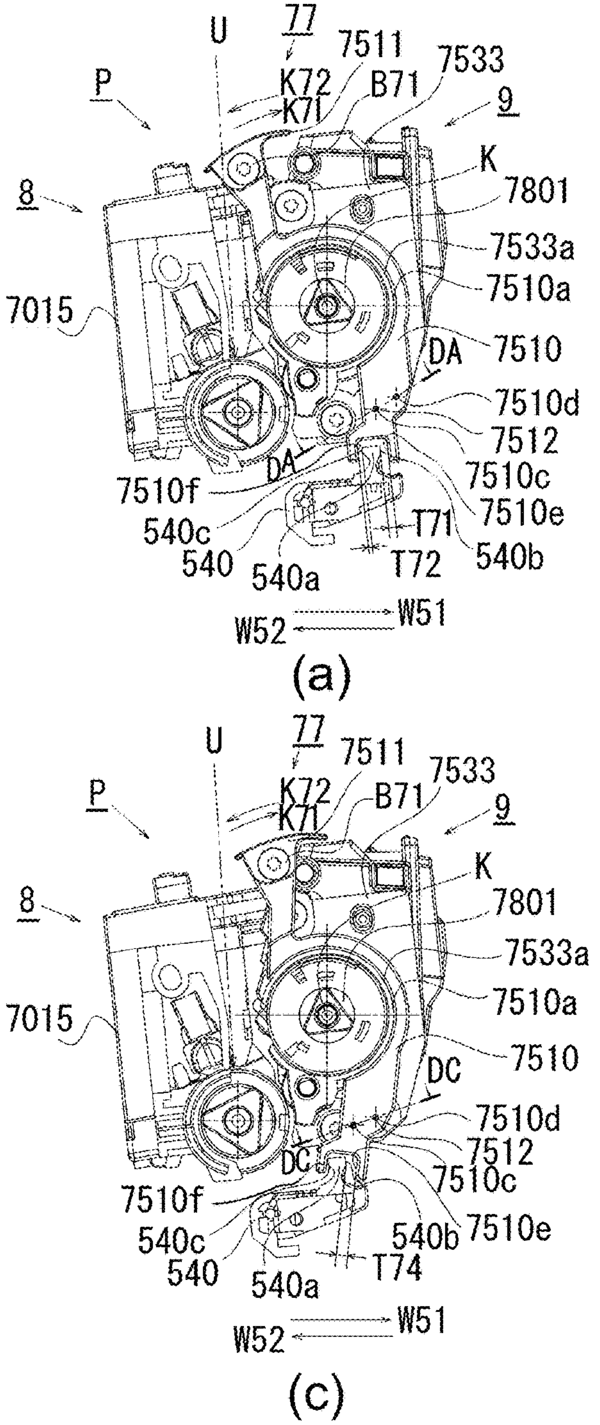
FIG. 43 is an illustration showing a drive interruption operation the Embodiment 6.
Figure 44:
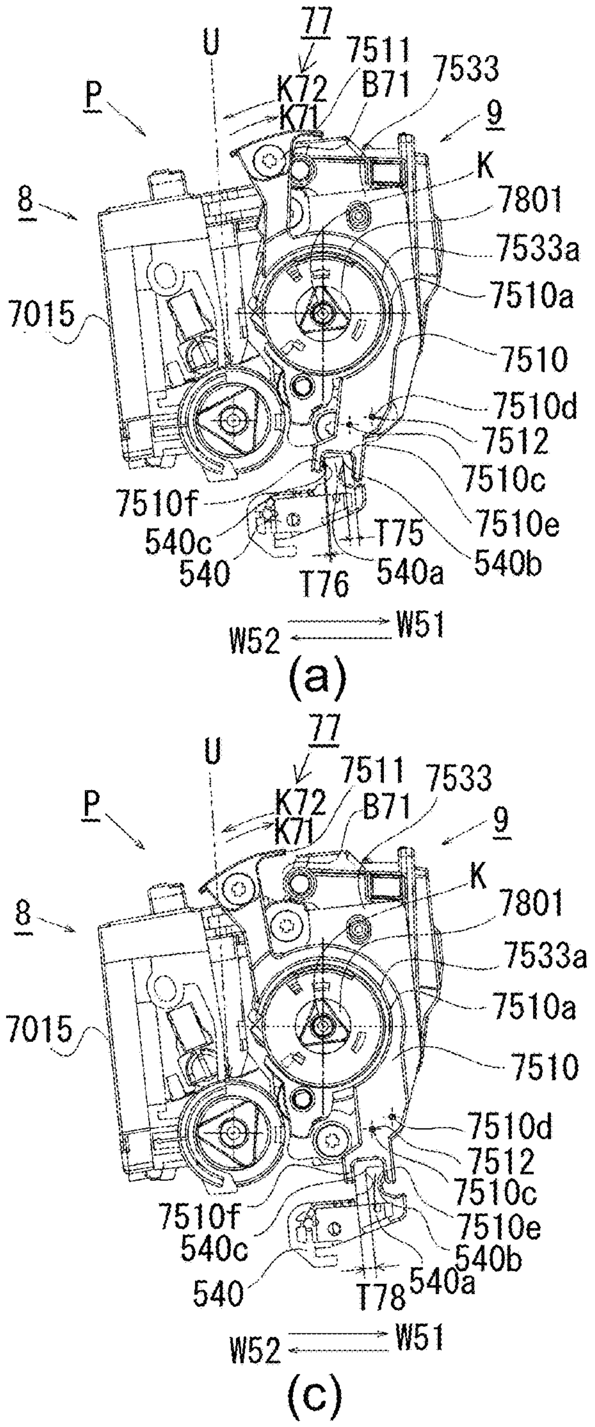
FIG. 44 is an illustration showing a drive connection operation in the Embodiment 6.
Figure 45:
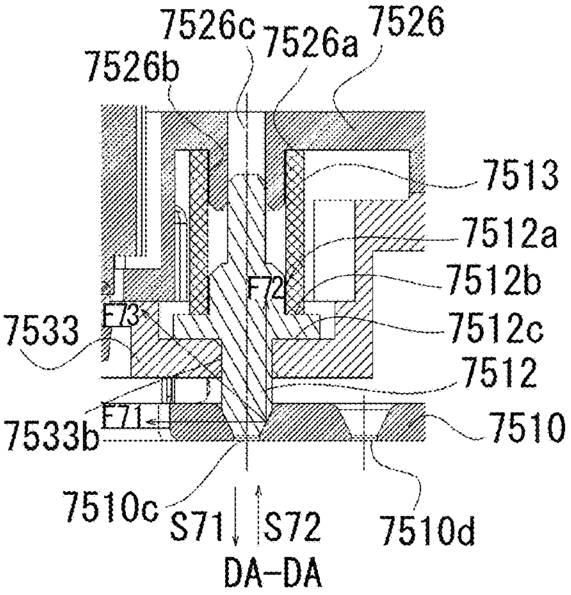
FIG. 45 is a positional relationship illustration of the shutter position restricting pin at the time of drive connection and interruption, in the Embodiment 6.
Figure 45:
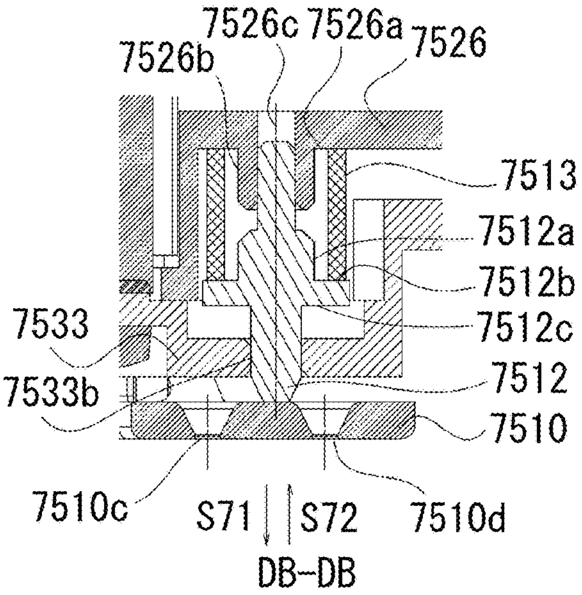
Figure 45:
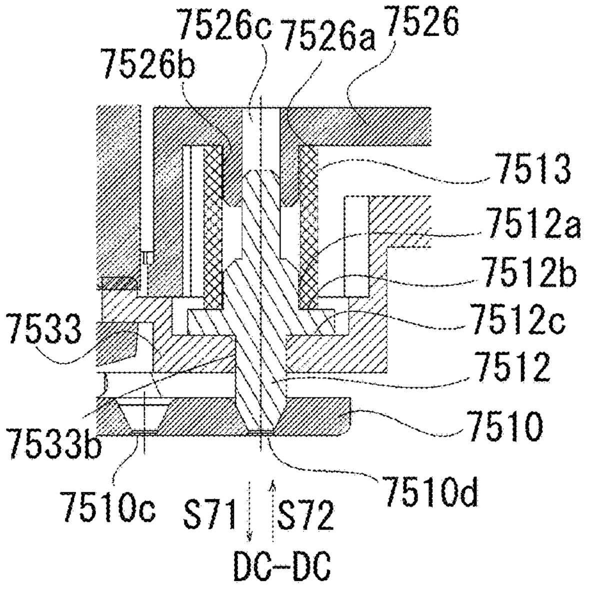

Referring to FIGS. 43 to 45, the operation of switching between opening and closing the laser beam by the operation of the laser shutter unit 77 will be described. FIG. 43 shows the operation of the laser shutter unit 77 from the laser beam blocking state to the laser beam open state. FIG. 44 shows the operation of the laser shutter unit 77 from the laser beam open state to the laser beam blocking state. FIG. 45 shows operations of the shutter moving member 7510 and the shutter position restricting pin 7512 from the laser beam blocking state to the laser beam open state. FIGS. 43 and 44 are illustrations of the process cartridge P as viewed from the drive side, and for better illustration of the structure, the drive side cartridge cover member 7520 shown in FIG. 40 is not shown, and a drive control member 540 is shown.

As shown in part (a) of FIG. 43, the laser shutter 7511 of the laser shutter unit 77 is at the first position to block the laser beam U, in a state that the photosensitive drum cannot be irradiated by the laser beam, that is, in a laser beam blocking state. At this time, the drive control member 540 is placed at the home position, and the control portion 540*a* of the drive control member 540 does not contact the shutter moving member 7510. That is, in this state, a gap T71 is provided between the first force applying surface 540*b* of the drive control member 540 and the closing direction pressed surface 7510*e* of the shutter moving member 7510, and a gap T72 is provided between the second force applying surface 540*c* and the opening direction pressed surface 7510*f*.

Part (a) of FIG. 45 is a sectional view taken along a line DA-DA which passes through the closing phase hole 7510*c* and the opening phase hole 7510*d* in part (a) of FIG. 43. As described above, the shutter position restricting pin 7512 and the shutter position regulation spring 7513, which is a compression coil spring as an urging means, are held at the opposite ends thereof by the developing device cover member 7533 and the drive side bearing 7526. The shutter position restricting pin 7512 is fitted in and supported by the cover-side regulating pin support hole 7533*b* and the regulating pin support hole 7526*c*. The shutter position regulation spring 7513 is a compression coil spring, and the opposite ends thereof are held by the pin-side regulating spring support portion 7512*a* and the bearing-side regulating spring support portion 7526*b*. The shutter position restricting pin 7512 is movable in the S71 direction and the S72 direction (parallel to the swing axis K). The shutter position regulation spring 7513 is in contact with the bearing side regulating spring force receiving surface 7526*a* and the pin side regulating spring force receiving surface 7512*b*, and urges the shutter position restricting pin 7512 in the S71 direction. A regulating pin abutment surface 7512*c* of the shutter position restricting pin 7512 abuts against the developing device cover member 7533, and the movement thereof in the S71 direction is restricted. Here, the free end of the shutter position restricting pin 7512 enters the closing phase hole 7510*c* of the shutter moving member 7510, and the rotational movement of the shutter moving member 7510 can be restricted and fixed. By this, the laser shutter unit 77 is fixed at the first position where the laser beam U is blocked.

Part (b) of FIG. 43 shows a state in which the laser shutter unit 77 is rotated in the shutter opening direction K71 and moved from the first position where the laser beam U is blocked to the second position where it is not blocked. At this time, the drive control member 540 is moving in the W52 direction from the home position, and the control portion 540*a* of the drive control member 540 pushes the shutter moving member 7510 in the W52 direction. That is, a gap T73 exists between the first force applying surface 540*b* of the drive control member 540 and the closing direction pressed surface 7510*e* of the shutter moving member 7510, and no gap exists between the second force applying surface 540*c* and the opening direction pressed surface 7510*f*.

Part (b) of FIG. 45 is a sectional view taken along a line DB-DB which passes through the closing phase hole 7510*c* and the opening phase hole 7510*d* of part (b) of FIG. 43. At this time, the shutter position restricting pin 7512 is part wary of movement from the closing phase hole 7510*c* to the opening phase hole 7510*d*, and is away from the position shown in part (a) of FIG. 45 in the direction of F72. When the shutter moving member 7510 moves in the W52 direction, the shutter position restricting pin 7512 receives an external force in the F71 direction, as shown in part (a) of FIG. 43, as the shutter moving member 7510 rotates. The shape of the free end of the shutter position restricting pin 7512 is such that force components are produced in the directions of F72 and F73. By this, the shutter position restricting pin 7512 receives a force in the F71 direction to move in the S72 direction, thus changing the state from that shown in part (a) of FIG. 45 to that shown in part (b) of FIG. 45. At this time, the shutter position regulation spring 7513 is in a compressed state.

As shown in part (c) of FIG. 43, the laser shutter 7511 of the laser shutter unit 77 is at the second position which is for not blocking the laser beam U, in the state that the photosensitive drum can be irradiated with the laser beam, that is, a laser beam open state. At this time, the drive control member 540 is moving more in the W52 direction than the position shown in part (b) of FIG. 43, and the control portion 540*a* of the drive control member 540 is at rest in contact with the shutter moving member 7510. That is, a gap T74 exists between the first force applying surface 540*b* of the drive control member 540 and the closing direction pressed surface 7510*e* of the shutter moving member 7510, and no gap exists between the second force applying surface 540*c* and the opening direction pressed surface 7510*f*, in this state.

Part (c) of FIG. 45 is a sectional view taken along a line DC-DC which passes through the closing phase hole 7510*c* and the opening phase hole 7510*d* of part (c) of FIG. 43. As shown in part (c) of FIG. 45, the free end of the shutter position restricting pin 7512 is in the opening phase hole 7510*d* of the shutter moving member 7510, so that the rotational movement of the shutter moving member 7510 can be restricted and fixed. By this, the laser shutter unit 77 is fixed at the second position where the laser beam U is not blocked.

Part (a) of FIG. 44 shows the position of the process cartridge P when the image forming operation is carried out. As shown in part (a) of FIG. 44, the laser shutter 7511 of the laser shutter unit 77 is at the second position as in part (c) of FIG. 45. At this time, the drive control member 540 has moved from the position shown in part (c) of FIG. 43 to the home position. At this time, the control portion 540*a* of the drive control member 540 does not contact the shutter moving member 7510. That is, a gap T75 exists between the first force applying surface 540*b* of the drive control member 540 and the closing direction pressed surface 7510*e* of the shutter moving member 7510, a gap T76 exists between the second force applying surface 540*c* and the opening direction pressed surface 7510*f*, in this state. In addition, the shutter position restricting pin 7512 is in the state shown in part (c) of FIG. 45.

Part (b) of FIG. 44 shows a state in which the laser shutter unit 77 is rotated, after the image forming operation is completed, in the shutter closing direction K72, and is moving from the second position which does not block the laser beam U to the first position which blocks it. As shown in part (b) of FIG. 44, the shutter moving member 7510 and the laser shutter 7511 of the laser shutter unit 77 are at the second position as in part (b) of FIG. 43. At this time, the drive control member 540 is moving in the W51 direction away from the home position, and the control portion 540*a* of the drive control member 540 pushes the shutter moving member 7510 in the W51 direction. That is, no gap exists between the first force applying surface 540*b* of the drive control member 540 and the closing direction pressed surface 7510*e* of the shutter moving member 7510, and a gap T77 exists between the second force applying surface 540*c* and the opening direction pressed surface 7510*f*. In addition, the shutter position restricting pin 7512 is in the state shown in part (b) of FIG. 45 described above.

Part (c) of FIG. 44 shows a state in which the laser shutter 7511 of the laser shutter unit 77 is again moved after the image forming operation is completed, to the first position where the laser beam U is blocked. As shown in part (c) of FIG. 44, the shutter moving member 7510 and the laser shutter 7511 of the laser shutter unit 77 are at the first position to block the laser beam U, as in part (a) of FIG. 43.

At this time, the drive control member 540 has moved further in the W51 direction beyond the position shown in part (b) of FIG. 44, and the control portion 540*a* of the drive control member 540 is at rest in contact with the shutter moving member 7510. That is, no gap exists between the first force applying surface 540*b* of the drive control member 540 and the closing direction pressed surface 7510*e* of the shutter moving member 7510, and a gap T78 exists between the second force applying surface 540*c* and the opening direction pressed surface 7510*f*. In addition, the shutter position restricting pin 7512 is in the state shown in part (a) of FIG. 45.

As described above, by using the structure of this embodiment, the laser shutter unit 77 can be fixed at any phase of the first position and the second position. By this, regardless of the contact/separation operation between the photosensitive drum 4 and the developing roller 6, the laser beam U can be switched between the reachable state and non-reachable state to the photosensitive drum even when the photosensitive drum 4 and the developing roller 6 are always in contact with each other, and it is possible to switch between enablement and disablement of the image forming operation as an electrophotographic image forming process operation. In this embodiment, the laser shutter unit 77 is structured to switch between the reachable and non-reachable states of the laser beam U by rotating about the swing axis K, the motion of the opening and closing of the shutter is not limited to the rotational motion, but may be of a sliding motion or foldable structure, for example. In addition, in this structure, the parts constituting the shutter and the like are supported on the developing unit side, but they may be supported on the drum unit side.

Although described again, in this embodiment, the closing phase hole 7510*c* is recessed in the direction perpendicular to the moving direction of the shutter moving member 7510 as the first recess, and the opening phase hole 7510*d* is also recessed in the direction perpendicular to the direction of movement of the shutter moving member 7510 as the second recess. The shutter position restricting pin 7512 is structured to be movable forward and backward in a direction perpendicular to the moving direction of the shutter moving member 7510 as a first projection or a second projection. Depending on the position of the shutter moving member 7510, the shutter position restricting pin 7512 fits into either the closing phase hole 7510*c* or the opening phase hole 7510*d*, thereby functioning as an engaging portion which holds the shutter moving member 7510 at predetermined positions. The outer peripheral edge of the free end surface of the shutter position restricting pin 7512 is a tapered inclined surface, and the closing phase hole 7510*c* and the opening phase hole 7510*d* each have a mortar-shaped recess shape which expands toward the opening. That is, the contact surfaces between the shutter position restricting pin 7512 and the closing phase hole 7510*c* and the opening phase hole 7510*d* are inclined with respect to the moving direction of the shutter moving member 7510 and the advancement/retraction direction of the shutter position restricting pin 7512, respectively. Such a structure functions as, the force applying portion (first force applying section, second force applying portion) for applying, to the shutter position restricting pin 7512, the force for moving the shutter position restricting pin 7512 in a retracting direction, when the shutter moving member 7510 moves.

Here, the structures of the shutter position restricting pin 7512, closing phase hole 7510*c*, and opening phase hole 7510*d* are not limited to those described in this embodiment. That is, in this embodiment, one projection and two recess portions are combined, but various combinations are conceivable. For example, a combined structure is conceivable, in which two projections are provided, one of which is made the first projection which fits into the first recess when the moving member (shielding member) is at the first position, and the other projection is made the second projection which fits into the second recess when the moving member is in the second position. Alternatively, one recess portion is provided for two projections, and one projection is fitted into a common recess portion when the moving member is at the first position, and the other projection is fitted into the common recess portion when the moving member is at the second position. In this embodiment, the shutter position restricting pin 7512 as a projection is provided on the cartridge frame side, and the closing phase hole 7510*c* and the opening phase hole 7510*d* as recess portions are provided on the moving member side, but the present invention is not limited to such a structure. That is, the projection may be provided on the moving member side, and the recess portion may be provided on the cartridge frame side. In addition, the structure may be such that, the cartridge frame side is provided with a first projection which is fitted when the moving member is at the first position, the moving member side is provided with the first recessed portion, respectively, the second projection portion which is fitted when the moving member is at the second position is provided on the moving member side, and the second recess is provided on the cartridge frame side. Alternatively, the reverse combination may be used.

Embodiment 7

Referring to FIGS. 46 to 49, a process cartridge and an image forming apparatus according to Embodiment 7 of the present disclosure will be described. The process cartridge of this embodiment is the same as that of the Embodiment 6, and differs only in the structure of an electrical contact shutter unit 87 and its periphery, which will be described hereinafter. Accordingly, members including the same functions and structures are assigned by the same reference numerals, and detailed description thereof is omitted.

In addition, in this embodiment, by providing the electrical contact shutter unit 87 in the process cartridge, it is possible to switch between a state in which, a bias voltage applied from the electrical contact 503 (which will be described hereinafter) of the image forming apparatus main assembly 502 can be supplied to the process cartridge P (the contact shutter unit does not block the bias voltage) and a state in which the bias voltage cannot be supplied (contact shutter unit blocks the bias voltage). By this, it is possible to switch between enablement and disablement of the image forming operation regardless of the structure of the contact/separation operation between the photosensitive drum 4 and the developing roller 6 and regardless of the connecting/disconnecting operation of the drive connecting portion shown in other embodiments. Although this embodiment employs the laser shutter unit 77 as in the Embodiment 6, it is not necessary to switch between the state where the laser beam can reach the photosensitive drum 4 and the state where the laser beam cannot reach it.

[Overall Structure of Process Cartridge Having Contact Shutter Unit]

Figure 46:
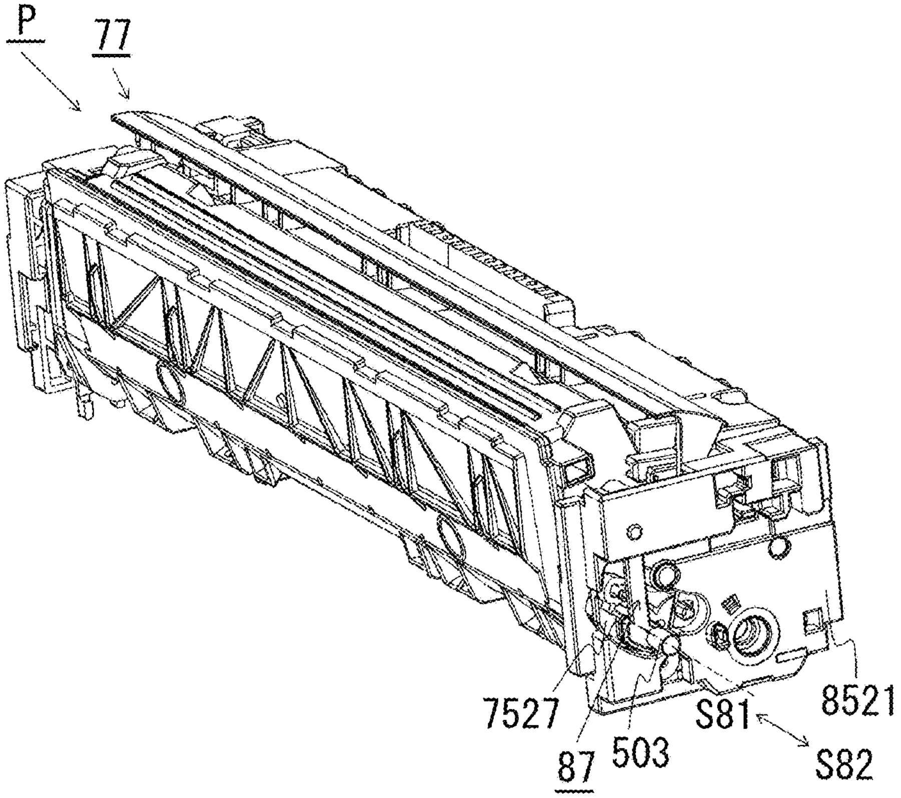
FIG. 46 is and illustrations showing a drive interruption operation in the Embodiment 7.
Figure 46:
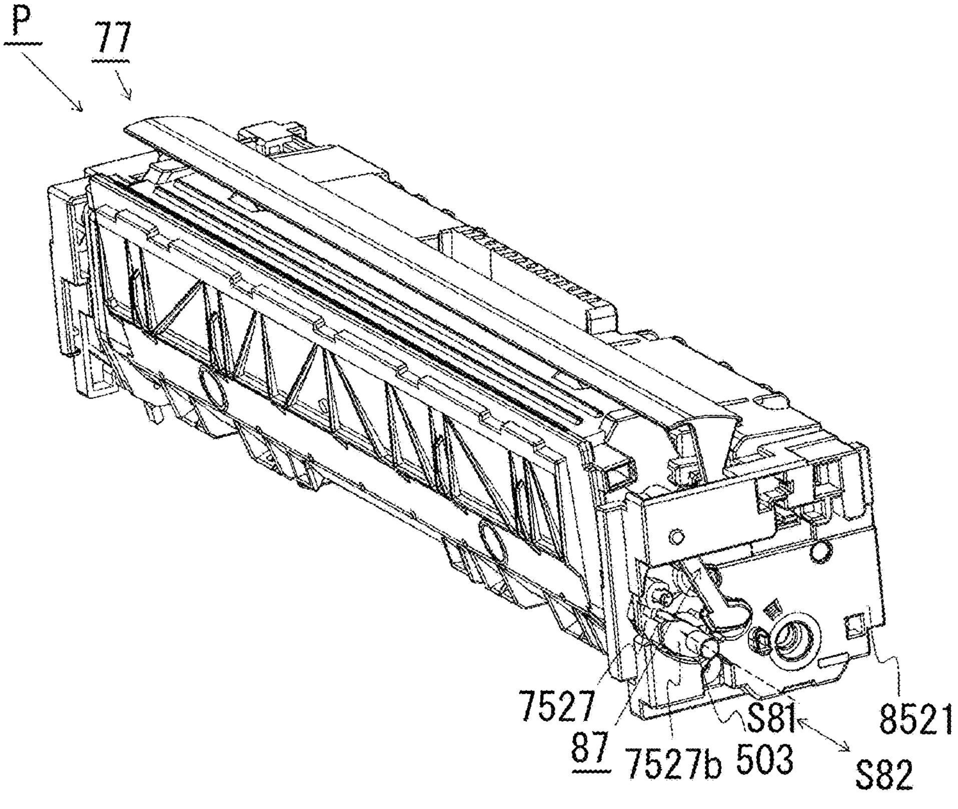

Referring to Figure, the overall structure of the process cartridge P will be described. FIG. 46 is a perspective view of the process cartridge P and the electrical contact 503 viewed from the non-drive side. As shown in FIG. 46, the contact shutter unit 87 is sandwiched between a non-drive side cartridge cover member 8521 and a non-drive side bearing 7527 and is fixedly held. A contact 503 as a body electrode portion is a compression coil spring, and can be contracted in an S81 or S82 direction, which is the longitudinal direction. The contact 503 is always compressed with its end in the S82 direction fixed, it urges the process cartridge Pin the S81 direction. The bias voltage applied from the image forming apparatus main assembly 502 is supplied to the process cartridge P when the contact 503 and the electrode portion 7527*b* of the non-drive side bearing 7527 contacts each other. Here, part (a) of FIG. 46 shows a state in which the contact shutter unit 87 blocks the bias voltage supplied from the contact 503. In the state shown in part (a) of FIG. 46, the contact 503 is in contact with a contact shutter 8511, which will be described hereinafter, so that no bias voltage is supplied to the process cartridge P and image formation is impossible. Part (b) of FIG. 46 shows the position where the contact shutter unit 87 opens without blocking the bias voltage supplied from the contact 503. In the state of part (b) of FIG. 46, the contact 503 and the electrode portion 7527*b* of the non-drive side bearing 7527 are in contact with each other, so that a bias voltage is supplied to the process cartridge P and image formation is possible.

Figure 47:
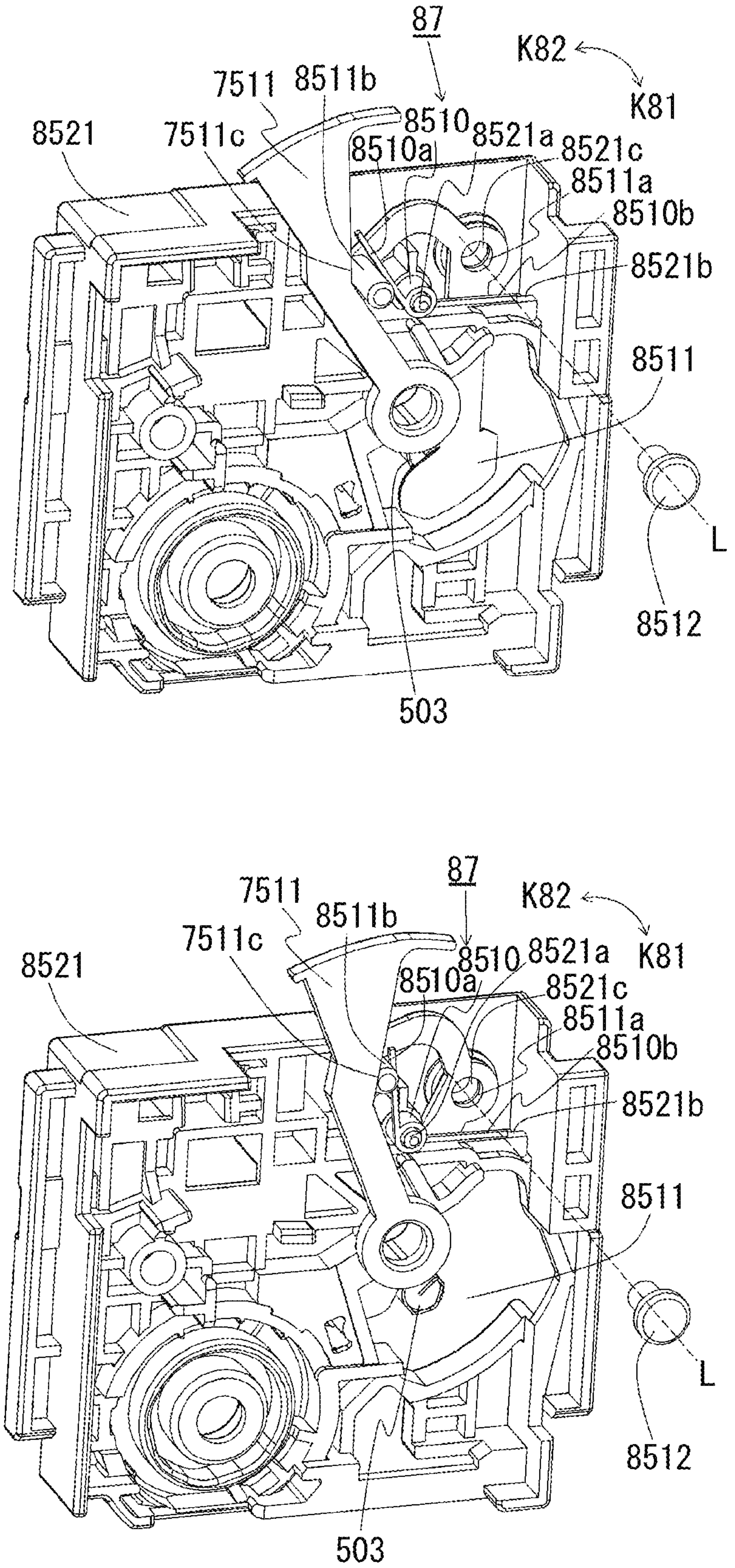
FIG. 47 is a perspective view illustrating the positional relationship at the time of drive connection and interruption of the drive connecting portion, in the Embodiment 7.

Referring to Figure, an overview of the contact shutter unit will be described. FIG. 47 is a perspective view of the process cartridge P as viewed from the drive side, and shows only parts of the electrical contact shutter unit 87, the non-drive side cartridge cover member 8521, the contacts 503, and the laser shutter 7511 for better illustration of the construction. In addition, it shows a contact fixing pin 8512 (which will be described hereinafter) of the contact shutter unit 87 in the state of being removed from the support hole 8521*c* of the non-drive side cartridge cover member 8521. The contact shutter unit 87 comprises a spring 8510 which is a torsion coil spring, the contact shutter 8511 (an example of a moving member), and the contact fixing pin 8512. The spring 8510 is fixed to the support portion 8521*a* of the non-drive side cartridge cover member 8521. In addition, the position of the end 8510*a* of the spring 8510 in the clockwise direction as viewed from the drive side is restricted by the restricting surface 8521*b* of the non-drive side cartridge cover member 8521. The contact shutter 8511 is provided with a fixing hole 8511*a* for fixing the position of the contact shutter unit 87. A contact fixing pin 8512 is inserted through the fixing hole 8511*a* of the contact shutter 8511, and the free end of the contact fixing pin 8512 is inserted into and fixed by a support hole 8521*c* of the non-drive side cartridge cover member 8521. By this, the contact shutter 8511 is supported rotatably in the shutter opening direction K81 and the shutter closing direction K82 about the swing axis L, which is the axis of the contact fixing pin 8512.

In the state of part (a) of FIG. 47, the contact shutter unit 87 is fixed at a position for blocking the bias voltage supplied from the contact 503. That is, the contact shutter 8511 is fixed between the contact 503 and the electrode portion 7527*b* of the non-drive side bearing 7527. The position of the contact shutter 8511 at this time is referred to as a first position.

In part (b) of FIG. 47, the contact shutter unit 87 is fixed at the open position not blocking the bias voltage supplied from the contact 503. That is, the contact shutter 8511 is fixed so as not to be placed between the contact 503 and the electrode portion 7527*b* of the non-drive side bearing 7527. The position of the contact shutter 8511 at this time is referred to as a second position.

The contact shutter 8511 includes an arm portion 8511*b* as an external force receiving surface for being rotated about the swing axis L in the K81 direction. Furthermore, the arm portion 8511*b* of the contact shutter 8511 is in contact with the end portion 8510*b* of the spring 8510. The laser shutter 7511 as a movable member rotates in the K81 direction, and the arm portion 8511*b* receives a rotational force from the force applying surface 7511*c*, thereby rotating the contact shutter 8511 in the shutter opening direction K81 to the second position. In addition, the position of the laser shutter 7511 as a movable member at this time is the second holding position. Here, when the contact shutter 8511 is at the second position, the spring 8510 receives force in the coil winding direction. Therefore, when the laser shutter 7511 rotates in the K82 direction and the external force applied to the arm portion 8511*b* of the contact shutter 8511 from the laser shutter 7511 disappears, the arm portion 8511*b* receives a rotational force by the urging force of the spring 8510 in the direction of increasing the torsion angle causes the arm portion 8511*b*, so that the contact shutter 8511 rotates in the shutter closing direction K82 to the first position. In addition, the position of the laser shutter 7511 as the movable member at this time is the first holding position. The holding of the contact shutter 8511 at the first position and the second position by the engagement of the laser shutter 751 is effected by an engagement mechanism of the shutter moving member 7510 described in the Embodiment 6, and therefore, the description is omitted. By this, even when the photosensitive drum 4 and the developing roller 6 are always in contact with each other, the bias voltage application to the process cartridge P can be switched between the enabled state and the disabled state, so that the image forming operation as an electrophotographic image forming process operation can be switched between the enabled state and the disabled state, regardless of the contact/separation operation between the photosensitive drum 4 and the developing roller 6.

[Switching Operation for Opening and Closing Laser Beam]

Figure 48:
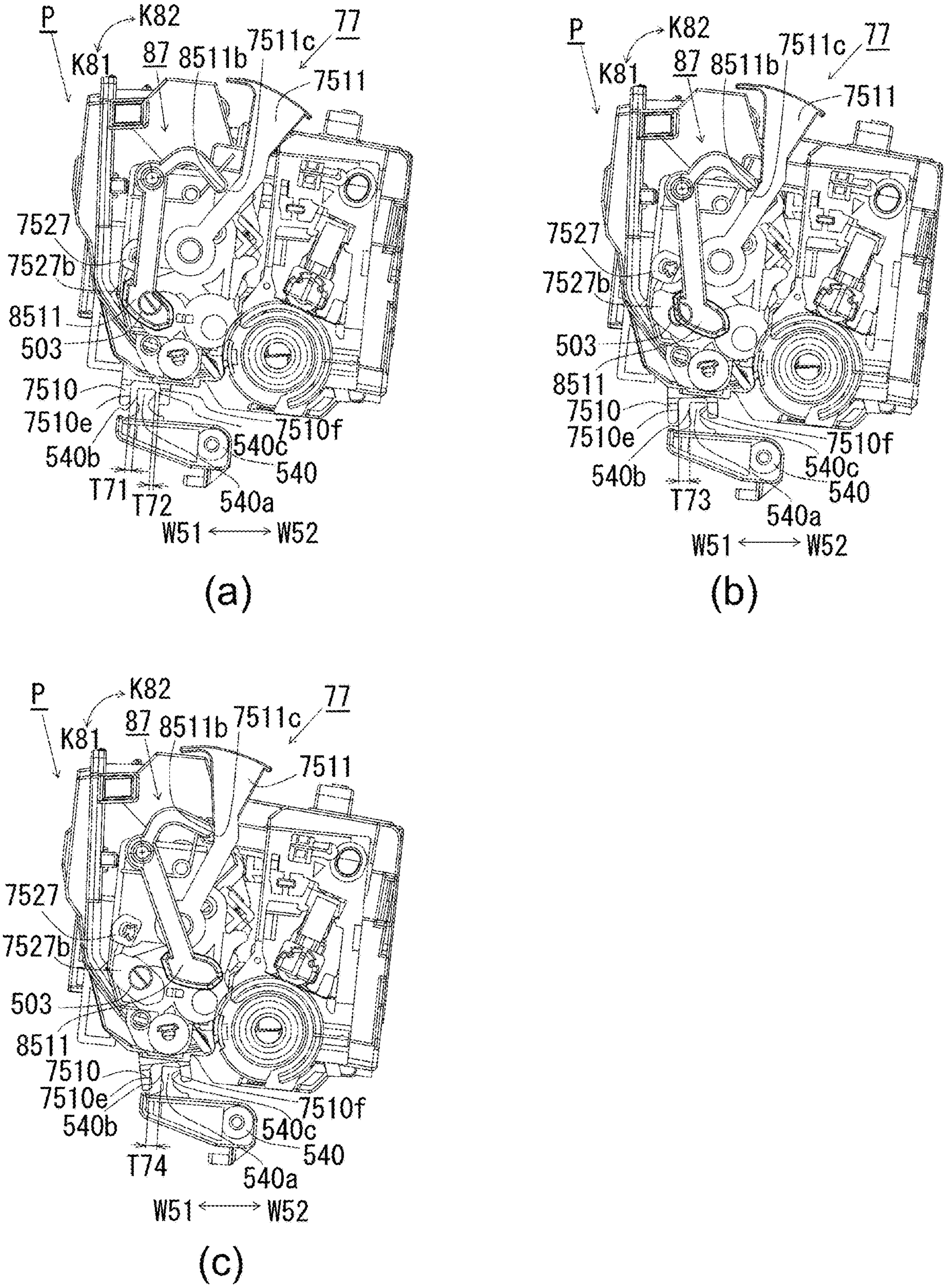
FIG. 48 is an illustration showing a drive interruption operation, in the Embodiment 7.
Figure 49:
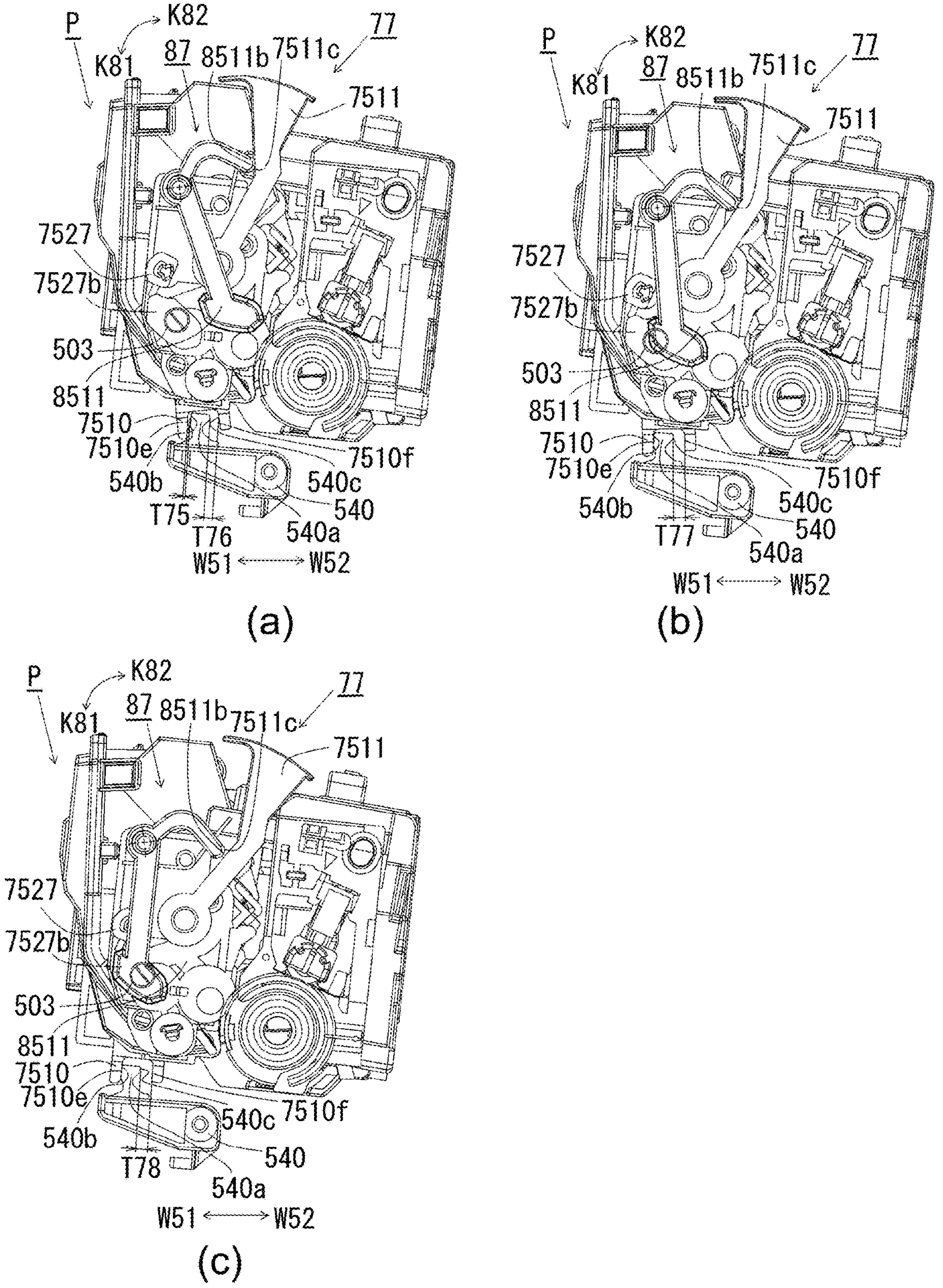
FIG. 49 is an illustration of a drive connection operation, in the Embodiment 7.

Referring to FIGS. 48 and 49, the operation of switching between supply and non-supply of the bias voltage by the operation of the contact shutter unit 87 will be described. FIG. 48 shows the operation of the contact shutter unit 87 from the bias voltage non-supply state to the bias voltage supply state. FIG. 49 shows the operation of the contact shutter unit 87 from the bias voltage supply state to the bias voltage non-supply state. FIGS. 48 and 49 are illustrations of the process cartridge P as viewed from the non-drive side, and for better illustration of the structure, the non-drive side cartridge cover member 8521 shown in FIG. 46 is not shown, but the drive control member 540 of the main assembly is shown.

Part (a) of FIG. 48 shows that the contact shutter 8511 of the contact shutter unit 87 is in the first position fixed between the contact 503 and the electrode portion 7527*b* of the non-drive side bearing 7527, and the bias voltage cannot be supplied from the contact 503 to the electrode portion 7527*b* of the non-drive side bearing 7527. At this time, the drive control member 540 is placed at the home position, and the control portion 540*a* of the drive control member 540 does not contact the shutter moving member 7510. That is, in this state, a gap T71 exists between the first force applying surface 540*b* of the drive control member 540 and the closing direction pressed surface 7510*e* of the shutter moving member 7510, and a gap T72 exists between the second force applying surface 540*c* and the opening direction pressed surface 7510*f*. In addition, as described in the Embodiment 6, the free end of the shutter position restricting pin 7512 enters the closing phase hole 7510*c* of the shutter moving member 7510, thereby restricting the rotational movement of the shutter moving member 7510 to fix it there.

Part (b) of FIG. 48 shows a state in which the contact shutter 8511 is moving from the first position for blocking the bias voltage to the second position for not blocking the bias voltage. As shown in part (b) of FIG. 48, the drive control member 540 is moving in the W52 direction from the home position, and the control portion 540*a* of the drive control member 540 pushes the shutter moving member 7510 in the W52 direction. That is, a gap T73 exists between the first force applying surface 540*b* of the drive control member 540 and the closing direction pressed surface 7510*e* of the shutter moving member 7510, and no gap exists between the second force applying surface 540*c* and the opening direction pressed surface 7510*f*. When the shutter moving member 7510 is pushed in the W52 direction and the laser shutter unit 77 is rotated in the K81 direction, the force applying surface 7511*c* of the laser shutter 7511 and the arm portion 8511*b* of the contact shutter 8511 are brought into contact with each other. When the laser shutter unit 77 further rotates in the direction K81 from this state, the contact shutter 8511 receives a rotational force from the laser shutter 7511 to rotate in the shutter opening direction K81. In addition, as described in the Embodiment 6, the shutter position restricting pin 7512 receives an external force in the F71 direction (FIG. 45) as the shutter moving member 7510 rotates. At this time, the shutter position regulation spring 7513 becomes in a compressed state.

Part (c) of FIG. 48 shows the second position where the contact shutter 8511 of the contact shutter unit 87 is fixed without being positioned between the contact 503 and the electrode portion 7527*b* of the non-drive side bearing 7527. By the movement of the contact shutter 8511 from the first position to the second position, the contact 503, which is a compression coil spring, extends in the direction S81 (FIG. 46) from the state shown in part (b) of FIG. 48, so that the contact 503 and the non-drive side bearing 7527 are brought into contact with each other. By this, a bias voltage can be supplied from the contact 503 to the electrode portion 7527*b* of the non-drive side bearing 7527, that is, the forming operation as an electrophotographic image forming process operation is enabled. At this time, the drive control member 540 is moving further in the W52 direction beyond the position shown in part (b) of FIG. 48, and the control portion 540*a* of the drive control member 540 is at rest while contacting the shutter moving member 7510. That is, a gap T74 exists between the first force applying surface 540*b* of the drive control member 540 and the closing direction pressed surface 7510*e* of the shutter moving member 7510, and no gap exists between the second force applying surface 540*c* and the opening direction pressed surface 7510*f*. Further, as described in the Embodiment 6, the free end of the shutter position restricting pin 7512 enters the opening phase hole 7510*d* of the shutter moving member 7510, thereby restricting the rotational movement of the shutter moving member 7510 to fix it there.

Part (a) of FIG. 49 shows the position of the process cartridge P during image forming operation. As shown in part (a) of FIG. 49, the drive control member 540 has moved from the position shown in part (c) of FIG. 48T to the home position, and the control portion 540*a* is in a position of not contacting the shutter moving member 7510. That is in this state, a gap T75 exists between the first force applying surface 540*b* of the drive control member 540 and the closing direction pressed surface 7510*e* of the shutter moving member 7510, and a gap T76 exists between the second force applying surface 540*c* and the opening direction pressed surface 7510*f*. Even in the state of part (a) of FIG. 49, as described in the Embodiment 6, the free end of the shutter position restricting pin 7512 is in the opening phase hole 7510*d* of the shutter moving member 7510, and therefore, the laser shutter 7511 is fixed at the same position as shown in part (c) of FIG. 48. That is, the contact shutter 8511 is at the second position as in part (c) of FIG. 48.

Part (b) of FIG. 49 shows a state in which the contact shutter 8511 is moving from the second position where it does not block the bias voltage to the first position where it blocks the bias voltage, after the image forming operation is finished. As shown in part (b) of FIG. 49, the drive control member 540 is moving in the W51 direction from the home position, and the control portion 540*a* of the drive control member 540 pushes the shutter moving member 7510 in the W51 direction. That is, in this state, no gap exists between the first force applying surface 540*b* of the drive control member 540 and the closing direction pressed surface 7510*e* of the shutter moving member 7510, and a gap T77 exists between the second force applying surface 540*c* and the opening direction pressed surface 7510*f*. When the shutter moving member 7510 is pushed in the W51 direction and the laser shutter unit 77 rotates in the K82 direction, the force applying surface 7511*c* of the laser shutter 7511 and the arm portion 8511*b* of the contact shutter 8511 are spaced from each other. At this time, the arm portion 8511*b* of the contact shutter 8511 receives a rotational force by the urging force of the spring 8510 in the direction in which the torsion angle increases, and the contact shutter 8511 rotates in the shutter closing direction K82. In addition, as described in the Embodiment 6, the shutter position restricting pin 7512 receives an external force in the reverse direction F71 (FIG. 45) as the shutter moving member 7510 rotates. At this time, the shutter position regulation spring 7513 becomes in a compressed state.

Part (c) of FIG. 49 shows the first position where the contact shutter 8511 of the contact shutter unit 87 is placed between the contact 503 and the electrode portion 7527*b* of the non-drive side bearing 7527 after the image forming operation is completed. By moving the contact shutter 8511 from the second position to the first position, the contact 503, which is a compression coil spring, contracts in the S82 direction (FIG. 46) from the state shown in part (b) of FIG. 48, and rides on the shutter 8511. That is, the contact 503 and the electrode portion 7527*b* of the non-drive side bearing 7527 are spaced. By this, a bias voltage cannot be supplied from the contact 503 to the electrode portion 7527*b* of the non-drive side bearing 7527, that is, the image forming operation as an electrophotographic image forming process operation becomes impossible. At this time, the drive control member 540 is moving further in the W51 direction beyond the position shown in in part (b) of FIG. 49, the control portion 540*a* of the drive control member 540 is at rest in contact with the shaft of moving member 7510. That is, no gap exists between the first force applying surface 540*b* of the drive control member 540 and the closing direction pressed surface 7510*e* of the shutter moving member 7510, and the gap T78 is formed between the second force applying surface 540*c* and the opening direction pressed surface 7510*f*. In addition, as described in the Embodiment 6, the free end of the shutter position restricting pin 7512 enters the closing phase hole 7510*c* of the shutter moving member 7510, thereby restricting the rotational movement of the shutter moving member 7510 to fix it there.

As described above, by using the structure of this embodiment, the contact shutter 8511 can be switched between the first position and the second position at an arbitrary phase by moving the drive control member 540 from the home position. By this, even when the photosensitive drum 4 and the developing roller 6 are always in contact with each other it is possible to switch between enablement and disablement of the image forming operation as an electrophotographic image forming process operation, by switching between enablement and disablement of the supply of the bias voltage, regardless of the contact/separation operation between the photosensitive drum 4 and the developing roller 6.

In this embodiment, the contact shutter 8511 as the electrode cover member is structured to cover the electrode portion 7527*b*, but the structure is not limited to such an example. For example, the contact shutter 8511 may move (retreat) the electrode portion 7527*b* in the normal direction of the electrode surface. That is, a retraction mechanism (retracting mechanism) capable of moving the electrode portion 7527*b* between a predetermined position in which the electrode portion 7527*b* is electrically connected to the contact 503 of the image forming apparatus main assembly 502 and a retracted position in which the electrode portion 7527*b* is retracted away and spaced from the contact 503. The contact shutter 8511 as a moving member is structured to be movable between the second position where the electrode portion 7527*b* is placed at the predetermined position and a first position where the electrode portion 7527*b* is placed at the retracted position. The structure for holding the contact shutter 8511 at the first position and the second position may be the same as in the above embodiment. Alternatively, the contact 503 as the body electrode portion and the electrode portion 7527*b* as the cartridge side electrode portion may be structured to be movable back and forth.

In addition, the structure for breaking the path of electrical connection is not limited to the structure of this embodiment described above. It is not limited to between the contacts of the image forming apparatus main assembly and the contacts of the cartridge, and a path breaking structure similarly to that of this embodiment may be provided in the middle of the electrical path inside the cartridge. Further, the retracting structure of the electrode portion described above is not limited to the structure in which the electrode portion on the cartridge side is movable back and forth, and the electrode portion of the image forming apparatus may be made movable back and forth, or both of them are made movable back and for the.

Embodiment 8

Referring to FIGS. 50 to 54, a process cartridge and an image forming apparatus according to an Embodiment 8 of the present disclosure will be described. The process cartridge of this embodiment is the same as that of the Embodiment 1, and only the structure of the regulating member and the peripheries thereof are different. Therefore, the members having the same functions and structures are assigned by the same reference numerals, and detailed description thereof is omitted.

[Structure of Regulating Member]

Figure 50:
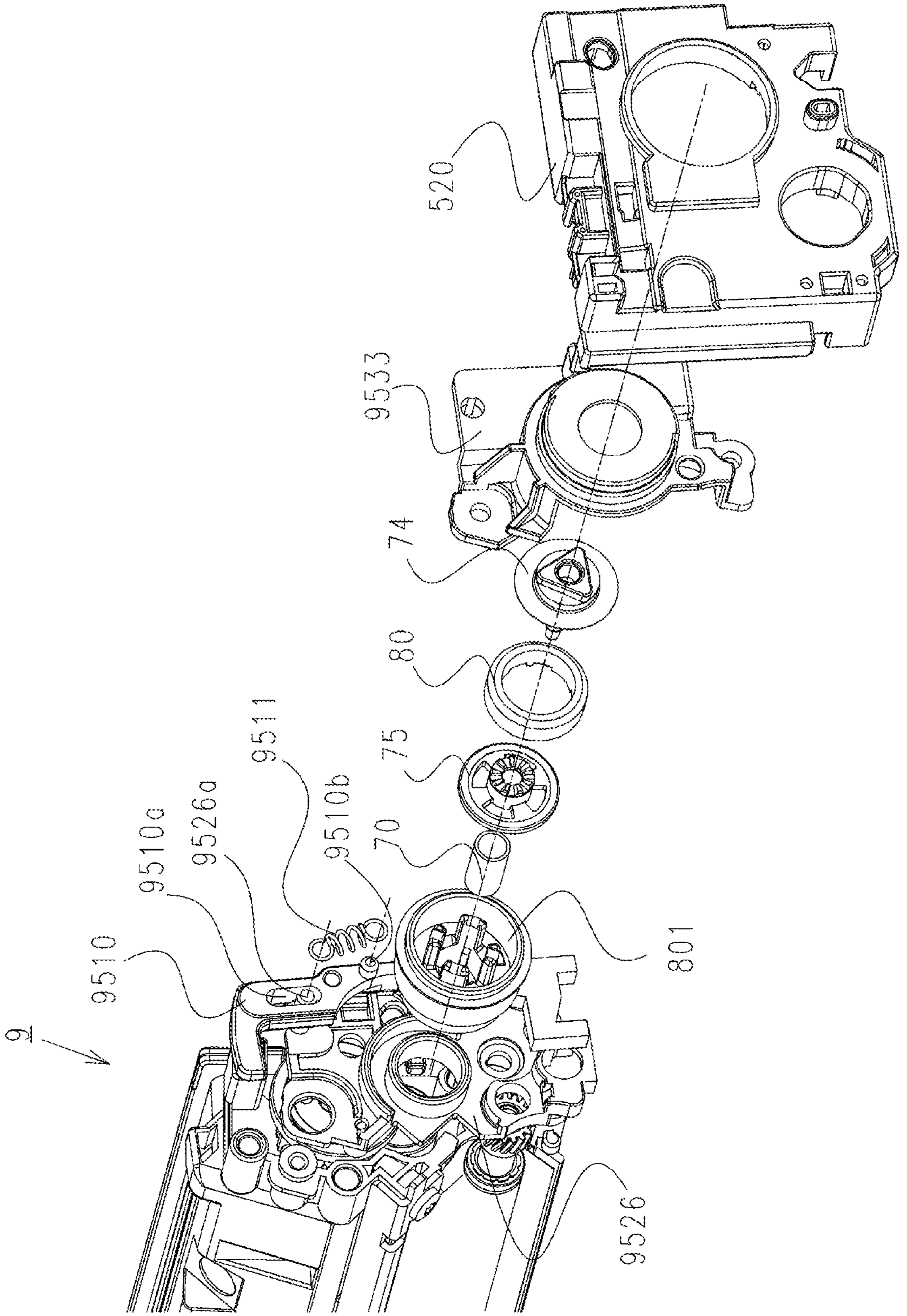
FIG. 50 is an exploded view of the process cartridge, in the Embodiment 8.
Figure 51:
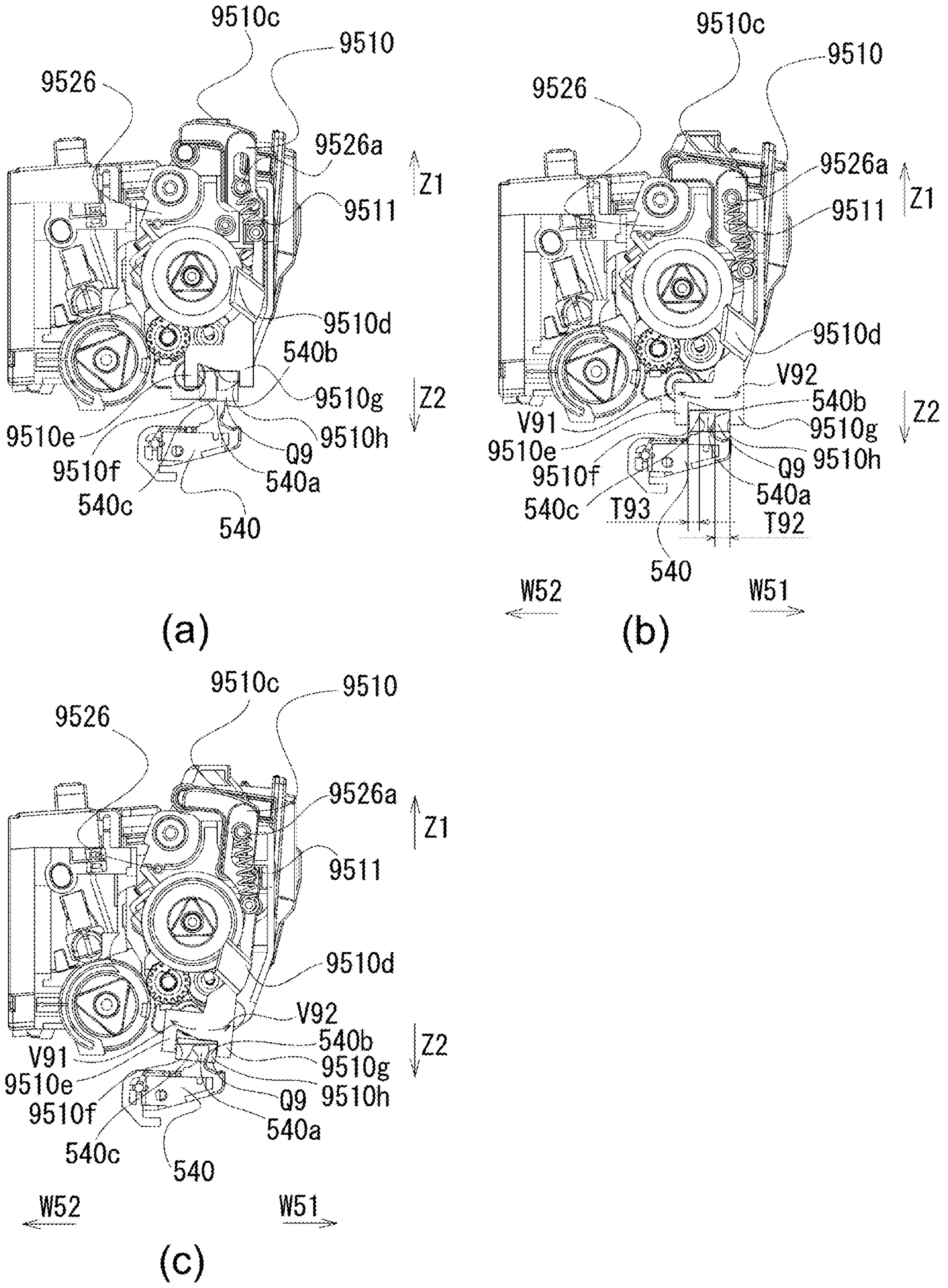
FIG. 51 is an illustration of the operation of the regulating member in the Embodiment 8.

FIG. 50 is a perspective view of the process cartridge P as viewed from the drive side. Part (a) of FIG. 51 is a side view of the process cartridge with the front door 111 open. Part (b) of FIG. 51 shows a state in which the regulating member 9510 is at a first position and the drive control member 540 is at a home position. Part (c) of FIG. 51 shows a state where the regulating member 9510 is at a second position and the drive control member 540 is at the home position. For the sake of better illustration, the drive side cartridge cover 9520 and the developing device cover member 9533 are omitted. Further, the drive connecting and disconnecting operations of the development coupling member 74 and the rotatable member 75, and the operation of the drive control member 540 are the same as those in the Embodiment 1, and therefore, the description thereof are omitted.

As shown in FIG. 50, the regulating member 9510 is provided with a supported hole 9510*a* fitted in a support portion 9526*a* of the drive side bearing 9526, and can swing around the support portion 9526*a*. In addition, the tension spring 9511 is fitted into the support portion 9526*a* of the drive side bearing 9526 and the support portion 9510*b* of the regulating member 9510. As shown in FIG. 51, the tension spring 9511 urges the regulating member 9510 in the Z1 direction in part (a) of FIG. 51. The regulating member 9510 is provided with feet 9510*e* and 9510*g* which can project from the developing unit 9 in the Z2 direction. The foot portion 9510*e* is provided with a first force receiving portion (insertion force receiving portion) 9510*f* which receives a force from the drive control member 540, and the foot portion 9510*g* is provided with a second force receiving portion (retraction force receiving portion) 9510*h* which receives a force from the drive control member 540.

By closing the front door 111, the cartridge pressing member (not shown) in the apparatus main assembly lowers in the Z2 direction in part (b) of FIG. 51 to press a pressed portion 9510*c*, so that the regulating member 9510 moves in the Z2 direction. Then, the control portion 540*a* of the drive control member 540 enters a space Q9 interposed between the first force receiving portion 9510*f* and the second force receiving portion 9510*h*. At this time, there is a gap T93 between the first force receiving portion 9510*f* of the foot portion 9510*e* and the second force applying surface 540*c*, and a gap T92 between the second force receiving portion 9510*f* of the foot portion 9510*g* and the first force applying surface 540*b*. In addition, the regulating lever portion 9510*d* is placed at a position where the development coupling member 74 and the sliding member 80 do not contact with each other. The position of this regulating member 9510 is referred to as the first position. At this time, the driving connection state is maintained while the regulating member 9510 is maintained at the first position.

When the drive control member 540 moves in the W52 direction, the second force applying surface 540*c* contacts the first force receiving portion 9510*f* of the regulating member 9510, and the regulating member 9510 rotates in a direction of an arrow V91 in part (b) of FIG. 51. Then, the regulating lever portion 9510*d* of the regulating member 9510 is placed at a position which is between the surface 74*b* of the development coupling member 74 and the surface 80*b* of the sliding member 80. The position of this regulating member 9510 is referred to as the second position. Therefore, the drive connection is maintained in the interrupted state.

When the drive control member 540 moves in the W51 direction, the first force applying surface 540*b* abuts to the second force receiving portion 9510*h* of the regulating member 9510, and the regulating member 9510 rotates in a direction of an arrow V92 in part (b) of FIG. 51. Then, the regulating lever portion 9510*d* is separated from the development coupling member 74 and the sliding member 80, and the drive connection is established.

As described above, by using the structure of this embodiment, it is possible to switch between the second position and the first position of the regulating member 9510 by moving the drive control member 540, thereby switching the drive connection state. By this, it is possible to switch the drive connection state, regardless of the contact/separation operation between the photosensitive drum 4 and the developing roller 6.

[Layout Details—Part 1]

Figure 52:
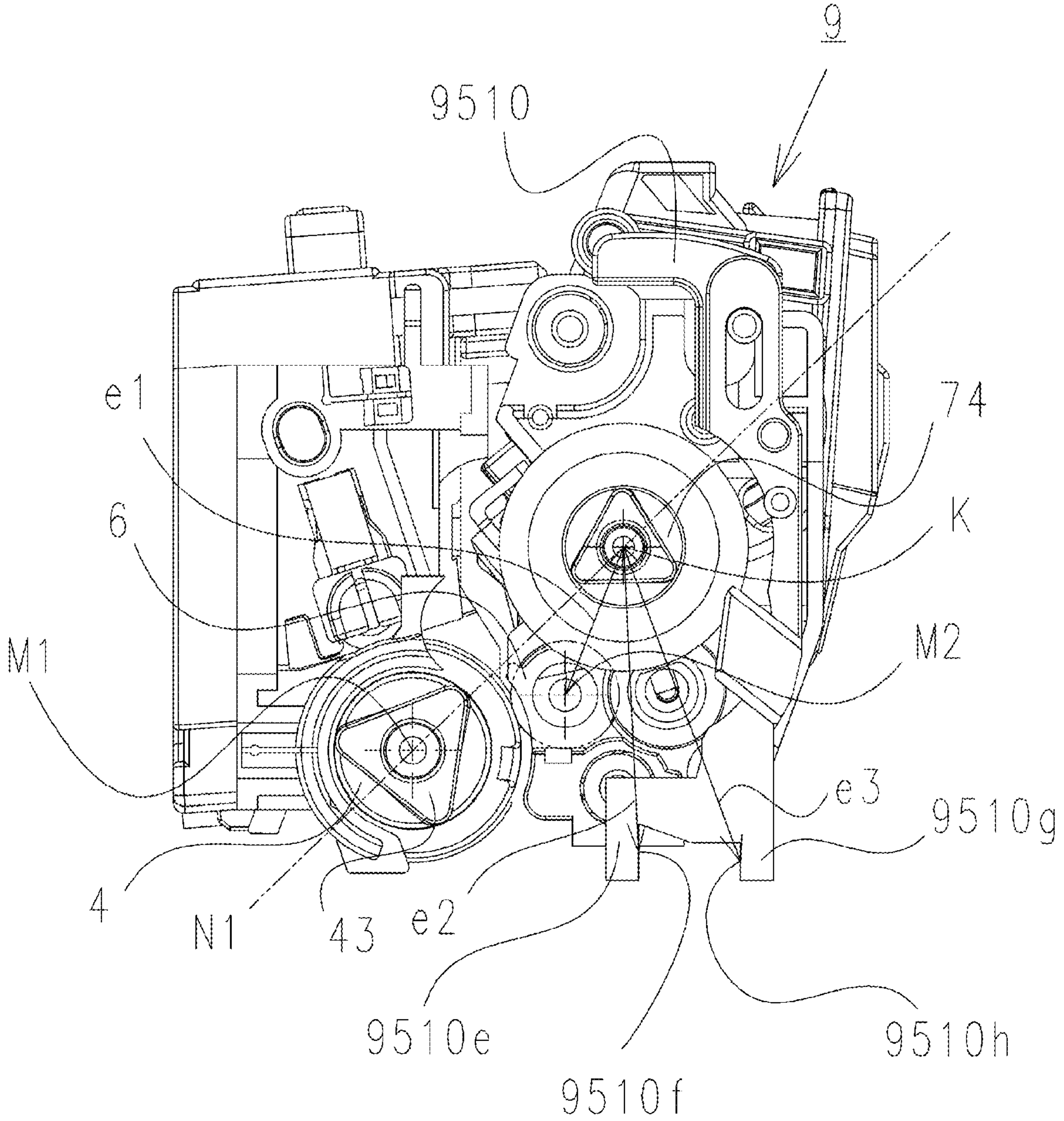
FIG. 52 is a side view of a process cartridge according to Embodiment 8.

Referring to Figure, arrangement of the regulating member 9510 will be described in detail. FIG. 52 is a view of the process cartridge P as viewed from the drive side in the direction of the rotational axis of the photosensitive drum 4. The regulating member 9510 is placed at the first position. For the sake of better illustration, the drive side cartridge cover 9520 and the developing device cover member 9533 are omitted.

As shown in FIG. 52, a rotation axis (rotation center) of the photosensitive drum 4 is M1, a rotation axis (rotation center) of the developing roller 6 is M2, and a line connecting the rotation axis M1 of the photosensitive drum 4 and the rotation axis of the development coupling member 74 (rotation center) K is a line N1. In this embodiment, the rotation axis of the photosensitive member coupling member 43 is coaxial with the rotation axis M1. When the area is divided by the line N1, the rotation axis M2 of the developing roller 6, the first force receiving portion 9510*f*, and the second force receiving portion 9510*h* are arranged in the same area divided by the line N1. Further, a distance between the rotation axis K of the development coupling member 74 and the rotation axis M2 of the developing roller 6 is e1, a distance between the rotation axis K of the development coupling member 74 and the first force receiving portion 9510*f* is e2, and a distance between the rotation axis K and the second force receiving portion 9510*h* is e3. In this case, the first force receiving portion 9510*f* and the second force receiving portion 9510*h* are arranged such that the distances e2 and e3 are greater than the distance e1. By arranging the first force receiving portion 9510*f* and the second force receiving portion 9510*h* in this manner, the force required to move the regulating member 9510 to the first position and the second position can be reduced.

[Layout Details—Part 2]

Figure 53:
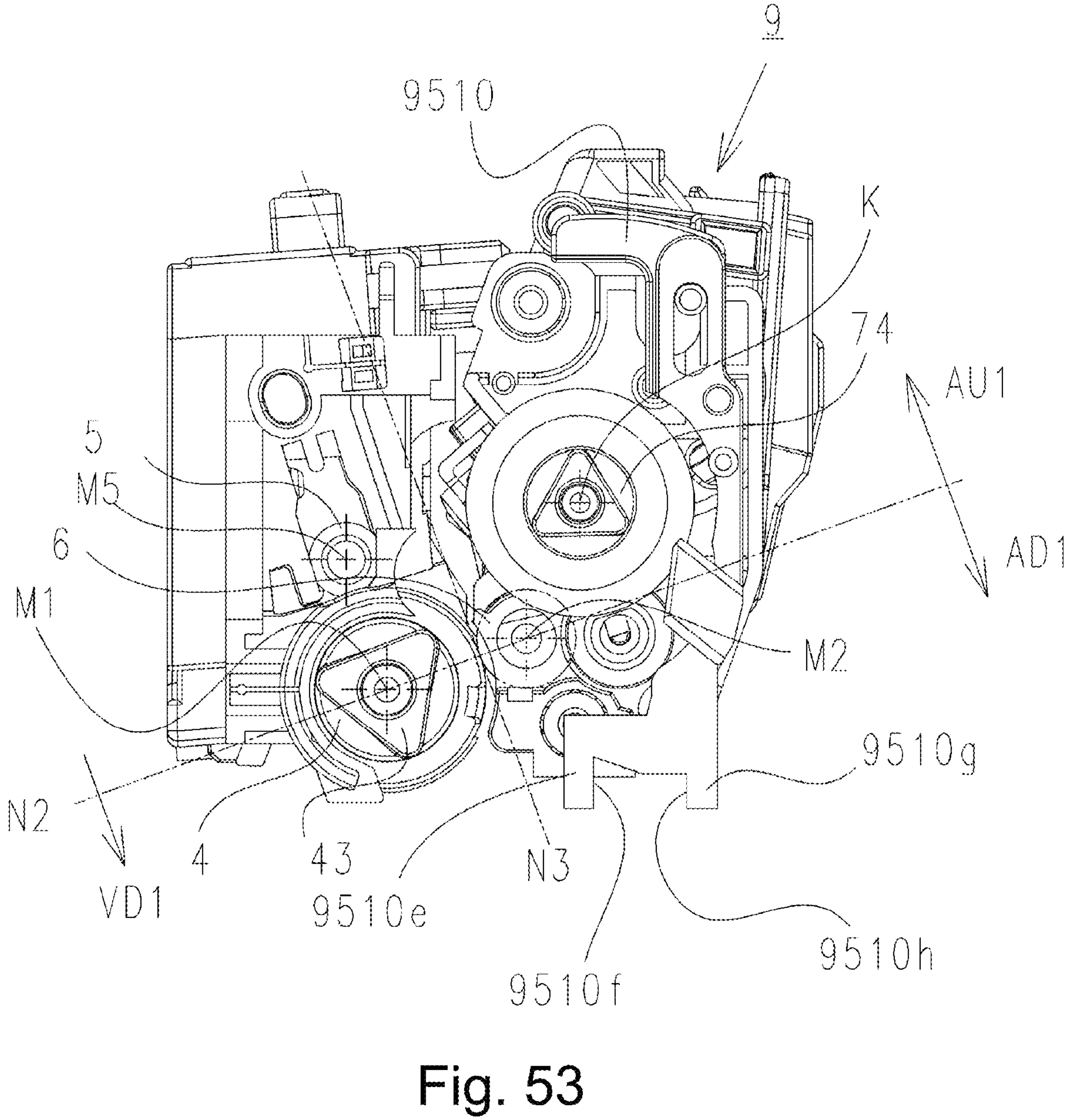
FIG. 53 is a side view of the process cartridge according to Embodiment 8.

Referring to Figure, arrangement of the regulating member 9510 will be described in detail. FIG. 53 is a view of the process cartridge P as viewed from the drive side in the direction of the rotational axis M1 of the photosensitive drum 4 or the rotational axis M2 of the developing roller. The regulating member 9510 is placed at the first position. For the sake of better illustration, the drive side cartridge cover 9520 and the developing device cover member 9533 are omitted.

As shown in FIG. 53, an imaginary straight line connecting the rotation axis M1 of the photosensitive drum 4 and the rotation axis M2 of the developing roller 6 is an imaginary line N2. When the areas is divided by the imaginary line N2 (the upper area is an area AU1 and the lower area is an area AD1), at least portion of the first force receiving portion 9510*f* and the second force receiving portion 9510*h* is placed in an area AD1 opposite to an area where the rotational axis K of the development coupling member 74 is provided. As described in the Embodiment 1, a driving member for driving the member provided in the developing unit 9 is arranged in the area AU1. Therefore, arranging at least portion of the first force receiving portion 9510*f* and the second force receiving portion 9510*h* in the area AD1 rather than the area AU1 accomplishes an efficient layout which avoids interference between members. This leads to downsizing of the process cartridge P and the main assembly 502 of the image forming apparatus.

In addition, a line perpendicular to the imaginary line N2 and passing through the point of contact between the developing roller 6 and the photosensitive drum 4 (the gap between the developing roller 6 and the photosensitive drum 4 in a structure in which the developing roller 6 and the photosensitive drum 4 are not in contact with each other) is an imaginary line N3. When the area is divided by the imaginary line N3, at least portion of the first force receiving portion 9510*f* and the second force receiving portion 9510*h* are arranged in the area opposite to the area where the rotational axis M1 of the photosensitive drum 4 is provided. In the above description, the area AU1 and the area AD1 are the area in which the rotation axis K or the development coupling member 74 is provided and the area in which the rotation axis K or the development coupling member 74 is not provided, when the boundary is divided by the imaginary line N2, as viewed in the direction of the rotation axis M2. However, when the area is divided by the imaginary line N2 as viewed in the direction of the rotation axis M2 the area AU1 and the area AD1 may be defined as the area where the charging roller 5 or the rotation axis M5 of the charging roller 5 is provided and the area where it is not provided, respectively, as another definition.

As a further definition when the area is divided by the imaginary line N2 as viewed in the direction of the rotation axis M2, the area AU1 and the area AD1 may be defined as the area where the development blade 30, the proximity point 30*d* (see FIG. 54), or the rotation axis M7 (see FIG. 54) of the stirring member 31 is provided and the area where it is not provided, respectively. The proximity point 30*d* is the position where the development blade 30 is closest to the surface of the developing roller 6. In a general electrophotographic cartridge, particularly in a process cartridge used with an in-line layout image forming apparatus, other members of the process cartridge are unlikely provided in the area AD1. In addition, when the first force receiving portion 9510*f* and the second force receiving portion 9510*h* are arranged in the area AD1, the image forming apparatus main assembly 502 also has the following advantages. That is, the drive control member 540 of the image forming apparatus main assembly 502 is disposed in the lower part of the process cartridge P, and is moved substantially horizontally (in this embodiment, the W51 and W52 directions, which are the directions in which the photosensitive drums 4 or the process cartridges P are arranged) to press the first force receiving portion 9510*f* and the second force receiving portion 9510*h*. With such a structure, the drive control member 540 and its drive mechanism can be made relatively simple or compact. This is particularly remarkable in the in-line layout image forming apparatus. Thus, the arrangement of the first force receiving portion 9510*f* and the second force receiving portion 9510*h* in the area AD1 can be expected to contribute to downsizing and cost reduction of the image forming apparatus main assembly 502.

As described above, the arrangement of the first force receiving portion 9510*f* and the second force receiving portion 9510*h* has been described with reference to FIG. 53, it is apparent from other Figures that the relationship is the same. When the direction perpendicular to the imaginary line N2 is a VD1 direction, the first force receiving portion 9510*f* and the second force receiving portion 9510*h* are arranged at positions projecting from the developing unit 9 at least in the VD1 direction. Therefore, the first force receiving portion 9510*f* and the second force receiving portion 9510*h* can be arranged such that the first force applying surface 540*b* of the drive control member 540 can contact the second force receiving portion 9510*h*, and the second force applying surface 540*c* can contact the first force receiving portion 9510*f*.

Further, the diameter of the developing roller 6 of this structure is smaller than the diameter of the photosensitive drum 4. By arranging the first force receiving portion 9510*f* and the second force receiving portion 9510*h* in this manner, a drive transmission portion (not shown) including a gear train and the like for transmitting the driving force from the development coupling member 74 to the developing roller can be arranged avoiding interference with the photosensitive drum 4 in a space-saving manner. By this, the process cartridge P can be downsized.

[Layout Details—Part 3]

Figure 54:
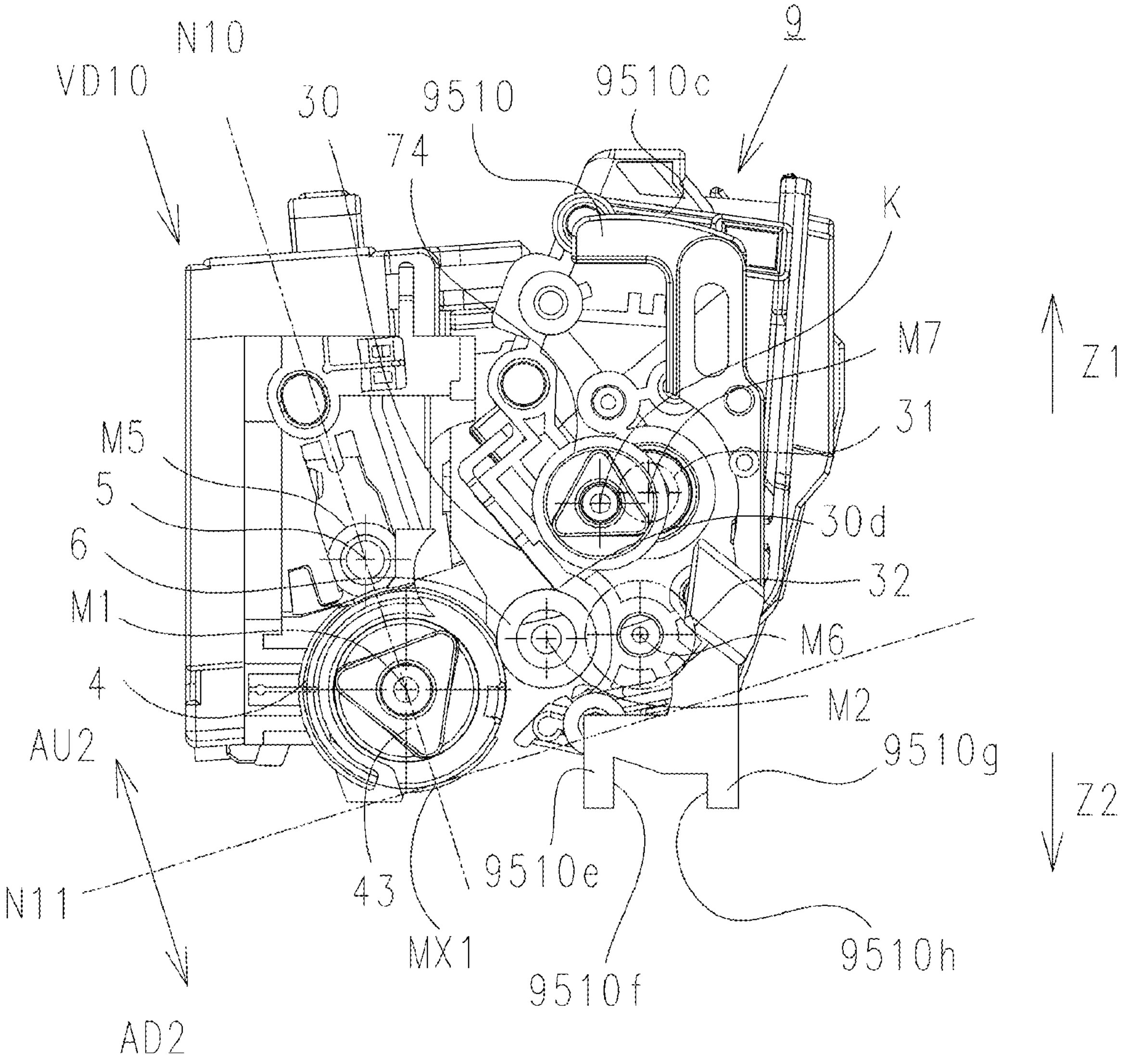
FIG. 54 is a side view of a process cartridge according to Embodiment 8.

Referring to FIG. 54, a concept similar to the above-described concept of disposing at least a part of each of the first force receiving portion 9510*f* and the second force receiving portion 9510*h* in the area AD1 will be described. FIG. 54 is a view of the process cartridge P as viewed from the drive side in a direction along the rotation axis M1, the rotation axis K, or the rotation axis M2 of the developing unit 9. The arrangement of the regulating member 9510 described in the following substantially commonly applies both to the first position and the second position, so only the first position will be described, and the description as to the second position will be omitted. A rotation axis of a toner supply roller (developer supply member) 32 is a rotation axis (rotation center) M6. Further, the process cartridge P includes a stirring member 31 which rotates and stirs the developer contained in the developing unit 9, and the rotation axis of the stirring member 31 is a rotation axis (rotation center) M7.

An imaginary line connecting the rotation axis M1 of the photosensitive drum 4 and the rotation axis M5 of the charging roller 5 as the charging member is imaginary line N10. Of the intersections between the imaginary line N10 and the surface of the photosensitive drum 4, the intersection more remote from the rotation axis M5 is an intersection MX1. An imaginary tangent line of the surface of the photosensitive drum 4 passing through the intersection MX1 is a tangent (predetermined tangent) N11. The area is divided by the tangent line N11, in which, a resulting area AU2 includes the rotation axis M1, the charging roller 5, the rotation axis M5, the development coupling member 74, the rotation axis K, the development blade 30, the proximity point 30*d*, the toner supply roller 32, the rotation axis M6, and the stirring member 31, the rotation axis M7, or the pressed portion 9510*c*, and a resulting area AD2 (predetermined area) does not include it. Also, the areas AU2 and AD2 may be defined in another way as follows. That is, a direction VD10 is a direction parallel to and directed in the same orientation as the direction from the rotation axis M5 to the rotation axis M1, the most downstream portion of the photosensitive drum 4 with respect to the direction VD10 is the intersection MX1. Then, with respect to the direction VD10, the area on the upstream side of the most downstream portion MX1 is an area AU2, and the area on the downstream side thereof is an area (predetermined area) AD2. The areas AU2 and AD2 defined in either way are the same.

At least a part of the first force receiving portion 9510*f* and the second force receiving portion 9510*h* is arranged in the area AD2. The arrangement in which at least a part of each of the first force receiving portion 9510*f* and the second force receiving portion 9510*h* in the area AD2 in this manner contributes to downsizing and cost reduction of the process cartridge P and the image forming apparatus main assembly 502. This is for the same reason as when at least portion of each of the first force receiving portion 9510*f* and the second force receiving portion 9510*h* is arranged in the area AD1. In addition, the regulating member 9510, the first force receiving portion 9510*f* and the second force receiving portion 9510*h* are displaced at least in the VD10 direction by movement in the Z1 and Z2 directions. By such a displacement in the VD10 direction it is possible to avoid interference of, the regulating member 9510, the first force receiving portion 9510*f*, and the second force receiving portion 9510*h* with the drive control member 540, when the process cartridge P is inserted into or removed from the image forming apparatus main assembly 502.

When a direction perpendicular to the tangent line N11 is VD10 direction, the first force receiving portion 9510*f* and the second force receiving portion 9510*h* are placed at a position projected from the developing unit 9 at least in the VD10 direction when the regulating member 9510 is at the first position. Therefore, the first force receiving portion 9510*f* and the second force receiving portion 9510*h* can be arranged such that the first force applying surface 540*b* of the drive control member 540 can contact the second force receiving portion 9510*h*, and the second force applying surface 540*c* can contact the first force receiving portion 9510*f*. The positional relationship of each force receiving portion described above is the same in all the embodiments described below.

Embodiment 9

Referring to FIGS. 55 to 58, the process cartridge and the image forming apparatus according to Embodiment 9 of the present disclosure will be described. The process cartridge of this embodiment is the same as that of the Embodiment 1, and only the structure of the regulating member and its periphery is different. Accordingly, the members having the same functions and structures are denoted by the same reference numerals, and the detailed description thereof is omitted.

[Structure of Regulating Member]

Figure 55:
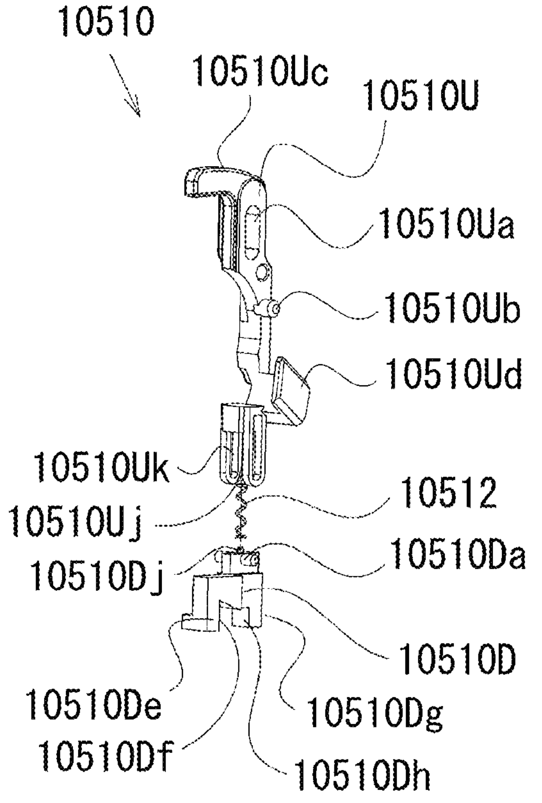
FIG. 55 is an exploded view of a regulating member in the Embodiment 9.
Figure 55:
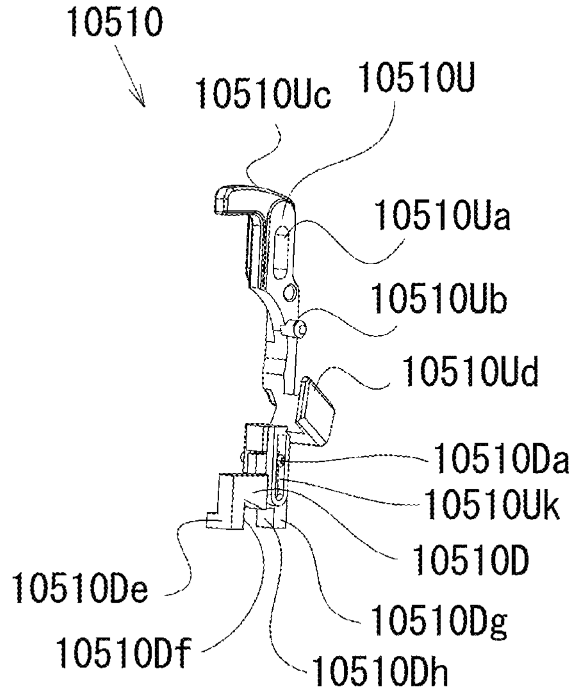
Figure 56:
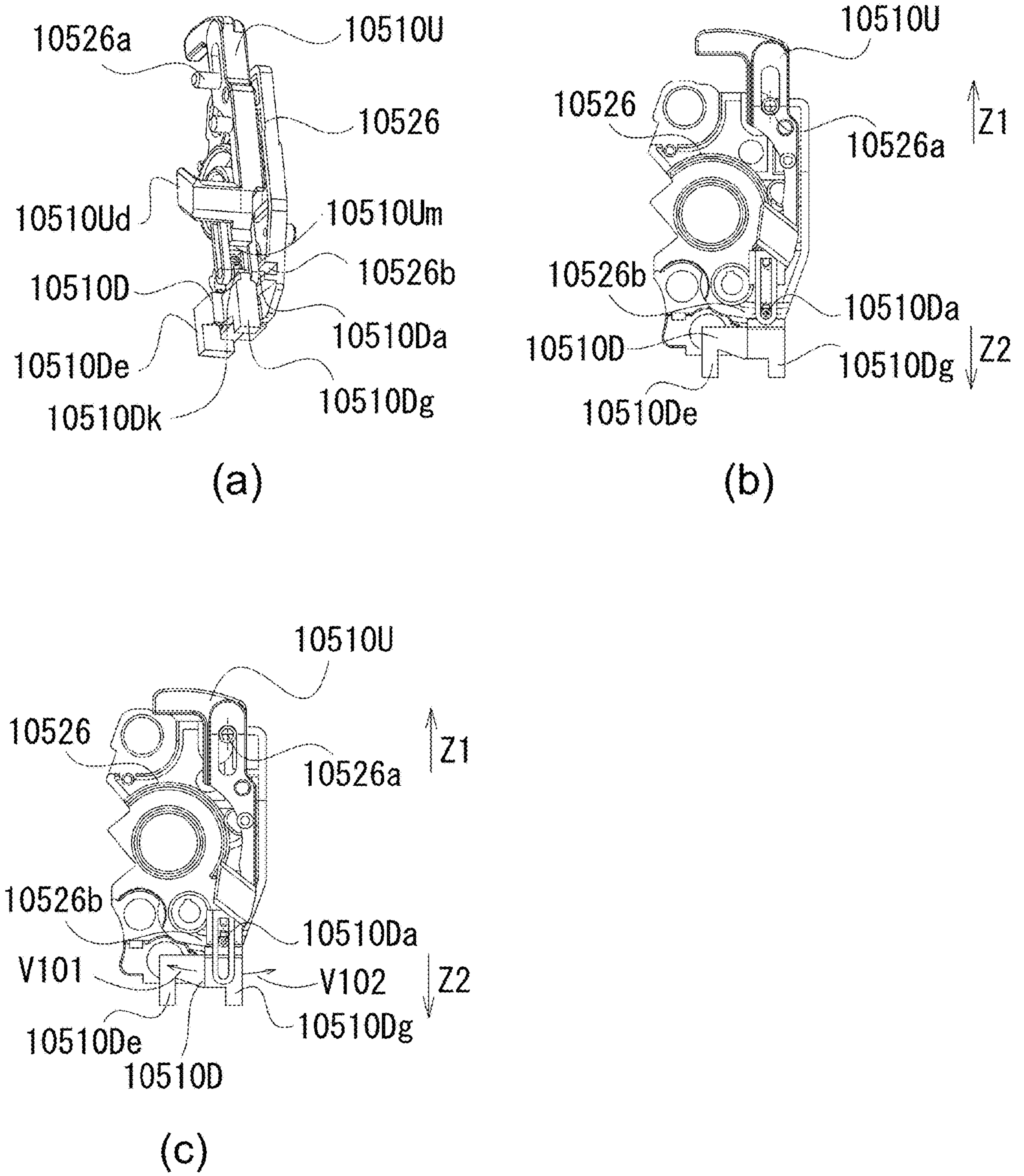
FIG. 56 is an illustration showing the operation of the regulating member in the Embodiment 9.

FIG. 55 is illustrations for illustrating the disassembly and assembly of the regulating member 10510. Part (a) of FIG. 56 is a perspective view of only the regulating member 10510 and the drive side bearing 10526. FIG. 56(*b*) is a side view of only the regulating member 10510 and the drive side bearing 10526. FIG. 56(*c*) is a side view of a state in which only the regulating member 10510 and the drive side bearing 10526 are pressed by the cartridge pressing member.

In the Embodiment 9, the regulating member 10510 in the Embodiment 8 is divided into two and connected with each other. Specifically, as shown in FIG. 55, the regulating member 10510 is divided into an upper regulating member 10510U and a lower regulating member 10510D. A shaft 10510Da is provided on the lower regulating member 10510D. In addition, as shown in part (a) of FIG. 56, the lower regulating member 10510D is provided with feet 10510De and 10510g which can project from the developing unit in the Z2 direction. A first force receiving portion (insertion force receiving portion) 10510Df is provided on the foot portion 10510De, and a second force receiving portion (retraction force receiving portion) 10510Dh is provided on the foot portion 10510Dg, and they receive forces from the drive control member 540. The upper regulating member 10510U has an opening 10510Uj on the surface facing the lower regulating member 10510D.

Oblong holes 10510Uk constituting a pair are provided across the opening 10510Uj. A spring holding portion 10510Dj is provided on the lower regulating member 10510D. One end of the compression spring 10512 is fitted to the spring holding portion 0510Dj, the other end is inserted from the opening 10510Uj, and supported by the holding portion (not shown) behind it, and then each shaft is fitted into each oblong hole 10510Uk. At that time, the regulating member 10510 is preferably made of a plastic material because it is assembled while widening the opening 10510Uj. When using a hard material, the shaft 10510Da may be a separate member. For example, a parallel pin may be used as the shaft 10510Da and assembled by press-fitting.

The upper regulating member 10510U and the lower regulating member 10510D are connected by an oblong hole 10510Uk and a pair of shafts 10510Da, and the upper regulating member 10510U is urged away from the lower regulating member 10510D by a compression spring 10512. Furthermore, the lower regulating member 10510D is rotatable about the shaft 10510Da relative to the upper regulating member 10510U. In addition, it is structured to be movable in the direction along the oblong hole 10510Uk relative to the upper regulating member 10510U. The connecting portion which connects upper regulating member 10510U and lower regulating member 10510D structured as described above can take a first state in which elastic deformation is permitted and a second state in which elastic deformation is restricted. The details will be described hereinafter.

[Description of Operation of Regulating Member]

Referring to part (a) of FIGS. 56 to (c), the operation of the regulating member 10510 will be described. As described in the Embodiment 8, after the process cartridge P is completely inserted into the image forming apparatus main assembly 502, the regulating member 10510 is pressed by the cartridge pressing member (not shown) in interrelation with the operation of closing the front door 111. Part (a) of FIG. 56 and part (b) of FIG. 56 show a state in which the regulating member 10510 is not pushed by the cartridge pressing member (free state), and part (c) of FIG. 56 shows a state in which the regulating member 10510 is pushed by the cartridge pressing member (locked state).

As shown in part (a) of FIG. 56, the lower regulating member 10510D is provided with an arc-shaped guide groove 10526*b* centered on a support portion 10526*a* provided in the drive side bearing 10526, into which the shaft 10510Da is fitted. As described above, the lower regulating member 10510D is swingable about the support portion 10526*a* relative to the upper regulating member 10510U. In addition, the upper regulating member 10510U swingable around the support portion 10526*a* of the drive side bearing 10526 and movable in the Z1 and Z2 directions.

As shown in part (b) of FIG. 56, with the above-described structure, when the regulating member 10510 is not pushed by the cartridge pressing member (free state), the lower regulating member 10510D is rotatable about the shaft 10510Da. Therefore, even if the lower regulating member 10510D receives force from the drive control member 540 and rotates, the force is not transmitted to the upper regulating member 10510U.

Referring to part (c) of FIG. 56, the operation in the state (locked state) in which the regulating member 10510 is pushed by the cartridge pressing member will be described. The upper regulating member 10510U moves in the Z2 direction against the urging force of the spring 10512, by being pushed down by the cartridge pressing member. As shown in part (a) of FIG. 56, the engaging portion (square shaft portion) 10510Dk fits into the engaged portion (square hole portion) 10510Um, so that the upper regulating member 10510U and the lower regulating member 10510D are integrated. That is, the swinging motion of the lower regulating member 10510D about the shaft 10510Da with respect to the upper regulating member 10510U is restricted. In this state, the integrated regulating member 10510 can swing about the support portion 10526*a* as the center of rotation, while the shaft 10510Da moves in the arc-shaped guide groove 10526*b* shown in part (a) of FIG. 56. Therefore, in the state of being pushed in the Z2 direction by the cartridge pressing member, the regulating member 10510 can move in the same manner as the regulating member 9510 in the Embodiment 8.

[Mounting of Process Cartridge to Main Assembly of Image Forming Apparatus]

Figure 57:
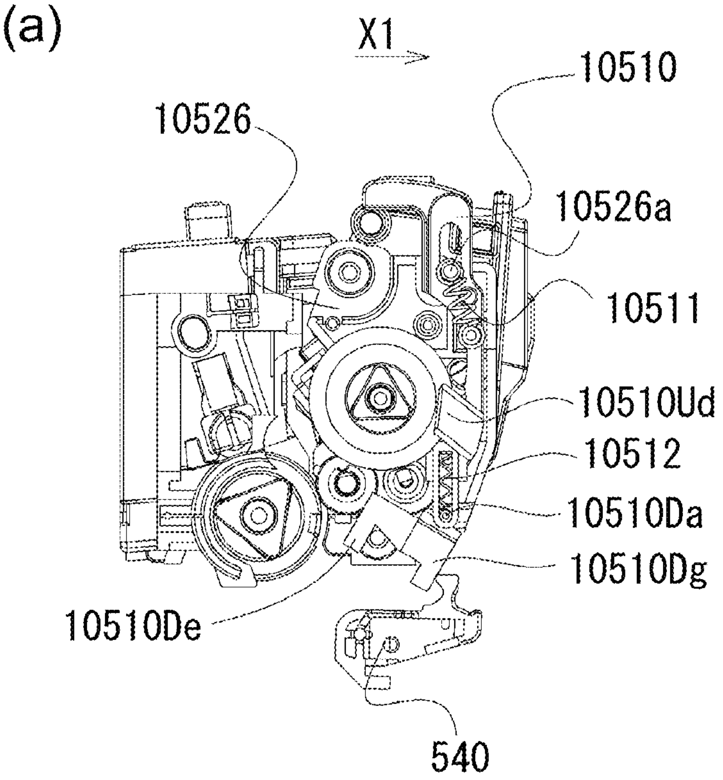
FIG. 57 is an illustration of explaining the operation of the regulating member in the Embodiment 9.
Figure 57:
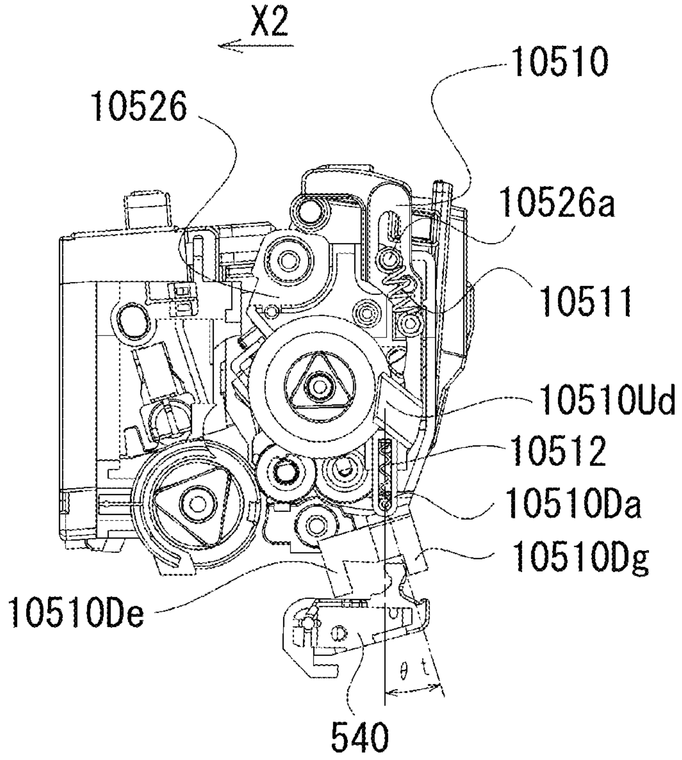

Referring to part (a) of FIG. 57 and part (b) of FIG. 57, the operation of the regulating member 10510 when the process cartridge is inserted in the Embodiment 9 will be described. part (a) of FIG. 57 shows a state in which the process cartridge P is in the process of being inserted into the image forming apparatus main assembly 502. FIG. 57(*b*) shows a state in which the process cartridge P is in the process of being dismounted from the image forming apparatus main assembly 502. For the sake of better illustration, the drive side cartridge cover 9520 and the developing device cover member 9533 are omitted. As described above, when the upper regulating member 10510U is not pushed by the cartridge pressing member (free state), the lower regulating member 10510D is rotatable about the shaft 10510Da. In this embodiment, the lower regulating member 10510D is at the same position as the first position of the regulating member 9510 (see part (b) of FIG. 51) in the Embodiment 8. Therefore, as in the Embodiment 8, when the process cartridge P mounted on the tray 110 (not shown) is inserted into the image forming apparatus main assembly 502 in the direction of the arrow X1, the drive control member 540 interferes with the lower regulating member 10510D. However, because of the above structure, as shown in part (a) of FIG. 57, it is avoidable that the lower regulating member 10510D rotates about the shaft 10510Da, and the drive control member 540 and the lower regulating member 10510D interfere with each other, and the cartridge is unable to be inserted into the image forming apparatus main assembly.

Next, when the process cartridge P is inserted into the image forming apparatus main assembly 502 and the front door 111 is closed, the upper regulating member 10510U is pushed down in the Z2 direction by the cartridge pressing member as described above. Then, the engaging portion (square shaft portion) 10510Dk shown in part (a) of FIG. 56 fits into the engaged portion (square hole portion) 10510Um. That is, the upper regulating member 10510U and the lower regulating member 10510D are integrated and perform substantially the same function as the regulating member 9510 of the Embodiment 8.

[Dismounting Process Cartridge from Main Assembly Image Forming Apparatus]

On the contrary, as shown in part (b) of FIG. 57, also when the process cartridge P is removed from the image forming apparatus main assembly 502 (X2 direction), the drive control member 540 interferes with the lower regulating member 10510D. However, since the lower regulating member 10510D is in a free state as described above, it is not integrated with the upper regulating member 10510U and thus rotates about the shaft 10510Da. Therefore, it is possible to prevent the drive control member 540 and the lower regulating member 10510D from interfering with each other and being unable to be removed from the image forming apparatus main assembly 502. In this embodiment, a process cartridge usable with a color image forming apparatus is described. Therefore, there are four process cartridges and four drive control members. Therefore, depending on the station, the operation shown in FIG. 57 is repeated four times at the maximum.

The structure is such that the lower regulating member 10510D returns from the position shown in part (b) of FIG. 57 to the neutral position shown in part (b) of FIG. 56 (the position where the angle formed between the upper regulating member 10510U and the lower regulating member 10510D is θt=0°.

[Operation of Restricting Member for Drive Connection/Disconnection]

Figure 58:
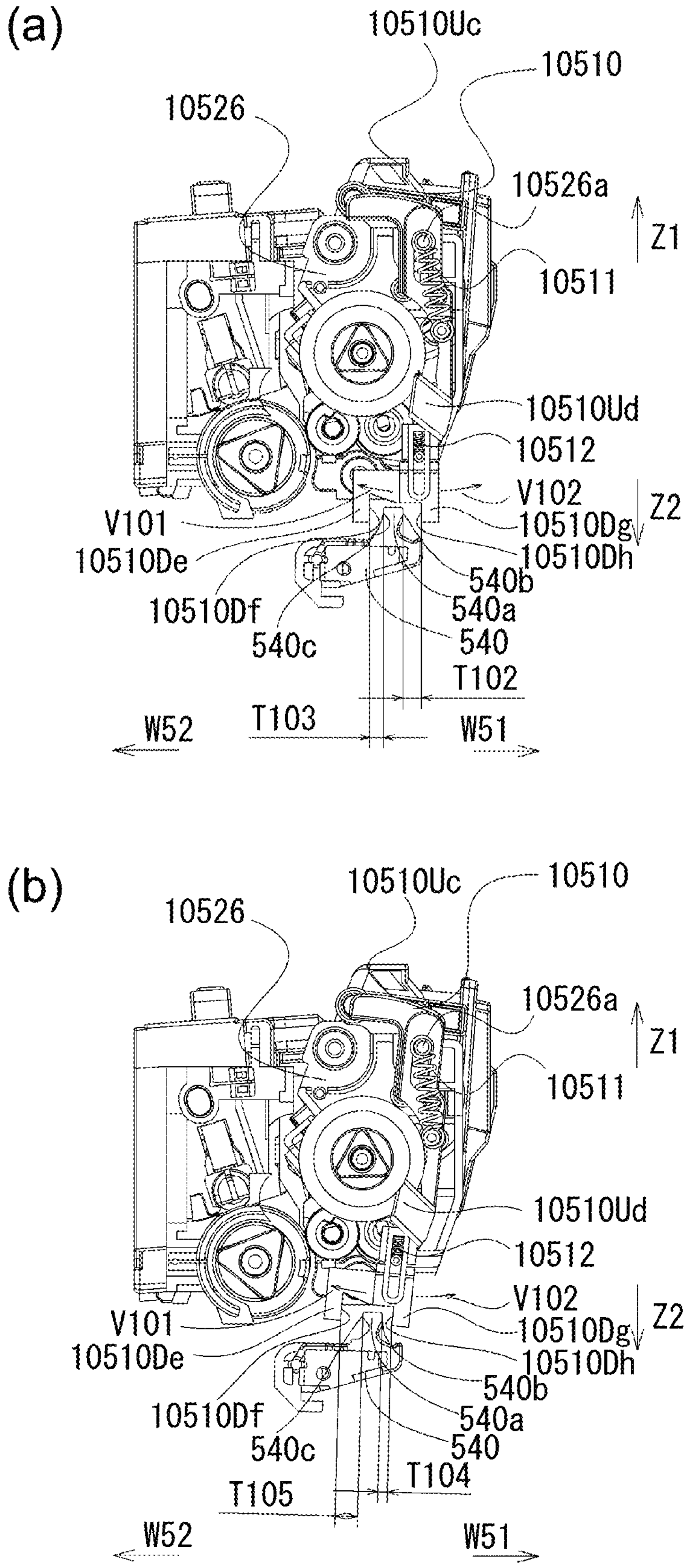
FIG. 58 is an illustration of operation of the regulating member in the Embodiment 9.

Referring to FIG. 58, the operation of the regulating member 10510 at the time of drive connection and disconnection will be described. Part (a) of FIG. 58 shows a state in which the regulating member 10510 is at the first position and the drive control member 540 is at the home position. Part (b) of FIG. 58 shows a state in which the regulating member 10510 is at the second position and the drive control member 540 is at the home position. For the sake of better illustration, the drive side cartridge cover 9520 and the developing device cover member 9533 are omitted. Further, the drive connection operation and drive disconnection operation of the development coupling member 74 and the rotatable member 75, and the operation of the drive control member 540 are the same as those in the Embodiment 1, and therefore the description thereof is omitted. As described above, when the process cartridge P is inserted into the image forming apparatus main assembly 502 and the front door 111 is closed, the upper regulating member 10510U is pushed down in the Z2 direction by the cartridge pressing member. Then, the upper regulating member 10510U and the lower regulating member 10510D are integrated.

At this time, there is a gap T103 between the first force receiving portion 10510Df of the foot portion 10510De and the second force applying surface 540*c*, and there is a gap T102 between the second force receiving portion 10510Dh of the foot portion 10510Dg and the first force applying surface 540*b*. In addition, the regulating lever portion 10510Ud as a moving portion is placed at a position where the development coupling member 74 and the sliding member 80 do not contact each other. The position of this regulating member 10510 is referred to as the first position. At this time, the driving connection state is maintained while the regulating member 10510 is maintained at the first position.

Further, when the drive control member 540 moves in the W52 direction, the second force applying surface 540*c* abuts to the first force receiving portion 10510Df of the lower regulating member 10510D, and the regulating member 10510 rotates about the support portion 10526*a* in part (a) of FIG. 58 in the direction of arrow V101. Then, the regulating lever portion 10510Ud of the upper regulating member 10510U becomes positioned between the surface 74*b* of the development coupling member 74 and the surface 80*b* of the sliding member 80. Therefore, the drive disconnection is maintained. The position of this regulating member 10510 is referred to as a second position. At this time, as to the lower regulating member 10510D, the gap T104 exists between the first force receiving portion 10510Df and the second force applying surface 540*c*, and the gap T105 exists between the second force receiving portion 10510Dh of the foot portion 10510Dg and the first force applying surface 540*b*. When the drive control member 540 moves in the W51 direction, the first force applying surface 540*b* is brought into contact with the second force receiving portion 10510Dh of the lower regulating member 10510D, and the regulating member 10510 rotates in the arrow V102 direction in part (b) of FIG. 58 around the support portion 10526*a*. Then, the regulating lever portion 10510Ud is separated from the development coupling member 74 and the sliding member 80, and the drive connection is established.

According to the structure of this embodiment described above, the same effect as in the Embodiment 8 can be obtained. In this embodiment, the lower regulating member 10510D including the first force receiving portion 10510Df and the second force receiving portion 10510Dh is made movable with respect to the upper regulating member 10510U and other portions of the process cartridge P. In this embodiment, the movement causes the first force receiving portion 10510Df and the second force receiving portion 10510Dh to be displaced in the Z2 direction, thereby moving at least in the direction VD1 (FIG. 53 and so on) and the direction VD10 (FIG. 54 and so on). The lower regulating member 10510D can switch between a state in which it can move independently (free state) and a state in which it is fixed to the upper regulating member 10510U (locked state), depending on the position of the upper regulating member 10510U. Accordingly, when the process cartridge P is inserted into or dismounted from the image forming apparatus main assembly 502, it is avoidable that the lower regulating member 10510D interferes with the image forming apparatus main assembly 502, especially the drive control member 540, resulting in incapability of mounting and dismounting of the process cartridge.

Embodiment 10

Referring to FIGS. 59 to 63, Embodiment 10 of the present disclosure will be described. In this embodiment, the structure and operation different from those of the above-described embodiment will be mainly described, and the description of the same structure and operation will be omitted. In addition, the same reference numerals or the numerals in the former parts are changed and the numerals and letters in the latter parts are the same for the structures corresponding to those of the above-described embodiment.

[Structure of Regulating Member]

Figure 59:
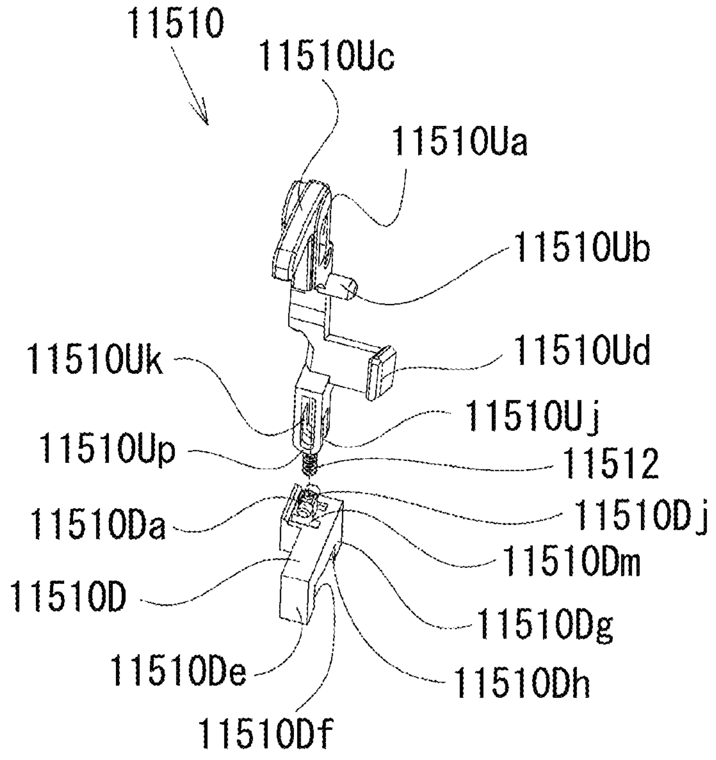
FIG. 59 is an exploded view of the regulating member in the Embodiment 10.
Figure 59:
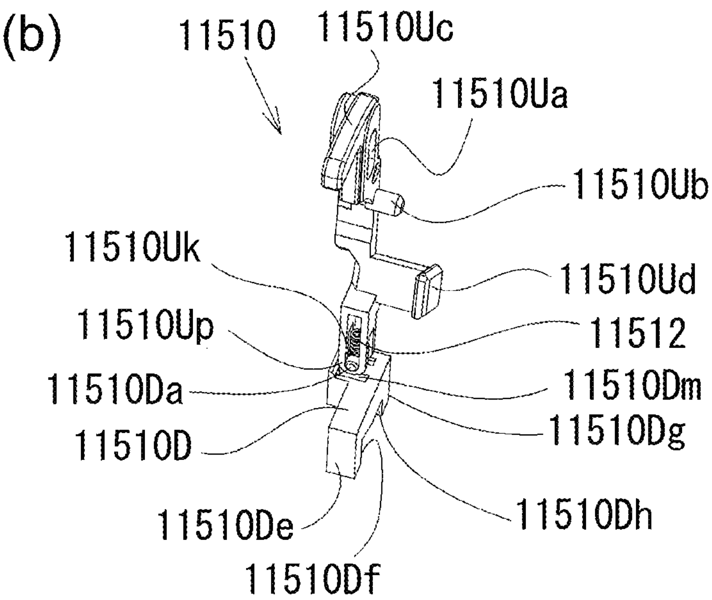

Part (a) of FIG. 59 shows the state the upper regulating member 11510U and the lower regulating member 11510D before assembly. Part (b) of FIG. 59 shows the state the upper regulating member 11510U and the lower regulating member 11510D after assembly. In the Embodiment 10, the regulating member corresponding to the regulating member 9510 in the Embodiment 8 dodge the drive control member 540 in the longitudinal direction (Y1 and Y2 directions in part (d) of FIG. 60 in the process of insertion of the process cartridge P as shown in FIG. 59. The Y1 and Y2 directions are parallel to the rotation axis M1 of the photosensitive drum 4 and the rotation axis M2 of the developing roller 6 of the Embodiment 1. Insertion and removal while the regulating member 11510 dodges the drive control member 540 will be described hereinafter.

As shown in FIG. 59, the specific structure of the regulating member 11510 is a two-part structure of an upper regulating member 11510U and a lower regulating member 11510D. The upper regulating member 11510U is provided with a pair of oblong holes opposing each other in the X1 and X2 directions at the part which overlaps the lower regulating member 11510D in the direction of the insertion and dismounting of the process cartridge (X1 and X2 directions, see FIG. 57) relative to the main assembly of the image forming apparatus. A shaft 11510Da is provided on the lower regulating member 11510D. Further, as shown in part (a) of FIG. 59, the lower regulating member 11510D has foot portions 11510De and 11510Dg which can project from the developing unit 9 in the Z2 direction. A first force receiving portion (insertion force receiving portion) 11510Df is provided on the foot portion 11510De, and a second force receiving portion (retraction force receiving portion) 11510Dh is provided on the foot portion 11510Dg, and they receive forces from the drive control member 540. A compression spring 11512 is provided between the upper regulating member 11510U and the lower regulating member 11510D. One end of the compression spring 11512 is supported by the holding portion (not shown) of the upper regulating member 11510U, the other end is fitted to the holding portion 11510Dj of the lower regulating member 11510D, so that the shaft 11510Da is fitted into the oblong hole 11510Uk (part (b) of FIG. 59).

The regulating member 11510 assembled in this manner is preferably made of a plastic material because the free end portion 11510Uj of the upper regulating member 11510U is widened when the shaft 11510Da is fitted into the oblong hole 11510Uk. When the regulating member 11510 made of a hard material is used, the shaft 11510Da and the lower regulating member 11510D may be separate members. For example, the shaft 11510Da may be finally press-fitted into the lower regulating member 11510D.

[Description of Operation of Regulating Member]

Figure 60:
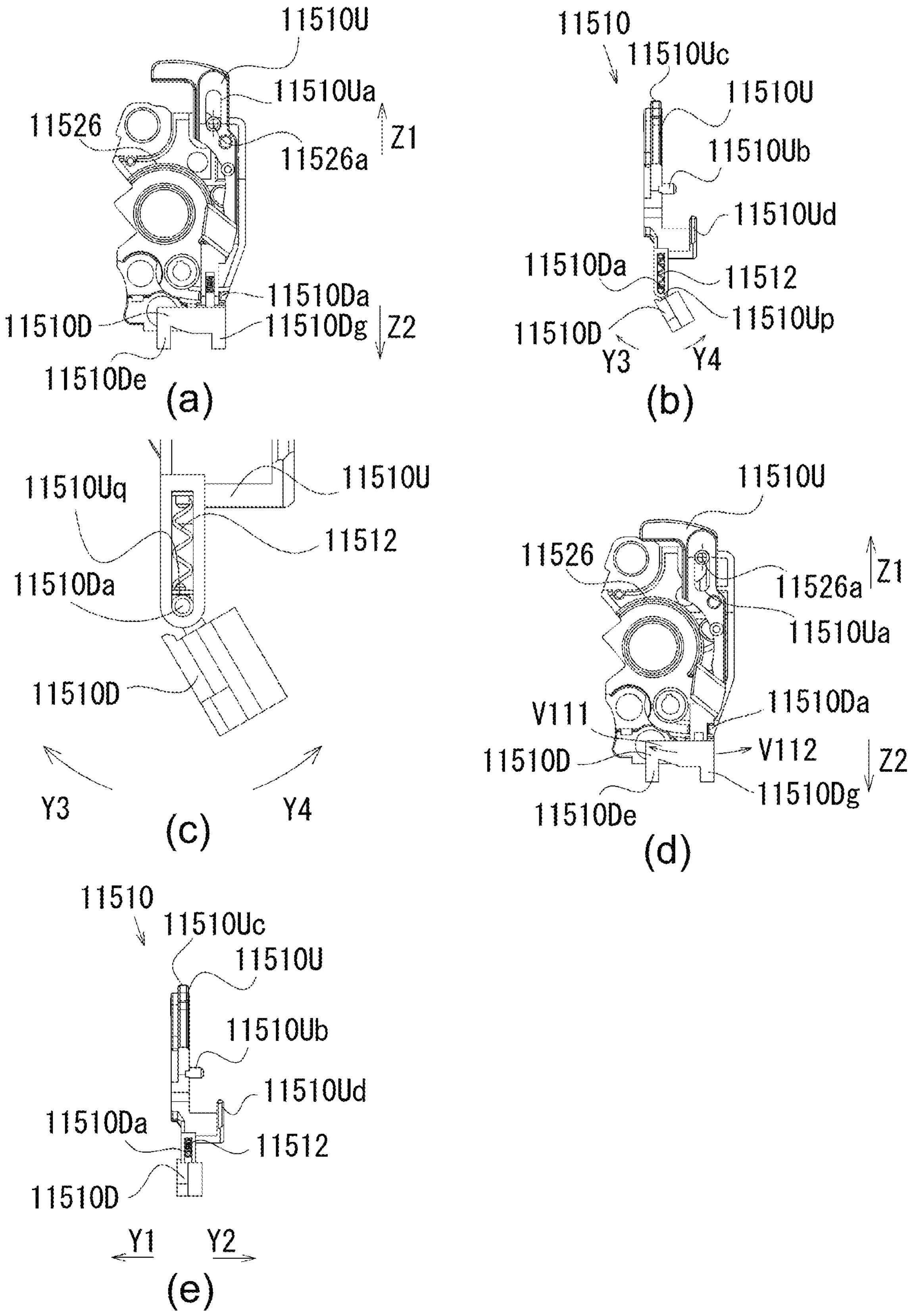
FIG. 60 is an illustration of the operation of the regulating member in the Embodiment 10.

Referring to part (a) of FIGS. 60 to (e), the operation of the regulating member 11510 will be described. Part (a) of FIG. 60 shows a state (free state) in which the upper regulating member 11510U is not pushed by the cartridge pressing member in the main assembly of the image forming apparatus. Part (b) of FIG. 60 shows only the regulating member 11510 as viewed from the drum unit side in part (a) of FIG. 60. FIG. 60(*c*) shows the enlarged view which shows the lower control member 11510D of FIG. 60(*b*). Part (d) of FIG. 60 shows a state in which the upper regulating member 11510U is pushed by the cartridge pressing member inside the image forming apparatus main assembly (locked state). Part (e) of FIG. 60 shows only the regulating member 11510 as viewed from the drum unit side in part (d) of FIG. 60.

Referring to part (a) of FIGS. 59 and (b), a state in which the regulating member 11510 is not pushed by the cartridge pressing member (free state) will be described. By fitting the oblong hole 11510Ua to the support portion 11526Ua of the drive side bearing 11526, the upper regulating member 11510U can move in the longitudinal direction of the oblong hole 11510Ua and in the Z1 and Z2 directions, and can swing about the support portion 11510Ua. When not pressed by the cartridge pressing member, the lower regulating member 11510D is supported by the shaft 11510Da, and can swing about the shaft 11510Da in the directions of arrows Y3 and Y4 (free state) relative to the upper regulating member 11510U. In this free state, by the force of the aforementioned compression spring 11512, for example, the lower regulating member 11510D supports the shaft 11510Da and is kept swingable with respect to the upper regulating member 11510U. In the free state, the lower regulating member 11510D needs to avoid interference with the drive control member 540 when the cartridge is inserted into or removed from the image forming apparatus main assembly which will be described hereinafter. For example, as shown in part (c) of FIG. 60, the spring seating surface 11510Dn of the lower regulating member 11510D receives the urging force of the compression spring 11512, thereby maintaining a state of being swung in the Y4 direction with respect to the upper regulating member 11510U. To do this, the seating surface 11510Dn of the lower regulating member 11510D faces the seating surface 11510Uq of the upper regulating member 11510U in the state that the lower regulating member 11510D is swung in the Y4 direction. By this, the elastic force of the compression spring 11512 provided between the upper regulating member 11510U and the lower regulating member 11510D causes the lower regulating member 11510D to maintain the state of swing, using the moment in the Y4 direction about the shaft 11510Da.

Referring to part (b) of FIGS. 59, 60(*d*), and 60(*e*), the operation in the state (locked state) in which the regulating member 11510 is pushed by the cartridge pressing member will be described. The upper regulating member 11510U moves in the Z2 direction against the urging force of the spring 11512 by being pushed down by the cartridge pressing member. In the state that the upper regulating member 11510U is pushed by the cartridge pressing member, the free end portion 11510 Up of the upper regulating member 11510U shown in part (b) of FIG. 59 fits into the square hole portion 11510Dm of the lower regulating member 11510D. Then, the upper regulating member 11510U and the lower regulating member 11510D are integrated, and the swinging of the lower regulating member 10510D about the shaft 10510Da with respect to the upper regulating member 10510U is restricted (locked state). In this state, the integrated regulating member 11510 can swing in the V111 and V112 directions about the support portion 11526*a* as the center of rotation. Therefore, in the state of being pushed in the Z2 direction by the cartridge pressing member, the regulating member 11510 can move in the same manner as the regulating member 9510 in the Embodiment 8.

[Mounting of Process Cartridge to Main Assembly of Image Forming Apparatus]

Figure 61:
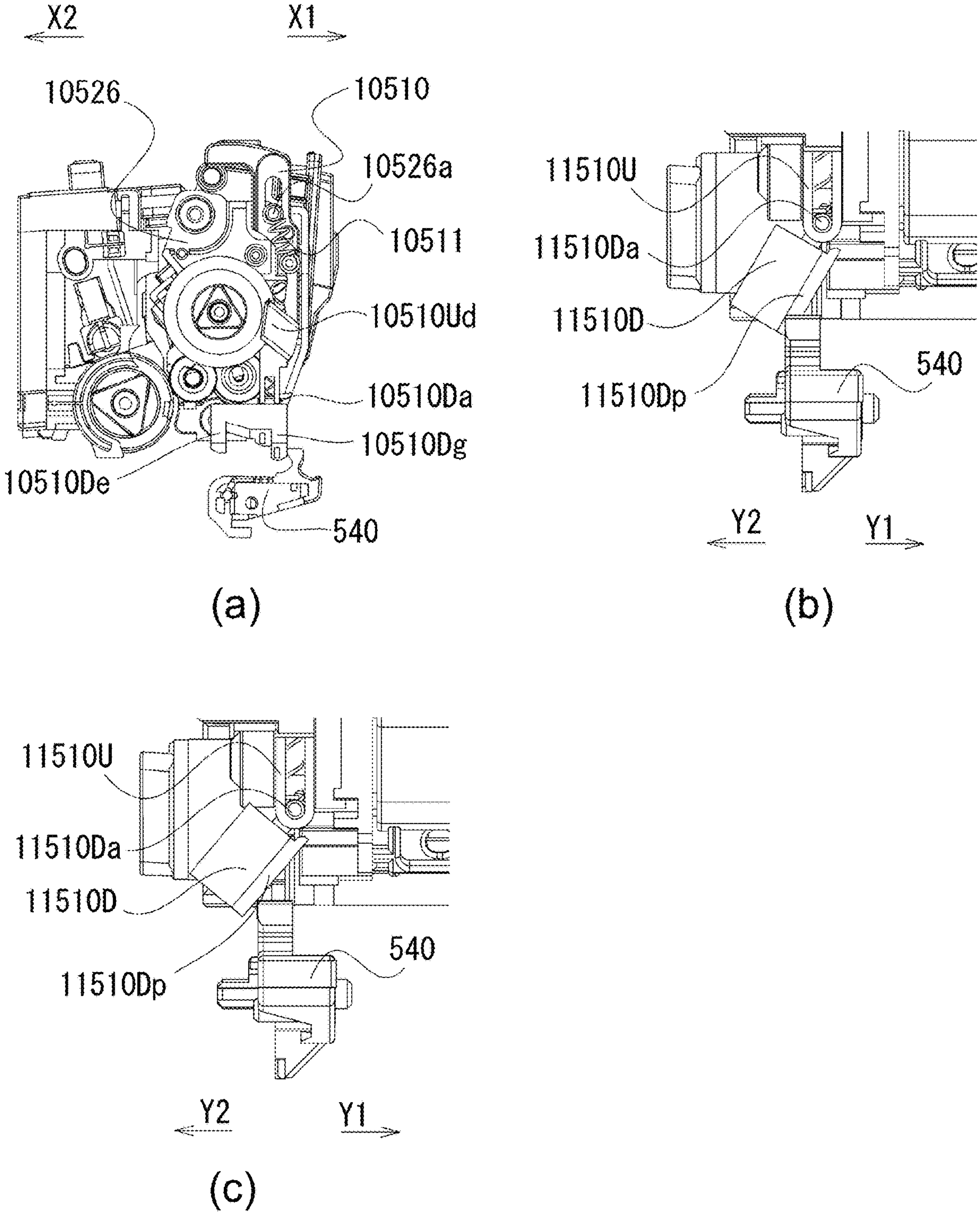
FIG. 61 is an illustration for explaining the operation of the regulating member the Embodiment 10.

Referring to part (a) of FIG. 61, (b), and (c), the operation of the regulating member 11510 when inserting the process cartridge in the Embodiment 10 will be described. part (a) of FIG. 61 shows a state in which the process cartridge P is in the process of being inserted into the image forming apparatus main assembly 502. FIG. 61(*b*) shows the state of part (a) of FIG. 61 as viewed from the developing unit side. Part (c) of FIG. 61 shows a state in which a process cartridge is further inserted from part (a) of FIG. 61. For the sake of better illustration, the drive side cartridge cover 9520 and the developing device cover member 9533 are omitted.

As described above, when the upper regulating member 11510U is not pushed by the cartridge pressing member (free state), the lower regulating member 11510D is rotatable about the shaft 11510Da as shown in part (b) of FIG. 60. When the process cartridge P mounted on the cartridge tray (not shown) is inserted into the image forming apparatus main assembly 502 in the direction of the arrow X1 or taken out thereof in the direction of the arrow X2, the lower regulating member 11510D is inserted while being retracted further in the longitudinal direction (Y2 direction) relative to the drive control member 540. This is because the lower regulating member 11510D is held in the state shown in part (b) of FIG. 60 by the action of the compression spring 11512 described above. Further, an incline surface 11510Dp is provided on the lower regulating member 11510D, and when it collides with the drive control member 540, the lower regulating member 11510D retracts in the Y2 direction. Therefore, it is possible to prevent the drive control member 540 and the lower regulating member 11510D from interfering with each other with the result of being unable to be inserted into the main assembly 502 of the image forming apparatus.

Next, when the process cartridge P is inserted into the image forming apparatus main assembly 502 and the front door 111 is closed, the upper regulating member 11510U is pushed down in the Z2 direction by the cartridge pressing member as described above. Then, the free end portion 11510Up of the upper regulating member 11510U shown in part (b) of FIG. 59 fits into the square hole portion 11510Dm of the lower regulating member 11510D. In other words, the upper regulating member 10510U and the lower regulating member 10510D are integrated and perform substantially the same function as the regulating member 9510 of the Embodiment 8.

[Dismounting of Process Cartridge from Main Assembly of Image Forming Apparatus]

Figure 62:
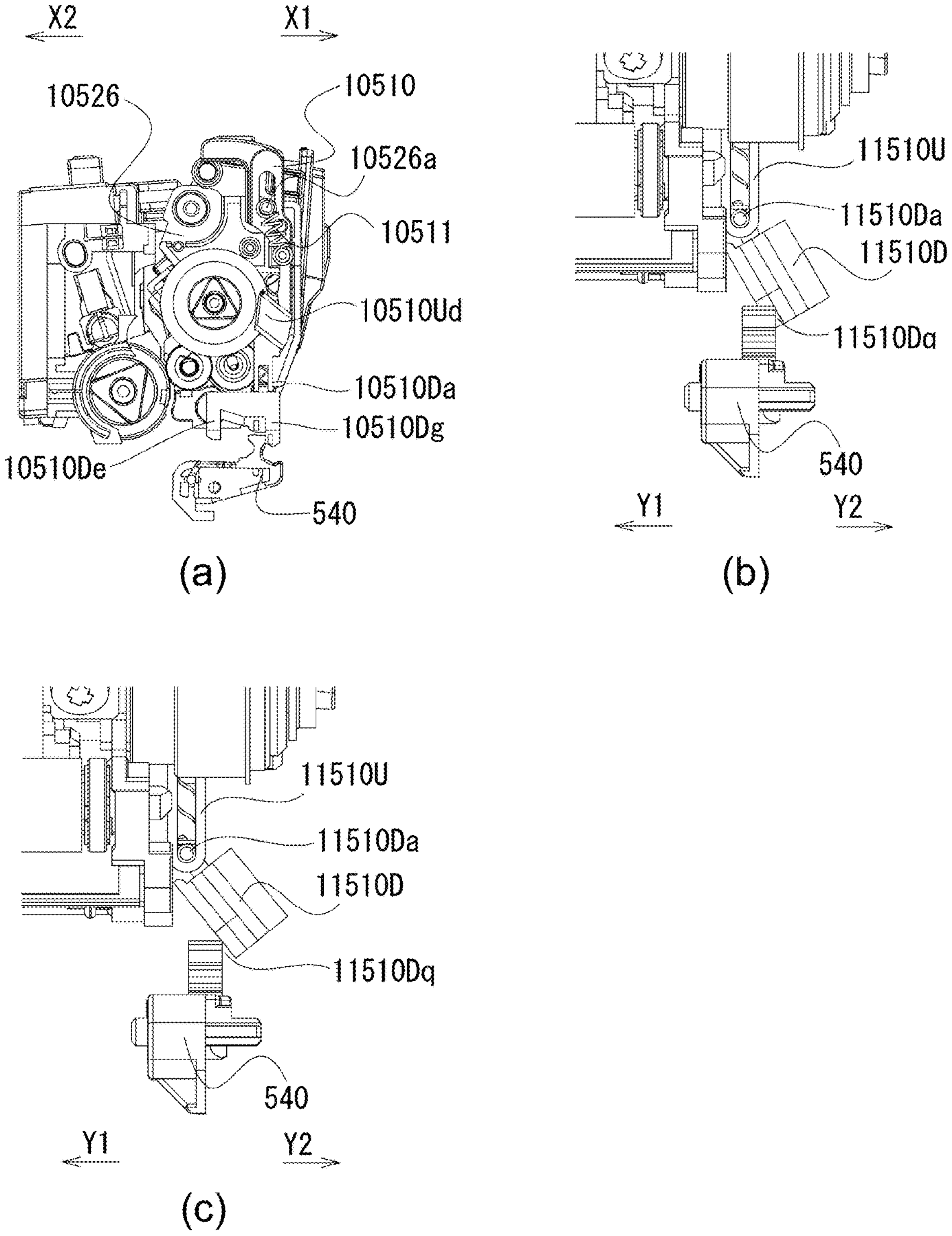
FIG. 62 is an illustration of the operation of the regulating member in the Embodiment 10.

Referring to part (a) of FIG. 62, part (b) of FIG. 62, and part (c) of FIG. 52, the operation of the regulating member 11510 when the process cartridge is removed will be described. Part (a) of FIG. 62 shows a state in which the process cartridge P is in the process of being taken out of the image forming apparatus main assembly 502. FIG. 62(*b*) shows the state of part (a) of FIG. 62 as viewed from the drum unit side. Part (c) of FIG. 62 shows a state in which the process cartridge is further removed from part (a) of FIG. 62 and part (b) of FIG. 62. For the sake of better illustration, the drive side cartridge cover 9520 and the developing device cover member 9533 are omitted.

As shown in part (b) of FIG. 62, when the process cartridge P is dismounted from the image forming apparatus main assembly 502 (X2 direction), the lower regulating member 10510D is removed in the longitudinal direction (Y2 direction). Further, the lower regulating member 11510D is provided with an inclined surface 11510Dq, and when it collides with the drive control member 540, the lower regulating member 11510D further retracts in the Y2 direction. Therefore, it is possible to prevent the drive control member 540 and the lower regulating member 11510D from interfering with each other with the result of incapability of removing it from the image forming apparatus main assembly 502. In this embodiment, a process cartridge usable with a color image forming apparatus is described. Therefore, there are four process cartridges and four drive control members. Therefore, depending on the station, the operations shown in FIGS. 61 and 62 are repeated four times at the maximum. As described above, when the process cartridge Pis inserted into or removed from the image forming apparatus main assembly 502, the lower regulating member 11510D is in a free state.

[Operation of Regulating Member for Drive Connection/Disconnection]

Figure 63:
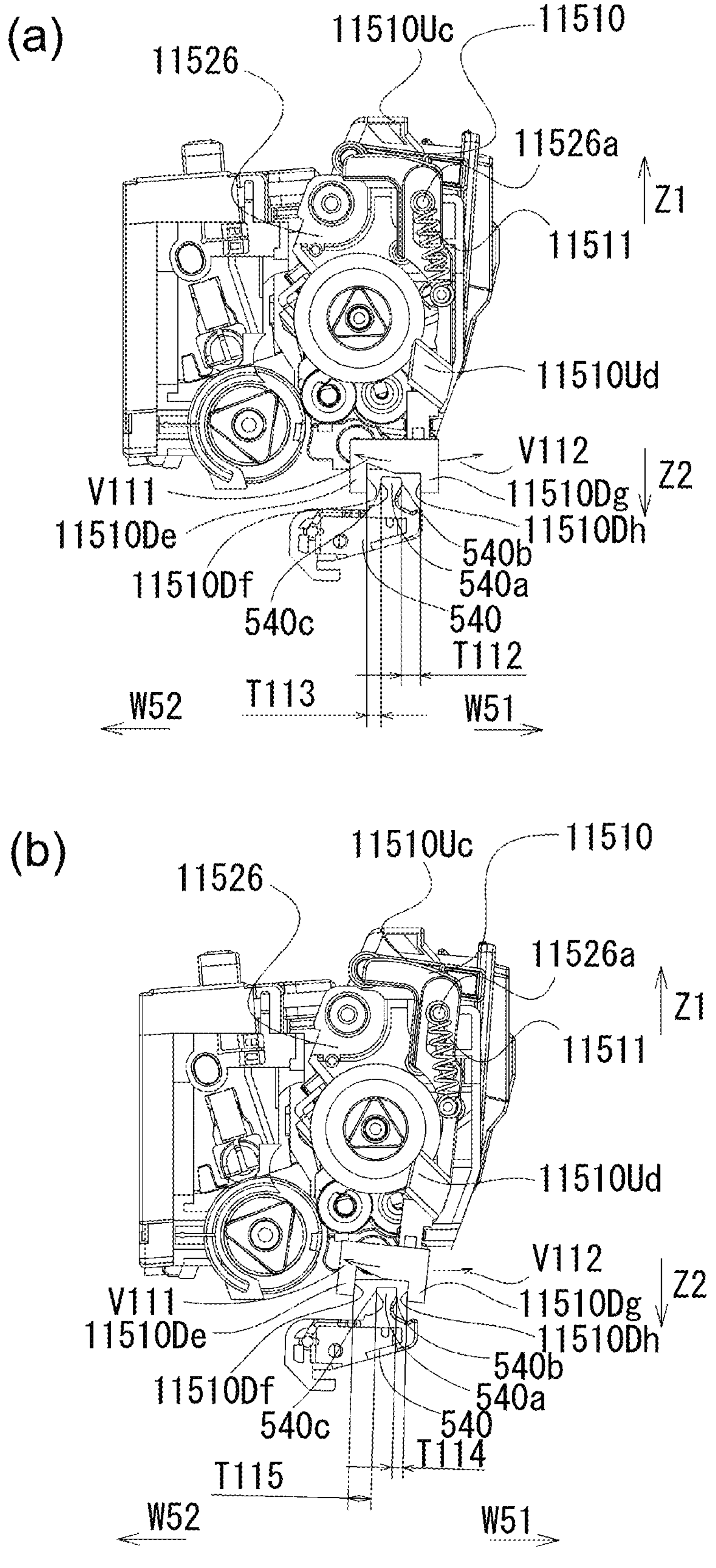
FIG. 63 is an illustration for explaining the operation of the regulating member in the Embodiment 10.

Referring to Figure, the operation of the regulating member 11510 at the time of drive connection and disconnection will be described. Part (a) of FIG. 63 shows a state where the regulating member 11510 is at the first position and the drive control member 540 is at the home position. Part (b) of FIG. 63 shows a state in which the regulating member 11510 is at the second position and the drive control member 540 is at the home position. For the sake of better illustration, the drive side cartridge cover 9520 and the developing device cover member 9533 are omitted. Further, the drive connection operation and drive disconnection operation of the development coupling member 74 and the rotatable member 75, and the operation of the drive control member 540 are the same as those in the Embodiment 1, and therefore the description thereof are omitted.

As described above, when the process cartridge P is inserted into the image forming apparatus main assembly 502 and the front door 111 is closed, the upper regulating member 11510U is pushed down in the Z2 direction by the cartridge pressing member. Then, the upper regulating member 10510U and the lower regulating member 10510D are integrated (part (a) of FIG. 63). At this time, there is a gap T113 between the first force receiving portion 11510Df of the foot portion 11510De and the second force applying surface 540*c*, and there is a gap T112 between the second force receiving portion 11510Dh of the foot portion 11510Dg and the first force applying surface 540*b*. In addition, the regulation lever portion 11510Ud is at a position where the development coupling member 74 and the sliding member 80 do not contact each other. The position of this regulating member 11510 is referred to as the first position. At this time, the driving connection state is maintained while the regulating member 11510 is maintained at the first position.

In addition, when the drive control member 540 moves in the W52 direction, the second force applying surface 540*c* abuts to the first force receiving portion 11510Df of the lower regulating member 11510D, so that the regulating member 11510 rotates about the center of the support portion 11526*a* in the direction of the arrow V111 in part (a) of FIG. 62. Then, the regulation lever portion 11510Ud of the upper regulating member 11510U is positioned between the surface 74*b* of the development coupling member 74 and the surface 80*b* of the sliding member 80. Therefore, the drive disconnection is maintained. The position of this regulating member 10510 is referred to as a second position. At this time, as to the lower regulating member 11510D, there is a gap T115 between the first force receiving portion 11510Df and the second force applying surface 540*c*, and there is a gap T114 therebetween the second force receiving portion 11510Dh of the foot portion 11510Dg and the first force applying surface 540*b*. When the drive control member 540 moves in the W51 direction, the first force applying surface 540*b* abuts to the second force receiving portion 11510Dh of the lower regulating member 11510D, and the regulating member 11510 rotates in the direction indicated by the arrow V112 in part (b) of FIG. 63 about the center of the support portion 11526*a*. When the regulation lever portion 11510Ud is separated from the development coupling member 74 and the sliding member 80, the drive connection is established.

According to the structure of this embodiment described above, the same effect as in the Embodiment 8 can be provided.

In addition, in this embodiment, the lower regulating member 11510D including the first force receiving portion (insertion force receiving portion) 11510Df and the second force receiving portion (withdrawing force receiving portion) 11510Dh is movable with respect to the upper regulating member 11510U and the other parts of the process cartridge P. In this embodiment, the movement displaces the first force receiving portion 11510*f* and the second force receiving portion 11510*h* at least in the Y2 direction (the direction parallel to the rotation axes M1 and M2 in the Embodiment 8). Then, the switching is possible between the state where the lower regulating member 11510D can move independently (free state) and the state where it is fixed to the upper regulating member 11510U (locked state), using the position of the upper regulating member 11510U. By this, when the process cartridge P is inserted into or removed from the image forming apparatus main assembly 502, it is possible to avoid, by taking a free state, that the lower regulating member 11510D and the image forming apparatus main assembly 502, especially the drive control member 540, interfere with each other with the result of incapability of insertion and removal of the process cartridge.

Embodiment 11

Figure 64:
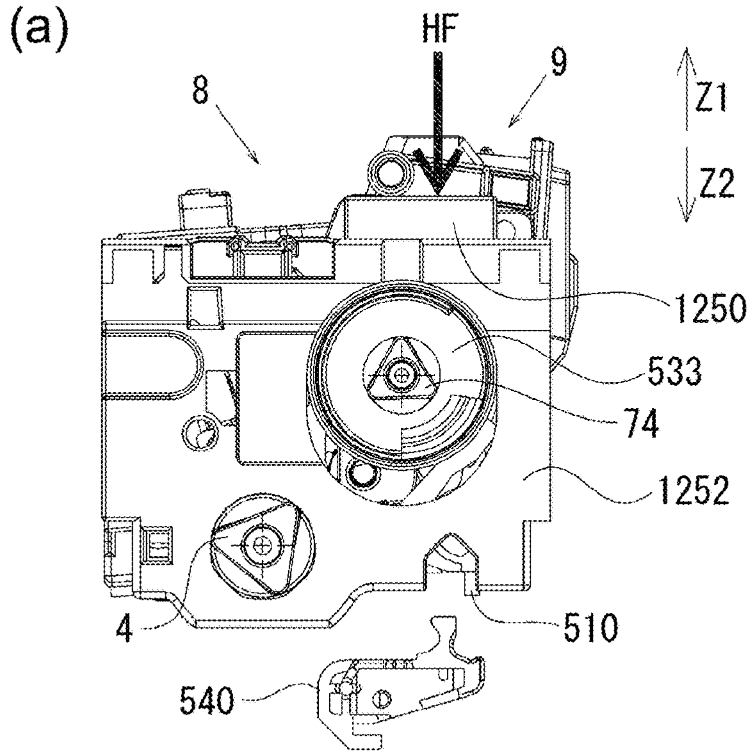
FIG. 64 is a side view of a process cartridge according to the Embodiment 11.
Figure 64:
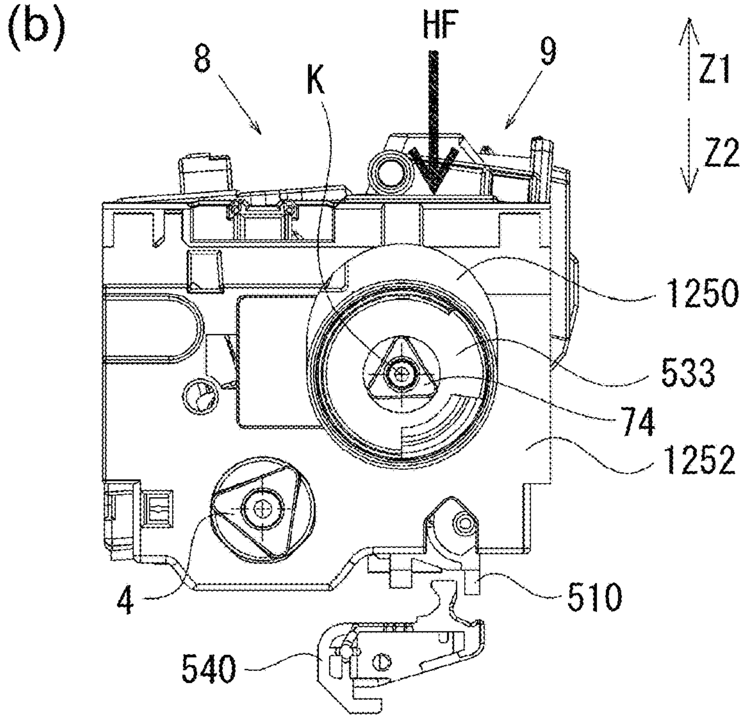
Figure 65:
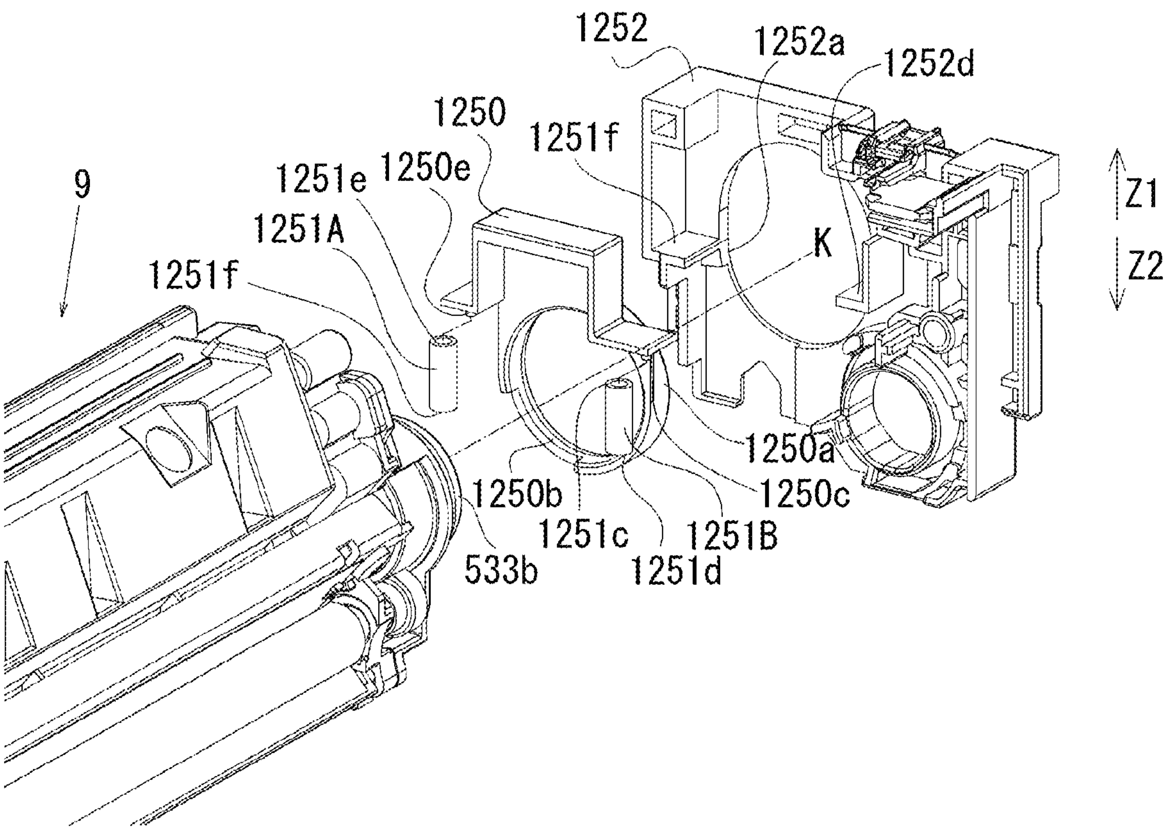
FIG. 65 is an exploded view of the process cartridge according to the Embodiment 11.
Figure 66:
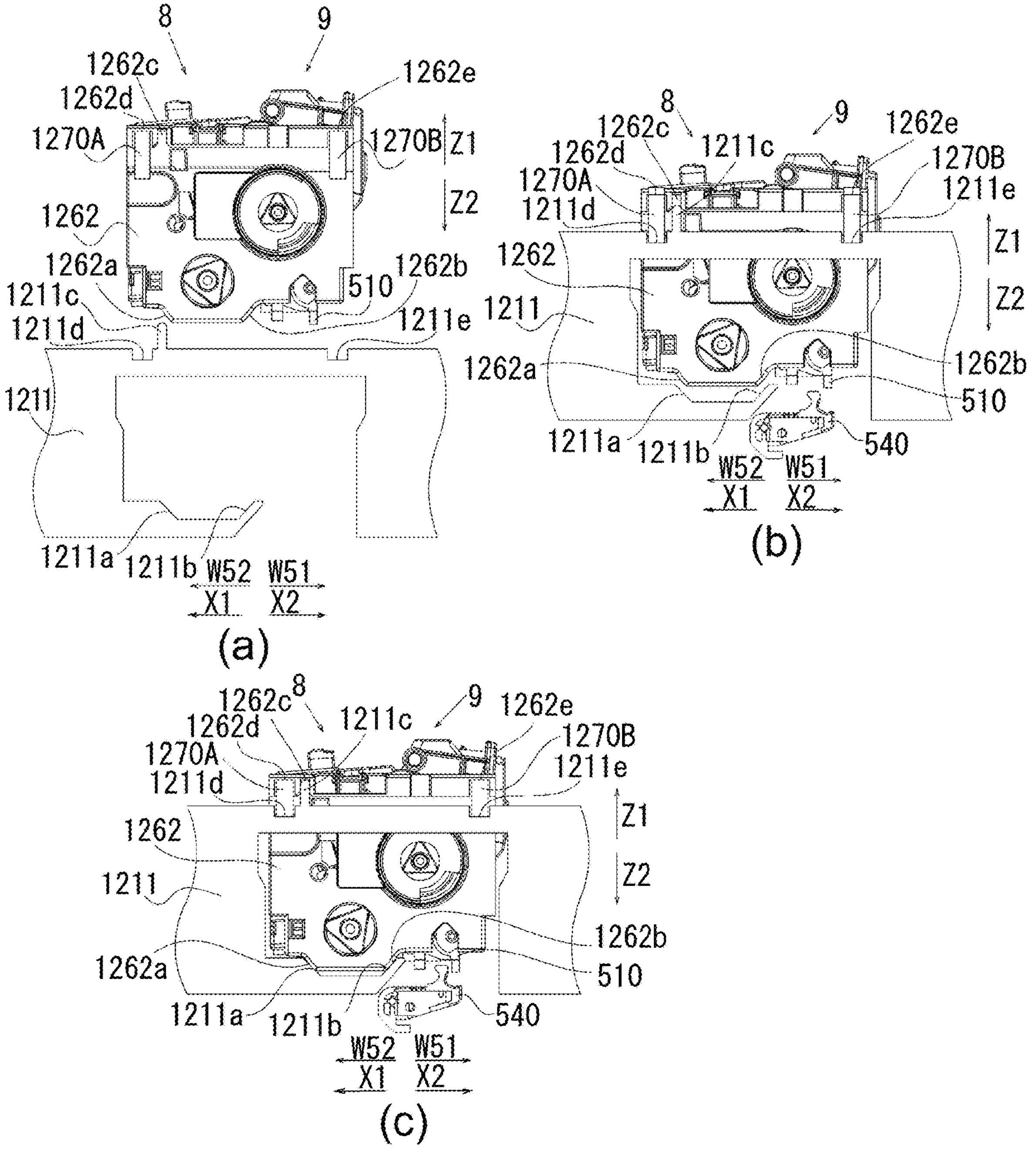
FIG. 66 is an illustration showing the operation of mounting the process cartridge to the main assembly of the apparatus in the Embodiment 11.

Referring to FIGS. 64 to 66, a process cartridge and an image forming apparatus according to an Embodiment 11 of the present disclosure will be described. The process cartridge of this embodiment is the same as that of the Embodiment 1, and differs only in the structure of the cartridge cover member and its peripheries, which will be described hereinafter. Accordingly, the members having the same functions and structures are assigned by the same reference numerals, and detailed description thereof is omitted.

In this embodiment, as in the Embodiment 1, it is possible to switch the drive without depending on the contact/separation operation between the photosensitive drum 4 and the developing roller 6, the drive control member 540 provided in the image forming apparatus main assembly and the component structure and operation of the regulating member 510 provided in the process cartridge are the same as those in the Embodiment 1. According to the structure of this embodiment, the same effects as those of the Embodiment 1 can be provided. In addition to the operations described in the Embodiment 1, a structure is provided with which the process cartridge or the developing unit further moves in the vertical direction until image forming operation. With this operation, when the process cartridge is inserted into or removed from the apparatus main assembly, it is possible to provide a larger vertical distance from the drive control member more than in the Embodiment 1, so that the likelihood of the interference with the drive control member with the result of incapability of insertion and removal of the process cartridge can be further reduced.

[Structure of Process Cartridge Including Developing Unit Moving Member]

Referring to FIGS. 64 and 65, a structure will be described in which the developing unit, which is a process cartridge, moves in the direction perpendicular to the axis of the photosensitive drum of the drum unit. As described in the Embodiment 1, the perpendicular direction Z in this embodiment means the direction perpendicular to the arrow X direction (X1, X2) and perpendicular to the axis of the photosensitive drum 4 (arrows Z1 and Z2) in FIG. 5. That is, the process cartridge according to this embodiment is structured such that the drum unit as the first unit and the developing unit as the second unit are movable relative to each other in the vertical direction. The directions (Z1, Z2) of such relative movement are directions which intersect the imaginary line N2 shown in FIG. 53.

As shown in FIG. 64, the drum unit 8 and developing unit 9 are integrally held by a cartridge cover member to form a process cartridge. FIG. 64 is a side view of the process cartridge as viewed from the drive side.

Here, as shown in part (a) of FIG. 64, in this embodiment, the developing unit 9 is held at a position raised in the direction of arrow Z1, in contrast to the Embodiment 1. That is, the positional relationship is such that the drive control member 540 described in the Embodiment 1 does not operate the regulating member 510. As shown in part (b) of FIG. 64, in this embodiment, the vertical position of the developing unit 9 is the same as in the Embodiment 1. That is, the positional relationship is such that the drive control member 540 described in the Embodiment 1 can operate the restriction member 510. A detailed structure (structure of the developing unit moving member) in which the developing unit 9 is vertically movably held by the developing unit moving member, which is a vertically moving member provided in the process cartridge, will be described hereinafter.

A structure in which the developing unit 9 is held movably in the directions of arrows Z1 and Z2, which are vertical directions, will be described in detail. FIG. 65 is a perspective view of the process cartridge as viewed from the non-drive side, and is an exploded view of the developing unit moving member. The drum unit is not shown for better illustration. As shown in FIGS. 64 and 65, the developing unit moving member, which is a vertically moving member, is an integrated unit member including a drive side developing unit movement bearing 1250, drive side developing unit moving springs 1251A and 1251B, and a drive side cartridge cover member 1252.

The drive side developing unit movement bearing 1250 has a drive side developing unit cylindrical receiving portion 1250*b* for axially supporting the cylindrical portion 533*b* of the developing device cover member to enable fitting support. In addition, the drive side outer cylindrical portion 1250*a* of the drive side developing unit moving bearing 1250 is supported by the drive side cartridge cover member sliding portion 1252*a* of the drive side cartridge cover member so as to be fittable. The drive side cartridge cover member sliding portion 1252*a* has an oblong hole shape parallel to the vertical direction (directions of arrows Z1 and Z2), so that the drive side developing unit moving bearing 1250 and the developing unit is movable in the vertical direction.

In this embodiment, as shown in part (a) of FIG. 64, the drive side developing unit movement bearing 1250 and the developing unit 9 are held in the state of being in abutment to the upper side (Z1 direction) of the oblong hole of the drive side cartridge cover member sliding portion 1252*a*. As shown in FIG. 65, drive side developing unit moving springs 1251A and 1251B are mounted to drive side moving spring fixing boss portions 1250*c* and 1250*e* of the drive side developing unit movement bearing 1250, respectively. The drive side developing unit moving springs 1251A and 1251B are pushing springs, and the moving spring contact surfaces (moving bearing side) 1251*c* and 1251*e* abut to the drive side moving spring fixing boss portions 1250*c* and 1250*e*, and the moving spring contact surfaces (cover side) 1251*d* and 1251*f* are mounted to abut to the drive side cover member moving spring receiving portions 1252*d* and 1252*f*. By this, the drive side developing unit movement bearing 1250 and the developing unit 9 are urged in the Z1 direction with respect to the drive side cartridge cover member 1252 by the pressure spring force of the drive side developing unit moving springs 1251A and 1251B.

As shown in part (b) of FIG. 64, the drive side developing unit movement bearing 1250 and the developing unit 9 are held in contact with the lower side (Z2 direction) of the oblong hole of the drive side cartridge cover member sliding portion 1252*a*. In part (b) of FIG. 64, the vertical positions of the drum unit 8 including the photosensitive drum 4 and the developing unit 9 are the same as in the Embodiment 1. That is, the development coupling member 74 of the developing unit 9 is positioned on the axis of the swing shaft K. In this state, the drive control member 540 and the regulating member 510 are in mutually operable positions and the image forming operation is possible. In order to move the developing unit 9 from the position shown in part (a) of FIG. 64 to the vertical position shown in part (b) of FIG. 64, a developing unit moving pressing force HF (also referred to as vertical urging force), which is the urging force from the image forming apparatus main assembly, is applied in the Z2 direction.

For example, in interrelation with the operation of closing the front door described in the Embodiment 1, the main assembly side vertical movement member (not shown) contacts and presses the drive side development unit movement bearing 1250, thereby producing an urging force in the vertical direction (Z2 direction). At this time, by designing such that the urging force of the main assembly side vertical movement member is larger than the pressure spring urging force of the drive side developing unit moving springs 1251A and 1251B, it is possible to move in the Z2 direction, and it moves to the developing unit position shown in part (b) of FIG. 64. On the other hand, by removing the contact pressure between the main assembly side vertical moving member and the drive side developing unit movement bearing 1250, in interrelation with the operation of opening the front door, it is possible to return the position of the developing unit 9 to the state shown in part (a) of FIG. 64 by the pressure spring urging force of the above-described drive side developing unit moving springs 1251A and 1251B.

[Structure of Process Cartridge Having Cartridge Moving Member]

FIG. 66 shows a process in which the drum unit 8 and the developing unit 9 which are integrally held by the cartridge cover member to form a process cartridge, and are being mounted in the tray and in the main assembly of the image forming apparatus. FIG. 66 is a view as seen from the drive side.

Part (a) of FIG. 66 shows a state before the tray and the drive side tray member 1211 provided on the tray are pulled out of the image forming apparatus and the process cartridge is mounted. As shown in part (a) of FIG. 66, the process cartridge in which the drum unit 8 and the developing unit 9 are integrally held by the side cover member can be mounted to and dismounted from a drive side tray member 1211 provided on the tray, and it can be mounted in the Z1 direction and can be removed by lifting it in the Z1 direction. Here, the drive side cartridge movement springs 1270A and 1270B are mounted to the drive side cartridge cover member 1262 and fixed to cartridge movement spring contact surfaces (on the cartridge side) 1262*d* and 1262*e*. Here, the drive side cartridge movement springs 1270A and 1270B are pushing springs. The drive side cartridge moving springs 1270A and 1270B are fixed by any method of press-fitting and bonding to bosses provided on the drive side cartridge cover member 1262.

Part (b) of FIG. 66 shows a state in which the process cartridge is mounted to the drive side tray member 1211 provided on the tray, the tray has been inserted into the image forming apparatus, and the front door of the image forming apparatus is open. As shown in part (b) of FIG. 66, in the process cartridges mounted in the Z2 direction, drive side cartridge movement springs 1270A and 1270B provided on the drive side cartridge cover member 1262 contact the drive side cartridge movement spring contact surface (tray side) 1211*d* and 1211*e*. In the state of part (b) of FIG. 66, the drive control member 540 provided in the image forming apparatus and the regulating member 510 provided on the process cartridge are in vertically separated positions from each other, and therefore, even if the drive side tray member 1211 is moved in the X1 and X2 directions, which are the tray insertion/removal directions, the insertion/removal thereof can be carried out without interference (the drive control member 540 is shifted to the rear side in the longitudinal direction with respect to the drive side tray member 1211, and has a positional relationship with no interfere upon insertion and removal). It is required to design such that the spring forces of the drive side cartridge moving sprints 1270A and 1270B are enough to separate the drive control member 540 and the regulating member 510 from each other so as to disable mutual action, as shown part (b) of FIG. 66.

Part (c) of FIG. 66 shows a state in which the front door of the image forming apparatus is closed and the process cartridge is vertically moved to the image forming position. Here, as in the method described above, the process cartridge is urged in the Z2 direction by the main assembly side vertical movement member (not shown) as the front door is closed. As shown in part (c) of FIG. 66, by the contact between the drive side cartridge positioning portions (cartridge side) 1262*a* and 1262*b* of a drive side cartridge cover member 1262 provided on the process cartridge and the drive side cartridge positioning portions (tray side) 1211*a* and 1211*b* provided on the drive side tray member 1211, the movement in the Z2 direction is restricted and the position in the Z2 direction is fixed. In addition, the drive side cartridge rotation stopper (cartridge side) 1262*c* of the drive side cartridge cover member 1262 has a cut-away formed recess shape, and the drive side cartridge rotation stopper (tray side) 1211*c* provided in the drive side tray member 1211 has a projection shape, wherein the rotational movement in the X1 and X2 directions is restricted by the projection shape portion enters the recess shape portion.

Further, as shown in part (c) of FIG. 66 the positioning positions of the drive side cartridge positioning portion 1211*a* and 1211*b* the provided on the drive side tray member 1211 designed, so that the drive control member 540 and the regulating member 510 can act on each other in the vertical direction, by which the image forming operation described in the Embodiment 1 can be stably operated. At this time, the drive side cartridge moving springs 1270A and 1270B are in a more compressed state than that in the state shown in part (b) of FIG. 66, and by designing such that the urging force by the vertical moving member of the main assembly side is larger than the pressure spring urging force of the drive side cartridge moving springs 1270A and 1270B, it is possible to make the movement as shown in part (c) of FIG. 66.

In this embodiment, the vertically moving member is provided on the drive side, but by providing a similar structure on the non-drive side, the developing unit can be vertically moved horizontally. Further, from the standpoint of cost reduction, a structure in which the developing unit moving member is provided only on the drive side may be employed. In such a case, only the drive side of the developing unit or process cartridge is lifted in the Z1 direction, and it is in an inclined state. Even in the structure in which it is provided only on the drive side, the drive control member 540 provided on the drive side of the image forming apparatus can be separated from the regulating member 510 in the vertical direction, and therefore, it is easy to avoid the possibility that the drive control member interferes with the insertion or removal when the device is taken out with the result of incapability of insertion or removal of the process cartridge. In addition to the image forming operation in Embodiment 1, the structure in which the process cartridge or developing unit further moves has been described, but the structure of other embodiments and the structure of the vertically moving member of this embodiment may be combined.

Embodiment 12

Referring to FIGS. 67 to 72, a process cartridge and an image forming apparatus according to Embodiment 12 of the present disclosure will be described. The process cartridge of this embodiment is the same as that of the Embodiment 1, except for the structure of the regulating member 13510 and the peripheries thereof. Accordingly, the members having the same functions and structures are assigned by the same reference numerals, and the detailed description thereof is omitted. In addition, the drive connection operation, the drive disconnection operation, and the operation of the drive control member 540 are the same as those in the Embodiment 1, and therefore the description thereof are omitted. In this embodiment, as shown in part (a) of FIG. 71, the regulating member 13510 escapes in the longitudinal direction (arrow Y2 direction) from the drive control member 540 in the process of inserting the process cartridge P into and removing it from the image forming apparatus main assembly 502. When the mounting is completed, the restriction member 13510 is at the same longitudinal position as the drive control member 540, and the drive disconnection operation is possible as in the Embodiment 1.

[Drive side Process Cartridge Structure]

Figure 67:
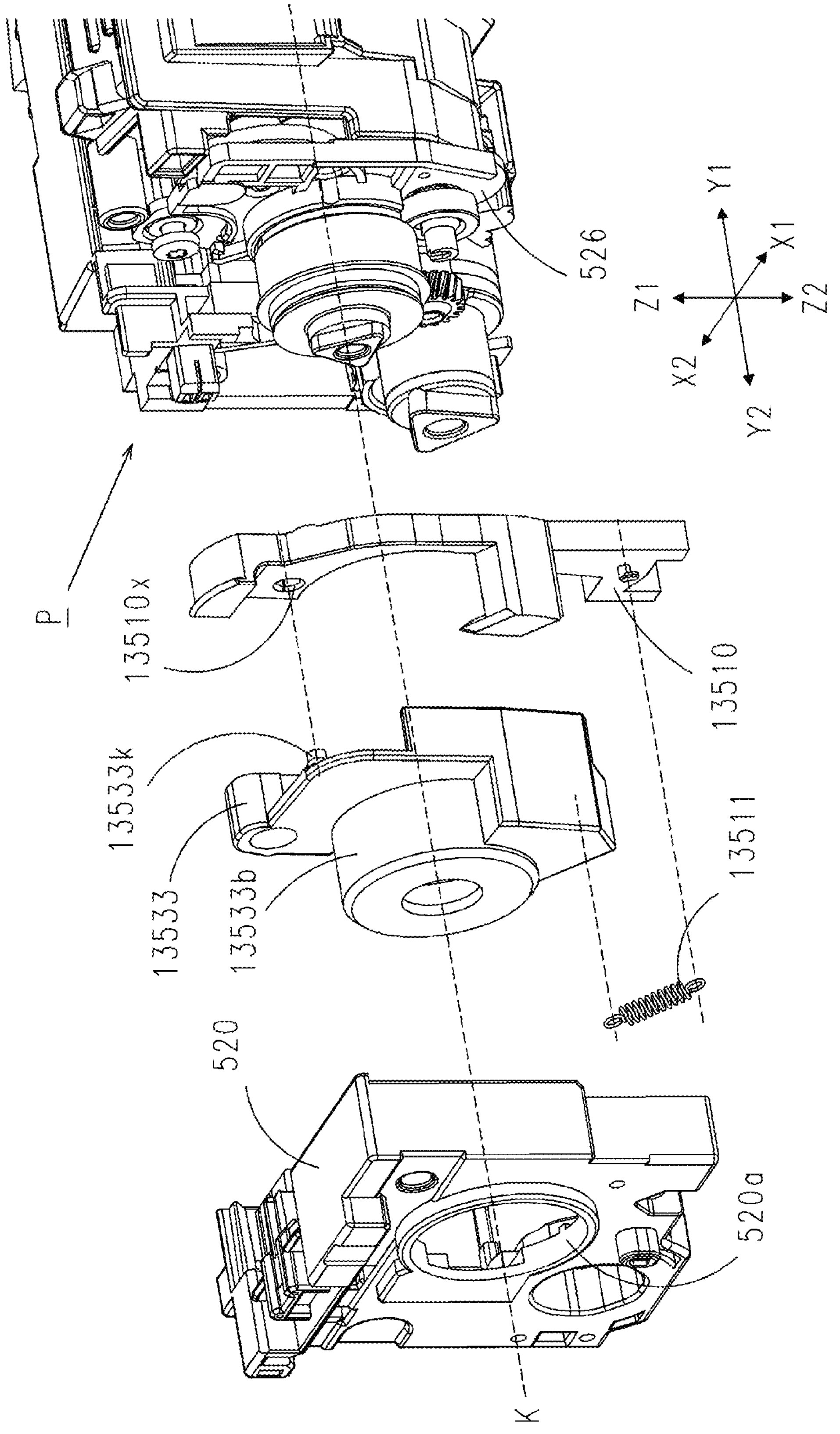
FIG. 67 is an exploded view of the process cartridge according to the Embodiment 12.

FIG. 67 shows a perspective view of the process cartridge P as viewed from the drive side. In this embodiment, the regulating member 13510 is provided with a first oblong hole round 13510*x* and a second oblong round hole 13510*y* (see part (c) of FIG. 68), and the outer diameter of the second support portion 13533*k* of the developing device cover member 13533 is fitted with the inner walls of the first oblong hole 13510*x* and the second oblong hole 13510*y*, by which it is supported so as to be swingable about two swing shafts which will be described hereinafter. In addition, the tension spring 13511 urges the regulating member 13510 and the developing device cover member 13533 to attract each other. Further, the outer diameter of the cylindrical portion 13533*b* of the developing device cover member 13533 is fitted with the support hole 520*a* of the drive side cartridge cover member 520.

[Description of Structure and Operation of Regulating Member]

Figure 68:
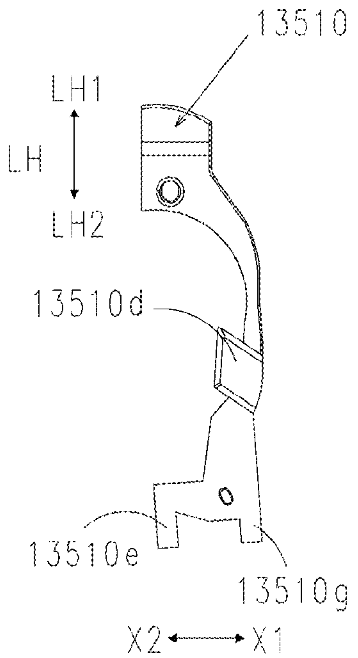
FIG. 68 is an illustration of operation of the regulating member in the Embodiment 12.
Figure 68:
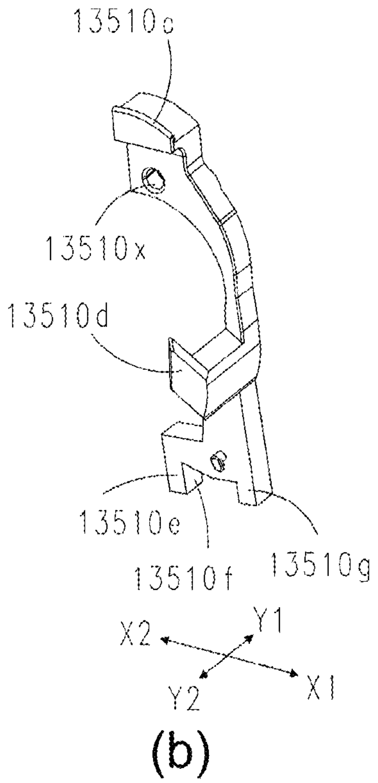
Figure 68:
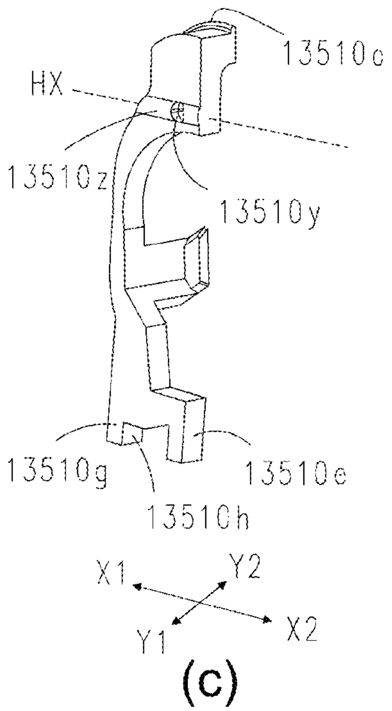
Figure 69:
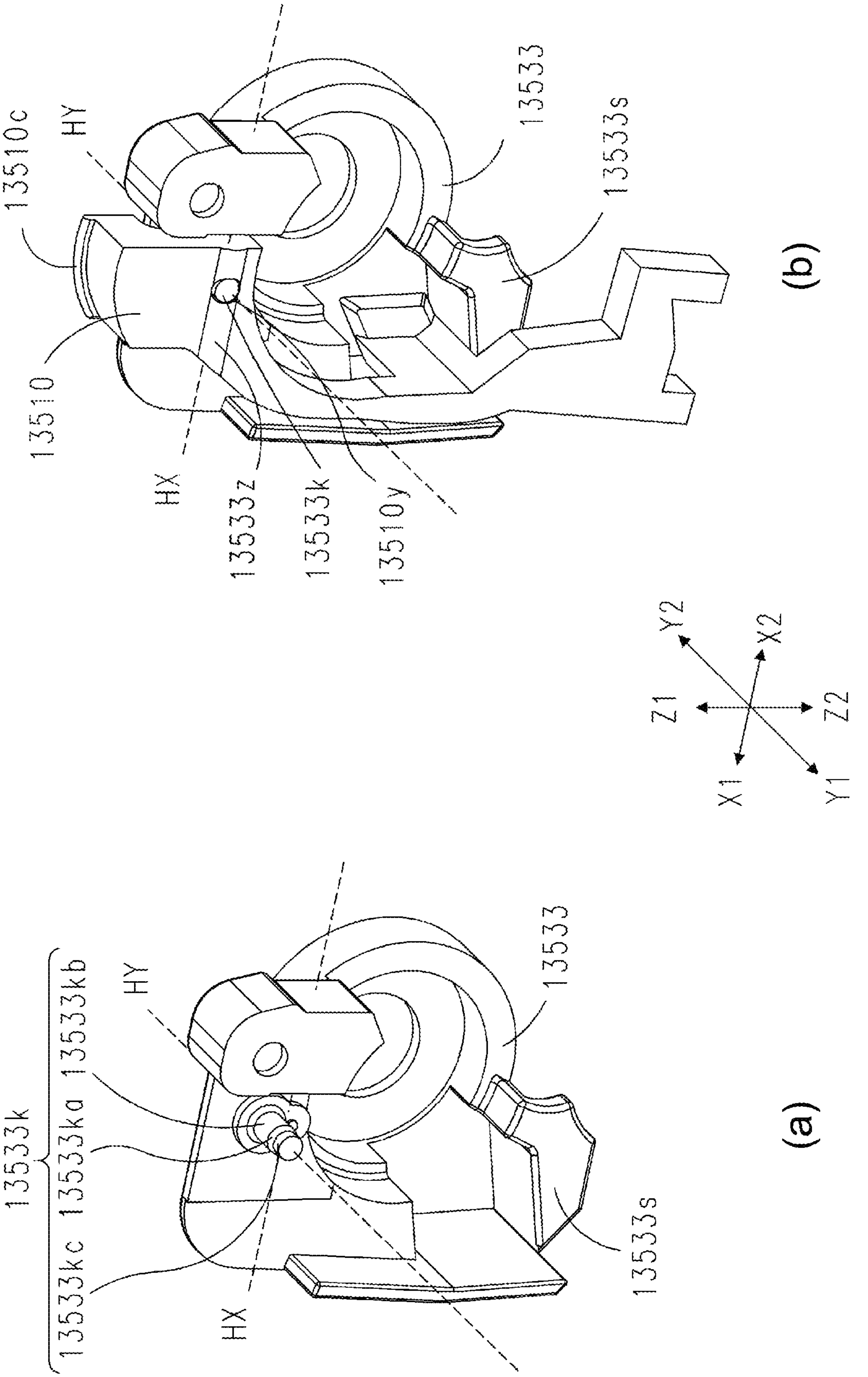
FIG. 69 is illustration of the operation of the regulating member in the Embodiment 12.
Figure 70:
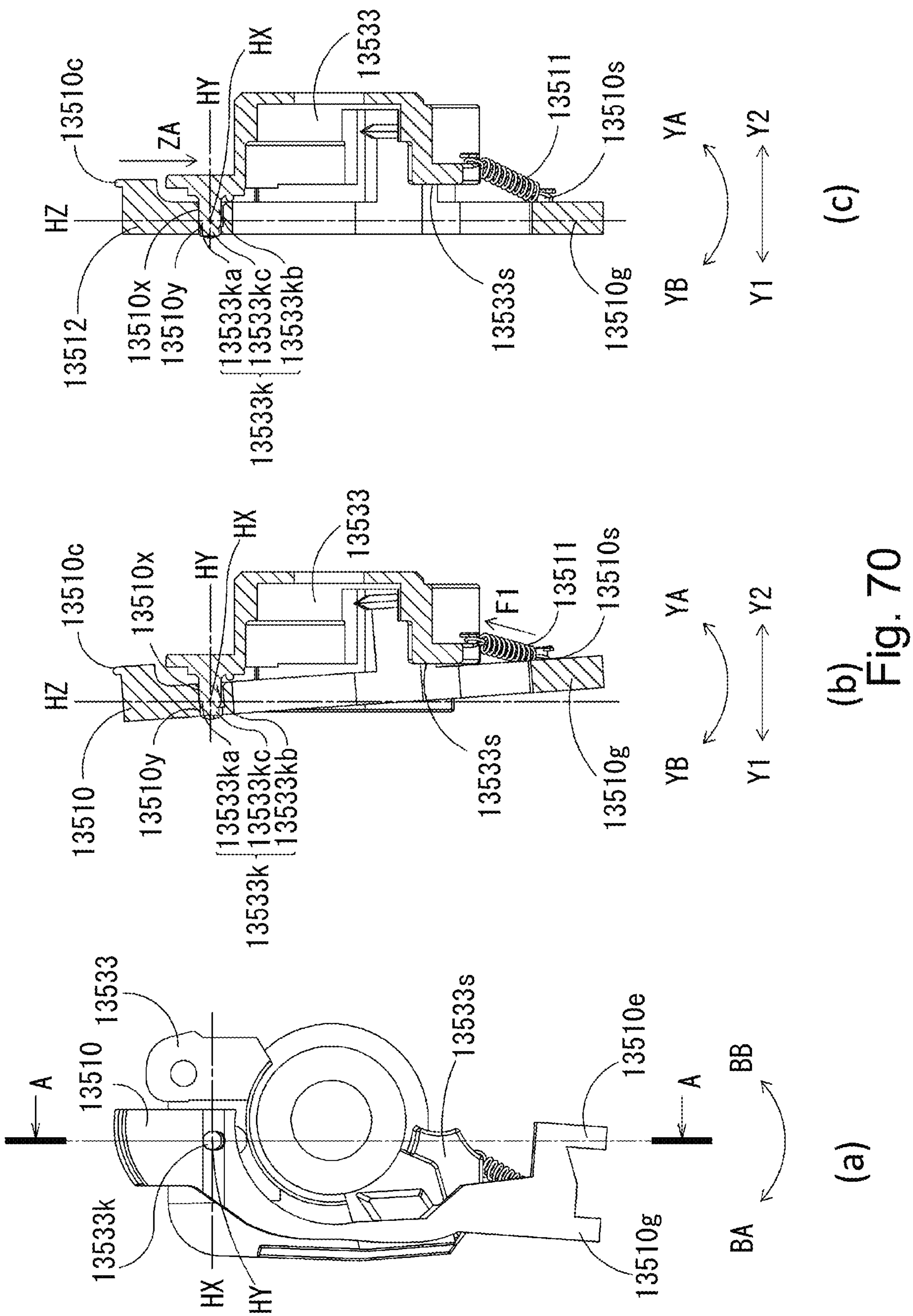
FIG. 70 is an illustration of the operation of the regulating member the Embodiment 12.

Referring to FIGS. 68 to 70, the structure of the drive side regulating member 13510 in this embodiment will be described in detail. Part (a) of FIG. 68 is a front view of the regulating member 13510 per se as viewed in the longitudinal direction of the process cartridge P (in the direction of arrow Y1 in FIG. 67), and part (b) of FIG. 68 and part (c) of FIG. 68 are perspective views of the regulating member 13510 per se. The regulating member 13510 includes a pressed portion 13510*c*, a regulating lever portion 13510*d*, a foot portion 13510*e*, a foot portion 13510*g*, a first oblong hole 13510*x* and a second oblong hole 13510*y*. The foot portions 13510*e* and 13510*g* have surfaces 13510*f* and 13510*h*, which receive forces from drive control member 540. The longitudinal directions LH of the first oblong hole 13510*x* and the second oblong hole 13510*y* are the same, and an upward direction (substantially Z1 direction) is indicated by arrow LH1, and a downward direction (substantially Z2 direction) is indicated by arrow LH2. An axis that is perpendicular to the LH direction and perpendicular to the depth direction (Y1 direction) of the oblong hole forming the first oblong hole 13510*x* is referred to as an axis HX. The regulating member 13510 has a cylindrical surface 13510*z* centered on the axis HX. The Y1 direction is parallel to the rotation axes of the developing roller 6 and the photosensitive drum 4 described in the Embodiment 1. In this embodiment, the first oblong hole 13510*x* and the second oblong hole 13510*y* are arranged so that the apex is common in the arrow LH1 direction. In addition, the first oblong hole 13510*x* and the second oblong hole 13510*y* communicate with each other, and the diameter of the first oblong hole 13510*x* is larger than that of the second oblong hole 13510*y*. Further, the length of the first oblong hole 13510*x* is set longer than the length of the second oblong hole 13510*y*.

Part (a) of FIG. 69 is a perspective view illustrating only the developing device cover member 13533, and part (b) of FIG. 69 is a perspective view illustrating the developing device cover member 13533 and the regulating member 13510. The second support portion 13533*k* of the developing device cover member 13533 is formed by a first cylindrical portion 13533*kb*, a second swing portion 13533*ka* having a spherical surface, and a second cylindrical portion 13533*kc* having a diameter smaller than that of the first cylindrical portion 13533*kb*. Here, the axis passing through the centers of the first cylindrical portion 1923*kb* and the second cylindrical portion 13533*kc* is referred to as HY. The axis perpendicular to this HY and passing through the center of the spherical surface of the second swing portion 13533*ka* is the same as the aforementioned axis HX. In this embodiment, the second swing portion 13533*ka* has a spherical surface, but the present invention is not limited to this, as long as it is a surface which is within a range of not hindering the movement. In addition, the first oblong hole 13510*x* and the second oblong hole 13510*y* of the regulating member 13510 suffices if they are similarly arranged so as not to hinder the swinging in the directions of the arrows YA and YB and the directions of the arrows BA and BB with respect to the first cylindrical portion 13533*kb* and the second cylindrical portion 13533*kc*, and the diameters and the positional relationship in the LH direction are not limited to this example.

FIG. 70 shows a state in which the regulating member 13510 and the tension spring 13511 are mounted to the developing device cover member 13533. Part (a) of FIG. 70 is a view of the process cartridge P as viewed in the longitudinal direction (in the direction of arrow Y2 in FIG. 67). The longitudinal direction of the process cartridge P is parallel to the swing axis K described in the Embodiment 1. The regulating member 13510 is supported by the second support portion 13533*k* of the developing device cover member 13533 so as to be swingable about the axis HY in the directions of arrows BA and BB. Part (b) of FIG. 70 shows a sectional view taken along a line A-A parallel to the LH direction and passing through the center (HY) of the second support portion 13533*k*. The regulating member 13510 receives force in the F1 direction from the tension spring 13511 while the second swing portion 13533*ka* and the inner wall of the first oblong hole 13510*x* are in contact with each other. Here, the spring hooking portion 13510*s* of the regulating member 13510 is placed at a position downstream, in the Y2 direction, of the contact between the second swing portion 13533*ka* and the first oblong hole 13510*x*, and therefore, a moment is produced about the axis HX by the spring force, and it swings about the axis HX. The regulating member 13510 swinging in the direction of the arrow YA determines its attitude by contacting the movement member regulating portion 13533*s* of the developing device cover member 13533, and the foot portions 13510*e* and 13510*g* project in the Y2 direction. This position is a stand-by position of the regulating member 13510.

Next, when the pushed-in surface 13510*f* is pushed in the direction of the arrow ZA from the position shown in part (b) of FIG. 70, a moment in the direction of the arrow YB is produced about the axis HX, since it is placed downstream, in the Y2 direction, of the contact point between the second swing portion 13533*ka* and the first oblong hole 13510*x*. By this, the foot portions 13510*e* and 13510*g* of regulating member 13510 move in the Y1 direction to the attitude shown in part (c) of FIG. 70. This position is an operating position of the regulating member 13510. The amount of pressing in the ZA direction is determined by the amount of movement in the ZA direction of the pressing member 130 (see FIG. 71) of the image forming apparatus main assembly 502 (not shown). In order to restrict rotation of regulating member 13510 about axis HZ perpendicular to axis HY and axis HX, the cylindrical surface 13510*z* is arranged so as to contact the drive side bearing 526 (see FIG. 67). In addition, the contact between the second cylindrical portion 13533*kc* and the second oblong hole 13510*y* also has a similar rotation restricting effect. With the above structure, the regulating member 13510 is supported so as to be swingable in two directions about the axis HY and the axis HX.

[Mounting of Process Cartridge to Main Assembly of Image Forming Apparatus]

Figure 71:
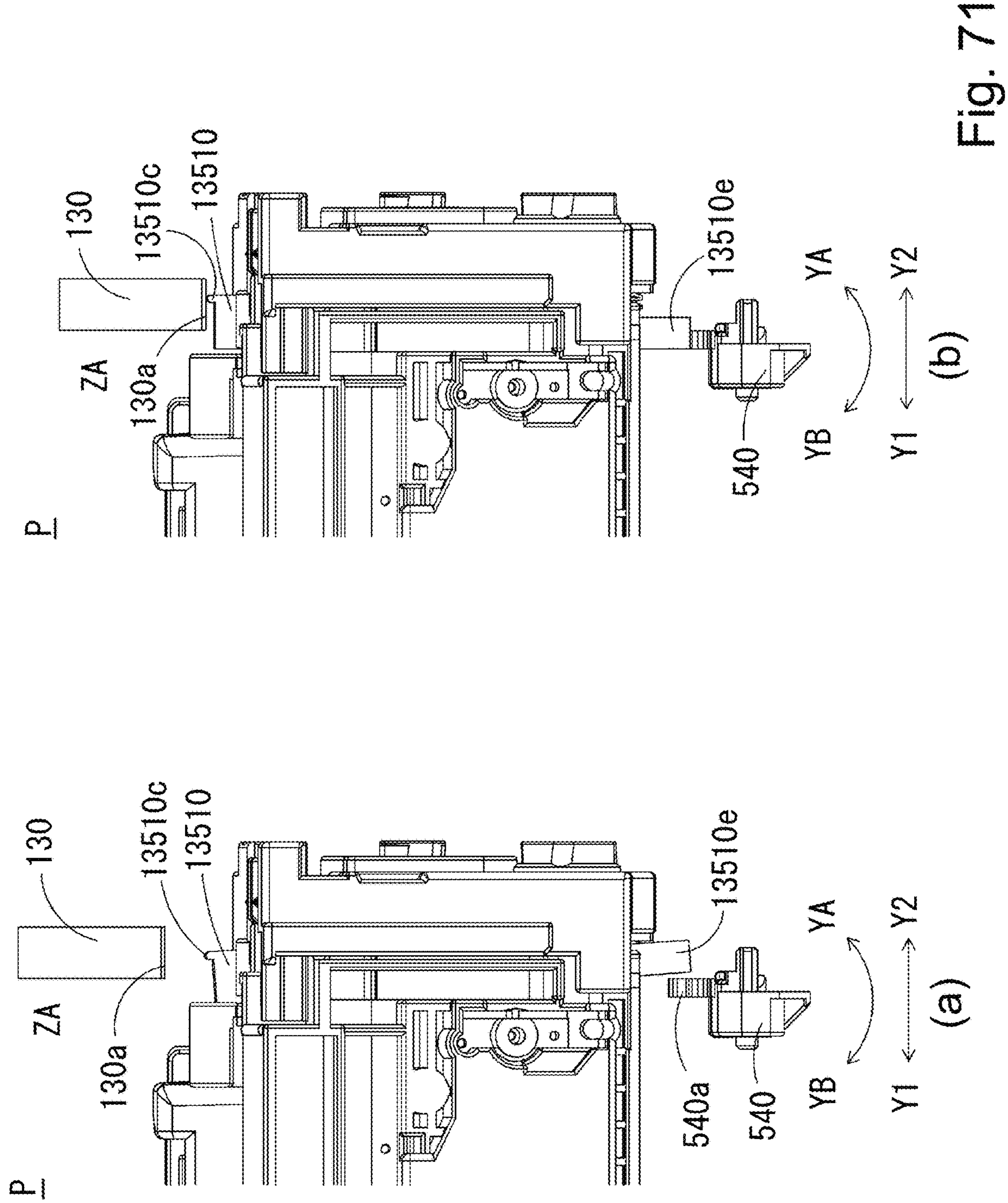
FIG. 71 is an illustration of the operation of the regulating member in the Embodiment 12.

Next referring to Figure, the operation of the regulating member 13510 of the process cartridge P when the process cartridge P is mounted in the image forming apparatus main assembly 502 (not shown) will be described. Part (a) of FIG. 71 is a view as seen from the front door side of the image forming apparatus main assembly 502, when the process cartridge P is mounted on the tray 110 (not shown) and before the front door 111 is closed. Part (a) of FIG. 71 omits parts other than the process cartridge P, the pressing member 130, and the drive control member 540 for better illustration of the structure. In the state of part (a) of FIG. 71, the foot portions 13510*e* and 13510*g* of the regulating member 13510 are positioned at the standby position swung in the YA direction as described above, when the tray 110 is mounted. Further, the foot portions 13510*e* and 13510*g* of the regulating member 13510 are at a position away from the drive control member 540 in the arrow Y2 direction.

Part (b) of FIG. 71 shows a state in which the front door 111 is closed from the state of part (a) of FIG. 71. As in the Embodiment 9, when the front door 111 is closed, the pressing member 130 inside the image forming apparatus main assembly 502 lowers in the ZA direction, and the force applying portion 130*a* is brought into contact with the pressed portion 13510*c* of the regulating member 13510. By this, the foot portions 13510*e* and 13510*g* of the regulating member 13510 are swung in the YB direction by the above-described swing mechanism and reach the operating position. When this operation is completed, the first force applying surface 540*b* of the drive control member 540 and the surface 13510*h* (see FIG. 72) of the regulating member 13510 oppose to each other, and the second force applying surface 540*c* and the surface 13510*f* (see FIG. 72) oppose to each other. That is, the foot portions 13510*e* and 13510*g* of regulating member 13510 and control portion 540*a* of drive control member 540 are arranged so as to overlap each other, in the directions of arrows Y1 and Y2. When the process cartridge P is to be removed from the image forming apparatus main assembly 502, the operation is the reverse of the above-described operation for the mounting, and by opening the front door 111, the foot portions 13510*e* and 13510*g* of the regulating member 13510 moves from the operating position to the stand-by position.

[Switching Operation Between Drive Connection and Disconnection]

Figure 72:
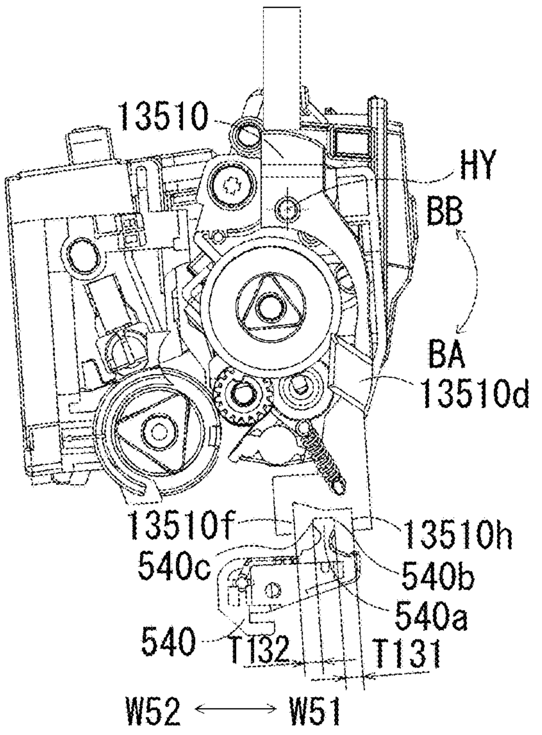
FIG. 72 is an illustration of the operation of the regulating member in the Embodiment 12.
Figure 72:
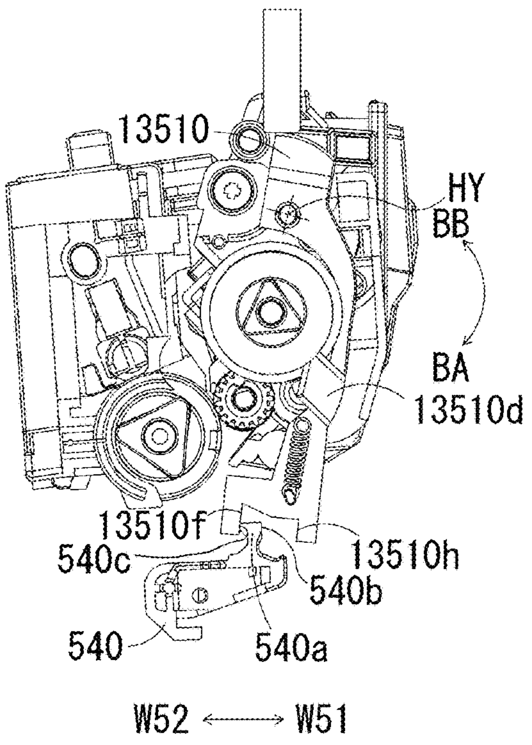

Referring to FIG. 72, the switching operation between drive connection and disconnection will be described. Part (a) of FIG. 72 is a view of the state of part (b) of FIG. 71 as seen from the drive side, with the drive side cartridge cover member 520 and the developing device cover member 13533 not shown for better illustration. In the state of part (a) of FIG. 72, there is a gap T131 between the first force applying surface 540*b* of the drive control member 540 and the surface 13510*h* of the regulating member 13510, and there is a gap T132 between the second force applying surface 540*c* and the surface 13510*f*. In addition, the regulating lever portion 13510*d* is at a position where the development coupling member 74 (not shown) and the sliding member 80 do not contact with each other. The position of this regulating member 13510 is referred to as the first position. At this time, the driving connection state is maintained while the regulating member 13510 is maintained at the first position.

Further, when the drive control member 540 moves in the W52 direction, the second force applying surface 540*c* abuts to the surface 13510*f* of the regulating member 13510, so that the regulating member 13510 swings in the BA direction about the axis HY. Then, the regulating lever portion 13510*d* of the regulating member 13510 is positioned between the inclined surface 74*c* of the development coupling member 74 (not shown) and the cam surface 80*a* of the sliding member 80 (part (b) of FIG. 72). The position of this regulating member 13510 is referred to as a second position. Therefore, the drive disconnection state is maintained. When the drive control member 540 moves in the W51 direction from the state of part (b) of FIG. 72, the first force applying surface 540*b* is brought into contact with the surface 13510*h* of the regulating member 13510, so that the regulating member 13510 rotates in the BB direction about the axis HY as the rotation center. Then, the regulating lever portion 13510*d* is separated from the development coupling member 74 and the sliding member 80, and the driving connection state is established.

As described above, by using the structure of this embodiment, it is possible to switch between the first position and the second position of the regulating member 13510 by moving the drive control member 540, thereby switching the drive connection state. By this, it is possible to switch the drive connection state regardless of the contact/separation operation between the photosensitive drum 4 and the developing roller 6.

In this embodiment, the foot portions 13510*e* and 13510*g* of the regulating member 13510 are made movable in the YA direction. By doing so, when the process cartridge P is inserted into or removed from the image forming apparatus main assembly 502, it is avoided that the foot portions 13510*e* and 13510*g* interfere with the image forming apparatus main assembly 502, particularly the drive control member 540 with the result of preventing insertion or removal of the cartridge. In addition, in this embodiment, when the foot portions 13510*e* and 13510*g* of the regulating member 13510 move from the standby position to the operating position, the amount of movement of the foot portions 13510*e* and 13510*g* in the pressing direction (ZA direction) of the pressing member 130 is small. Therefore, it is possible to select a small amount of movement of the pressing member 130 necessary for moving the foot portions 13510*e* and 13510*g* of the regulating member 13510 from the standby position to the operating position, thus accomplishing downsizing of the main assembly 502 of the image forming apparatus.

The structures of the embodiments described above can be combined with each other as much as possible, as long as there is no technical contradiction.

INDUSTRIAL APPLICABILITY

There are provided a cartridge which transmits the driving force from the coupling member to the developing member, and an image forming apparatus including the cartridge.

The present invention is not limited to the embodiments described above, and various modifications and variations are possible without departing from the spirit and scope of the present invention. Accordingly, the following claims are attached to publicize the scope of the invention.

This application claims priority based on Japanese Patent Application No. 2020-156776 filed on Sep. 17, 2020, and the entire contents of the description are incorporated herein.

The invention claimed is:

1. A cartridge comprising:

a photosensitive member;

a developing member for depositing toner onto the photosensitive member;

a coupling member capable of receiving a driving force for rotating the developing member;

a movable portion movable between a driving force transmitting position for permitting transmission of the driving force from the coupling member to the developing member and a driving force interrupting position for interrupting the transmission of the driving force from the coupling member to the developing member;

a holding portion for holding the movable portion in the driving force interrupting position so that the movable portion is restricted in the driving force interrupting position, wherein the movable portion is capable of taking the driving force transmitting position and the driving force interrupting position in a state where the developing member is in a position where the toner is capable of being deposited on the photosensitive member.

2. A cartridge according to claim 1, further comprising a first rotatable member and a second rotatable member that are provided in a transmission path of the driving force from the coupling member to the developing member and which have a common axis, wherein the first rotatable member and the second rotatable member are capable of taking an engaging position in which they are engaged with each other to transmit the driving force and a non-engaging position in which they are separated from each other so as not to transmit the driving force, and wherein the movable portion separates, in the driving force interrupting position, the first rotatable member and the second rotatable member from each other by applying a force for disengaging the first rotatable member and the second rotatable member to at least one of the first rotatable member and the second rotatable member when they are engaged with each other.

3. A cartridge according to claim 2, further comprising a spring for urging at least one of the first rotatable member and the second rotatable member to place the first rotatable member and the second rotatable member in the engaging position, wherein the force applied to at least one of the first rotatable member and the second rotatable member by the moving portion in the driving force interrupting position is against an urging force of the spring.

4. A cartridge according to claim 3, wherein, in the driving force interrupting position, the first rotatable member and the second rotatable member are positioned in the non-engaging position by inserting the moving portion between the first rotatable member and the second rotatable member when they are in the engaging position, against the urging force of the spring, wherein, in the driving force transmitting position, the first rotatable member and the second rotatable member are positioned in the engaging position by retracting the moving portion from between the first rotatable member and the second rotatable member, and wherein the moving portion is held in the driving force interrupting position by being sandwiched between the first rotatable member and the second rotatable member by the urging force of the spring.

5. A cartridge according to claim 3, wherein the second rotatable member receives the driving force from the first rotatable member by engaging with the first rotatable member about the rotational axis, and the second rotatable member is movable in a direction of the rotational axis between an engaging position for engaging with the first rotatable member and a non-engaging position not engaging therewith, and wherein the spring urges the second rotatable member to the engaging position, and the holding portion comprises the first rotatable member and the second rotatable member.

6. A cartridge according to claim 3, further comprising a moving portion urging spring for applying, to the moving portion placed in the driving force interrupting position, an urging force including a component force effective to place the moving portion in the driving force interrupting position.

7. A cartridge according to claim 6, wherein the moving portion urging spring applies, to the moving portion placed in the driving force transmitting position, an urging force including a component force effective to place the moving portion in the driving force transmitting position.

8. A cartridge according to claim 6, wherein the holding portion includes the moving portion urging spring.

9. A cartridge according to claim 3, further comprising third a moving portion urging spring for applying a force to the moving portion, wherein the moving portion urging spring applies to the moving portion moving from the driving force transmitting position toward the driving force interrupting position a force effective to place the moving portion in the driving force transmitting position until the moving portion reaches a predetermined position, and wherein, when the moving portion exceeds the predetermined position, the moving portion urging spring applies, to the moving portion, an urging force effective to place the moving portion in the driving force interrupting position.

10. A cartridge according to claim 9, wherein the moving portion urging spring includes a toggle spring having one end portion fixed to a frame of the cartridge and the other end portion fixed to the moving portion.

11. A cartridge according to claim 9, wherein the holding portion includes the moving portion urging spring.

12. A cartridge according to claim 1, further comprising a clutch provided in a transmission path of the driving force from the coupling member to the developing member, the clutch including:

an input member rotatable by receiving the driving force at an upstream side of the transmission path, an output member rotatable coaxially with the input member by receiving the driving force from the input member, a transmitting member capable of taking a transmitting state in which a relative rotation between the input member and the output member is restricted to permit simultaneous rotations of the input member and the output member to transmit the driving force from the input member to the output member and a non-transmitting state in which the relative rotation is permitted so as not to transmit the driving force from the input member to the output member, and a control member for switching a state between the transmitting state and the non-transmitting state, wherein the moving portion placed in the driving force interrupting position interrupts transmission of the driving force from the input member to the output member by acting on the control member so as to bring the transmission member into the transmission state.

13. A cartridge according to claim 12, wherein the transmitting member contacts, in the transmitting state, the input member and is rotated integrally with the input member by restriction of the relative rotation by a friction with the input member, and the control member controls the relative rotation by controlling a degree of contact between the input member and the transmitting member, and the moving portion interrupts, in the driving force interrupting position, the transmission of the driving force from the input member to the output member by acting on the control member to reduce a frictional force between the input member and the transmitting member.

14. A cartridge according to claim 13, wherein the clutch is a spring clutch, and the transmitting member is a spring wound around an outer periphery the input member, wherein the control member is engaged with an end of the spring, and the clutch transmits the driving force by integral rotation of the input member, the spring, the output member, and the control member, and wherein the transmission of the driving force from the input member to the output member is interrupted by easing tightening of the spring on the input member by the moving portion restricting rotation of the control member in the driving force interrupting position.

15. A cartridge according to claim 14, wherein the control member includes an engaged portion, and the moving portion has a rotational axis parallel with a rotational axis of the control member, and wherein the moving portion is capable of switching between the engaging position in which it is engaged with the engaged portion and a non-engaging position in which it is not engaged with the engaged portion.

16. A cartridge according to claim 15, wherein a rotational movement direction of the control member is opposite to a movement direction of the moving portion from the non-engaging position toward the engaging position, and wherein the engaged portion includes a first engaged portion engaged with the moving portion placed in the engaging position, in opposition to the rotational direction of the control member, and a second engaged portion engaged with the moving portion placed in the engaging position, in opposition to a direction opposite to the movement direction of the moving portion from the non-engaging position toward the engaging position.

17. A cartridge according to claim 16, wherein the second engaged portion is an outer peripheral surface of the control member, and the first engaged portion is a claw shape portion projected from the outer peripheral surface.

18. A cartridge according to claim 16, wherein, as viewed in a direction of the rotational axis of the control member or the rotational axis of the moving portion, a movement locus of the first engaged portion and a movement locus of the moving portion intersect with each other in an area interposed between a first imaginary line passing through the rotational axis of the control member and a second imaginary line passing through the rotational axis of the moving portion, the imaginary lines being perpendicular to a line connecting the rotational axis of the control member and the rotational axis of the moving portion.

19. A cartridge according to claim 16, wherein the holding portion includes the first engaged portion and the second engaged portion.

20. A cartridge according to claim 15, further comprising a restriction portion for restricting the movement of the moving portion from the engaging position toward the non-engaging position.

21. A cartridge according to claim 15, further comprising a moving portion urging spring for applying, to the moving portion placed in the engaging position, an urging force including a component force effective to place the moving portion in the engaging position.

22. A cartridge according to claim 21, wherein the moving portion urging spring applies, to the moving portion placed in the non-engaging position, an urging force including a component force effective to place the moving portion in the non-engaging position.

23. A cartridge according to claim 21, wherein the holding portion includes the moving portion urging spring.

24. A cartridge according to claim 15, further comprising a moving portion urging spring for applying a force to the moving portion, wherein the moving portion urging spring applies to the moving portion moving from the non-engaging position toward the engaging position a force effective to place the moving portion in the non-engaging position until the moving portion reaches a predetermined position, and wherein, when the moving portion exceeds the predetermined position, the moving portion urging spring applies, to the moving portion, an urging force effective to place the moving portion in the engaging position.

25. A cartridge according to claim 24, wherein the moving portion urging spring includes a toggle spring having one end portion fixed to a frame of the cartridge and the other end portion fixed to the moving portion.

26. A cartridge according to claim 24, wherein the holding portion includes the moving portion urging spring.

27. A cartridge according to claim 1, further comprising a first gear and a second gear which are in meshing engagement with each other and which are provided in a transmission path of the driving force from the coupling member to the developing member, wherein the moving portion supports one of the first gear and the second gear, and wherein the moving portion places, in the driving force transmitting position, one of the gears in an engaging position in which one of the gears engages with the other gear, and places, in the driving force interrupting position, the one of the gears in a non-engaging position in which the one of the gears does not engage with the other gear.

28. A cartridge according to claim 27, further comprising a third gear in meshing engagement with the other one of the first gear and the second gear in the transmission path, and a moving portion urging spring for applying an urging force to place the moving portion in the driving force interrupting position, wherein, when the moving portion is in the driving force interrupting position, a moment M3 which is produced by the urging force of the moving portion urging spring and which is effective to place the moving portion in the driving force interrupting position is greater than a moment M1 which is produced by the engagement between the other one of the gears and the third gear and which is effective to place the moving portion in the driving force transmitting position, and wherein, when the moving portion is in the driving force transmitting position, the moment M3 is less than a sum of the moment M1 and a moment M2 which is produced by engagement between the first gear and the second gear and which is effective to place the moving portion in the driving force transmitting position.

29. A cartridge according to claim 28, wherein the moving portion urging spring is a tension spring having one end portion fixed to a frame of the cartridge and the other end portion fixed to the moving portion.

30. A cartridge according to claim 28, wherein the holding portion is a combination of the first gear and the second gear which are engaged with each other when the moving portion is in the driving force interrupting position.

31. A cartridge according to claim 1, further comprising a force receiving portion for receiving a force for moving the moving portion, wherein, as viewed in a direction of a rotational axis M1 of the photosensitive member or a rotational axis M2 of the developing member, the force receiving portion is movable in a direction crossing with an imaginary line N2 connecting the rotational axis M1 and the rotational axis M2.

32. A cartridge according to claim 31, wherein at least a part of the force receiving portion is provided in one of areas provided by the imaginary line N2, and wherein the one of areas does not include a rotational axis K of the coupling member.

33. A cartridge according to claim 31, wherein at least a part of the force receiving portion is provided in one of areas provided by an imaginary line N3 perpendicular to the imaginary line N2 and between the photosensitive member and the developing member, and wherein the one of areas does not include the rotational axis M1.

34. A cartridge according to claim 31, wherein the moving portion and the force receiving portion are integral with each other.

35. A cartridge according to claim 31, wherein the moving portion and the force receiving portion are connected to each other and are capable of taking a first state in which the force receiving portion is movable relative to the moving portion and a second state in which the moving portion and the force receiving portion are movable integrally with each other.

36. A cartridge according to claim 35, wherein a connecting portion connecting the moving portion and the force receiving portion with each other is elastic, and wherein the connecting portion is elastically deformable in the first state, and elastic deformation of the connecting portion is restricted in the second state.

37. A cartridge according to claim 1, further comprising a force receiving portion for receiving a force for moving the moving portion, and a charge member for charging the photosensitive member, wherein, as viewed in a direction of a rotational axis M1 of the photosensitive member or a rotational axis M2 of the developing member, the force receiving portion is movable in a direction crossing an imaginary line N10 connecting the rotational axis M1 of the photosensitive member and a rotational axis M5 of the charge member.

38. A cartridge according to claim 37, wherein at least a part of the force receiving portion is provided in one of areas divided by a tangent line N11 of a surface of the photosensitive member at one of intersections between the imaginary line N10 and the surface of the photosensitive member, the one of intersections being more remote from the rotational axis M5 of the charge member than the other intersection is from the rotational axis M5, and wherein the one of areas does not include the rotational axis M1 of the photosensitive member, the rotational axis M2 of the developing member, or the rotational axis M5 of the charge member.

39. A cartridge according to claim 1, further comprising a first unit including the photosensitive member, a first frame supporting the photosensitive member, and a second unit including the developing member, and a second frame supporting the developing member and the coupling member, wherein, as viewed in a direction of a rotational axis M1 of the photosensitive member or a rotational axis M2 of the developing member, the first unit and the second unit are movable relative to each other in a direction crossing a direction of an imaginary line N2 connecting the rotational axis M1 of the photosensitive member and the rotational axis M2 of the developing member.

40. A cartridge according to claim 39, wherein the moving portion is provided on the second unit.

41. A cartridge according to claim 1, further comprising a force receiving portion for receiving a force for moving the moving portion, wherein the force receiving portion is movable in a direction of a rotational axis of the photosensitive member or a rotational axis of the developing member.

* * * * *